US009830632B2

United States Patent
Lenahan et al.

(10) Patent No.: US 9,830,632 B2
(45) Date of Patent: Nov. 28, 2017

(54) SYSTEM AND METHODS FOR PERSONALIZATION AND ENHANCEMENT OF A MARKETPLACE

(71) Applicant: eBay Inc., San Jose, CA (US)

(72) Inventors: Michael Lenahan, Moraga, CA (US); Ben Mitchell, Oakland, CA (US); Chahn Chung, San Francisco, CA (US); Myra Sandoval, San Francisco, CA (US); Tim Suglian, San Francisco, CA (US); Matthew Bret MacLaurin, Santa Cruz, CA (US); James Ross Skorupski, San Jose, CA (US); Jesse Wolfe, Sammamish, WA (US); Hsin-Yi Chien, Cupertino, CA (US); Marie Jeanette Floyd Tahir, San Jose, CA (US); Jai Dandekar, San Jose, CA (US); Healey Cypher, San Francisco, CA (US)

(73) Assignee: eBay Inc., San Jose, CA (US)

( * ) Notice: Subject to any disclaimer, the term of this patent is extended or adjusted under 35 U.S.C. 154(b) by 818 days.

(21) Appl. No.: 14/051,375

(22) Filed: Oct. 10, 2013

(65) Prior Publication Data

US 2014/0100991 A1    Apr. 10, 2014

Related U.S. Application Data

(60) Provisional application No. 61/712,205, filed on Oct. 10, 2012, provisional application No. 61/712,217, (Continued)

(51) Int. Cl.
*G06Q 40/00* (2012.01)
*G06Q 30/06* (2012.01)
*G06Q 10/08* (2012.01)

(52) U.S. Cl.
CPC ...... *G06Q 30/0625* (2013.01); *G06Q 10/0833* (2013.01); *G06Q 30/0629* (2013.01); *G06Q 30/0631* (2013.01); *G06Q 30/0643* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS

| 5,336,870 A | 8/1994 | Hughes et al. |
| 7,212,829 B1 * | 5/2007 | Lau ........................ G06Q 10/00 340/539.13 |

(Continued)

FOREIGN PATENT DOCUMENTS

| CN | 105684016 A | 6/2016 |
| JP | 2009151412 A | 7/2009 |

(Continued)

OTHER PUBLICATIONS

"U.S. Appl. No. 14/159,352, Non Final Office Action dated Mar. 28, 2016", 15 pgs.

(Continued)

*Primary Examiner* — Frantzy Poinvil
(74) *Attorney, Agent, or Firm* — Schwegman Lundberg & Woessner, P.A.

(57) ABSTRACT

A system comprising a computer-readable storage medium storing at least one program, and a computer-implemented method for enhancing and personalizing an interactive marketplace. The systems and methods provided herein may allow a user to receive search results that are tailored to the user's personal preferences based on social and purchasing information known about the user. In addition, the systems and methods provided herein may provide shipping updates to a buyer that include a personalized message based on (Continued)

location information provided by the package being shipped. In addition, the systems and methods provided herein allow merchants to provide incentives and rewards for shoppers by participating in interactive shopping games.

9 Claims, 109 Drawing Sheets

Related U.S. Application Data filed on Oct. 10, 2012, provisional application No. 61/712,210, filed on Oct. 10, 2012, provisional application No. 61/712,204, filed on Oct. 10, 2012, provisional application No. 61/712,233, filed on Oct. 10, 2012, provisional application No. 61/712,203, filed on Oct. 10, 2012, provisional application No. 61/712,202, filed on Oct. 10, 2012, provisional application No. 61/712,198, filed on Oct. 10, 2012, provisional application No. 61/712,196, filed on Oct. 10, 2012.

(58) Field of Classification Search
USPC .......................................................... 705/3–44
See application file for complete search history.

(56) References Cited

U.S. PATENT DOCUMENTS

| | | | | |
|---|---|---|---|---|
| 8,180,689 | B2* | 5/2012 | Bezos | G06Q 30/00 705/26.7 |
| 8,392,276 | B1* | 3/2013 | Saltzman | G06Q 30/06 705/26.2 |
| 8,401,914 | B1 | 3/2013 | Kim | |
| 8,418,919 | B1 | 4/2013 | Beyda | |
| 8,503,995 | B2* | 8/2013 | Ramer | H04W 4/025 455/414.1 |
| 8,577,880 | B1* | 11/2013 | Donsbach | G06F 17/30867 705/26.7 |
| 8,666,376 | B2* | 3/2014 | Ramer | G06Q 30/02 455/414.3 |
| 8,744,929 | B2* | 6/2014 | Bezos | G06Q 30/00 705/26.7 |
| 8,774,777 | B2* | 7/2014 | Ramer | G06Q 30/02 455/414.1 |
| 2008/0039212 | A1 | 2/2008 | Ahlgren et al. | |
| 2008/0040233 | A1 | 2/2008 | Wildman et al. | |
| 2008/0237340 | A1 | 10/2008 | Emmons et al. | |
| 2009/0187492 | A1 | 7/2009 | Hammad et al. | |
| 2009/0313142 | A1 | 12/2009 | Hiruma et al. | |
| 2010/0036670 | A1 | 2/2010 | Hill et al. | |
| 2010/0044430 | A1 | 2/2010 | Song et al. | |
| 2010/0205167 | A1 | 8/2010 | Tunstall Pedoe et al. | |
| 2011/0076941 | A1 | 3/2011 | Taveau et al. | |
| 2011/0078628 | A1 | 3/2011 | Rosenberg | |
| 2011/0099069 | A1 | 4/2011 | Hoelz et al. | |
| 2011/0215138 | A1 | 9/2011 | Crum | |
| 2011/0217994 | A1 | 9/2011 | Hirson et al. | |
| 2012/0129552 | A1 | 5/2012 | Skybey | |
| 2012/0173351 | A1 | 7/2012 | Hanson et al. | |
| 2012/0203664 | A1 | 8/2012 | Torossian et al. | |
| 2012/0209749 | A1 | 8/2012 | Hammad et al. | |
| 2012/0290421 | A1 | 11/2012 | Qawami et al. | |
| 2012/0293305 | A1 | 11/2012 | Shaw et al. | |
| 2013/0018726 | A1 | 1/2013 | Ionescu et al. | |
| 2013/0051754 | A1 | 2/2013 | Gilpin | |
| 2013/0080279 | A1 | 3/2013 | Daily et al. | |
| 2013/0153655 | A1 | 6/2013 | Dawkins | |
| 2013/0311328 | A1 | 11/2013 | Chien et al. | |
| 2013/0317923 | A1 | 11/2013 | Capps et al. | |
| 2014/0108247 | A1 | 4/2014 | Artman et al. | |
| 2014/0282743 | A1 | 9/2014 | Howard et al. | |
| 2014/0365341 | A1 | 12/2014 | MacLaurin et al. | |
| 2015/0094080 | A1 | 4/2015 | Bleecher Snyder et al. | |

FOREIGN PATENT DOCUMENTS

| | | |
|---|---|---|
| JP | 2009301297 A | 12/2009 |
| KR | 1020100009150 A | 1/2010 |
| KR | 1020120102304 A | 9/2012 |
| WO | WO-2014197627 A2 | 12/2014 |
| WO | WO-2014197627 A3 | 12/2014 |

OTHER PUBLICATIONS

"U.S. Appl. No. 14/159,352, Response filed Jan. 11, 2016 to Final Office Action dated Sep. 11, 2015", 13 pgs.
"Application Serial No. PCT/US2014/040952, International Preliminary Report on Patentability dated Dec. 17, 2015", 7 pgs.
"European Application Serial No. 14807509.6, Communication pursuant to Rules 161(2) and 162 EPC mailed Jan. 19, 2016", 2 pgs.
"European Application Serial No. 14807509.6, Response filed Feb. 10, 2016", 13 pgs.
"U.S. Appl. No. 14/109,737, Non Final Office Action dated Dec. 5, 2016", 13 pgs.
"Canadian Application Serial No. 2,913,994, Office Action dated Nov. 30, 2016", 4 pgs.
"European Application Serial No. 14807509.6, Extended European Search Report dated Nov. 22, 2016", 6 pgs.
"Korean Application Serial No. 2016-7000111, Office Action dated Sep. 19, 2016", W/ English Translation, 14 pgs.
U.S. Appl. No. 14/159,352, filed Jan. 20, 2014, Shoppable Video.
U.S. Appl. No. 14/109,737, filed Dec. 17, 2013, Store of the Future.
"U.S. Appl. No. 14/159,352, Final Office Action dated Feb. 4, 2015", 12 pgs.
"U.S. Appl. No. 14/159,352, Final Office Action dated May 22, 2015", 12 pgs.
"U.S. Appl. No. 14/159,352, Final Office Action dated Sep. 11, 2015", 14 pgs.
"U.S. Appl. No. 14/159,352, Non Final Office Action dated Oct. 6, 2014", 11 pgs.
"U.S. Appl. No. 14/159,352, Response filed Jan. 6, 2015 to Non Final Office Action dated Oct. 6, 2014", 13 pgs.
"U.S. Appl. No. 14/159,352, Response filed May 4, 2015 to Non Final Office Action dated Feb. 4, 2015", 13 pgs.
"U.S. Appl. No. 14/159,352, Response filed Aug. 24, 2015 to Non Final Office Action dated May 22, 2015", 17 pgs.
"International Application Serial No. PCT/US2014/040952, International Search Report dated Oct. 9, 2014", 2 pgs.
"International Application Serial No. PCT/US2014/040952, Written Opinion dated Oct. 9, 2014", 5 pgs.
"U.S. Appl. No. 14/109,737, Response filed Sep. 9, 2016 to Restriction Requirement dated May 20, 2016", 10 pgs.
"U.S. Appl. No. 14/109,737, Restriction Requirement dated May 20, 2016", 5 pgs.
"U.S. Appl. No. 14/159,352, Final Office Action dated Oct. 6, 2016", 22 pgs.
"U.S. Appl. No. 14/159,352, Response filed Jun. 28, 2016 to Non Final Office Action dated Mar. 28, 2016", 14 pgs.
"Australian Application Serial No. 2014274905, First Examiner Report mailed Aug. 17, 2016", 3 pgs.
"U.S. Appl. No. 14/109,737, Response Filed Mar. 16, 2017 to Non Final Office Action dated Dec. 5, 2016", 20 pgs.
"U.S. Appl. No. 14/159,352, Response Filed Mar. 6, 2017 to Final Office Action dated Oct. 6, 2016", 15 pgs.
"Australian Application Serial No. 2014274905, Response filed Jan. 18, 2017 to First Examiner Report mailed Aug. 17, 2016", 21 pgs.
"Australian Application Serial No. 2014274905, Subsequent Examiners Report mailed Feb. 22, 2017", 3 pgs.
"Korean Application Serial No. 2016-7000111, Response filed Dec. 16, 2016 to Office Action dated Sep. 19, 2016", (English Translation of Claims), 31 pgs.
"U.S. Appl. No. 14/109,737, Final Office Action dated May 26, 2017", 19 pgs.
"Australian Application Serial No. 2014274905, Response filed May 19, 2017", 18 pgs.

(56) References Cited

OTHER PUBLICATIONS

"European Application Serial No. 14807509.6, Response filed Jun. 13, 2017", 9 pgs.
"Korean Application Serial No. 2016-7000111, Final Office Action dated Apr. 17, 2017", (English Translation), 7 pgs.
Shader, Danny et al., "PayNearMe at FinovateFall 2010", [Online]. Retrieved from the Internet: <http://www.youtube.com/watch?v=d-oaZpCzpqk>, (Nov. 5, 2010).
"U.S. Appl. No. 14/109,737 Examiner Interview Summary dated Jun. 20, 2017", 3 pgs.
"U.S. Appl. No, 14/109,737, Response filed Jul. 20, 2017 to Final Office Action dated May 26, 2017", 18 pgs.
"Australian Application Serial No. 2014274905, Subsequent Examiners Report dated Jun. 19, 2017", 3 pgs.
"Korean Application Serial No. 2016-7000111, Final Office Action dated Jul. 25, 2017", 4 pgs.
"Korean Application Serial No. 2016-7000111, Request for Reexamination filed Jul. 17, 2017", W/ English Claims, 25 pgs.

\* cited by examiner

SYSTEM AND METHODS FOR PERSONALIZATION AND ENHANCEMENT OF A MARKETPLACE

RELATED APPLICATIONS

This application claims the priority benefit of U.S. Provisional Application No. 61/712,205, filed Oct. 10, 2012, U.S. Provisional Application No. 61/712,217, filed Oct. 10, 2012, U.S. Provisional Application No. 61/712,210, filed Oct. 10, 2012, U.S. Provisional Application No. 61/712,204, filed Oct. 10, 2012, U.S. Provisional Application No. 61/712,233, filed Oct. 10, 2012, U.S. Provisional Application No. 61/712,203, filed Oct. 10, 2012, U.S. Provisional Application No. 61/712,202, filed Oct. 10, 2012, U.S. Provisional Application No. 61/712,198, filed Oct. 10, 2012, and U.S. Provisional Application No. 61/712,196, filed Oct. 10, 2012, which are each incorporated herein by reference.

TECHNICAL FIELD

The subject matter disclosed herein generally relates to systems and methods for providing an interactive shopping experience.

BACKGROUND

Virtual storefronts created for electronic commerce (e-commerce) are often static webpages that show products without much information about the products. In many cases the merchants that are selling the products have a vision for the products that they offer that may be lost in the static webpage. As a result, would-be buyers visiting the virtual storefront may not appreciate the uniqueness of the products on display, and not be drawn into the storefront, possibly navigating away to a different storefront.

Accordingly, there is a need for systems and methods for providing an interactive shopping experience that allows merchants to create dynamic storefronts that engage the would-be buyers by telling stories about the products being offered and allow the users to interact with the products on display.

When buying a product from an online merchant, one of the pastimes that occupies the buyer is tracking the package online. Conventional websites provided by UPS, FedEx, and the USPS provide relevant information, such as where the package currently is and when the package is scheduled to arrive. However, the buyer must actively log in to the website to see this relevant information. Moreover, the information is relatively static and uninteresting. Accordingly, there is a need for systems and methods for providing shipping updates that may be sent directly to the buyer and may be personalized based on factors such as the location, weather, and time of day relative to the package.

Although buyers and sellers are increasingly conducting transactions online, a majority of products are still sold locally. This means that a buyer must be at the physical location of the seller and provide traditional means of payment to the seller to complete the transaction. However, as more buyers and sellers adopt online financial accounts provided by payment service processors, such as PayPal of San Jose, Calif., the ability to use the online account to pay for transactions may be important when making purchasing decisions. Accordingly, there is a need for systems and methods for processing a payment using an online escrow account.

Searching for products online is often a tedious process that involves sifting through pages of results to find the results that matter. In many cases, the search results are inaccurate and may not provide the searcher with the products that they are ultimately interested in. Moreover, there are times when the searcher knows what a product looks like, but not the name, and wants to search for the product or products that are similar looking. Trying to perform a text search based on descriptors is even more frustrating and will often produce unsatisfactory results to a searcher. Accordingly, there is a need for systems and methods for searching for a product that produces results tailored to a searcher based on known information about the user as well as allowing searching for products by image recognition.

For many people shopping at a local mall is a fun and social activity. However, the shopping experience has not changed much over the last thirty years or so. With the increase in use of mobile devices having internet connectivity, shoppers use the mobile devices to research shopping options and decisions, as well as interact socially by blogging and tweeting about their purchases, sales, and updating their status to tell their friends which stores they are at. However, this does not do much for the retailer, as the retailer does not stand to gain much from the user's online participation while shopping. Accordingly, there is a need for systems and methods for an interactive shopping game that promotes long-term user engagement, retailer loyalty, and repeat business.

People often have more products lying around their garage, attic, or other places, than they generally know what to do with. In many cases, these products may provide sources of revenue. However, manually cataloguing these products and researching potential selling prices takes a lot of time and may put people off from attempting it. Accordingly, there is a need for systems and methods for creating and managing an inventory of products.

One of the most daunting tasks in buying a product is finding enough information about the product in order to make an informed decision on whether or not to buy the product. Would-be buyers often have to scour the internet to find reviews, availability, pricing, and advice regarding the product. Accordingly, there is a need for systems and methods that provide users with all of the information they need to make informed decisions about products of interest.

User interfaces for online shopping websites have not changed much since their introduction. User interfaces may often be centered around a search bar, or tabs for particular categories of products. However, these minimalistic interfaces do not provide much information to the user, nor do they offer any incentives for the user to visit the website unless they are currently shopping for a particular product. Online shopping websites, however, currently are able to capture and receive substantial information about the users as they shop on their site. By using this information, the online shopping websites could better tailor the shopping experience to meet the perceived needs and wants of the user.

Accordingly, there is a need for a personalized interface for online shopping that effectively presents a user with the products that they are interested in, likely to be interested in, as well as social information that may be of interest to a user based on the products that they are interested in.

BRIEF DESCRIPTION OF THE DRAWINGS

Various ones of the appended drawings merely illustrate example embodiments of the present invention and cannot be considered as limiting its scope.

FIGS. 49-51 are screenshots showing additional features of a product display, including pinning products for easy comparison.

Figure 85:
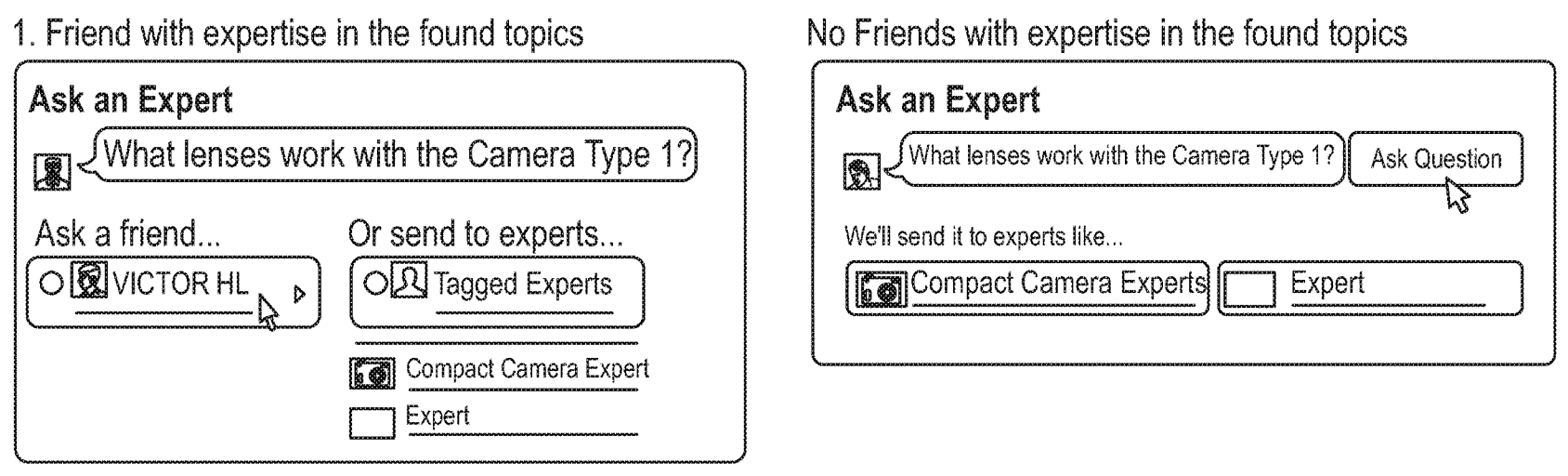

FIGS. 81-86 are screenshots illustrating additional examples of providing information to a user by asking questions of the community, consistent with some embodiments.

DETAILED DESCRIPTION

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details.

In accordance with the present disclosure, components, process steps, and data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein.

Figure 1:
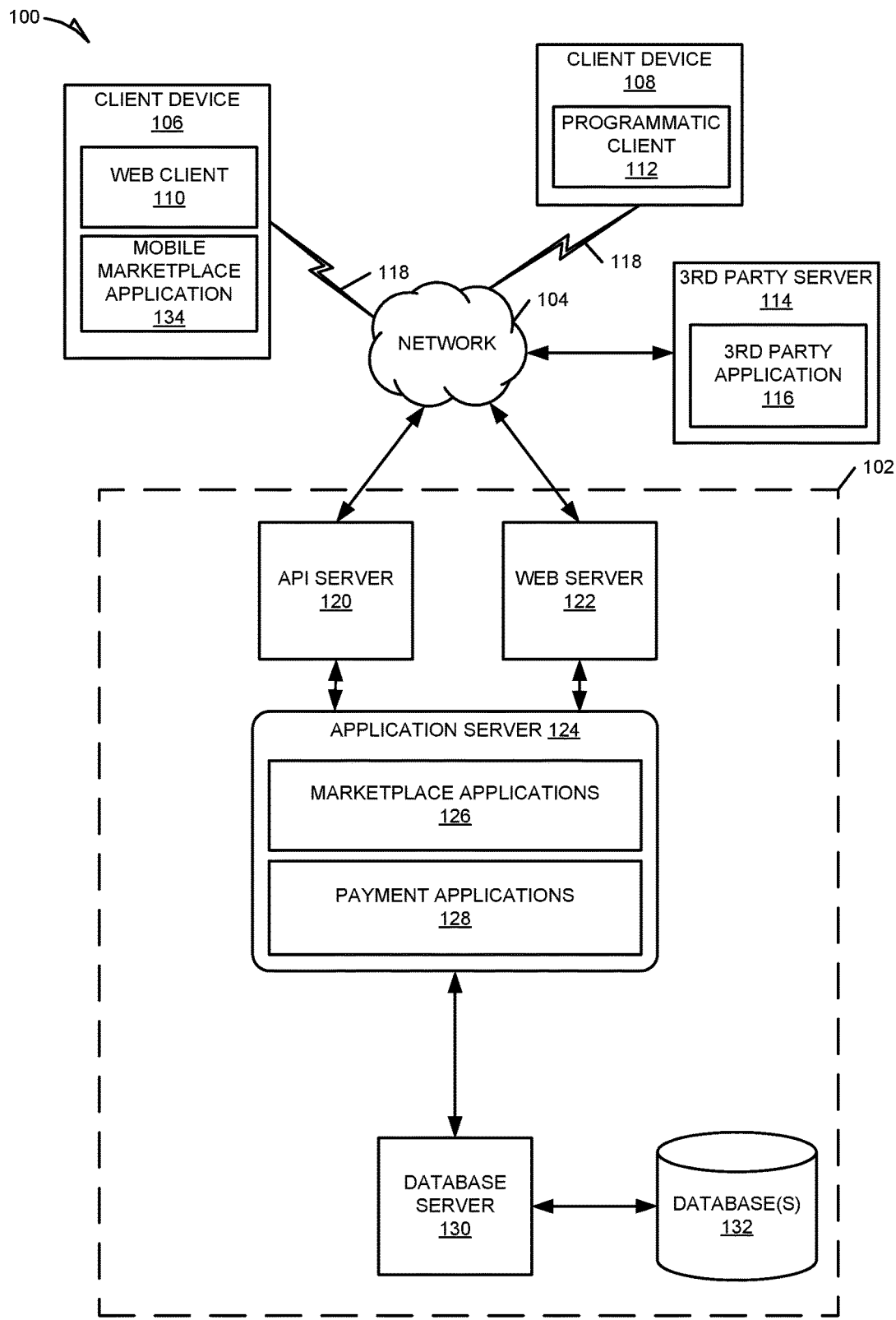
FIG. 1 is a network diagram depicting a network system having a client-server architecture configured for exchanging data over a network, according to an example embodiment.

FIG. 1 is a network diagram depicting an example network system 100, according to one embodiment, having a client-server architecture configured for exchanging data over a network. For example, the network system 100 may be a network-based marketplace 102 where clients may communicate and exchange data within the network system 100. The data may pertain to various functions and aspects associated with the network system 100 and its users.

A data exchange platform, in an example form of a network-based marketplace 102, may provide server-side functionality, via a network 104 (e.g., the Internet), to one or more client devices. The one or more client devices may be operated by users that use the network system 100 to exchange data over the network 104. These transactions may include transmitting, receiving (communicating), and processing data to, from, and regarding content and users of the network system 100. The data may include, but are not limited to images; video or audio content; user preferences; product and service feedback, advice, and reviews; product, service, manufacturer, and vendor recommendations and identifiers; product and service listings associated with buyers and sellers; product and service advertisements; auction bids; and transaction data, among other things.

In various embodiments, the data exchanges within the network system 100 may be dependent upon user-selected functions available through one or more client or user interfaces (UIs). The UIs may be associated with a client device, such as a client device 106 using web client 110. The web client 110 may be in communication with the network-based marketplace 102 via a web server 122. The UIs may also be associated with a client device 108 using a programmatic client 112, such as a client application, or a third party server 114 (e.g., one or more servers or client devices) hosting a third party application 116. It can be appreciated that, in various embodiments, the client devices 106, 108, and/or the third party server 114 may be associated with a buyer, a seller, a third party electronic commerce platform, a payment service provider, or a shipping service provider, each in communication with the network-based marketplace 102 and optionally with each other. The buyers and sellers may be any one of individuals, merchants, or service providers, among other things.

The client devices 106 and 108 may be any of a variety of types of devices. For example, the client devices 106 and 108 may a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. Consistent with some embodiments, the client devices 106 and 108 may alternatively be a tablet computer, such as an iPad™ or other tablet computer running one of the aforementioned operating systems. In some embodiments, the client device 106 and 108 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo® Wii™, the Microsoft® Xbox 360™, or the Sony® PlayStation™ 3, or other video game system consoles.

Consistent with some embodiments, the client devices 106 and 108 may include any appropriate combination of hardware and/or software having one or more processors and capable of reading instructions stored on a non-transitory machine-readable medium for execution by the one or more processors. Consistent with some embodiments, the client devices 106 and 108 may include a machine-readable medium, such as a memory (not shown) that includes instructions for execution by one or more processors (not shown) for causing the client devices 106 and 108 to perform specific tasks. For example, such instructions may include viewing, purchasing, and selling products through marketplace and payment applications 126 and 128. Further, content may be displayed by particular applications or "apps" stored in a memory of the client devices 106 and 108 and executed by one or more processors executing in the client devices 106 and 108. For example, the client devices 106 and 108 may include a mobile location application that is used to determine a location of the device, a mobile research application that assists user in researching products, a mobile search application that assists a user in searching products, and a mobile imaging application that allows user device to capture images. Another example of an application is a browser application (e.g., web client 110) that displays content, such as a web page or a user interface using a browser. Another example application is a mobile marketplace application 134 that is used to conduct marketplace activities such as shopping, buying, and selling products with an online marketplace that may be provided by application server 124. The client devices 106 and 108 may also include social applications (e.g., Facebook, Twitter, Google+, Pinterest, Svpply, or the like) in communication with third party server 116. In some embodiments, the client devices 106 and 108 may also include a mobile escrow application (not shown) that is used to set up an escrow account, transfer funds to an escrow account, authorize a transaction, and receive funds held in an escrow account in association with the marketplace applications 126 for the purpose of paying for transactions using an online escrow account. In some embodiments, the client devices 106 and 108 may also include a mobile shopping game application that provides one or more interactive shopping games for a user to participate in while shopping. In some embodiments, the client devices 106 and 108 may also include a near-field communications (NFC) transceiver.

The client devices 106 and 108 may interface via a connection 118 with a communication network 104 (e.g., the Internet or Wide Area Network (WAN)). Depending on the form of the client device 106 and 108, any of a variety of types of connections 118 and communication networks 104 may be used. For example, the connection 118 may be Code Division Multiple Access (CDMA) connection, a Global System for Mobile communications (GSM) connection, or other type of cellular connection. Such a connection 118 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 118 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates a third party application 116 executing on a third party server 114 that may offer one or more services to users of the client devices 106 and 108. The third party application 116 may have programmatic access to the network-based marketplace 102 via the programmatic interface provided by an application program interface (API)

server 120. In some embodiments, the third party application 116 may be associated with a vendor, a merchant, or any organizations that may conduct transactions with the users of the client devices 106 and 108. For some example embodiments, the third party application 116 may be associated with an online marketplace (e.g., eBay, Inc. of San Jose, Calif.). In some embodiments, the third-party server 114 and third party application 116 may correspond to a social network (e.g., Facebook, Twitter, Google+, Pinterest, Svpply, or the like).

Turning specifically to the networked-based marketplace 102, the API server 120 and a web server 122 are coupled to, and provide programmatic and web interfaces respectively to, one or more application servers 124. The application servers 124 host one or more marketplace applications 126, and payment applications 128. The application servers 124 may be coupled via these interfaces to the communication network 104, for example, via wired or wireless interfaces. The application servers 124 are, in turn, shown to be coupled to one or more database servers 130 that facilitate access to one or more databases 132. In some examples, the application servers 124 can access the databases 132 directly without the need for a database server 130. In some embodiments, the databases 132 may include databases both internal and external to the network-based marketplace 102.

The marketplace applications 126 may provide a number of marketplace functions and services to users that access the network-based marketplace 102. The payment applications 128 may likewise provide a number of payment services and functions to users. The payment applications 128 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 126. For some example embodiments, payment applications 128 generally enable transfer of values (e.g., funds, reward points, etc.) from an account associated with one party (referred to as a sender) to another account associated with another party (referred to as a receiver). To perform the value transfer, execution of the payment applications 128 may be based on one or more approval flows. This may require having access or the rights to initiate these approval flows and to use the services of a payment facilitator. One example of a payment facilitator is PayPal, Inc. of San Jose, Calif. Having access may not include having approval to transfer the values out of the sender's account, while having approval may implicitly include having access.

While the marketplace and payment applications 126 and 128 are shown in FIG. 1 to form part of the network-based marketplace 102, it will be appreciated that, in alternative embodiments, the marketplace applications 126 and payment applications 128 may form part of a service that is separate and distinct from the network-based marketplace 102. Further, while the system 100 shown in FIG. 1 employs client-server architecture, the present invention is, of course, not limited to such an architecture, and could equally well find application in an event-driven, distributed, or peer-to-peer architecture system, for example. The various modules of the application servers 124 may also be implemented as standalone systems or software programs, which do not necessarily have networking capabilities.

Figure 2:
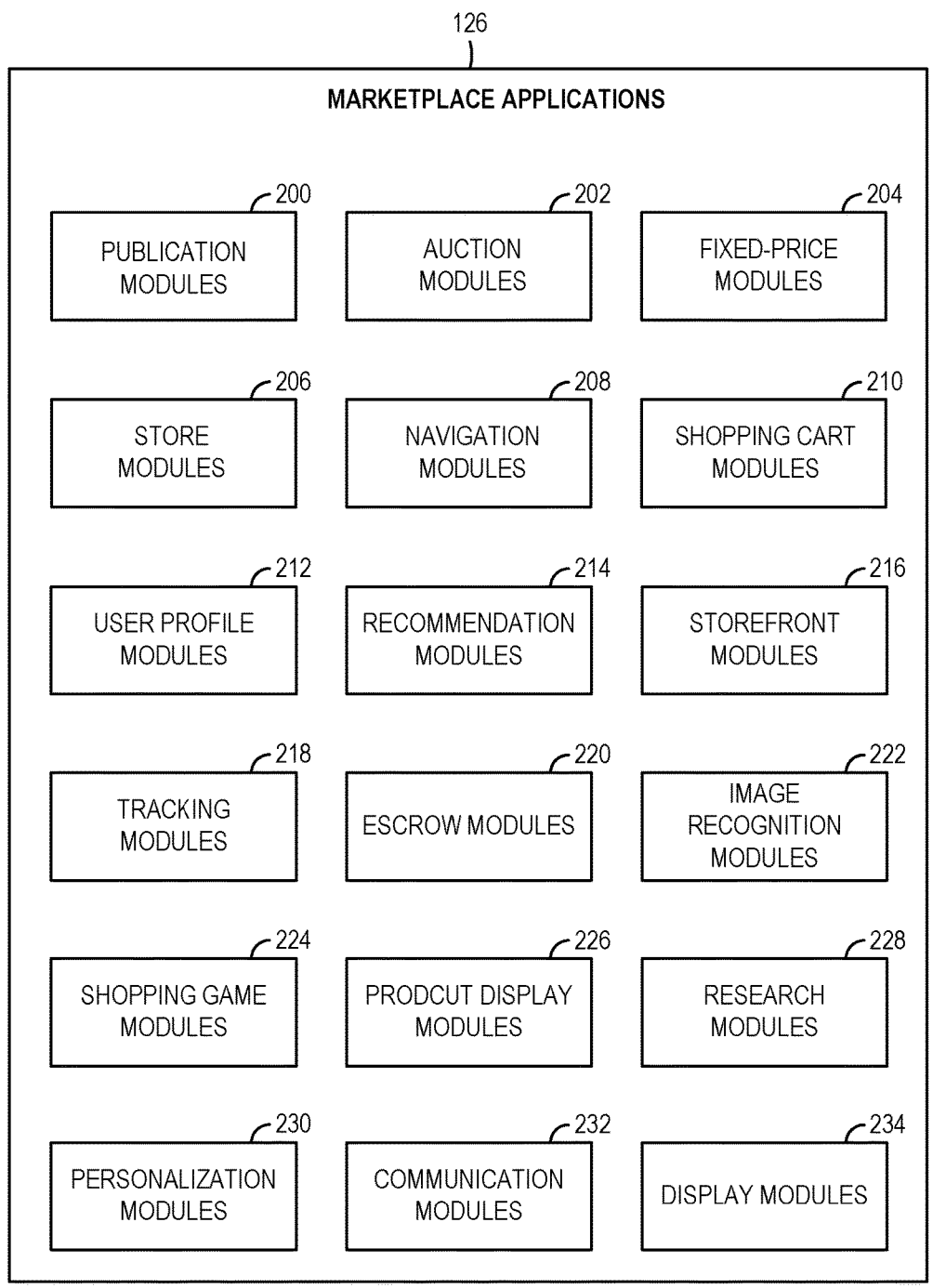
FIG. 2 is a block diagram illustrating an example embodiment of multiple marketplace and payment applications, which are provided as part of a network-based marketplace.

FIG. 2 is a block diagram illustrating an example embodiment of multiple modules forming the marketplace applications 126, which are provided as part of the network system 100. The modules of the marketplace applications 126 may be hosted on dedicated or shared server machines that are communicatively coupled to enable communications between server machines. Each of the modules 200-210 are communicatively coupled (e.g., via appropriate interfaces) to each other and to various data sources, so as to allow information to be passed between the modules 200-210 of the marketplace applications 126 or so as to allow the modules 200-210 to share and access common data. The various modules of the marketplace applications 126 may furthermore access one or more databases 132 via the database servers 130.

The marketplace applications 126 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and applications 126 are shown to include at least one publication module 200 and one or more auction modules 202, which support auction-format listing and price setting mechanisms (e.g., English, Dutch, Vickrey, Chinese, Double, Reverse auctions etc.). The various auction modules 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store modules 206 may allow sellers to group their item listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the network-based marketplace 102 may be facilitated by one or more navigation modules 208. For example, a search module may, inter alia, enable key word searches of listings published via the marketplace 102. A browser module may allow users via an associated UI to browse various category, catalogue, inventory, social network, and review data structures within the marketplace 102. Various other navigation modules 208 (e.g., an external search engine) may be provided to supplement the search and browsing modules. Consistent with some embodiments, the results for key word searches of listings published via the marketplace 102 may be filtered to include only listings corresponding to social network connections of the user.

In one embodiment, electronic shopping cart application(s) 210 are used to create an electronic shopping cart used by users of the networked marketplace 102 to add and store items listed by the store application(s) 206. The electronic shopping cart applications 210 may also be used to "check out," meaning a user may purchase items in the electronic shopping cart. The electronic shopping cart applications 210 may facilitate the transactions by automatically finding the items in the electronic shopping cart across at least one or all of a predefined set of vendors, a comparison shopping site, an auction site, etc. In various embodiments, the selection criteria for which vendor or vendors to purchase from may include, but is not limited to, criteria such as lowest cost, fastest shipping time, preferred or highest rated vendors or sellers, or any combination thereof.

As illustrated in FIG. 2, the marketplace applications 126 may also include one or more user profile modules 212, which are used to generate and maintain a user profile for each user of the networked system 100. Each user profile may be stored and maintained in database 132. Each user profile comprises a user data that describes aspects of a particular user. The user data may include to demographic data, user preferences, user activity and user account information. Accordingly, the user profile modules 212 may be configured to monitor, track, and record the activities and interactions of a user, using one or more devices (e.g., client device 106), within the context of the network system 100. The user profile modules 212 may store each user session as an activity set and maintain each activity set as part of the user data. Accordingly, in some embodiment, the user data may include past item searches that users have performed, items added to a user wish list or watch list, items added to an electronic shopping cart, items that the uses own, and any themes that a user has indicated they would like to find more items related to. In some embodiments, the user preferences may be inferred by the user profile modules 212 from the user activity.

In some embodiments, the user profile modules 212 may work in conjunction with the navigation applications 208 to monitor and store the activity of the user associated with the searching and browsing of listings published via the network-based marketplace 102. Accordingly, the user profile may also include a transaction history of the user. Transaction history may include information related to transactions for items or services offered for sale by a network based marketplace 102. The transaction history information may, for example, include a description of an item or service purchased by the user, an identifier of the item or service, a category to which the item or service belongs, a purchase price, a quantity, or a number of bids.

The demographic data included as part of the user profile may include information describing one or more characteristics of a user. Demographic data may, for example, include gender, age, location information, employment history, education history, contact information, familial relations, or user interests.

The user account information included in each user profile may, for example, include private financial information of users of devices such as account numbers, credentials, passwords, device identifiers, user names, phone numbers, credit card information, bank information, or other financial information which may be used to facilitate online transactions by users.

In some embodiments, the user profile may also include a list of social network connections of the user. For purposes of the present disclosure, a social network "connection", also referred to as being "connected" on a social network, may include both a bi-lateral agreement between members of the social network as well as situations in which there is only a unilateral acknowledgement of the "connection." In the bi-lateral agreement situation, both members of the "connection" acknowledge the establishment of the connection (e.g., friends). Similarly, in the unilateral acknowledgement situation, a member may elect to "follow" or "watch" another member. In contrast to bi-lateral agreement, the concept of "following" another member typically is a unilateral operation because it may not require acknowledgement or approval by the member that is being followed. The social network connections of a user may be retrieved via API from one or more social networks.

As illustrated in FIG. 2, the marketplace applications 126 may include one or more recommendation modules 210, which may provide recommendation services and functions to users. In some embodiments, the recommendation applications 210 may receive requests for recommendations, and, in turn, provide a recommendation to the user based on information contained in the user's corresponding user profile. In some embodiments, the recommendation modules 210 may automatically generate and provide a recommendation based on the activity of the user. The recommendations provided by the recommendation modules 210 may contain one or more items (e.g., products offered for sale, articles, blogs, movies, social network connections, etc.) that may potentially interest a user. The recommendations may, for example, be based on previous items purchased by the user or a social network connection of the user, a web page viewed by the user, or an item given favorable feedback by the user or a social connection of the user.

As illustrated in FIG. 2, the marketplace applications 126 may include one or more storefront modules 216, which may be configured to interface with application server 124 and client device 106 to provide an interactive shopping experience. Consistent with some embodiments, the storefront modules 216 may be configured to serve information over communication network 104 to web client 110 of client device 106 to provide a user with an interactive shopping experience by presenting a dynamic storefront. In one embodiment, a user may interact with storefront module 216 through the web client 110 or mobile marketplace application 134 over communication network 104 in order to view various products, food items, or services identified in one or more databases 132.

As illustrated in FIG. 2, the marketplace applications 126 may include one or more tracking modules 218, which may be configured track a location of the a package and provide updates to a user through buyer device 106 over network. Consistent with some embodiments, application server 124 may receive a location of a package over communication network 104, wherein tracking modules 218 may process the received location to provide a status update to the user. The status update may be personalized based on a location, weather, and time of day relative to the package's location, or may be based on other factors. The update may be available for the user to view on the client device 106 when accessing applications servers 124, or may be e-mailed, sent via short messaging service (SMS) or instant messaged (IM'd) to the user. The status update may also be sent to buyer over a social network such as Facebook, Twitter, Google+, or other social networks. Consistent with some embodiments, the tracking modules 218 may create a temporary account on a social networking site for the package that the user can subscribe to in order to receive updates, and share the account with their friends and family.

In some embodiments, the tracking modules 218 may access an inventory of the user (e.g., maintained as part of a user profile) to determine a compatibility between one or more items being shipped to the user and the items in the user's inventory. In this manner, the tracking modules 218 in conjunction with the communication modules 232 may transmit messages to the user notifying the user of the compatibility between one or more items being shipped to the user and the items in the user's inventory. In cases in which one or more items being shipped to the user are not compatible with one or more products in the user's inventory, the tracking modules 218 may work in conjunction with the recommendation modules 214 to generate one or more recommendations for new items that are compatible with the one or more items being shipped. The one or more recommendations may then be communicated to the user by the communication modules 232.

In some embodiments, the tracking modules 218 may work in conjunction with the recommendation modules 214 to determine one or more items to recommend to the user, that if ordered would arrive prior to or at the same time as an item currently being shipped to the user. The user may be provided with options to purchase the one or more recommended items from the network-based marketplace 102.

As illustrated in FIG. 2, the marketplace applications 126 may include one or more escrow modules 220, which may be configured to set up an escrow account, receive funds for holding in escrow, and releasing the funds. The escrow modules 220 may be in communication with one of more mobile escrow applications running on client device 106. Consistent with some embodiments, the escrow modules 220 may allow a buyer to request to pay for a purchase from seller using escrow, and, using the mobile escrow application the buyer may create an escrow account. The escrow modules 220 may then receive funds from the buyer to add to the escrow account. Consistent with some embodiments, the buyer may send or otherwise transfer funds to the escrow modules 220 to add funds to the created escrow account. Alternatively, the escrow modules 220 may be able to add funds to the escrow account automatically, using account information maintained as part of the user profile of the buyer.

As illustrated in FIG. 2, the marketplace applications 126 may include one or more image recognition modules 222, which may be configured to use an image recognition algorithm to match images to products from databases 130. In some embodiments, the image recognition modules 222 may receive an image and perform queries on the database 130 to match the images to products in databases 130. Moreover, the image recognition modules 222 may use information about a user stored in the user's profile and from other locations on communication network 104 to provide results that are tailored to the wants, needs, and interests of the user. The information about the user may include past purchases made by the user, past searches performed by user, social interactions of user, including information about the user from Facebook, Twitter, Pinterest, Google+, and other social networking sites. By leveraging this personal information, the systems and methods described herein may provide search results that are of value to the user.

As illustrated in FIG. 2, the marketplace applications 126 may include one or more shopping game modules 224, which may be configured to provide one or more shopping games for a user to participate in, and facilitate the participation of the user in the one or more shopping games through a mobile shopping game application executing on the client device 106. For example, the shopping game modules 224 may provide a shopping game in which a player (e.g., a user) may receive a discount on products located in a first area of a store if the player purchases products from a second area of the store. In another example, the shopping game modules 224 may provide a shopping game in which a player may receive virtual tokens (e.g., loyalty points or rewards) while traveling a path through a store. In this example, the virtual tokens may be used to receive a discount to the price of a product located at the end of the path. In this example, the path may be designed such that the player must pass by products that may be of interest to the player based on information maintained as part of the user's profile on the network-based marketplace 102.

Consistent with some embodiments, the shopping game modules 224 may receive input from a user participating in one or more shopping games. The user input may be stored and maintained in a user profile of the user, which is stored in database 132. In some embodiments, the user input from the one or more shopping game may be used by the recommendation modules 214 to generate one or more recommendations for the user. In some embodiments, the input received from the user may be used by the personalization modules 230 to provide a personalized experience for the user within the context of the network-based marketplace 102. Consistent with some embodiments, the user input may include a selection of a particular interactive shopping game, an action in furtherance of an interactive shopping game, or a decision to quit playing a particular interactive shopping game.

In some embodiments, the shopping game modules 224 may operate in conjunction with loyalty programs that are supported by the network-based marketplace 102 and third-party applications 116. For example, a buyer may earn loyalty or promotion points for each successfully completed shopping game, and the user may be offered a reward for which accumulated loyalty points may be redeemed. Accordingly, user who engage in playing an interactive shopping game may be provided various pricing options (e.g., coupons, discounts, bundle discounts, etc.) for items involved in the interactive shopping game.

As illustrated in FIG. 2, the marketplace applications 126 may include one or more product display modules 226, which may be configured to collect all of the relevant information about products from databases 130 and display them for use by a user. In some embodiments, the product display modules 226 may create product display interfaces that provides a user viewing the product all of the information that they would need to make an informed decision regarding purchasing or selling the product. For example, the product display interface may include information such as availability, local areas where it is available, information related to the shipping of the product, including tracking information if the product is being shipped, and shipping cost estimates based on a products dimensions, information about social network connects who own the same product or a competing product, and pricing information of the product. The product display interfaces may, for example, also include comparisons of the product to other products and market data about the product. The market data may include current market pricing, pricing trends, and market demand for the product. Questions, answers, and links to communities and affinity groups related to the product may also be shown on the product display interfaces.

As illustrated in FIG. 2, the marketplace applications 126 may include one or more research modules 228, which may be configured to assist a user in performing research using a mobile research application executing on the client device 106 may aggregate reviews from external websites and make them available for user to view using the mobile research application executing on the client device 106. In some embodiment, the research modules 228 may also aggregate and curate business insights, buying/selling statistics, expert reviews, and user reviews related to certain products for easy access by the user using the mobile research application executing on the client device 106.

As illustrated in FIG. 2, the marketplace applications 126 may include one or more personalization modules 230, which may be configured to personalize the experience of a user when accessing the network-based marketplace 102. In some embodiments, the personalization modules 230 may use information maintained as part of a user profile stored in databases 132 to personalize the experience of the user. In personalizing the experience of the user, the personalization modules 230 may, for example, use items that the user wants, items that the user owns, items that the user has previously purchased using marketplace applications 126, a location of the user, past item searches that the user has performed, and any themes that the user has indicated they would like to find more items related to.

Consistent with some embodiments, a user may, utilizing an appropriate personalization module 230, create a personalized reference page at which information regarding transactions to which the user is (or has been) a party may be viewed. Further, in some embodiments, a personalization module 230 may enable a user to personalize listings and other aspects of their interactions with the network-based marketplace 126 and other parties (e.g., third-party server 114).

As illustrated in FIG. 2, the marketplace applications 126 may include one or more communication modules 232, which may facilitate communications between users. In some embodiments, the communication modules 232 may be used for generation and delivery of messages to users of the network-based marketplace 102. In some embodiments, the communication module 232 may be used for generation and delivery of messages between a potential buyer and a potential seller. Such messages may, for example, include an indication of the match between a potential buyer and a potential seller.

Respective communication modules 232 may utilize any one of a number of message delivery networks and platforms to deliver messages to users. For example, the communication modules 232 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks. In some embodiments, the communication modules 232 may be used to generate social network entries to be posted on one or more social networks on behalf of a user. The social network entries may include one or more hyperlinks that may automatically redirect a user's browser to a particular marketplace listing.

As illustrated in FIG. 2, the marketplace applications 126 may include one or more display modules 234. The display module 234 may control information or data that is provided to client systems for display on client device 106. The display module 234 may be configured to generate and provide instructions to present web pages, user interfaces, search results, recommendation results, and other information retrieved from the database 132.

Figure 3:
FIG. 3 is a diagram illustrating a storefront providing an interactive shopping experience, consistent with some embodiments.

FIG. 3 is a diagram illustrating a storefront providing an interactive shopping experience, consistent with some embodiments. As shown in FIG. 3, when a user using web client 110 or mobile marketplace application 134 navigates to the storefront provided by storefront modules 216, the user may be presented with media that presents a story about the products available for purchase from the merchant. The media may be a collection of images, a short movie, music, or a combination thereof. Consistent with some embodiments, as the media is playing an image recognition algorithm executing on application server 124 will match the products shown in the media to known products in databases 132, and display the matching products around the media. The user may then be able to interact with the displayed matching products by selecting the products, exploring options or accessories associated with the products, pin the objects to a Want tab or wish list, and search for similar items. By presenting the products in the context of the media, the user may be more engaged with the products being shown, and may have greater appreciation for the products curated by the merchant. Moreover, the merchant may create additional value for their brand by engaging the user with their story to distinguish themselves from other merchants.

Figure 4:
FIG. 4 is a diagram illustrating another view of a storefront providing an interactive shopping experience, consistent with some embodiments.

FIG. 4 is a diagram illustrating another view of a storefront providing an interactive shopping experience, consistent with some embodiments.

Figure 5:
FIG. 5 is a diagram illustrating an example external toolbar providing an interactive shopping experience, consistent with some embodiments.

FIG. 5 is a diagram illustrating another view of a storefront providing an interactive shopping experience, consistent with some embodiments. As shown in FIG. 5, a user may select a product from a list of items that are being displayed and drag the item to an external toolbar application, where the user may be presented with additional options for exploring the product. For example, the user may wish to see options or accessories available for the selected product. Or, as shown in FIG. 5, the user may wish to see similar items. Consistent with some embodiments, an image recognition algorithm executing on application server 124 may match the selected product to known products in databases 132, and display the matching products to the user.

Figure 6:
FIG. 6 is a diagram illustrating another view of a storefront providing an interactive shopping experience, consistent with some embodiments.

FIG. 6 is a diagram illustrating another view of a storefront providing an interactive shopping experience, consistent with some embodiments. As shown in FIG. 6, the user may select a product from the items that are being displayed and be presented with additional options for exploring the product. One of the options that may be available to the user is the option to explore the brand of the selected product. As shown in FIG. 6, user may select the option to explore the brand of the selected product, which brings up another page showing products associated with the selected brand, as well as statistics and other information associated with the brand.

Figure 7:
FIG. 7 is a diagram illustrating another view of a storefront providing an interactive shopping experience, consistent with some embodiments.

FIG. 7 is a diagram illustrating another view of a storefront providing an interactive shopping experience, consistent with some embodiments. As shown in FIG. 7, one of the advantages that may be provided to a merchant by using storefront modules 216 to create a dynamic storefront having an interactive shopping experience is that the merchant is able to maintain control of the look and feel of their storefront, develop their brand, and tailor it to their buyer base. As also shown in FIG. 7, the user using mobile marketplace application 134 on client device 106 may shop buy storefronts instead of products, allowing the user to virtually "stroll" through the storefronts, similar to the experience of strolling through a market.

Figure 8:
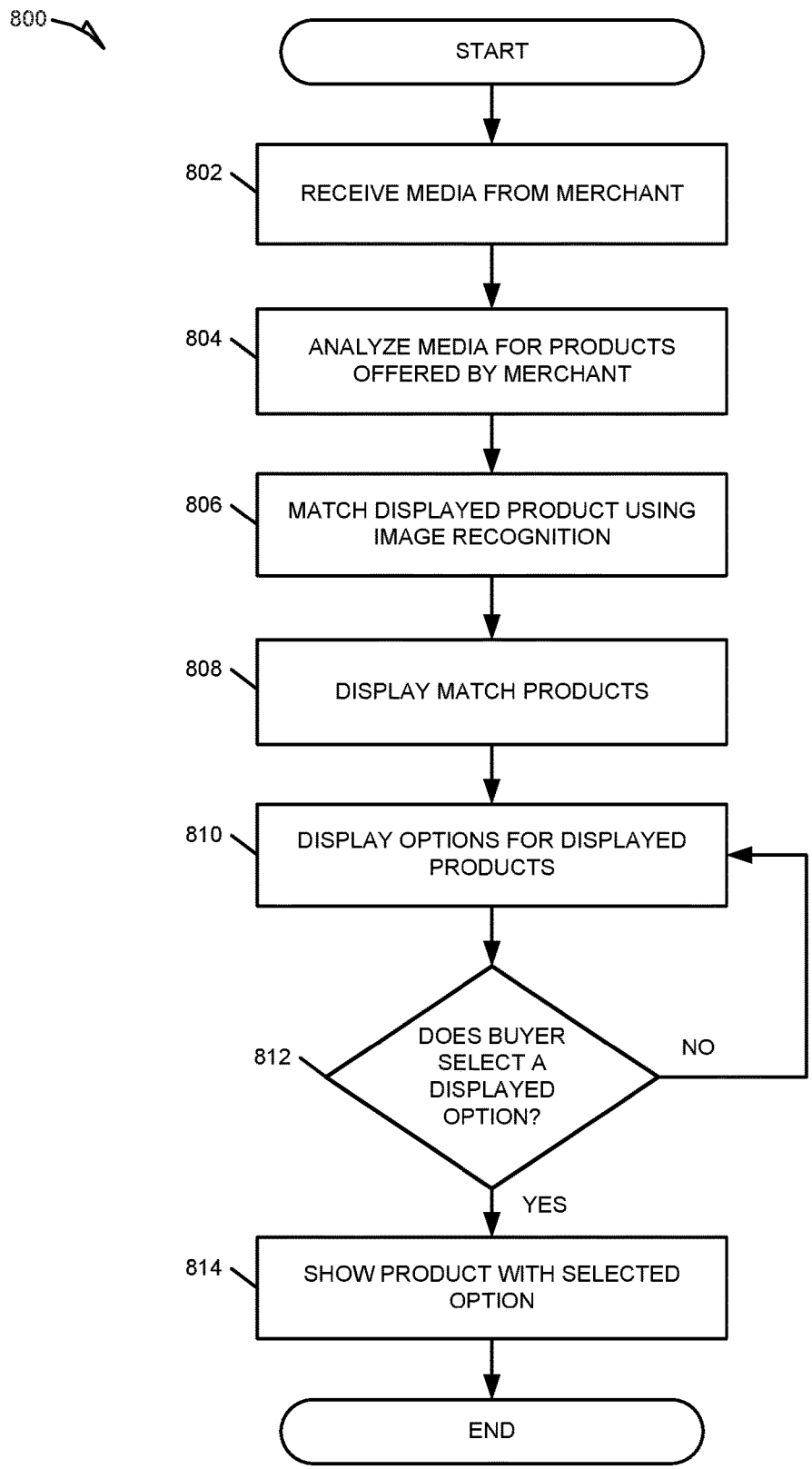
FIG. 8 is a flowchart illustrating a method of providing an interactive shopping experience, consistent with some embodiments.

FIG. 8 is a flowchart illustrating a method 800 of providing an interactive shopping experience, consistent with some embodiments. For the purpose of illustration, FIG. 8 may be described with reference to FIGS. 1-7. The method 800 may be embodied in computer-readable instructions for execution by one or more processors such that the steps of the method 800 may be performed by the application server 124 and, in particular, the storefront module 216 of marketplace applications 126. As shown in FIG. 8, storefront modules 216 may receive the media from a merchant 11, at operation 802. Consistent with some embodiments, the media may be a collection of photographs or images, or may be audio/visual media, such as a movie or music. In some embodiments, the media may be uploaded to the application server 124 by the merchant over the communication network 104. The storefront modules 216 may analyze the media for products offered by the merchant at operation 804. Consistent with some embodiments, as the media is playing an image recognition algorithm executing on application server 124 (depending on where the storefront is hosted) will match the products shown in the media to known products in databases 132 at operation 806. Consistent with some embodiments, using the location of the merchant, the storefront modules 214 may obtain information for similar products being listed on one or more third-party marketplaces. This information may then be communicated to the merchant so as to inform the merchant of the existing supply of the particular products the merchant intends to sell in the location of the merchant.

At operation 808, matching products may be displayed on the storefront webpage, such as shown in FIGS. 3-5. At operation 810, options for each of the displayed products may then be displayed, such as shown in FIGS. 5 and 6. If a buyer, such as the user, selects a displayed option (operation 812), the product will be shown with the selected option (operation 814), such as shown in FIGS. 5 and 6. Consistent with some embodiments, the product with the selected option will be shown within the displayed storefront. In other embodiments, the product may be displayed to a user on a different page or storefront.

Figure 9:
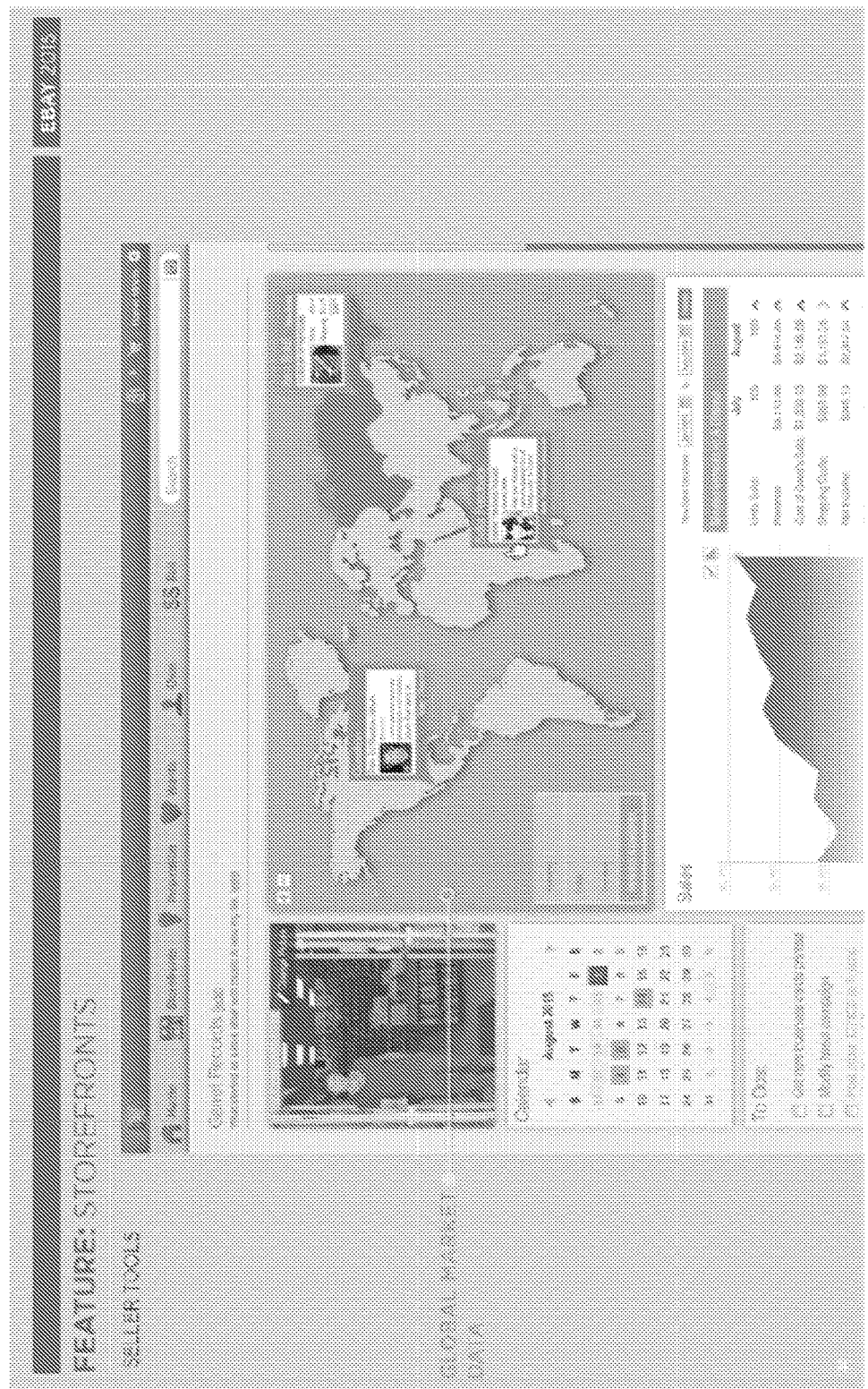
FIG. 9 is a diagram illustrating a map showing sales and reviews, consistent with some embodiments.

FIG. 9 is a diagram illustrating a map showing sales and reviews, consistent with some embodiments. As shown in FIG. 9, the storefront modules 216 may provide the merchant with tools to easily track sales and reviews. In particular, the storefront modules 216 may provide the merchant with tools to track this information geographically. As shown in FIG. 9, the storefront modules 216 displays to the merchant that a question has been received from Mexico, seller feedback has been received from South Africa, and an item has been sold in Russia. This information that is available to the merchant may also be made available to a buyer. Consistent with some embodiments, the storefront modules 216 may provide the user with a map showing sales and reviews, similar to the map shown in FIG. 9.

Figure 10:
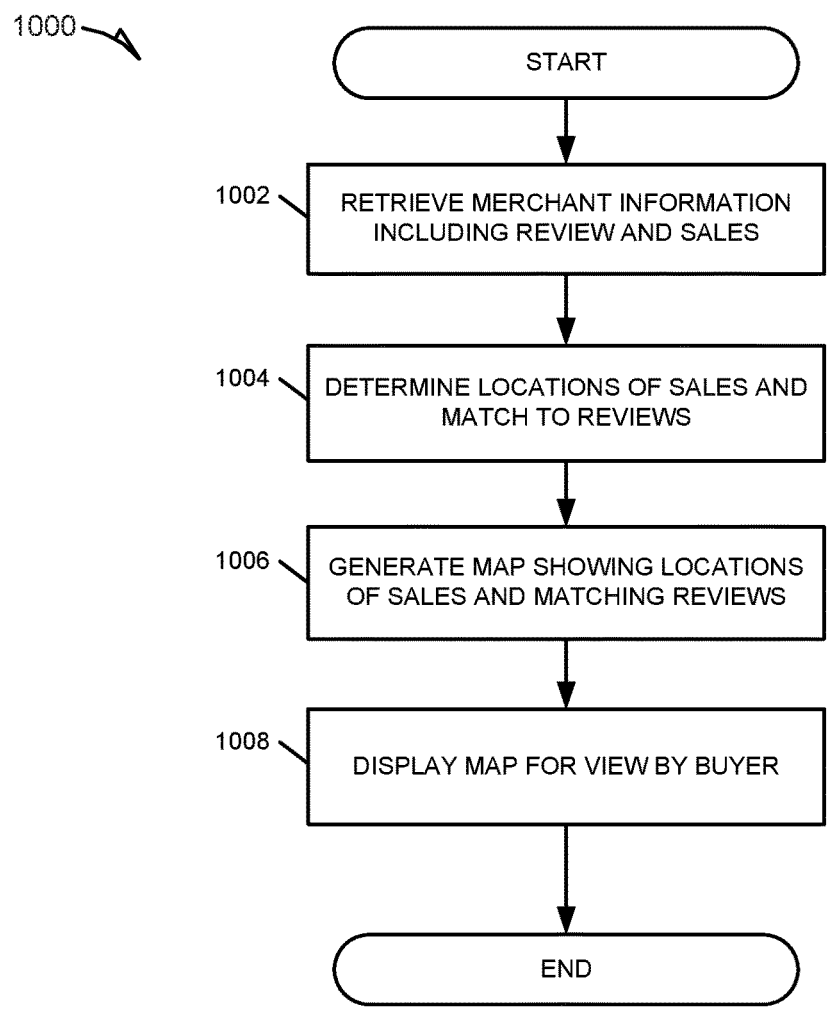
FIG. 10 is a flowchart illustrating a method of a map showing sales and reviews for a buyer, consistent with some embodiments.

FIG. 10 is a flowchart illustrating a method 1000 of a map showing sales and reviews for a buyer, consistent with some embodiments. For the purpose of illustration, FIG. 10 may be described with reference to FIGS. 1, 2, and 9. The method shown in FIG. 10 may be embodied in computer-readable instructions for execution by one or more processors in such that the steps of the method may be performed by the application server 124 and, in particular, the storefront modules 216 of the marketplace applications 126. As shown in FIG. 10, the storefront modules 216 may retrieve merchant information including reviews and sales at operation 1002. Consistent with some embodiments, the merchant information may be stored in databases 132. The storefront modules 216 may determine locations of sales and match to the retrieved reviews at operation 1004. A map may be generated showing locations of sales and matching reviews at operation 1006, similar to what is shown in FIG. 9. The storefront modules 216 may display the map for view buy a potential buyer at operation 1008. Consistent with some embodiments, a buyer such may be able to receive geographical information about sales and buying experiences from an interactive map displayed by the dynamic storefront.

Figure 11:
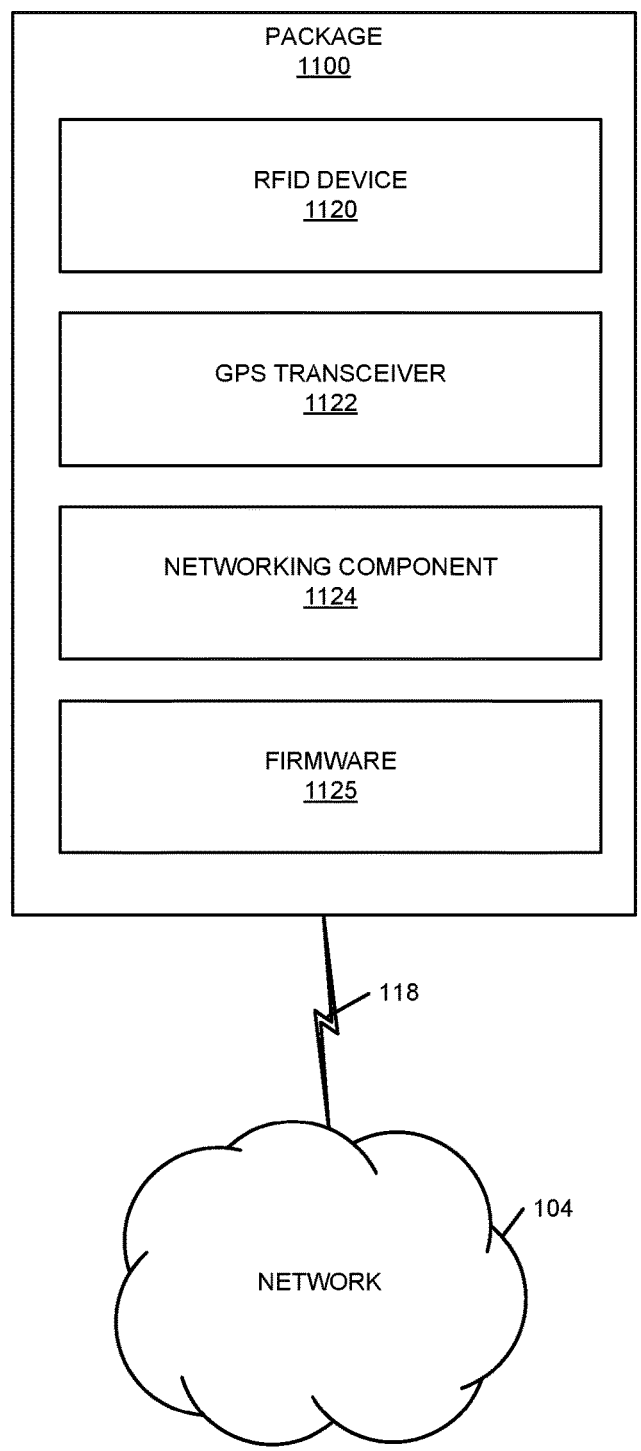
FIG. 11 is a diagram illustrating a package, from which the network-based marketplace 102 may receive a location update.

FIG. 11 is a block diagram illustrating a package 1100, from which the application servers 124 may receive a location update. Consistent with some embodiments, the package 1100 may include a radio frequency identification (RFID) device 1120, a global positioning system (GPS) transceiver, and a networking component 1124 for communication with network. Package 1100 may also include firmware 1125 stored in a memory (not shown) that provides instructions for obtaining a location of package 1100 using RFID device 1120, GPS transceiver, or a combination thereof, and reporting the location over communication network 104 to the client device 106 directly or to third party server 114 which will provide the user of client device 106 with updates about the location of package 1100. Consistent with some embodiments, RFID device 1120, GPS transceiver 1122, networking component, and memory including firmware, and one or more processors for executing the instructions in firmware may be included in a single chip that is attached to package 1100, or otherwise associated with package 1100.

Figure 12:
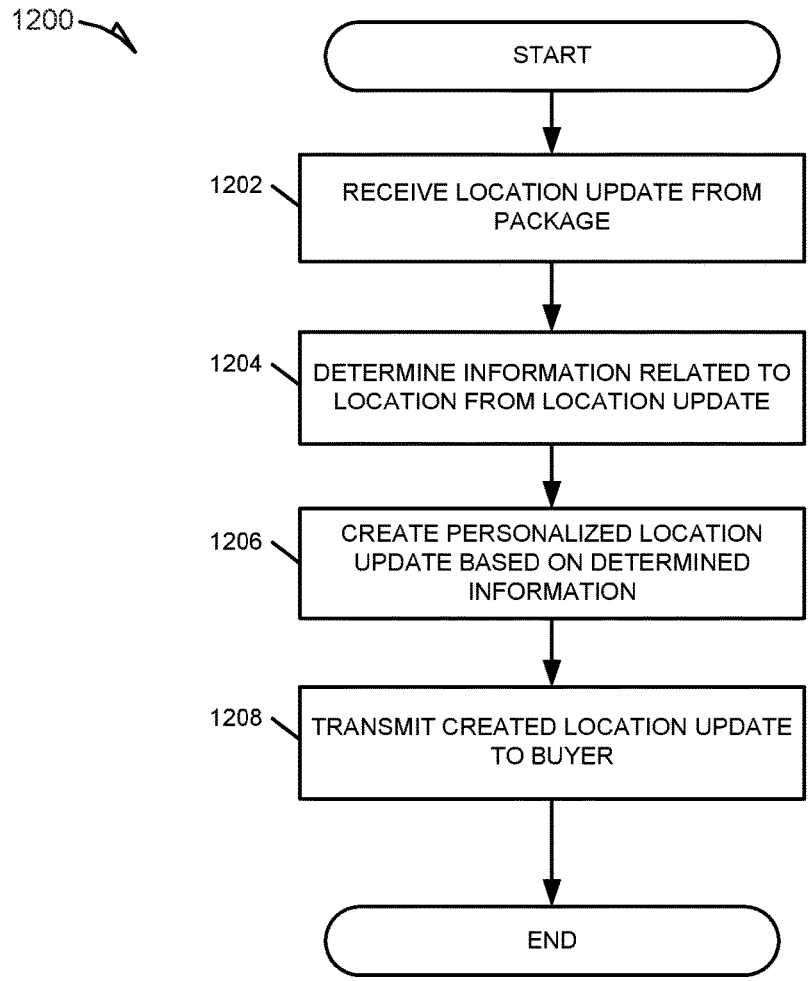
FIG. 12 is a flowchart illustrating a method for providing shipping updates, consistent with some embodiments.

FIG. 12 is a flowchart illustrating a method 1200 for providing shipping updates, consistent with some embodiments. For the purpose of illustration, FIG. 12 may be described with reference to FIGS. 1-2. The method 1200 may be embodied in computer-readable instructions for execution by one or more processors such that the steps of the method may be performed by the application server 126 and, in particular, tracking modules 218 of the marketplace applications 126. As shown in FIG. 12, application server 124 may receive a location update from package 1100 at operation 1202. Consistent with some embodiments, package 1100 may determine a location using GPS transceiver, RFID device, or a combination thereof, and then transmit the location update to application server 124 over communication network 104. At operation 1204, the tracking modules 218 may receive the location update and determine information related to the location of package 1100. Related information may include a time of day, the weather, the type of transport that package is on, the city, etc. At operation 1206, the tracking modules 218 may then create a personalized location update based on the determined information. The personalized location update may reflect certain features of the determined information. For example, if package 1100 is entering San Francisco in the evening, the personalized location update may be "I am looking forward to seeing the sunset over the Golden Gate Bridge." If package 1100 is about to board a freight ship for trans-ocean travel, the personalized location update may be "Anchors Aweigh! Leaving the port of Shanghai!" If the weather of the area that package is determined to be in is notable, the personalized location update may reflect this, such as "It's 112° F. in Phoenix today! I hope that I don't melt!" Or if package 1100 is entering Chicago, the personalized update may be "They don't call it the windy city for nothing! BRRRR!" Similarly, if package is in the Glendale post office, the personalized update may be "The Glendale post office is truly one of the nicest post offices I've ever stayed at!"

Returning to FIG. 12, at operation 1208, the application server 124 may then transmit the created location update to the client device 106. Consistent with some embodiments, the communication modules 232 may transmit a message to client device 106 over communication network 104. The update may be available for client device 106 to view when accessing application server 124, or may be e-mailed, sent via SMS or IM, sent over a social network such as Facebook, Twitter, Google+, or other social networks. Consistent with some embodiments, the tracking modules 218 may create a temporary account on a social networking site for the package 1100 that a user may subscribe to in order to receive updates, and share the account with their friends and family, where buyer can receive the created location update. Although the method 1200 has been described as being performed by application server 124, according to other embodiments, firmware 1125 may include instructions capable of performing the method 1200 by one or more processors associated with package 1100.

Figure 13:
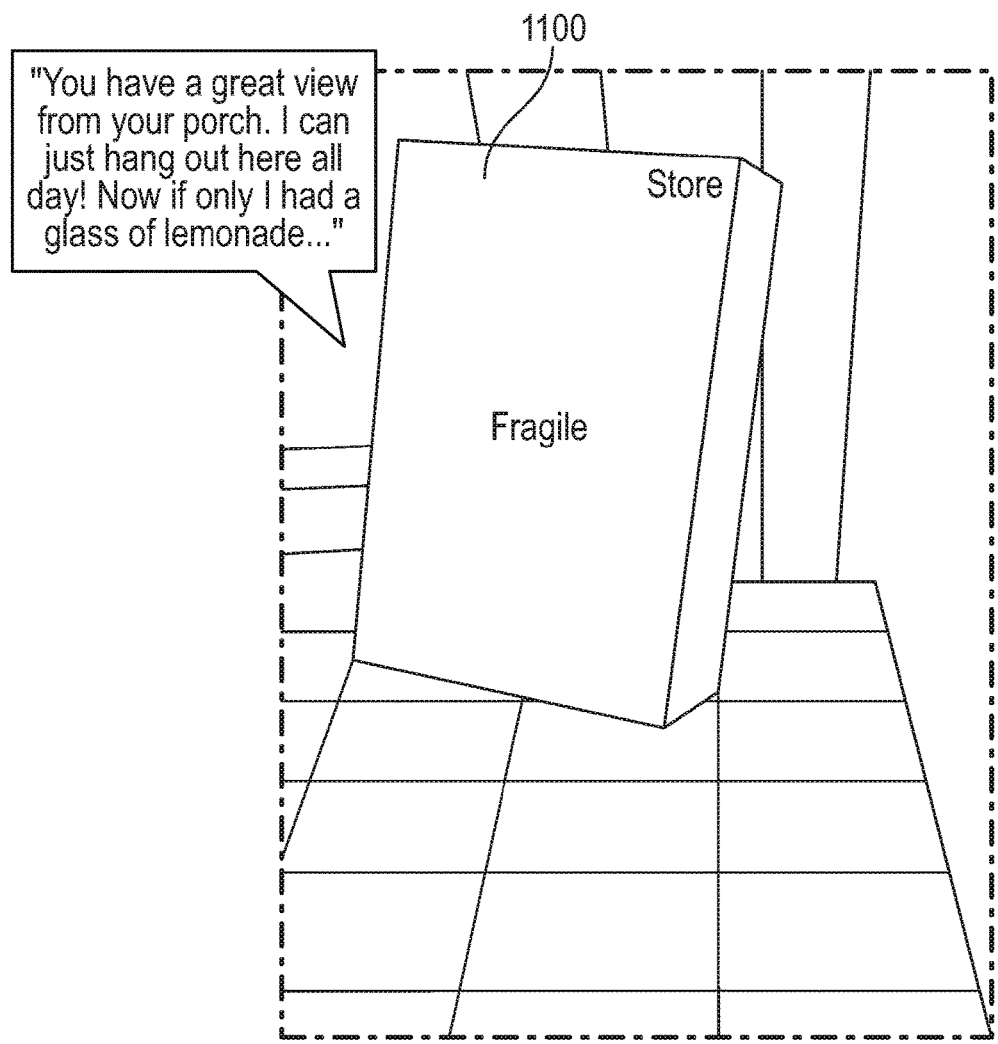
FIG. 13 is a diagram illustrating an example of providing a shipping update, consistent with some embodiments.

FIG. 13 is a diagram illustrating an example of providing a shipping update, consistent with some embodiments. As shown in FIG. 13, the package 1100 may provide an update when it has received a buyer's residence, along with a personalized message that provides a connection with the buyer making the shipping process intuitive, easy and, most importantly, more fun.

Figure 14:
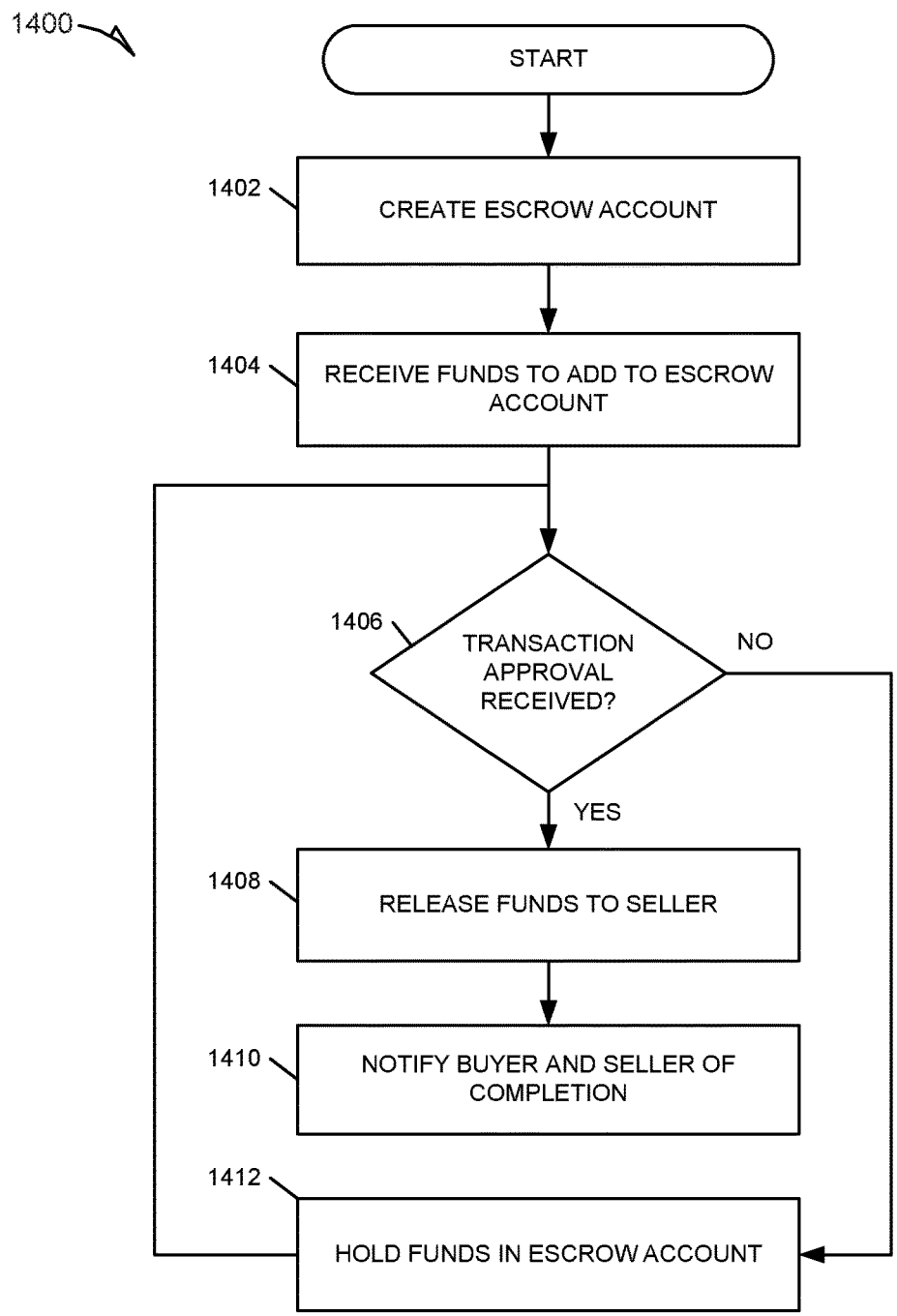
FIG. 14 is a flowchart illustrating a method for processing a payment using escrow, consistent with some embodiments.

FIG. 14 is a flowchart illustrating a method 1400 for processing a payment using escrow, consistent with some embodiments. For the purpose of illustration, FIG. 14 may be described with reference to FIGS. 1-2. The method 1400 may be embodied in computer-readable instructions for execution by one or more processors such that the steps of the method may be performed by the client device 106, or application server 124 (e.g., by escrow modules 220 of marketplace applications 126). As shown in FIG. 14, the escrow modules 220 may create an escrow account at operation 1402. Consistent with some embodiments, a buyer may request to pay for a purchase from seller using escrow, and, using a mobile escrow application (e.g., on client device 106), requests that application server 124 create an escrow account. The escrow modules 220 may then receive funds to add to the escrow account at operation 1404. Consistent with some embodiments, the buyer may send or otherwise transfer funds to the escrow modules 220 executing on the application server 124 to add funds to the created escrow account. Alternatively, the escrow modules 220 may be able to add funds to the escrow account automatically, using account information maintained as part of the user profile of the buyer. The escrow modules 220 may then wait for the buyer and seller to approve the transaction at operation 1406. Consistent with some embodiments, the buyer and seller may approve a transaction by using mobile escrow applications, executing on respective client devices, by pressing an accept button or similar. Alternatively, the buyer and seller may approve a transaction by sending an e-mail or other message to each other and remote server indicating that the transaction is approved. Moreover, as shown in FIG. 5, for local transactions, the buyer and seller may meet to discuss and approve the transaction, wherein the transaction may be approved by bumping or otherwise bringing a client device of the buyer (e.g., client device 106) in close proximity to a client device (e.g., client device 106) of the seller. Consistent with some embodiments, NFC transceivers embedded in each respective client device may be used to determine when the client device corresponding to the buyer is in close proximity to client device corresponding to the seller. In some embodiments, a GPS transceiver embedded in each respective client device may be used to determine when the client device corresponding to the buyer is in close proximity to client device corresponding to the seller.

Returning to FIG. 14, after the transaction has been approved by the buyer and the seller, the escrow modules 220 may release the funds held in the escrow account to the seller at operation 1408. Consistent with some embodiments, the escrow modules 220 may release the funds to the seller by arranging for payment to be made to the seller by check, wire, etc. Alternatively, the escrow modules 220 may cause the funds to be directly deposited into an account of the seller using account information maintained as part of a user profile of the seller. At operation 1410, the communication modules 232 may notify the buyer and the seller that the transaction has been completed at operation 1410. Consistent with some embodiments, the communication modules 232 may send a notification to the buyer and seller through e-mail, short messaging service (SMS) or other communication methods. The communication modules 232 may also send the buyer and seller the notification by sending the notification directly to the buyer device and the seller device through a mobile escrow application. If the transaction has not been approved by the buyer and the seller, the escrow modules 220 may hold the funds in the escrow account (at operation 1412) until the transaction is eventually approved.

Figure 15:
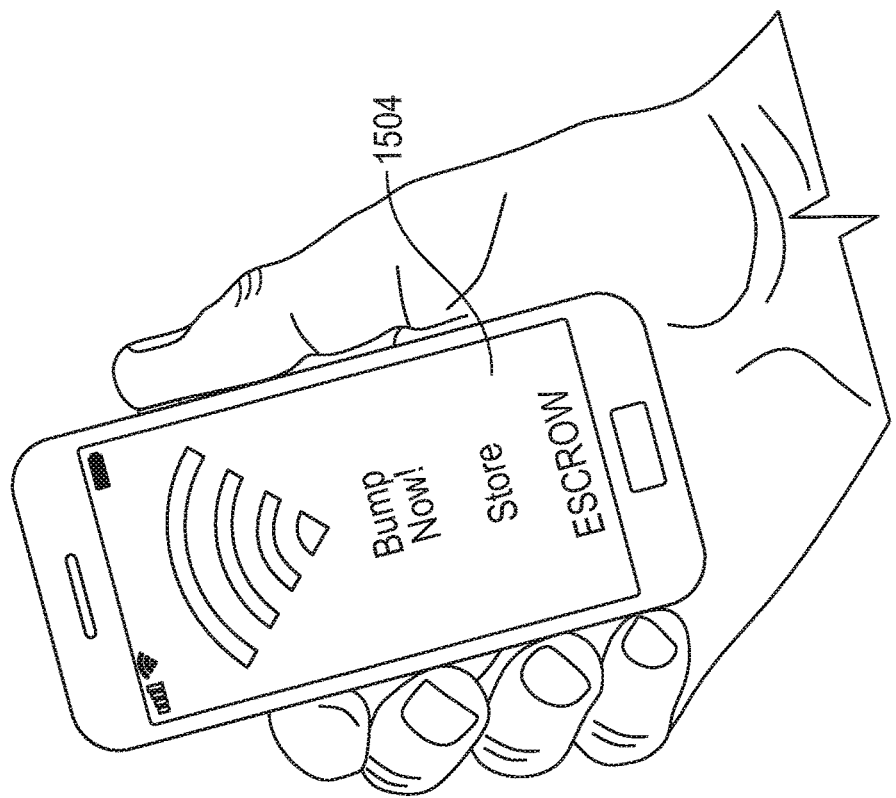
FIG. 15 is a diagram illustrating an example of a buyer and a seller approving an escrow transaction.
Figure 15:
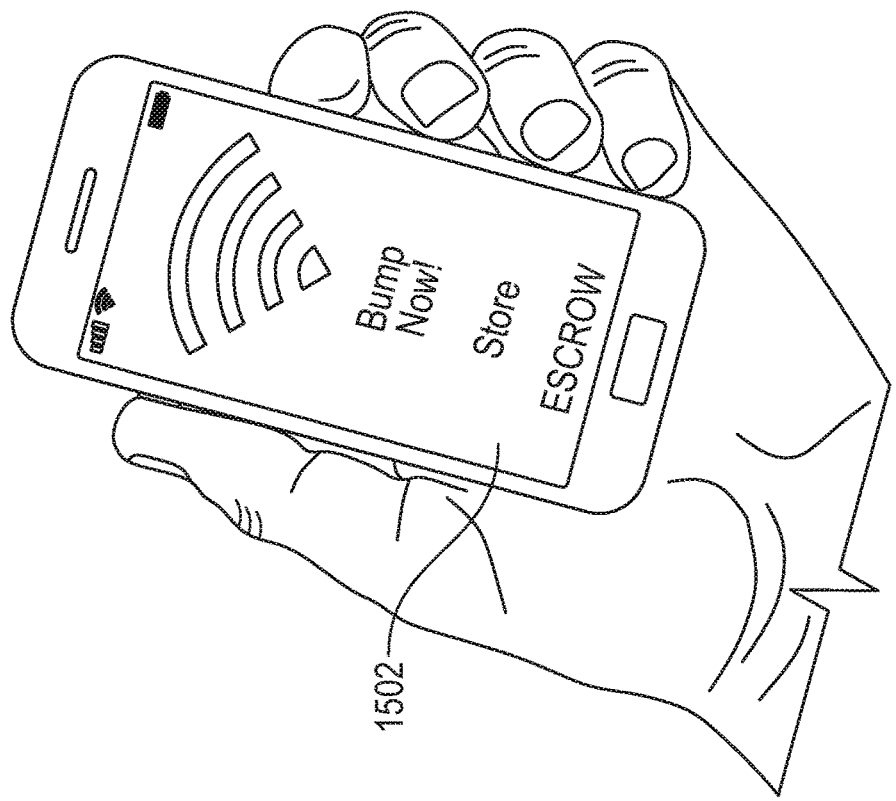

FIG. 15 is a diagram illustrating an example of a buyer and a seller approving an escrow transaction. As illustrated in FIG. 15, the buyer and seller may approve the escrow transaction by bumping the buyer device 1502 and the seller device 1504 together, consistent with some embodiments.

Figure 16:
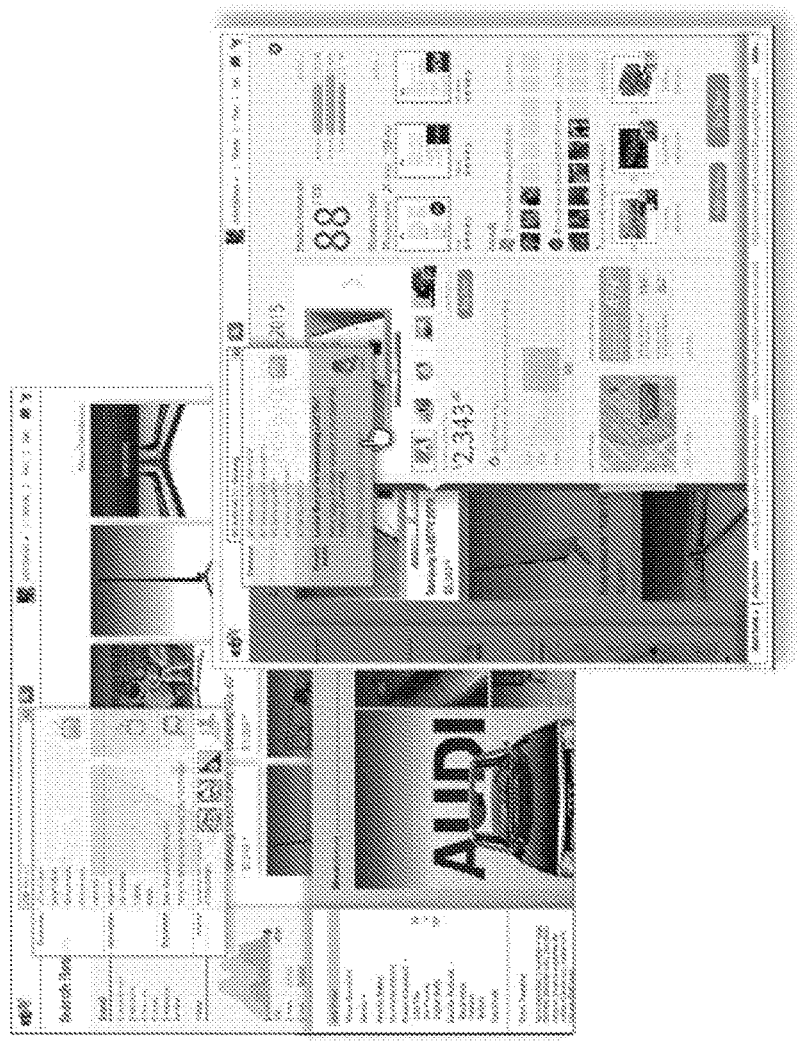
FIG. 16 is a diagram illustrating screenshots of searching, consistent with some embodiments.

FIG. 16 is a diagram illustrating screenshots of searching, consistent with some embodiments. As shown and described in FIG. 16, the methodologies for searching for products as described herein may allow a user using a mobile search application to perform searches that return results quickly upload images captured using mobile imaging applications to the network-based marketplace 102, where image recognition modules 222 will match the images to products in databases 132. Moreover, searches may use information about a user stored in the user's profile and from other locations on communication network 104 to provide results that are tailored to the wants, needs, and interests of the user. The information about the user may include past purchases made by the user, past searches performed by user, social interactions of user, including information about the user from Facebook, Twitter, Pinterest, Google+, and other social networking sites. By leveraging this personal information, the systems and methods described herein may provide search results that are of value to the user.

Figure 17:
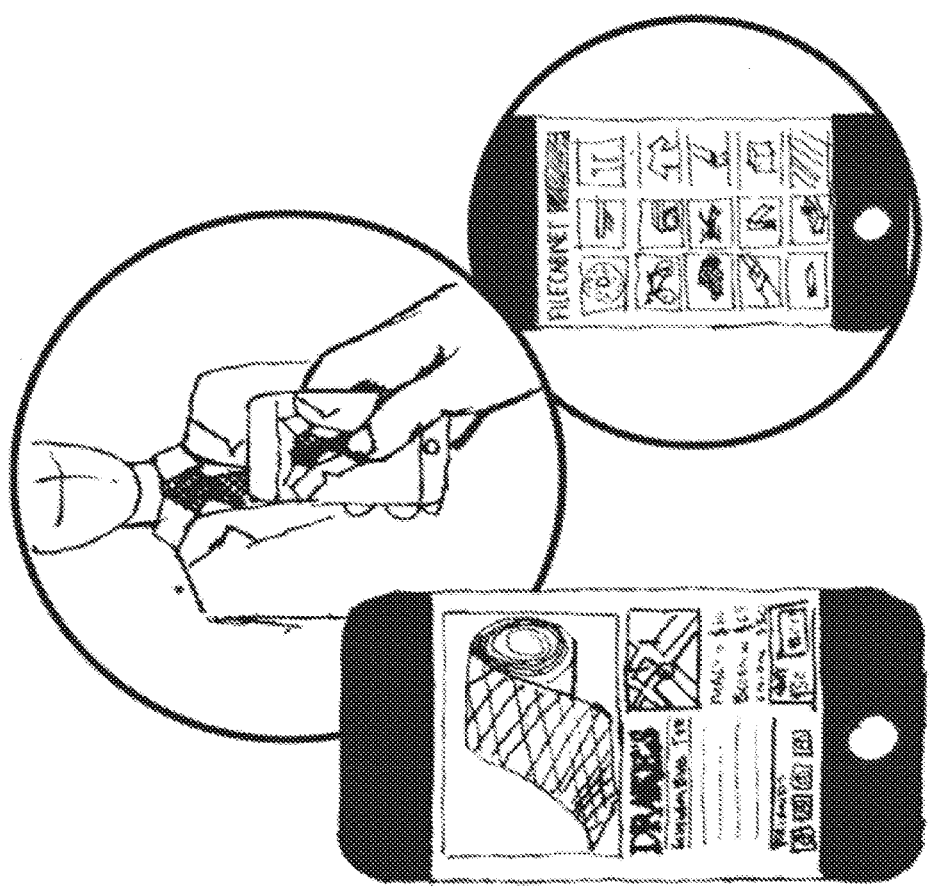
FIG. 17 is a diagram illustrating searching for products using images, consistent with some embodiments.

FIG. 17 is a diagram illustrating searching for products using images, consistent with some embodiments. As shown in FIG. 17, a user using a mobile imaging application (e.g., on client device 106) may capture images of products and search for the product or information about the product by uploading the images using a mobile search application to application server 124 over network. Image recognition modules 222 may then match the images to known products and similar-looking products in databases 130, and present the results to the user. Consistent with some embodiments, application server 124 may save the images and related products in the user's profile as additional indicia of products that the user may be interested in for further tailoring search results to the user. Moreover, the user may add the images and matching products to a want page or wish list.

Figure 18:
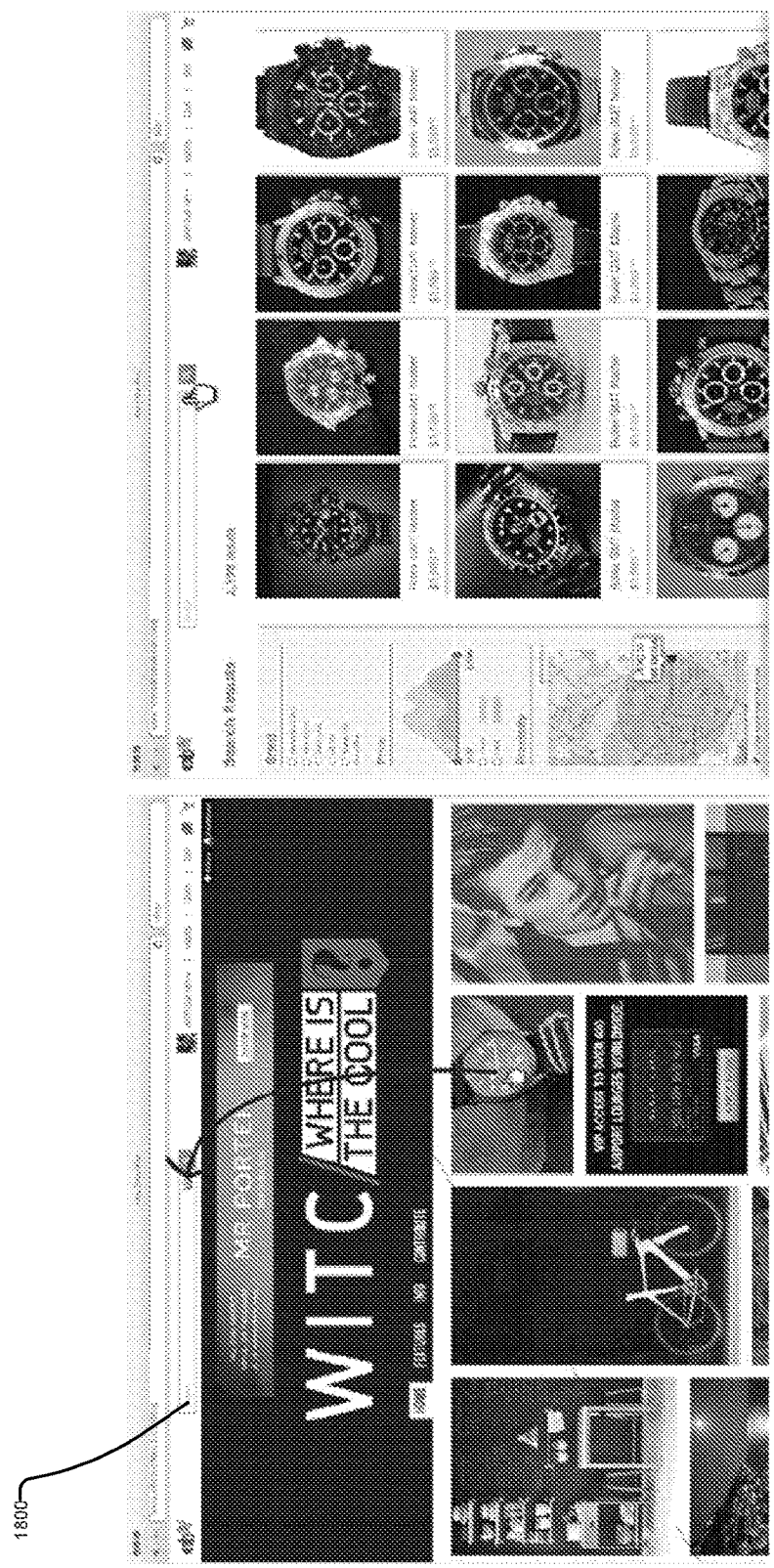
FIG. 18 is a diagram searching for products by image, consistent with some embodiments.

FIG. 18 is a diagram illustrating an example external toolbar 1800 for searching for products by image, consistent with some embodiments. As shown in FIG. 18, a user may be presented with images of products or themes of interest in the browser application the client device 106. By copying the image in from the mobile browser application and uploading the copied image to application server 124, the image recognition modules 222 may then match the images to known products and similar-looking products in databases 130, and present the results to user on the browser application, similar to FIG. 17. According to some embodiments, the mobile search application executing on the client device 106 may have an integrated external toolbar 1800 that allows for simple dragging of an image onto the toolbar to search for the image. As shown in FIGS. 17 and 18, a user is able to search based on images whether on the street using a mobile device, or at home while browsing websites.

Figure 19:
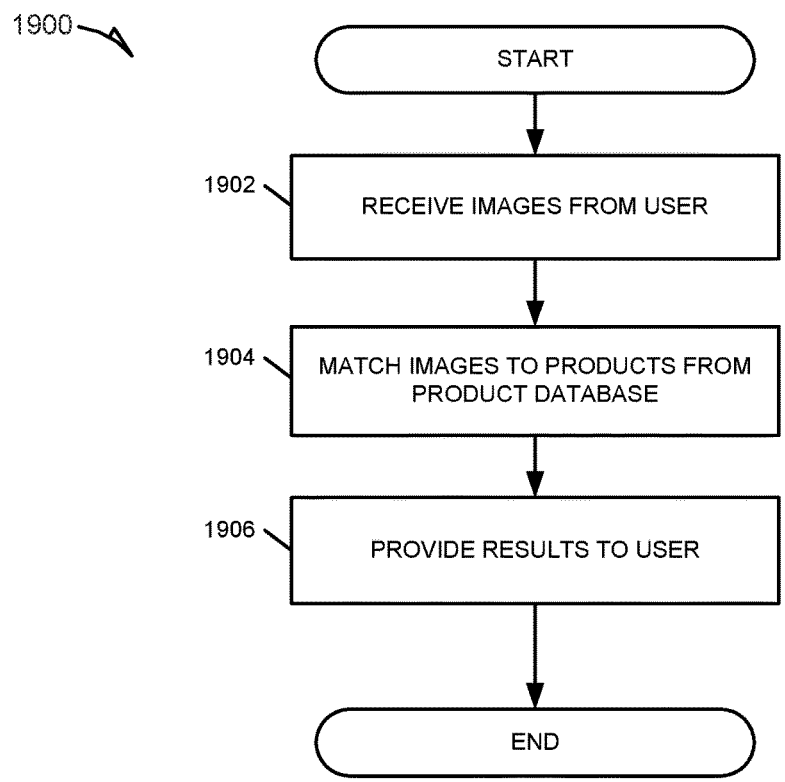
FIG. 19 is a flowchart illustrating a method for providing search results using image recognition, consistent with some embodiments.

FIG. 19 is a flowchart illustrating a method 1900 for providing search results using image recognition, consistent with some embodiments. For the purpose of illustration, FIG. 19 may be described with reference to FIGS. 1, 2, 17, and 18. The method shown in FIG. 19 may be embodied in computer-readable instructions for execution by one or more processors such that the steps of the method may be performed by the client device 106 or application server 124 and, in particular, a mobile search application executing on the client device 106 and the image recognition modules 222 of marketplace applications 126. As shown in FIG. 19, the application server 124 may receive images from the user at operation 1902. Consistent with some embodiments, the user may use the mobile search application in combination with an imaging component of the client device 106 and a mobile imaging application executing on the client device 106 to capture images of products that the user wants to search. Alternatively, the user may capture the images using an external toolbar, such as shown in FIG. 18. The captured images may be transmitted from the client device 106 to application server 124 over the communication network 104. At operation 1904, the image recognition modules 222 may then match the received images to products in databases 130 using one or more image recognition algorithms. The communication modules 232 may then transmit the results to the user at operation 1906. Consistent with some embodiments, the results are transmitted to the client device 106 over communication network 104. The results may include exact matches and products that have a similar appearance. The results may also include information about the products, such as shown in FIG. 17.

Figure 20:
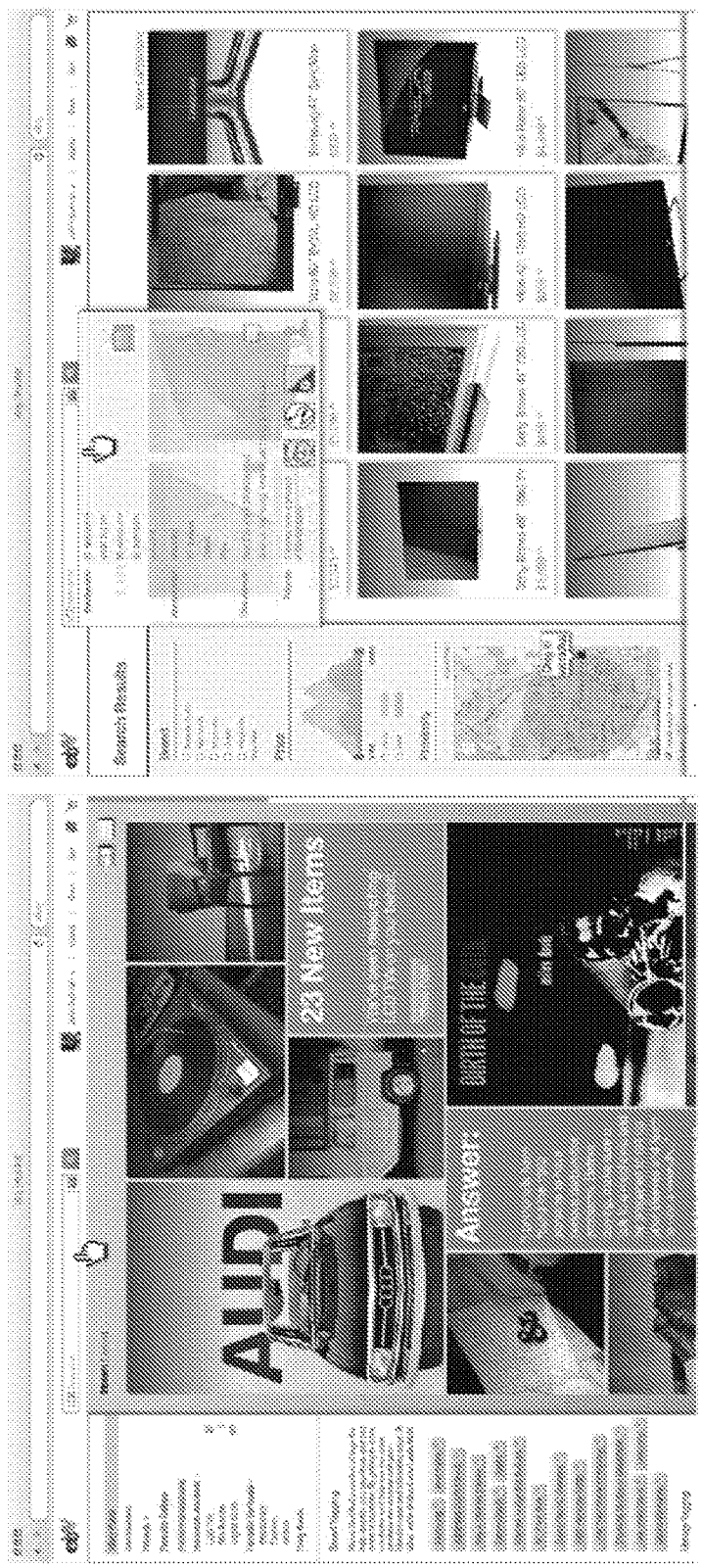
FIG. 20 is a diagram illustrating and describing providing instant search results, consistent with some embodiments.

FIG. 20 is a diagram illustrating and describing providing instant search results, consistent with some embodiments. As shown in FIG. 20, as the user using the mobile search application is entering a search query, the application server 124 is processing the search query and building results based on products in database 130. Consistent with some embodiments, the results may be further tailored or personalized based on information about the user stored in the user's profile. The information about the user may include past purchases made by the user, past searches performed by the user, social interactions of the user, including products purchased or recommended by social network connections of the user, and information about the user from Facebook, Twitter, Pinterest, Google+, and other social networking sites.

Figure 21:
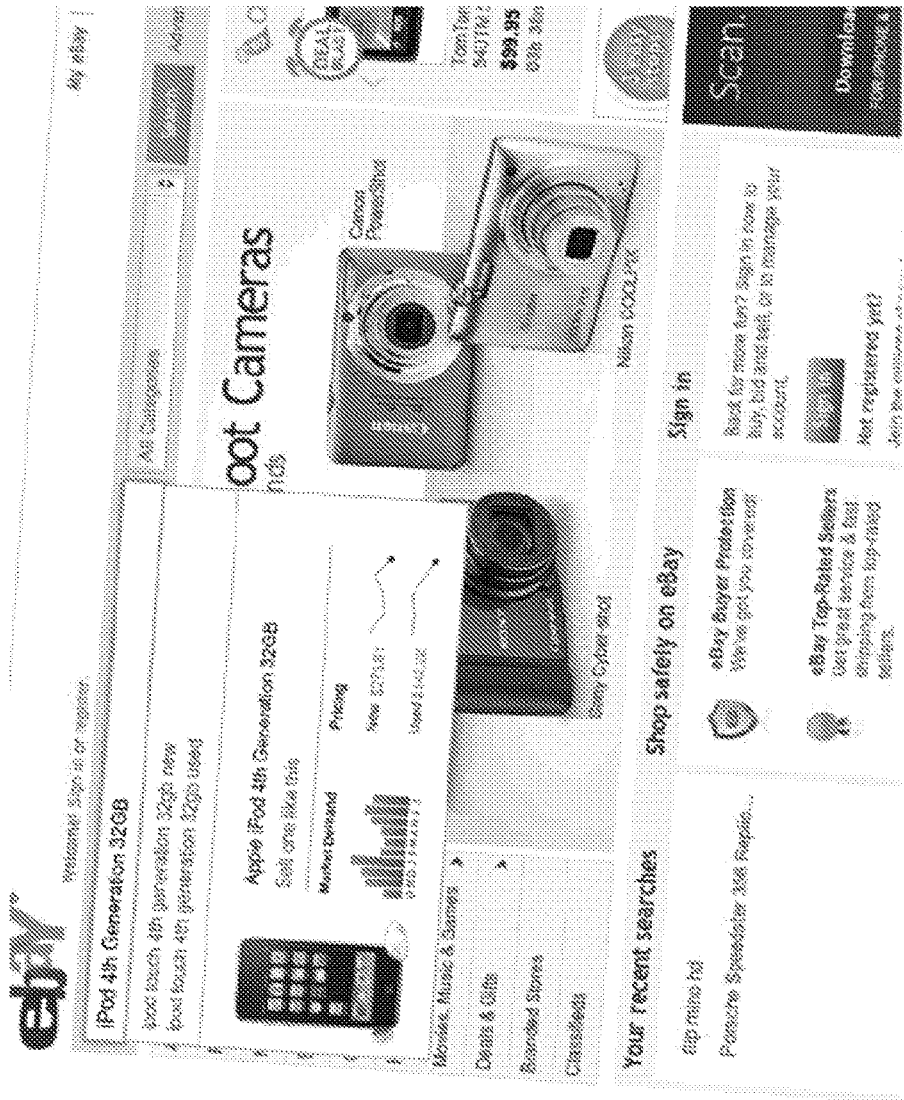
FIG. 21 is a diagram illustrating and describing providing automatic suggestions to a user, consistent with some embodiments.

FIG. 21 is a diagram illustrating and describing providing automatic suggestions to a user, consistent with some embodiments. As shown in FIG. 8, as the user is using the mobile search application executing on the client device 106 to enter a search query, the navigation modules 208 provide automatic suggestions to the user based on information about the user maintained as part of the user profile of the user. Alternatively, the suggestions may be made based on market trends associated with a product. As shown in FIG. 21, when searching for an iPod, the user may be suggested a new iPod based on current decreases in price, indicating that the user may be able to get a good deal on that particular product.

Figure 22:
FIG. 22 is a diagram illustrating and describing providing brand-specific search results, consistent with some embodiments.

FIG. 22 is a diagram illustrating and describing providing brand-specific search results, consistent with some embodiments. As shown in FIG. 22, as the user using the mobile search application executing on the client device 106 is entering a search query for a specific brand, the navigation modules 208 may provide automatic suggestions to the user based on products within that brand. For example, a user may be provided with suggestions regarding certain types of products within that brand or certain specific products within the brand. Moreover, the suggestions may reflect bestselling products, highest reviewed products, or products where user can obtain the best deal.

Figure 23:
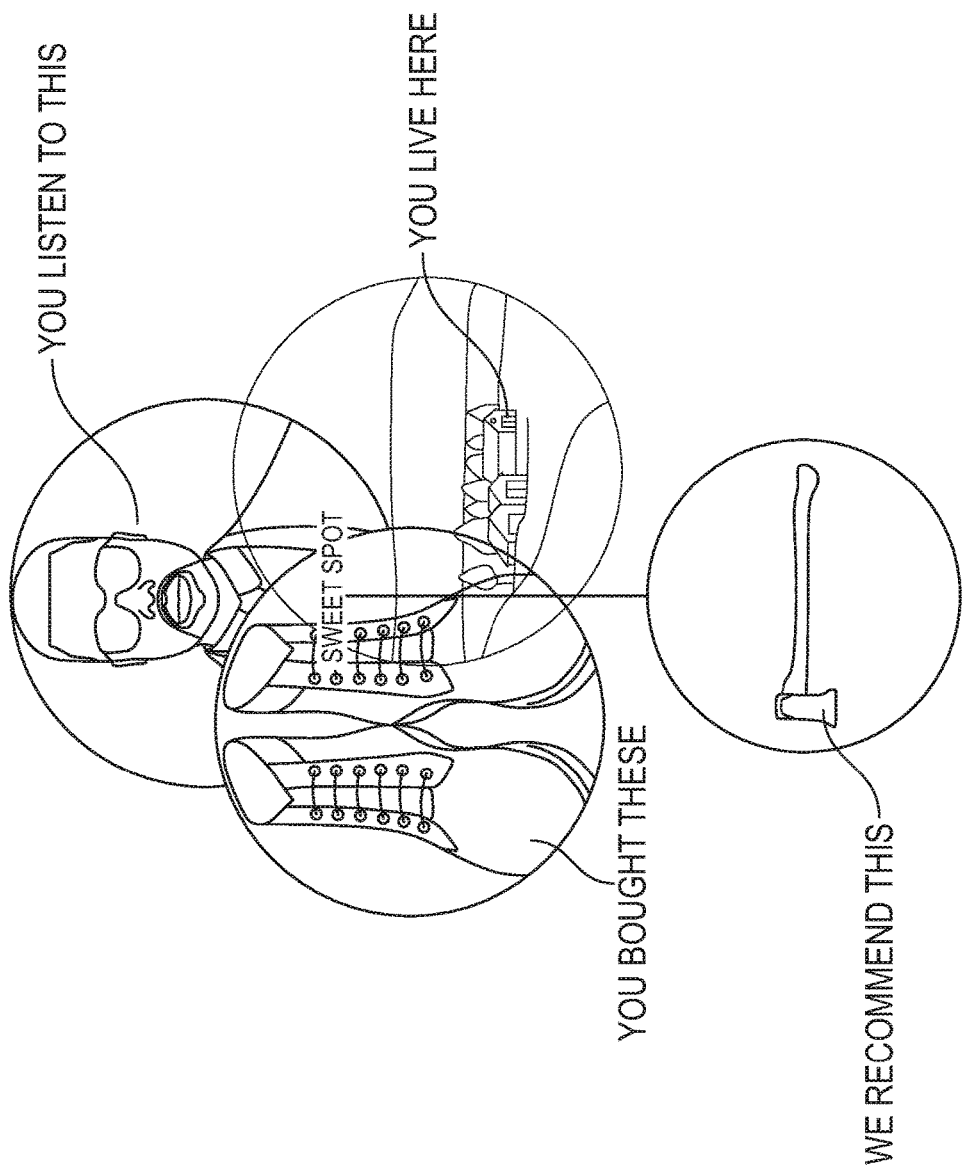
FIG. 23 is a diagram illustrating and describing providing recommendations to a user, consistent with some embodiments.

FIG. 23 is a diagram illustrating and describing providing recommendations to a user, consistent with some embodiments. FIG. 23 illustrates user information that may be used by the recommendation modules 214 in conjunction with the navigation modules 208 to tailor search results. As shown in FIG. 23, application server 124 may consider the listening tastes of the user, the location of the user, and the past purchases of the user to recommend a certain item. In providing tailored search results, the recommendation modules 214 may also use demographic information about the user such as age, location, or occupation. Consistent with some embodiments, once a recommendation has been provided to a user, the user may be able to rank the items provided in the recommendation according to the user's tastes and desires. This information may be stored in the user's profile and in turn used to generate subsequent recommendations.

Figure 24:
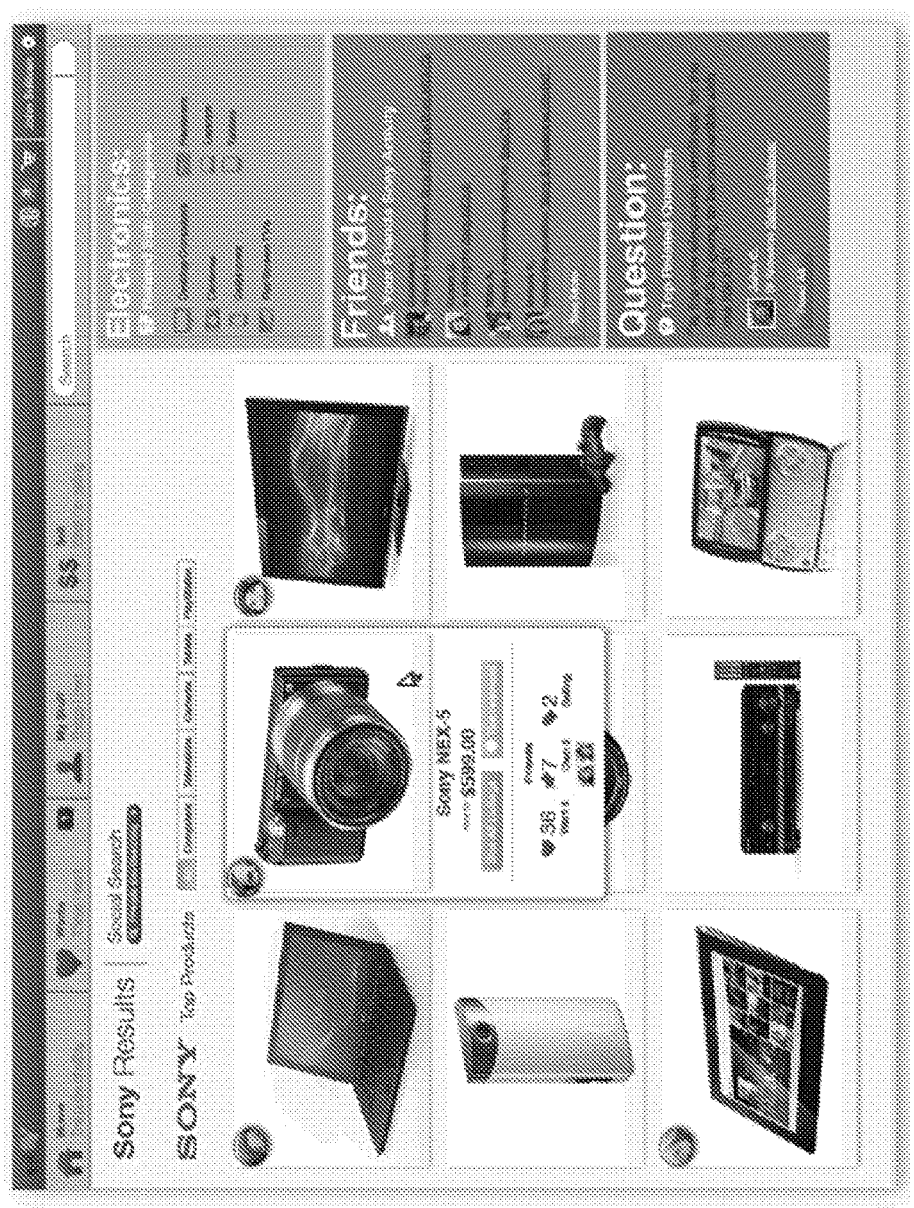
FIG. 24 is a diagram illustrating providing search results according to a brand, consistent with some embodiments.

FIG. 24 is a diagram illustrating providing search results according to a brand, consistent with some embodiments. As shown in FIG. 24, if the user enters a search query for a particular brand, the navigation modules 208 may provide search results that highlight top products within that brand. Consistent with some embodiment, the search results may include bestselling products, highest reviewed products, or products where user can obtain the best deal.

Figure 25:
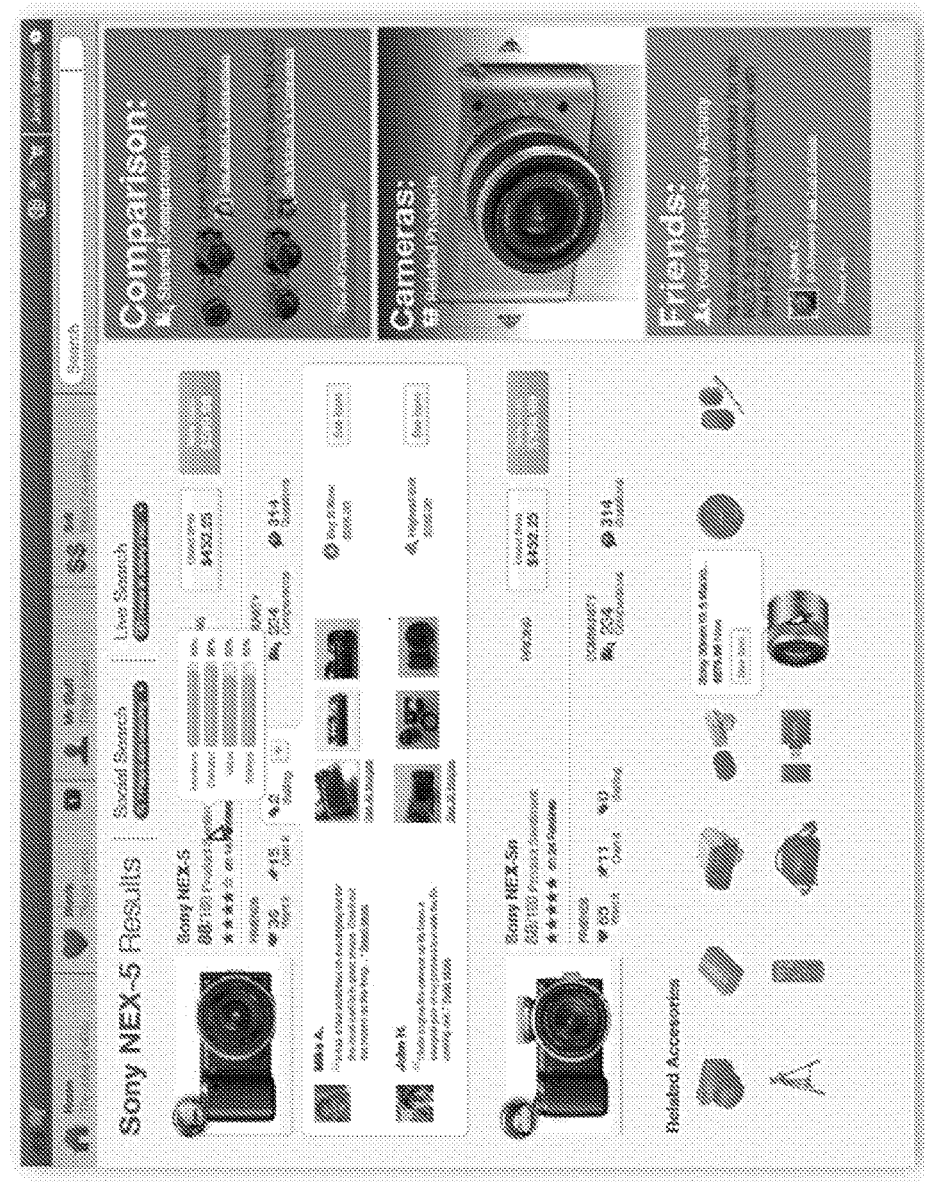
FIG. 25 is a diagram illustrating and describing providing product specific search results, consistent with some embodiments.

FIG. 25 is a diagram illustrating and describing providing product specific search results, consistent with some embodiments. As shown in FIG. 25, when a user searches for a specific product, the user may be presented with results that highlight the specific product, including information relative to the user. In particular, using the information maintained as part of the user profile of the user, the search result may show information about the product related to social network connections of the user, such as if any of the social connections of the user have purchased the product, or if any of the social network connections of the user have commented on the product.

Figure 26:
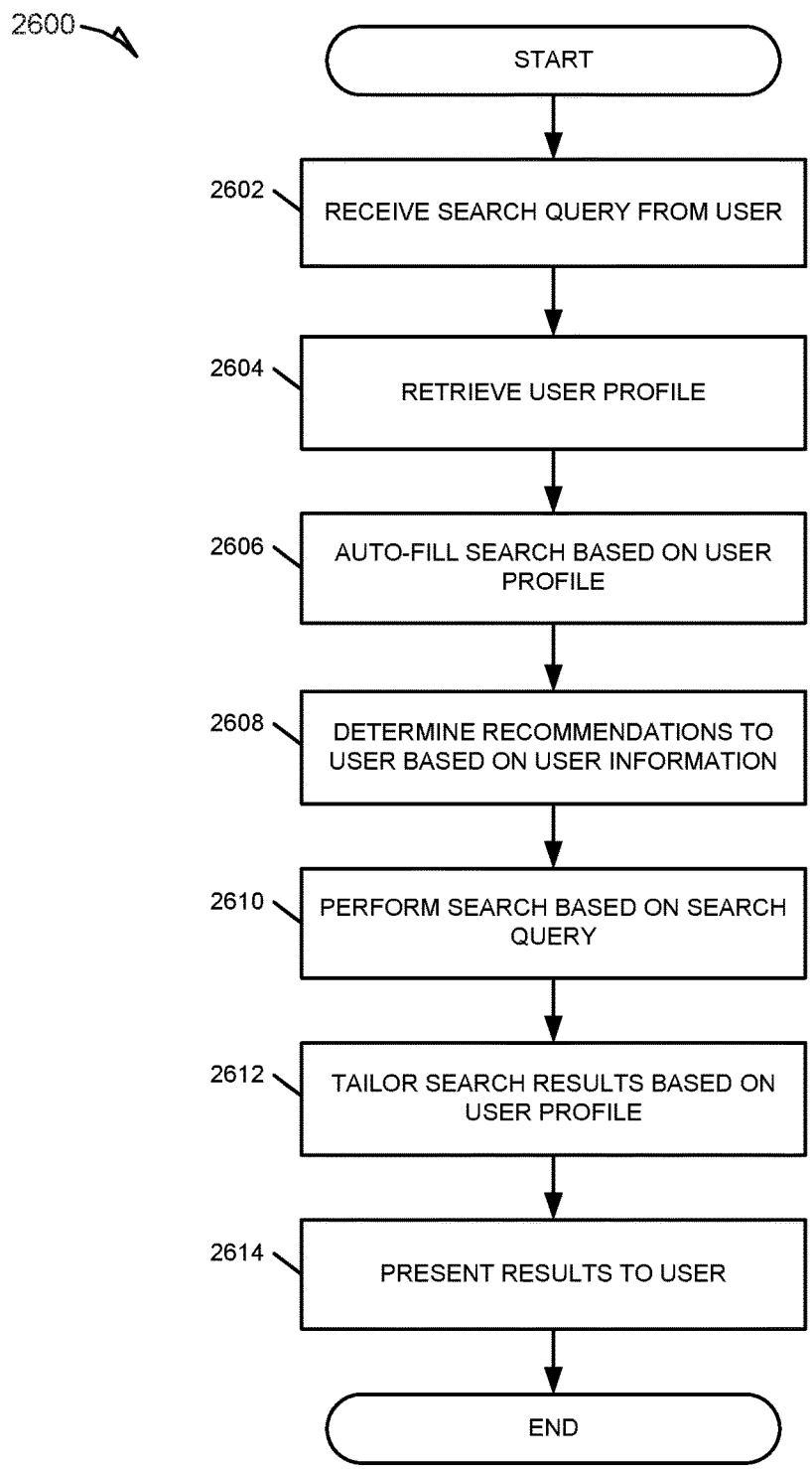
FIG. 26 is a flowchart illustrating a method of providing user-specific search results, consistent with some embodiments.

FIG. 26 is a flowchart illustrating a method 2600 of providing user-specific search results, consistent with some embodiments. For the purpose of illustration, FIG. 26 may be described with reference to FIGS. 1, 2, and 20-26. The method 2600 may be embodied in computer-readable instructions for execution by one or more processors such that the steps of the method may be performed by the client device 106 or application server 124 and, in particular, a mobile search application executing on the user device 106 and the image recognition modules 222 of marketplace applications 126. As shown in FIG. 26, at operation 2602, a search query using the mobile search application executing on the client device 106 may be received. At operation 2604, the application server 124 may retrieve user information maintained as part of the user profile of the user, which is stored in the database 132. The information about the user may include past purchases made by the user, past searches performed by the user, social interactions of the user, including products purchased or recommended by social network connections of the user, and information about the user from Facebook, Twitter, Pinterest, Google+, and other social networking sites. At operation 2606, the application server 124 may then auto-fill the search query based on user information, such as shown in FIGS. 20-22. At operation 2608, the application server 124 may also determine recommended products based on information about the user from the user profile of the user, such as shown in FIGS. 20 and 21. At operation 2610, the application server 124 may perform the search based on the search query, and tailor the search results based on the information in the user profile at operation 2612, such as shown in FIGS. 23-25. The results may then be presented by the display modules 234 to the user at operation 2614. Consistent with some embodiments, the search results will be transmitted to client device 106 over communication network 104.

Figure 27:
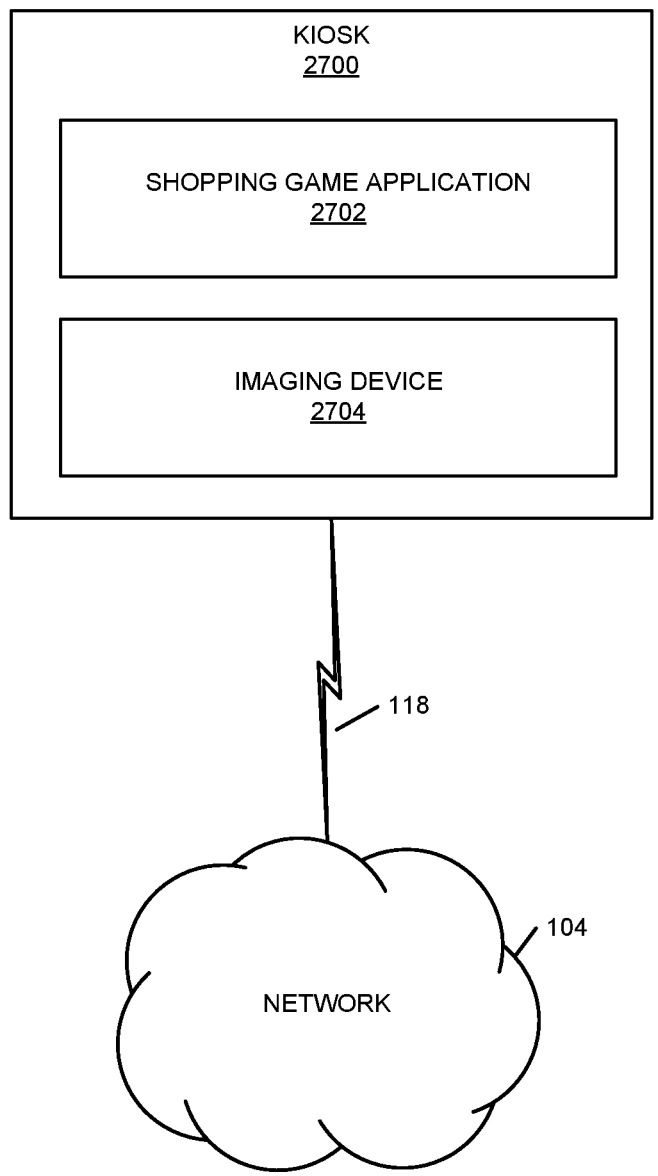
FIG. 27 is a diagram illustrating a kiosk that is in communication with the network-based marketplace.

FIG. 27 is a diagram illustrating a kiosk 2700 that is in communication with the application servers 124 over communication network 104. As illustrated in FIG. 27, the kiosk 2700 includes a combination of hardware and software capable of communication over communication network 104 for executing a shopping game application 2702 in conjunction with the client device 106 and the application server 124. The kiosk 2700 may also include an imaging device 2704 that is capable of facial recognition to recognize a user when the user is near the kiosk 2700. In some embodiments, the kiosk 2700 may also include a location beacon (not shown) that may be used to determine the location of the kiosk 2700. This concept is described in U.S. patent application Ser. No. 14/039,154, entitled "SYSTEM AND METHODS FOR CHECKING A USER INTO A LOCATION USING A PACKET SEQUENCE INCLUDING LOCATION INFORMATION", which is hereby incorporated by reference in its entirety.

Figure 28:
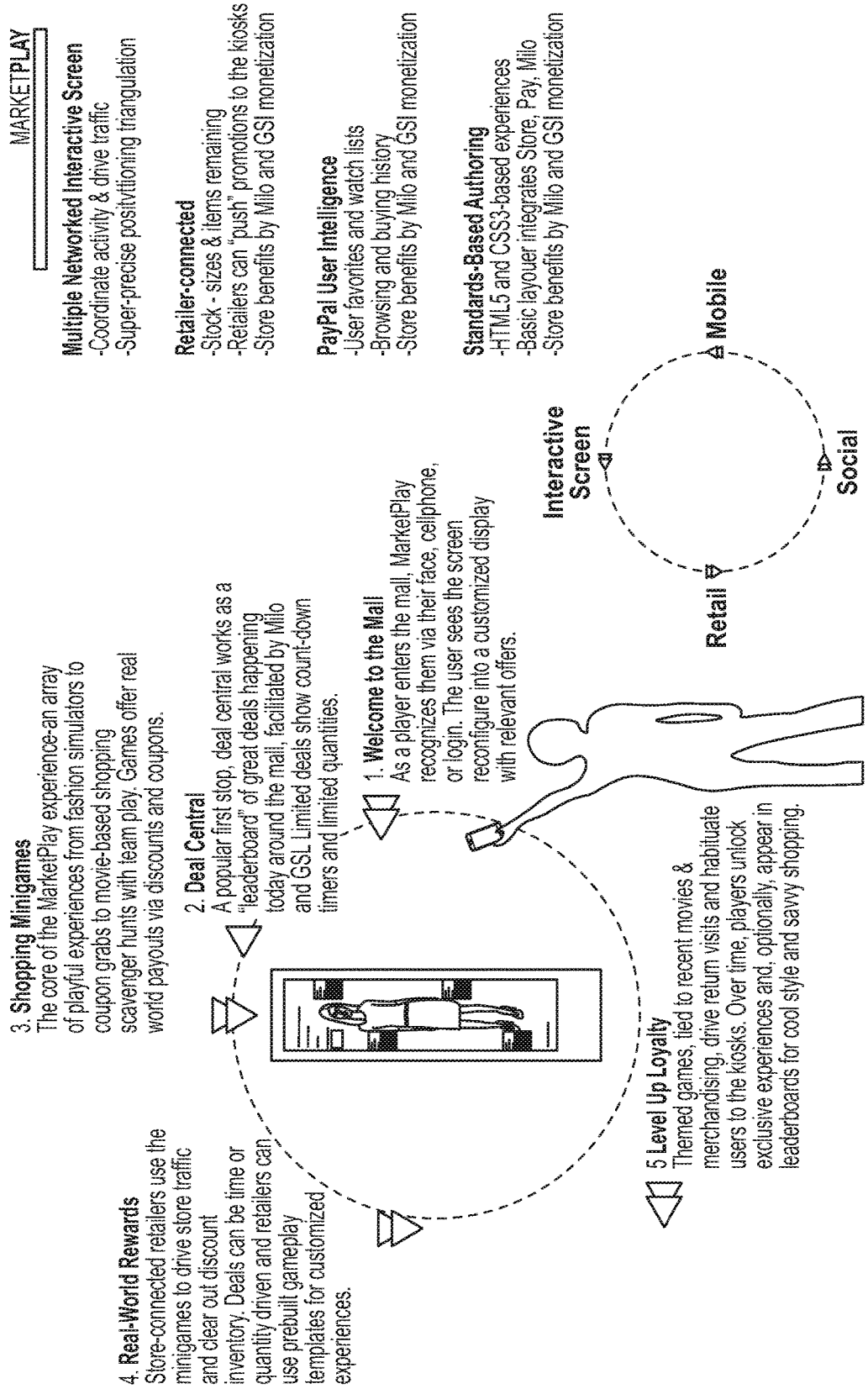
FIG. 28 is a diagram illustrating the concept of the interactive shopping games, consistent with some embodiments
Figure 29:
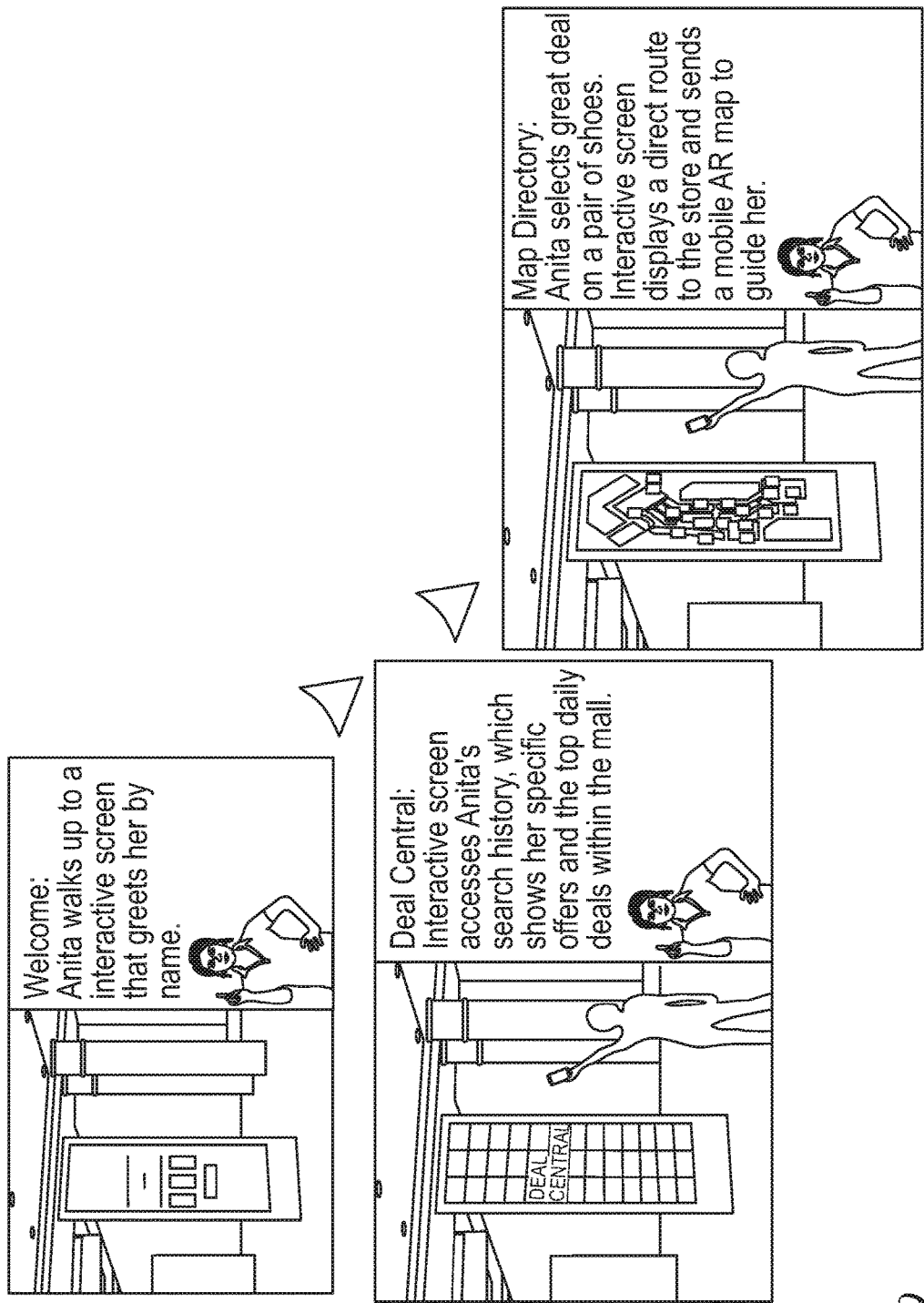
FIGS. 29-38 are diagrams illustrating one or more interactive shopping games and activities that are available to a user when shopping in a local mall having kiosks that are in communication with remote server.
Figure 30:
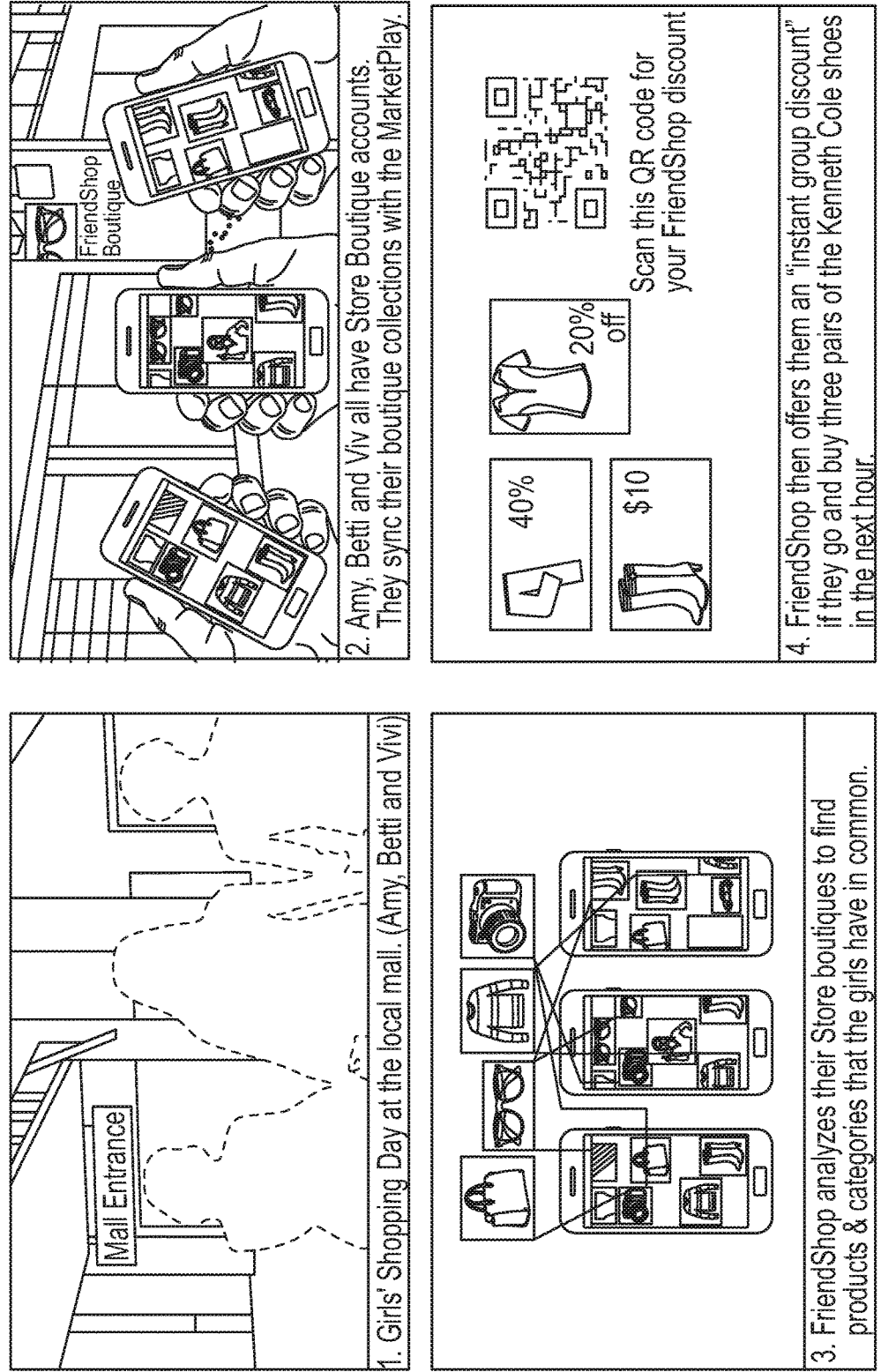
Figure 31:
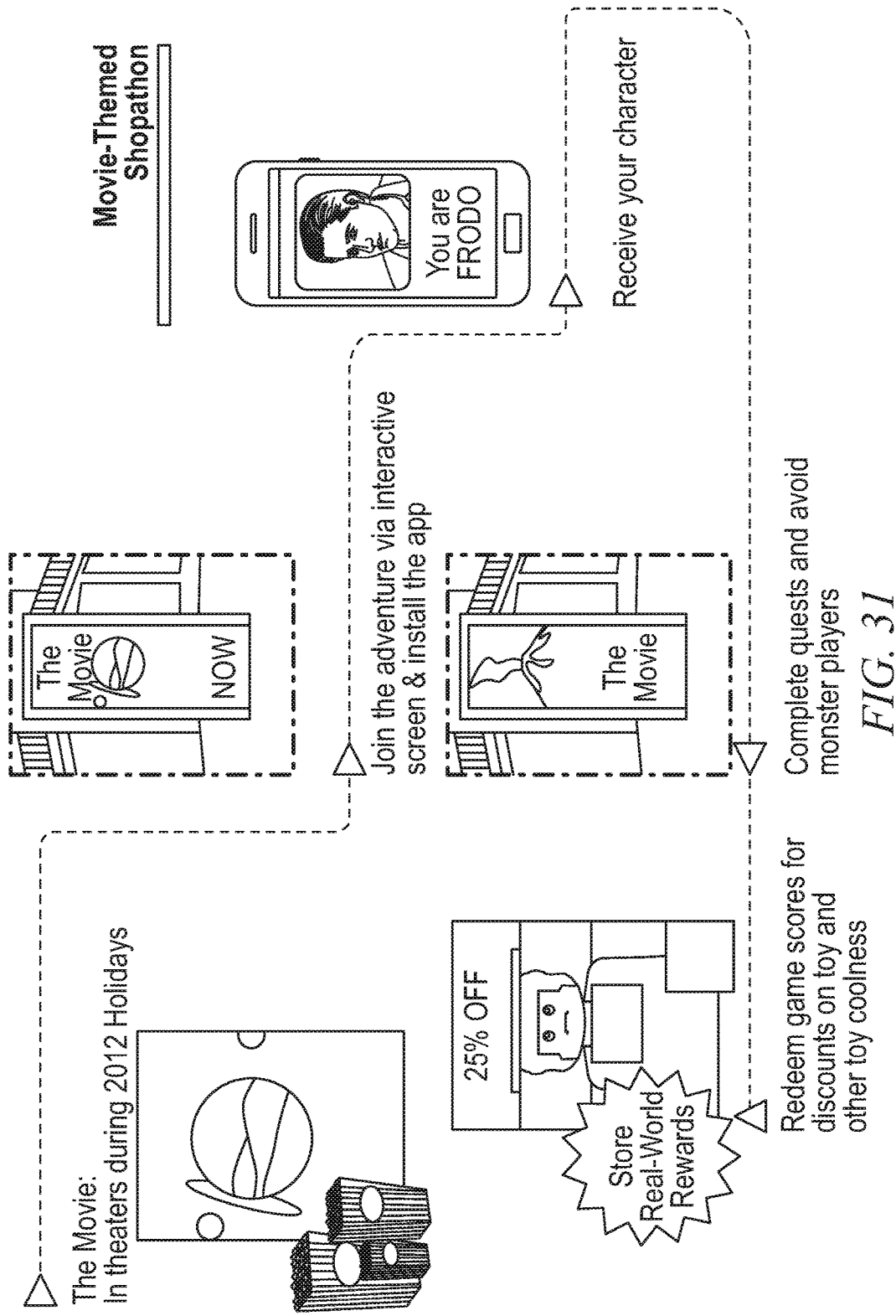
Figure 32:
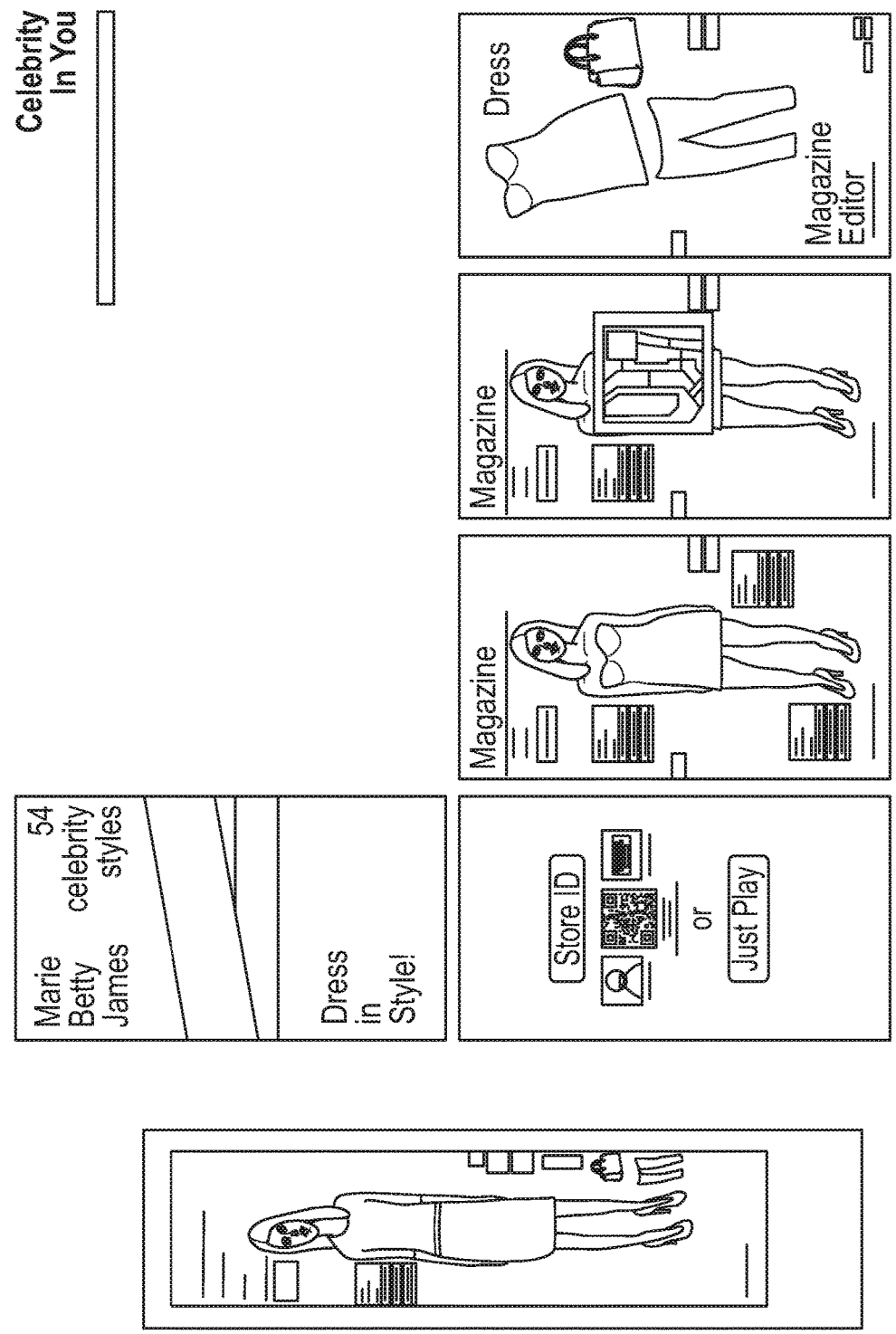
Figure 33:
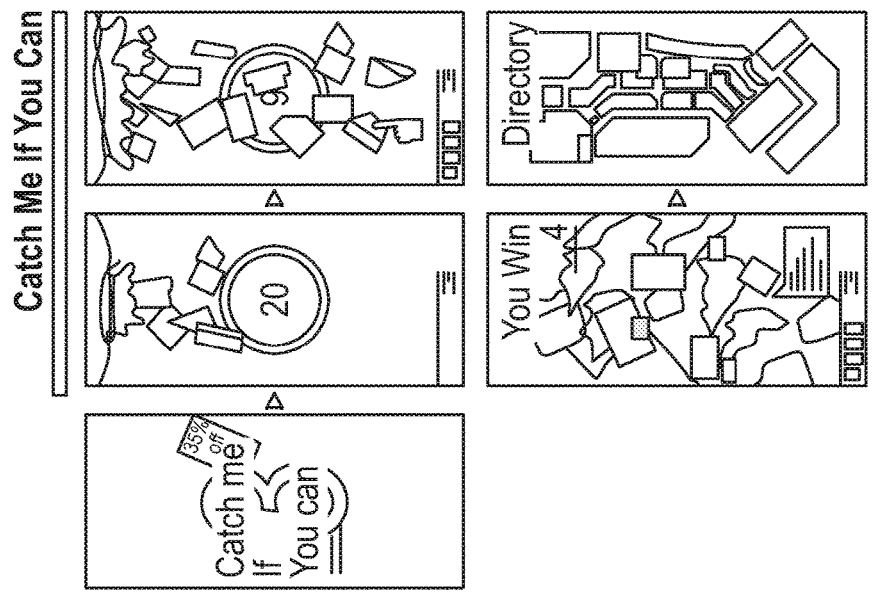
Figure 33:
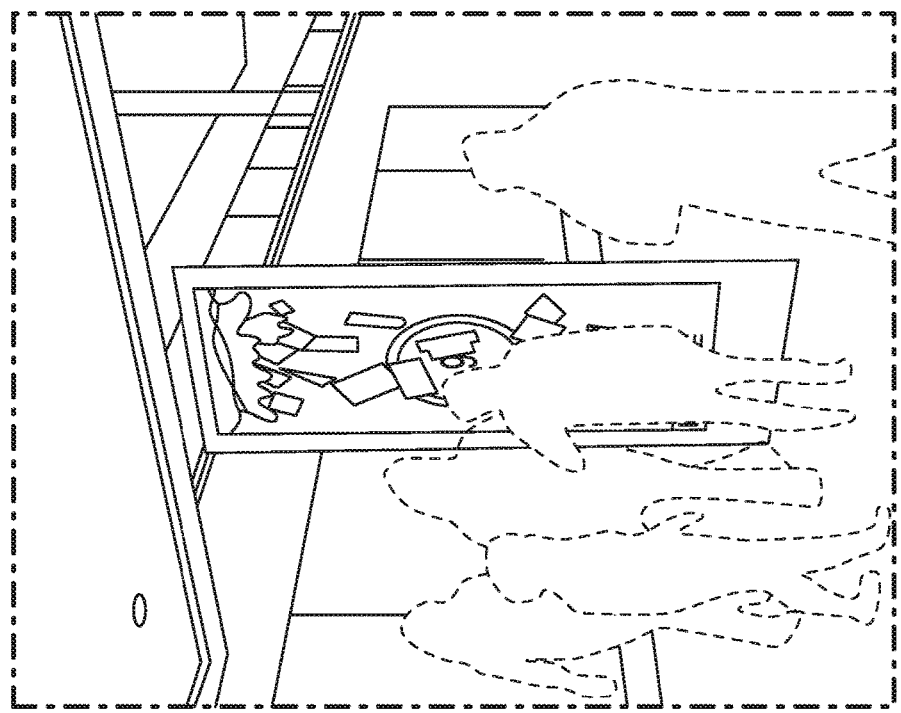
Figure 34:
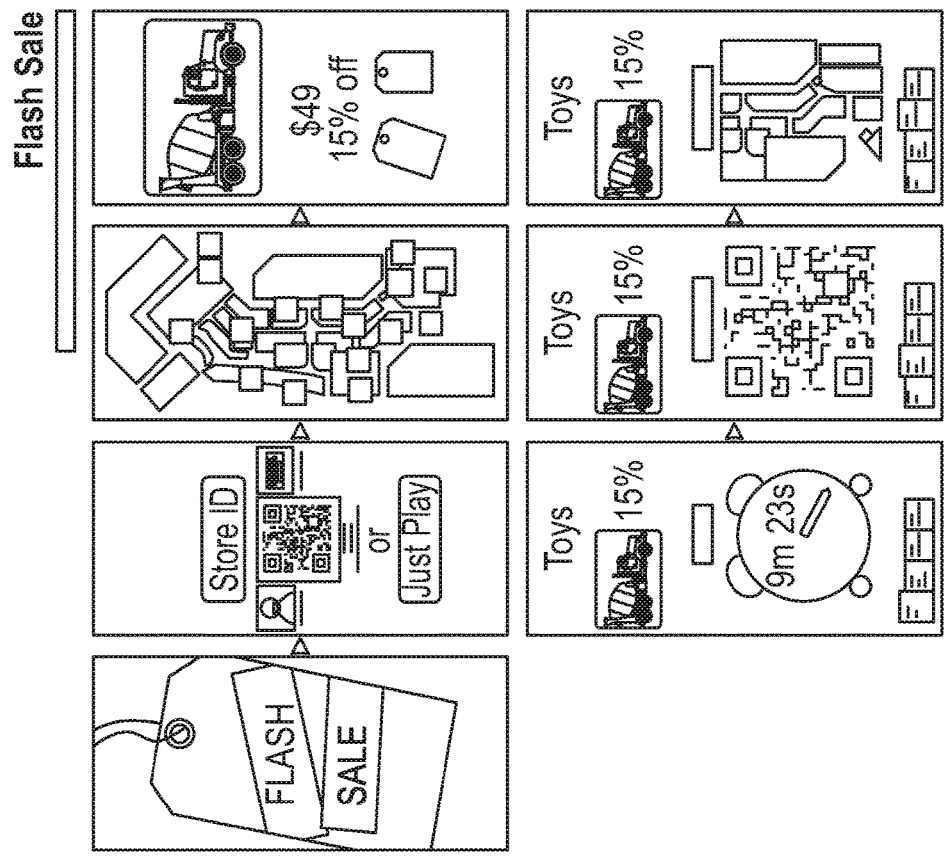
Figure 34:
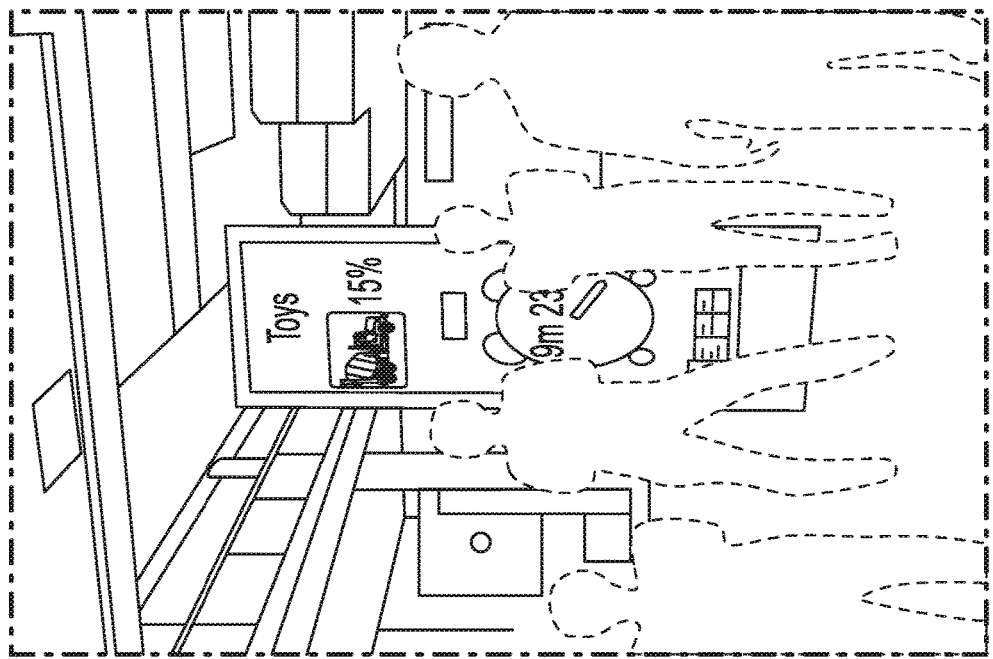
Figure 35:
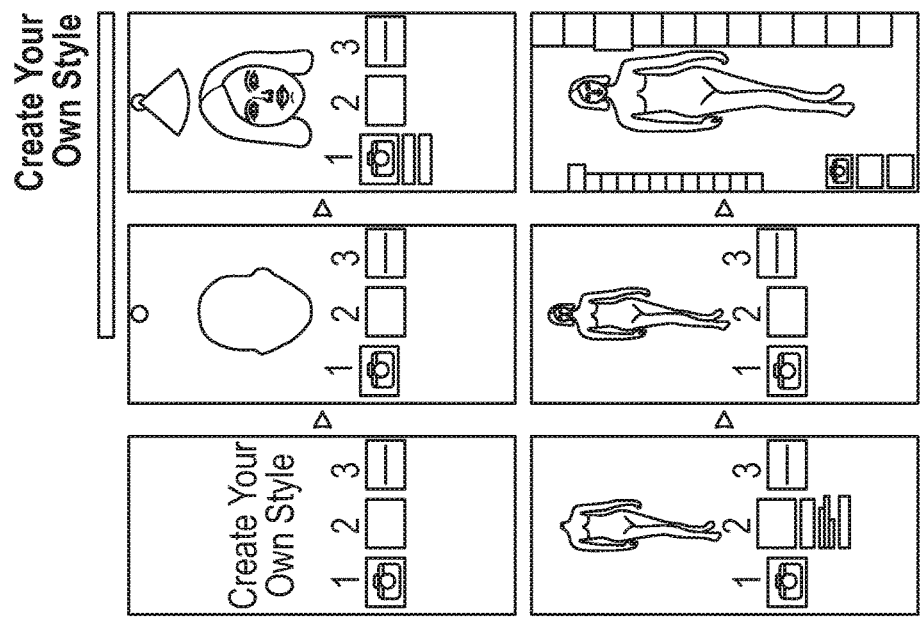
Figure 35:
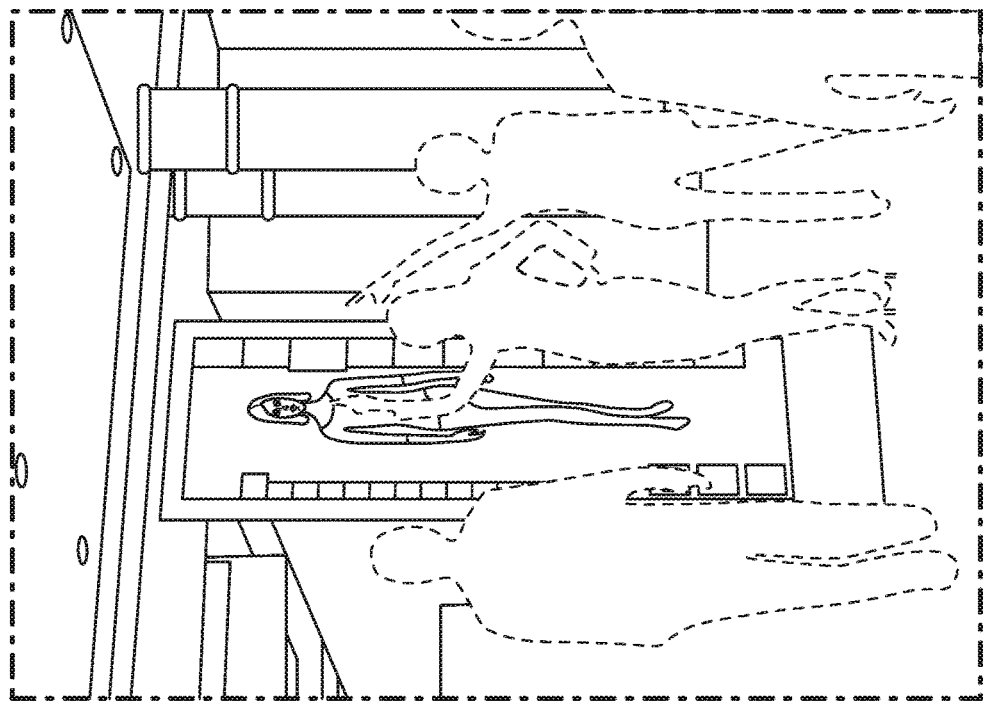
Figure 36:
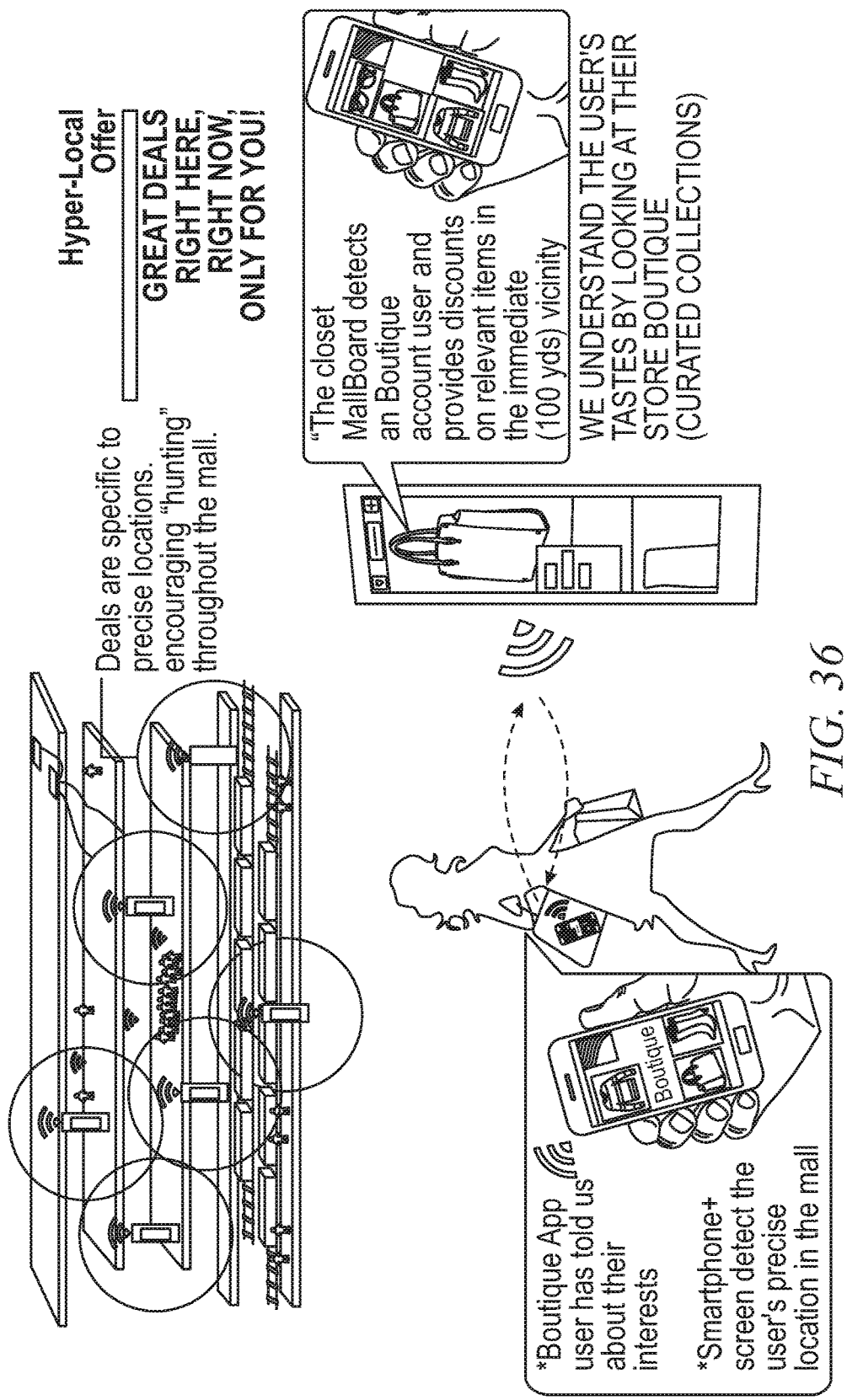
Figure 37:
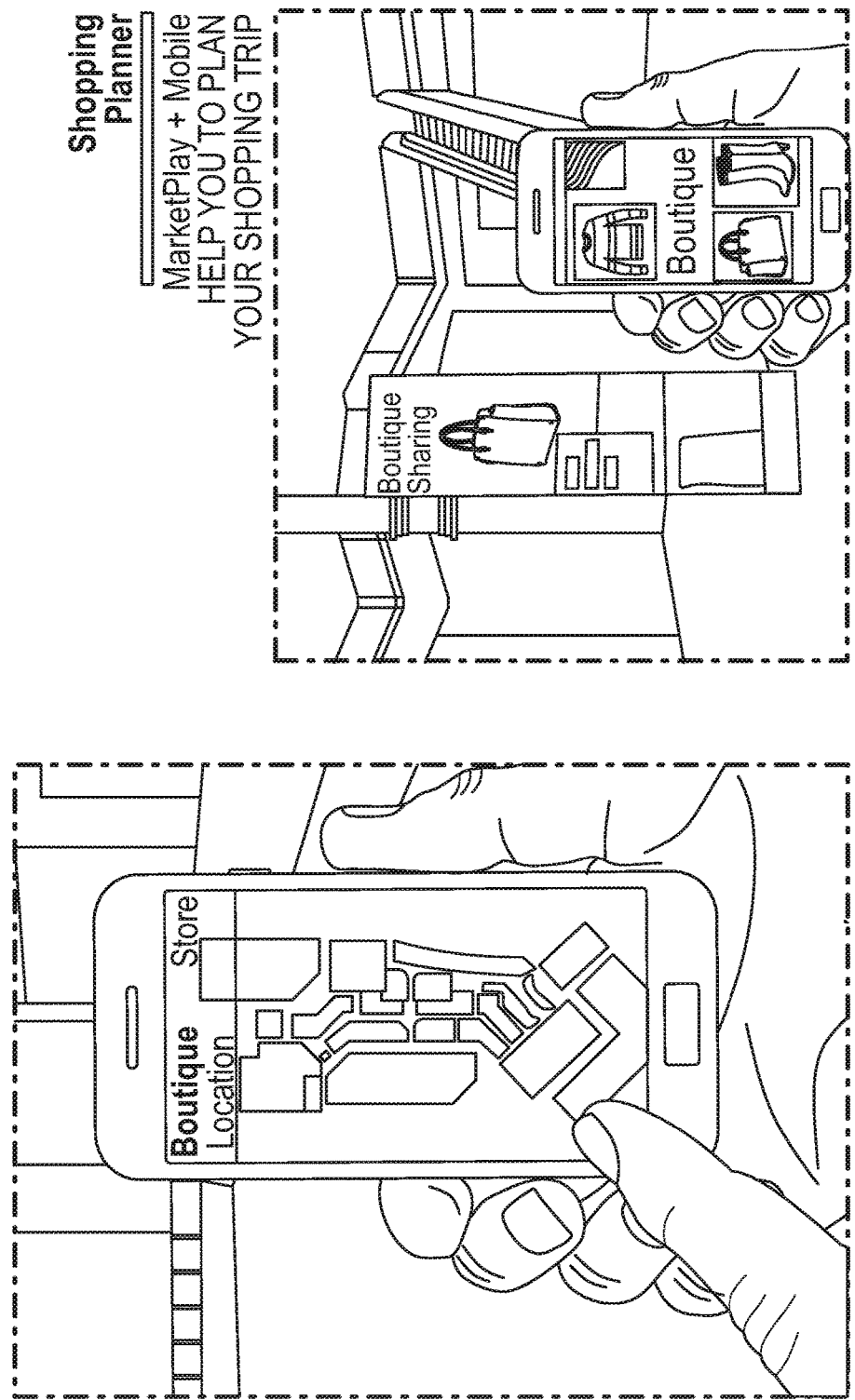
Figure 38:
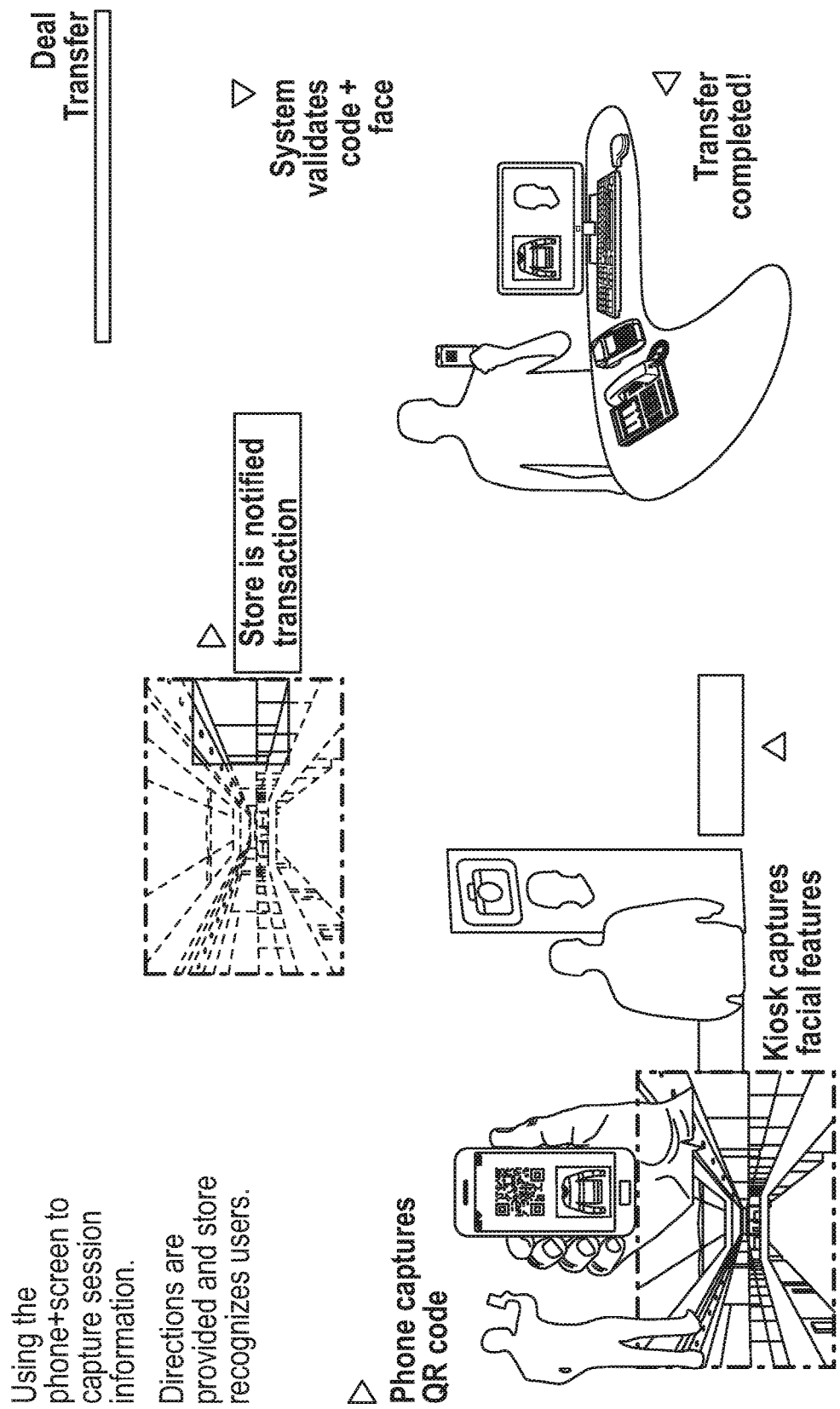

FIG. 28 is a diagram illustrating the concept of the interactive shopping games, consistent with some embodiments. As shown in FIG. 27, by using networked kiosks 2700 within a local mall environment, a user may access the application server 124 and the one or more shopping games provided by shopping game modules 224 using a mobile shopping game application executing on the client device 106 or by facial recognition by the kiosks 2700. Similar concepts are also described in U.S. patent application Ser. No. 13/765,558, entitled "SYSTEM AND METHODS TO PRESENT A PERSONAL SHOPPING EXPERIENCE", and U.S. Provisional Patent Application No. 61/831,607, entitled "STORE OF THE FUTURE", which are both hereby incorporated by reference in its entirety. FIG. 28 further describes providing one or more interactive shopping games, consistent with some embodiments.

FIGS. 29-38 are diagrams illustrating one or more interactive shopping games and activities that are available to a user when shopping in a local mall having kiosks that are in communication with remote server.

Figure 39:
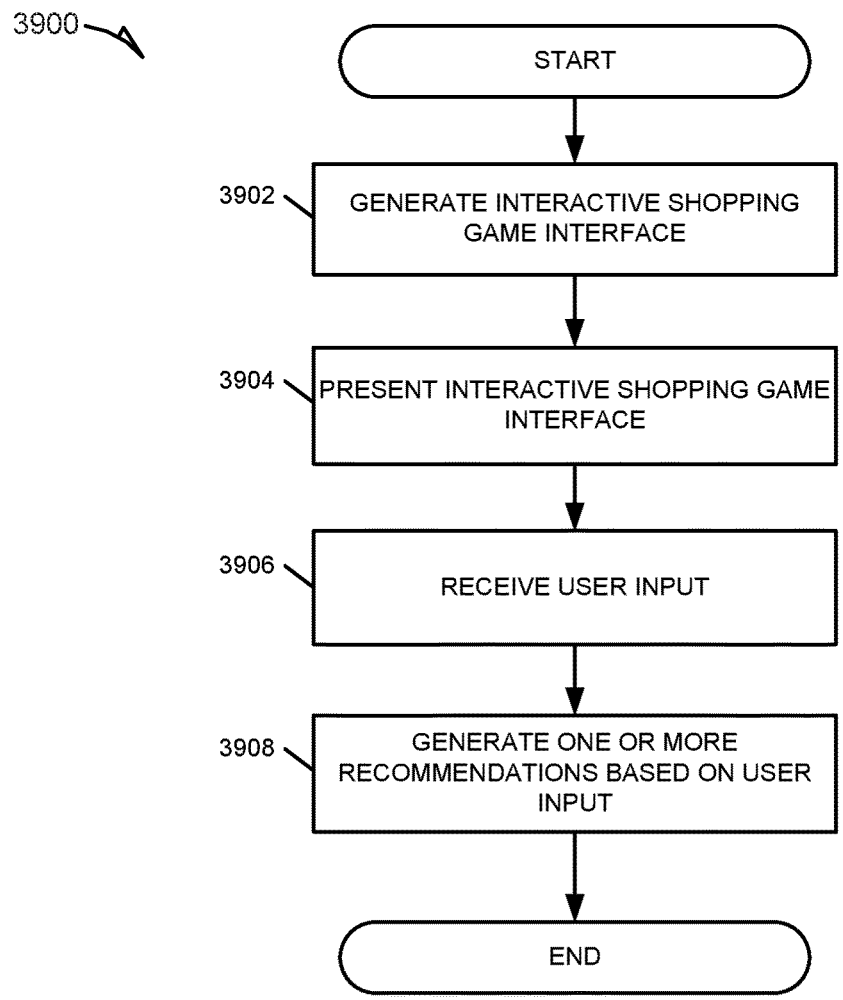
FIG. 39 is a flowchart illustrating a method for providing interactive shopping games to a user.

FIG. 39 is a flowchart illustrating a method 3900 for providing interactive shopping games to a user. For the purpose of illustration, FIG. 39 may be described with reference to FIGS. 1, 2, and 27-38. The method 3900 may be embodied in computer-readable instructions for execution by one or more processors such that the steps of the method 3900 may be performed by the client device 106, kiosk 2700, or application server 124 and, in particular, a mobile shopping application executing on the user device 106, the shopping game application 2702, and the shopping game modules 222 of marketplace applications 126.

At operation 3902, the shopping game modules 222 may generate an interactive shopping game interface (e.g., the interactive shopping games illustrated in FIGS. 28-38). At operation 3904, the interactive shopping game interface may be presented by the mobile shopping game interface running on client device 106 or the display of kiosk 2700. At operation 3906, the shopping game modules 222 may receive user input received at the client device 106 or kiosk 2700. The user input may be input received in furtherance of the interactive shopping game. At operation 3908, the received user input is used by the recommendation modules 218 to generate one or more recommendations. The one or more recommendations may, for example, include one or more items offered for sale that relate to the interactive shopping game or the location of the kiosk. In some embodiments, the recommendations may include a coupon to be used at a retail location offering the one or more items provided as part of the recommendation.

Figure 40:
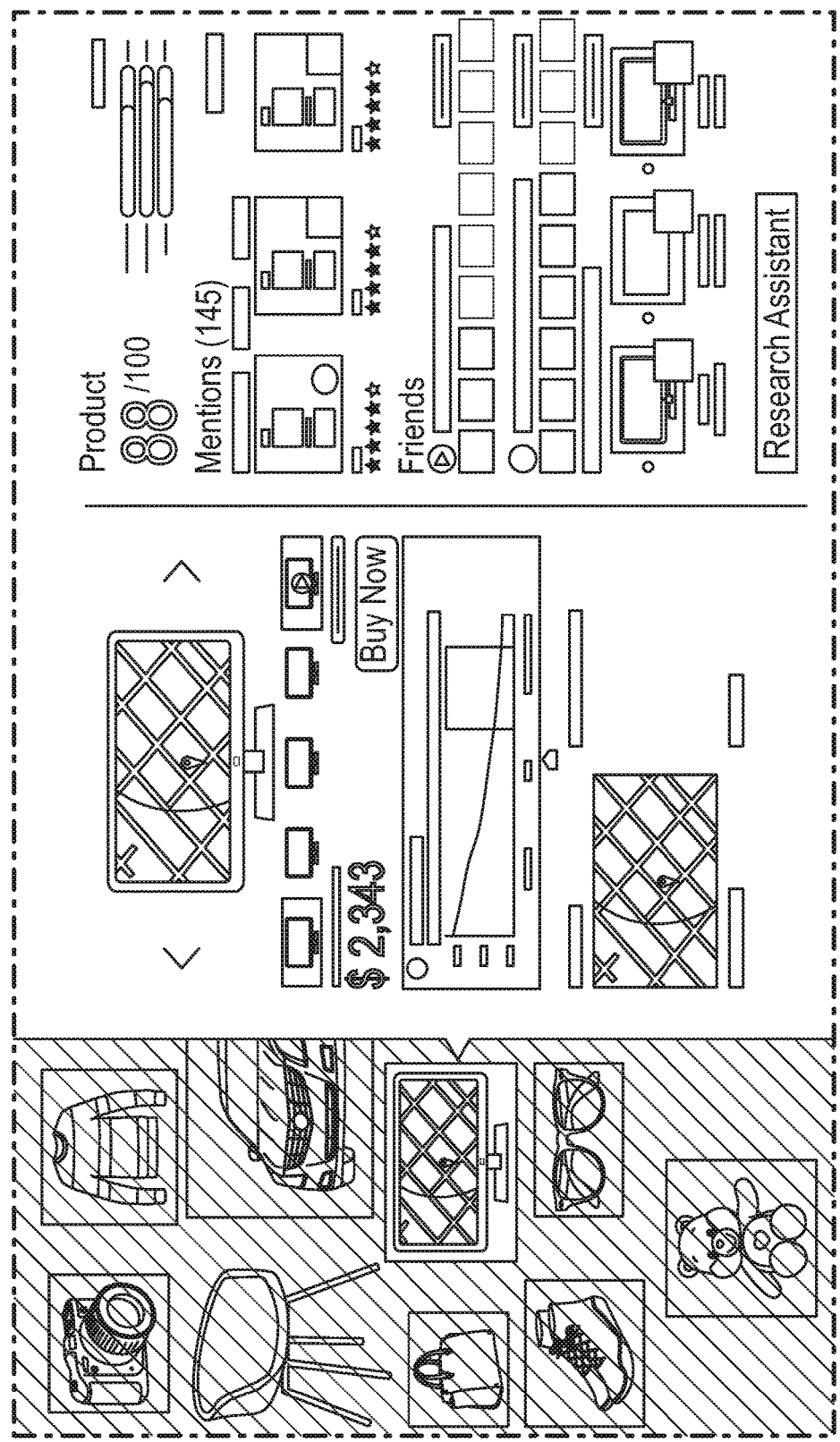
FIG. 40 is a diagram illustrating a product display, consistent with some embodiments.

FIG. 40 is a diagram illustrating a product display, consistent with some embodiments. As shown in FIG. 40, product display modules 226 may create views for a product that provides a user viewing the product all of the information that they would need to make an informed decision regarding purchasing or selling the product. The product display page may provide information such as availability, local areas where it is available, if any social network connections own the same product or a competing product, pricing of the product. The product display page may also provide comparisons of the product to other products and market data about the product, the market data including current market pricing, pricing trends, and market demand for the product. Questions, answers, and links to communities and affinity groups related to the product may also be shown on the product display page. All of the information provided on the product display page may be of use to the user when evaluating the product. The product display page may also include information related to the shipping of the product, including tracking information if the product is being shipped, and shipping cost estimates based on products dimensions.

Figure 41:
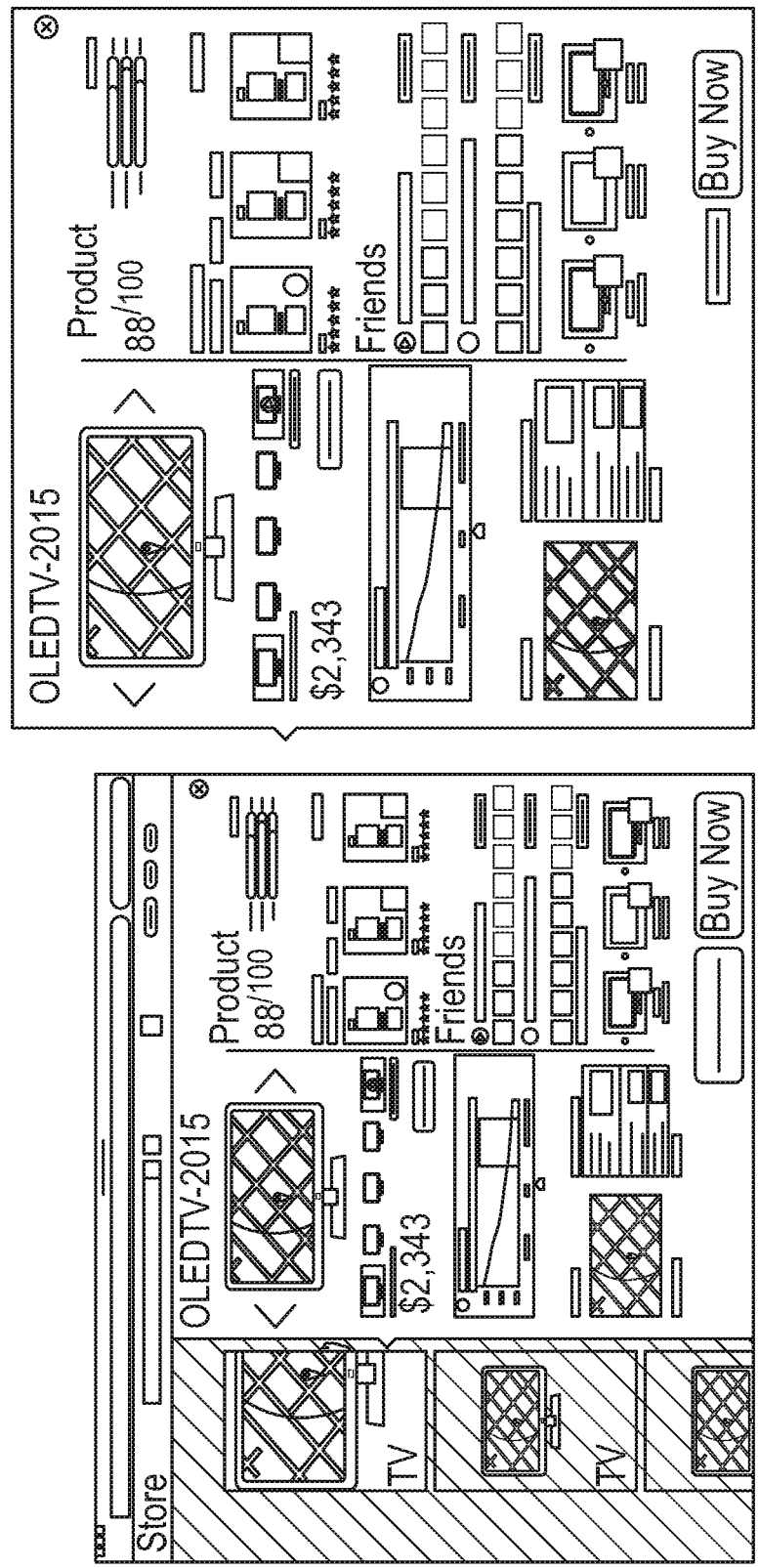
FIG. 41 is a diagram illustrating another view of a product display, consistent with some embodiments.

FIG. 41 is a diagram illustrating another view of a product display, consistent with some embodiments. As shown in FIG. 41, the product display may include a current lowest price, mentions, reviews, a map showing local availability, and a product sentiment score that may be used as an indicator of an overall relative value of the product.

Figure 42:
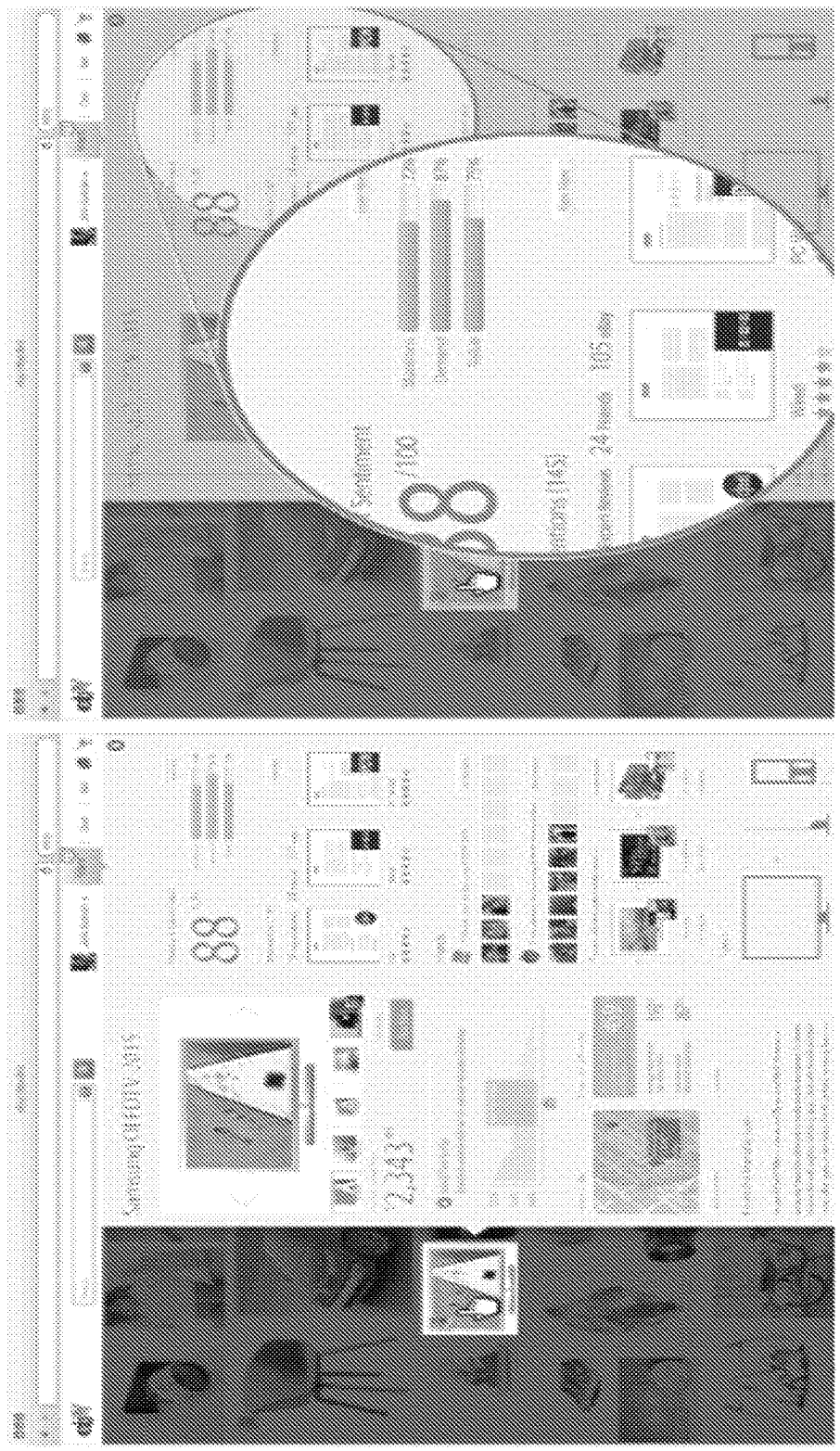
FIG. 42 is a diagram illustrating a product sentiment score of a product, consistent with some embodiments.

FIG. 42 is a diagram illustrating a product sentiment score of a product, consistent with some embodiments. As shown in FIG. 5, the product sentiment score is based on an aggregate of reviews, mentions, market demand, and the current market value of the product as determined by product display modules 226 from external sites over communication network 104 and databases 132.

Figure 43:
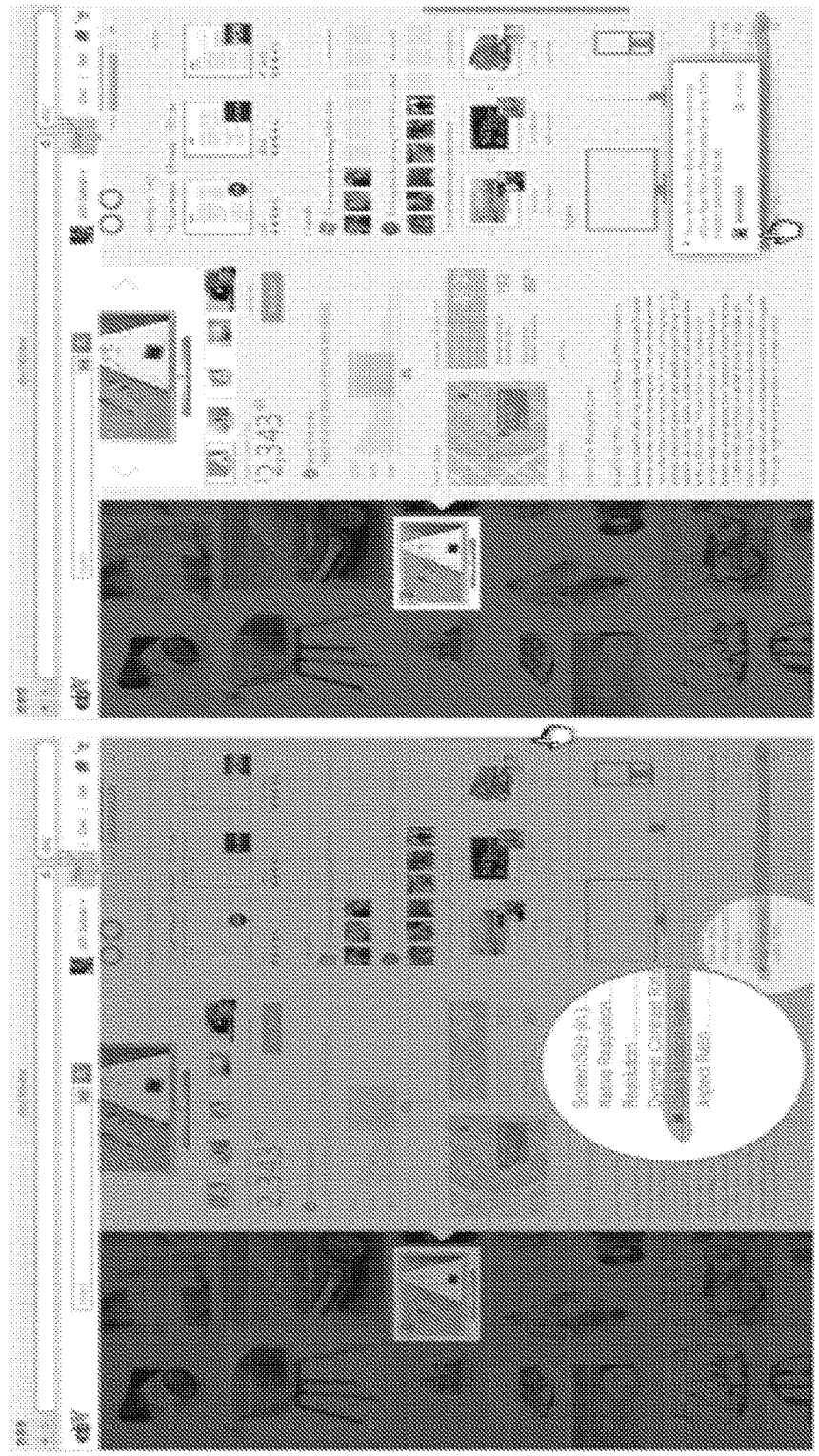
FIGS. 43 and 44 are diagrams illustrating a product display including highlighted comments from social contacts, consistent with some embodiments.
Figure 44:
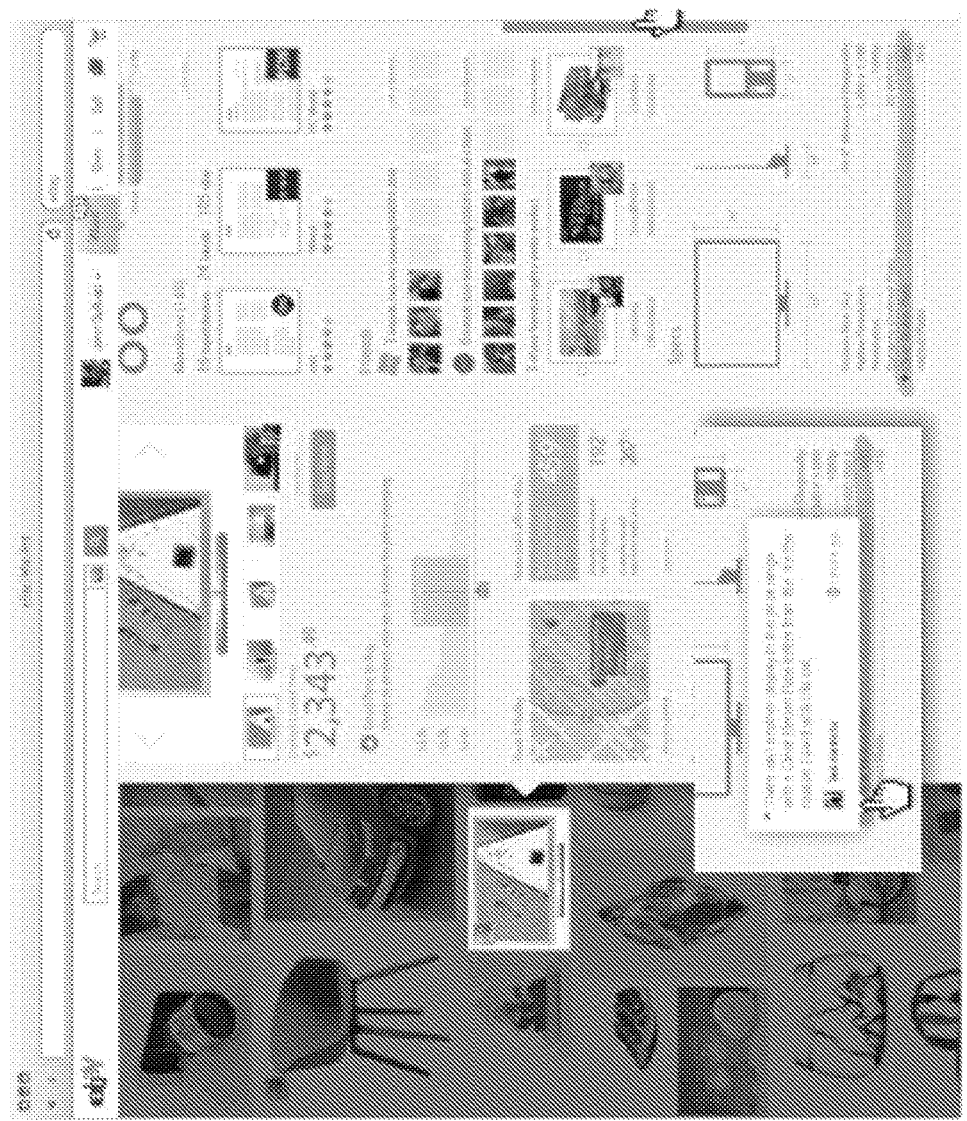

FIGS. 43 and 44 are diagrams illustrating a product display including highlighted comments from social network connections, consistent with some embodiments. As discussed above, advice from friends and family is typically highly regarded when making decisions about a product. In particular, certain ones of these social network connections may be known for always knowing the answers, whether they do the research or work in the industry. As shown in FIGS. 43 and 44, reviews and comments regarding a product may be shown on the product display. Moreover, the product display modules 226 may determine social network connections of the user from information about the user maintained as part of the user profile of the user and highlight any reviews or comments by social network connections of the user when the user is viewing the product display page, making it easier for the user to find.

Figure 45:
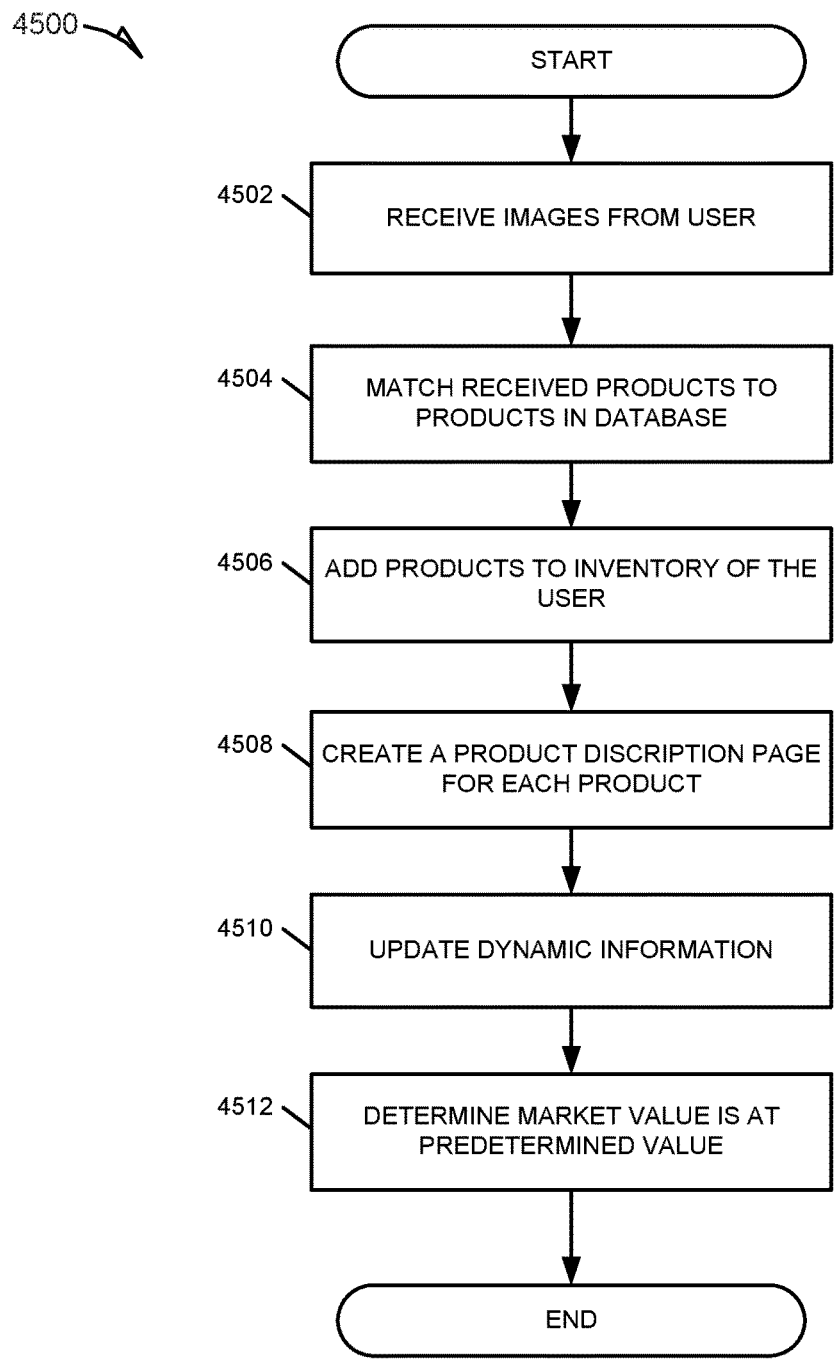
FIG. 45 is a flowchart illustrating a method of creating an inventory, consistent with some embodiments.

FIG. 45 is a flowchart illustrating a method 4500 of creating an inventory, consistent with some embodiments. For the purpose of illustration, FIG. 45 may be described with reference to FIGS. 1-2. The method 4500 may be embodied in computer-readable instructions for execution by one or more processors such that the steps of the method may be performed by the client device 106 or application server 124 and, in particular, a mobile marketplace application 134 executing on the client device 106 and image recognition modules 222 of the marketplace applications 126. As shown in FIG. 7, application server 124 may receive images from the user at operation 4502. Consistent with some embodiments, the user may use the mobile marketplace application 134 and a mobile imaging application executing on the client device 106 to capture images of products that the user wants to add to an inventory. The captured images are transmitted from the client device 106 to the application server 124 over the communication network 104. The images may be captured in bulk using a mobile device or using a traditional camera and uploaded using a desktop computer. At operation 4504, the image recognition modules 222 may then match the received images to products in databases 132 using one or more image recognition algorithms. At operation 4506, products that match the images are added to the inventory of the user. At operation 4508, the product display modules 226 may create a product description page for each of the items in the inventory of the user, such as shown in FIG. 43. At operation 4510, the product display modules 226 may then update the dynamic information including market value in the product description page for each item or product as the information changes.

Consistent with some embodiments, the user may set an alert to notify the user when the market value for a particular product or item has increased to a predetermined value, or has increased a predetermined percentage. In such embodiments, the product display modules 226 may determine if the market value associated with a product has increased to the set predetermined value, at operation 4512. If it has, the communication modules 232 may send an alert to the user at operation 4514. If it has not, the product display modules 226 will continue to update the dynamic information associated with the products in the created inventory.

Figure 46:
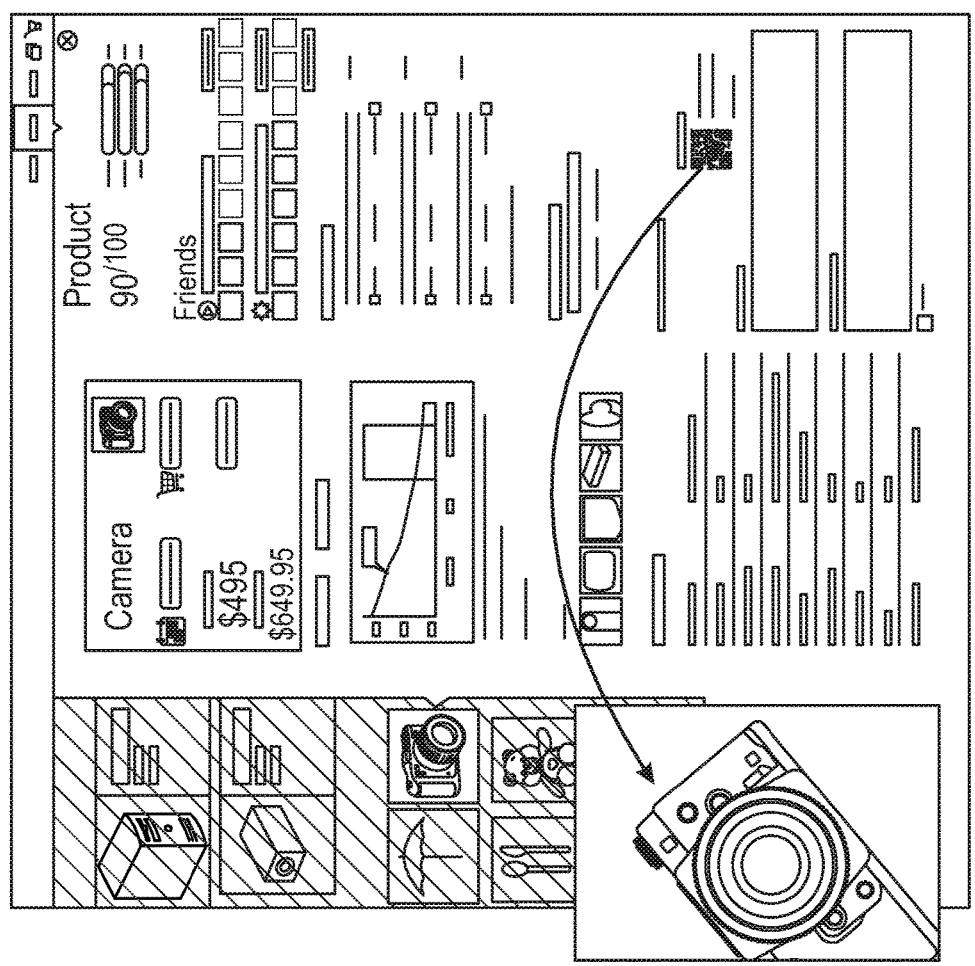
FIG. 46 is a diagram illustrating a digital history tag in a product display, consistent with some embodiments.

FIG. 46 is a diagram illustrating a digital history tag in a product display, consistent with some embodiments. As show in FIG. 46, each product may include a digital product history tag. The digital product history tag may tell the story of the product, and include such information as the date purchased, the seller, and product information such as manuals, reviews, warranty information, and return policies. Consistent with some embodiments, all of this information may be transmitted to a buyer of the product. Moreover, the user may print out the digital product history tag if the product is sold offline.

Figure 47:
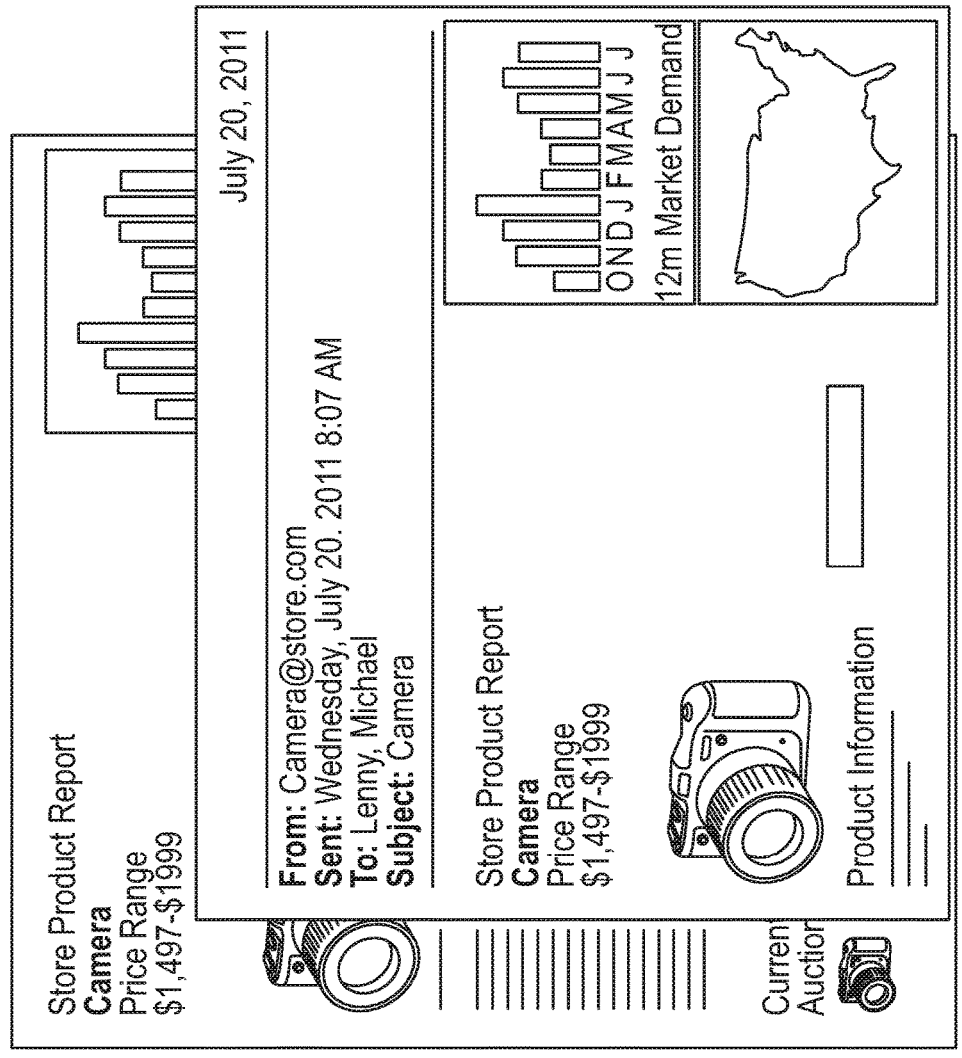
FIG. 47 is diagram illustrating a product report created from a product display, consistent with some embodiments.

FIG. 47 is diagram illustrating a product report created from a product display, consistent with some embodiments. As shown in FIG. 47, product reports may be created that include all of the information related to a product that the user may be interested in. The product report may essentially include all of the information that is available to the user in a product display such as discussed above, but made available in a convenient form for offline review. For example, the user may e-mail or send other communications to application server 124 via communication modules 232 to request a product report for a particular product. In turn, the product display modules 226 may take all of the information from the product display and transport it to a portable document file (PDF) or other format that may be conveniently e-mailed to the user. Moreover, the user can then print out the product report to bring with them as they shop for a product.

Figure 48:
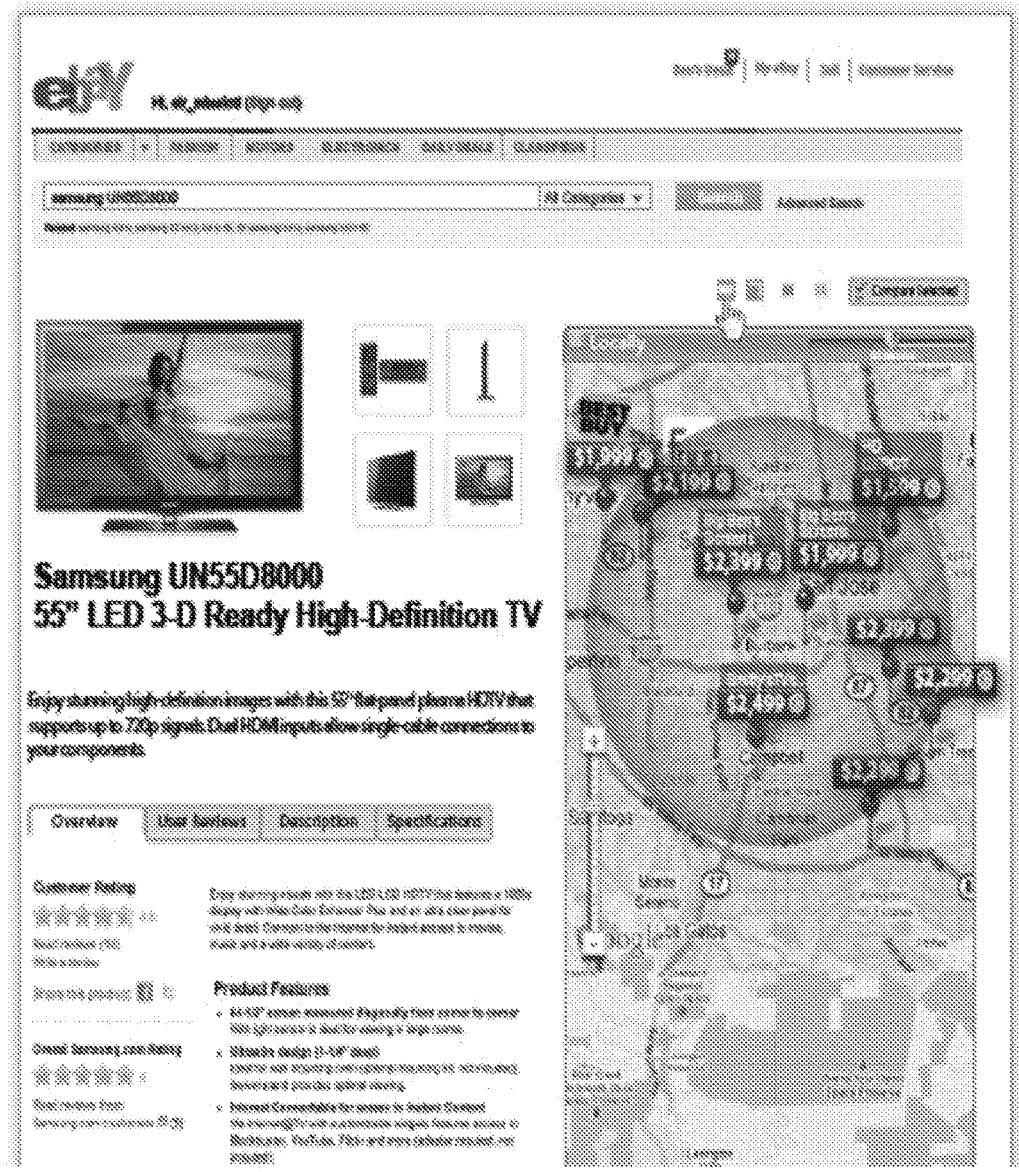
FIG. 48 is a diagram illustrating a product display including a map, consistent with some embodiments.

FIG. 48 is a diagram illustrating a product display including a map, consistent with some embodiments. As shown in FIG. 48, the product display modules 226 in communication with a mobile location application executing on the client device 106 may determine a location of the user to generate a map showing local availability of the product based on product availability from databases 132. As shown in FIG. 48, products may be shown on the map along with their price and distance. In some embodiments, the products may be shown on the map along with reviews for the product, and recommendations for related products. The reviews and recommendations may be filtered by location, such that only reviews and recommendations originating from users that are located within a particular geographic area (e.g., zip code, city, state, country, etc.) may be displayed. The user may choose further sorting options and scale the map to see a wider or smaller range.

Figure 49:
Figure 50:
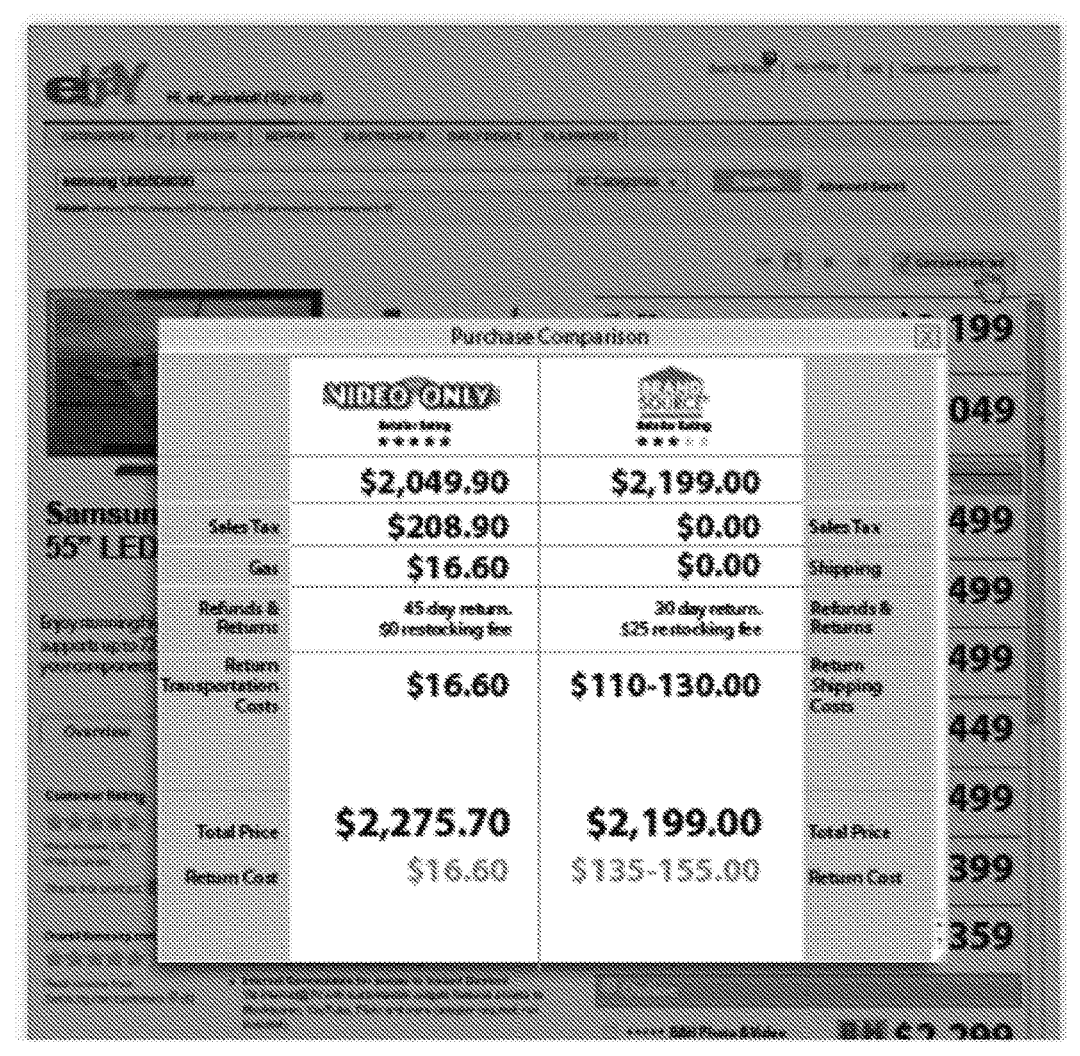
Figure 51:
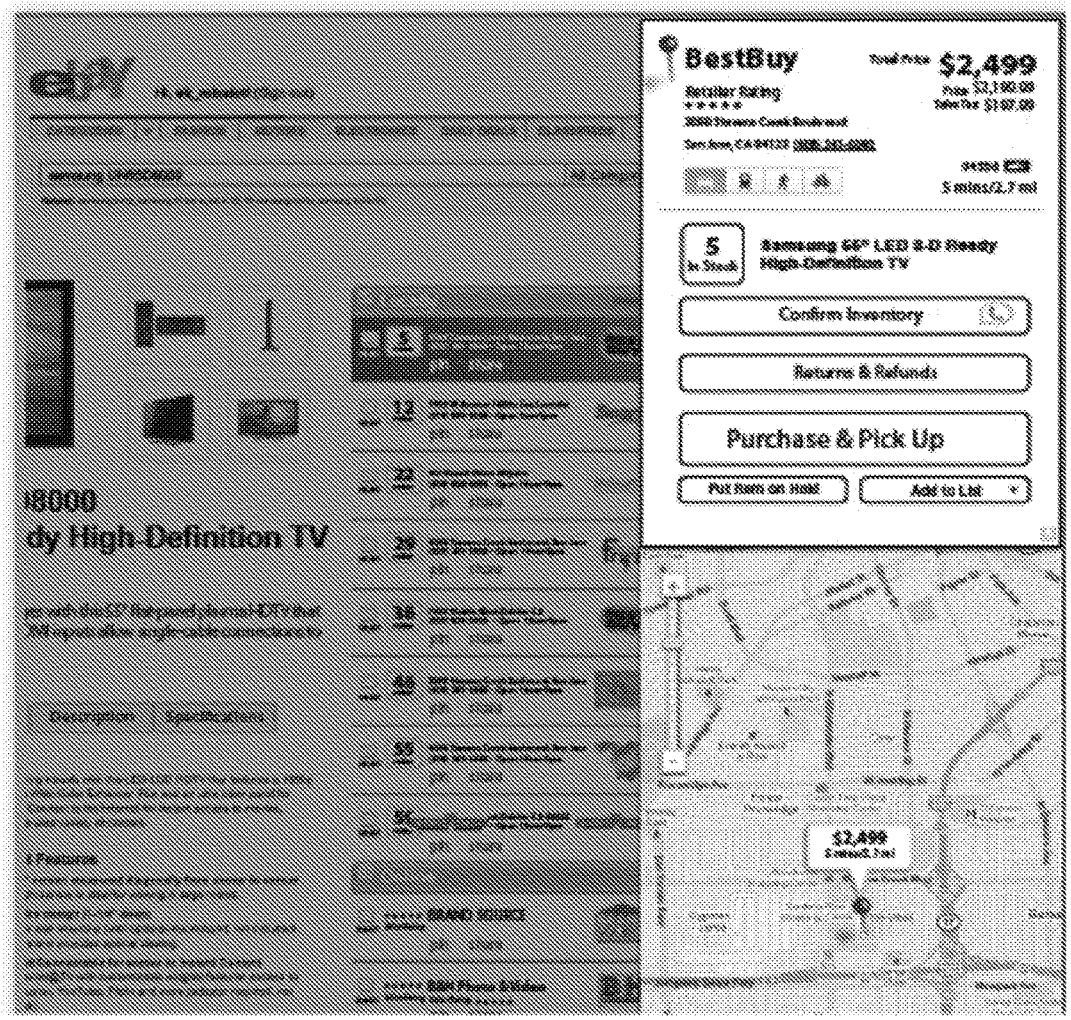

FIGS. 49-51 are screenshots showing additional features of a product display, including pinning products for easy comparison.

Figure 52:
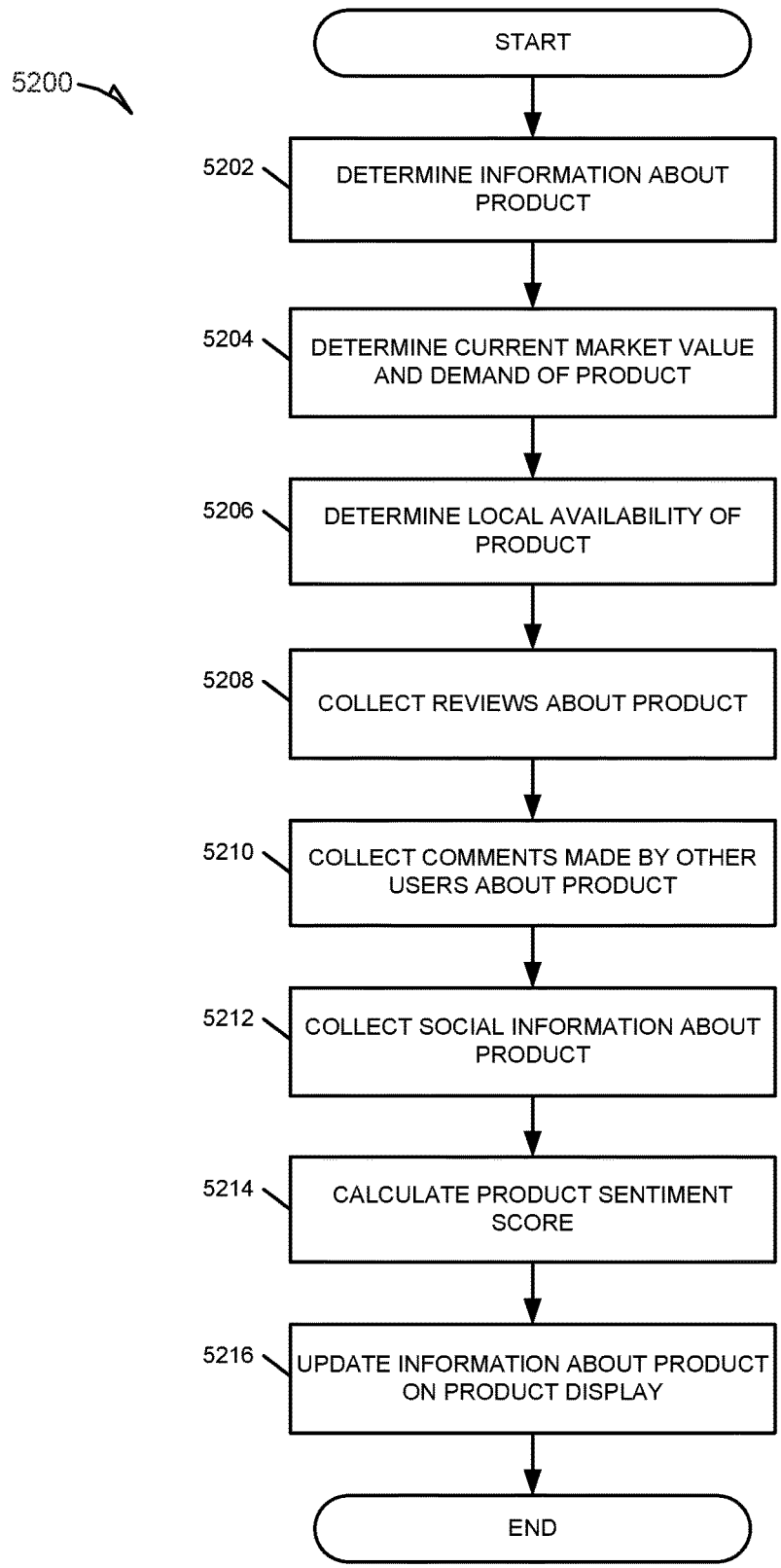
FIG. 52 is a flowchart illustrating a method for generating a product display, consistent with some embodiments.

FIG. 52 is a flowchart illustrating a method 5200 for generating a product display, consistent with some embodiments. For the purpose of illustration, FIG. 52 may be described with reference to FIGS. 1, 2 and 40-51. The method shown 5200 may be embodied in computer-readable instructions for execution by one or more processors such that the steps of the method may be performed by client device 106 or application server 124 and, in particular, the product display modules 226. As shown in FIG. 14, at operation 5202, product display modules 226 may determine information about a particular product. Determining information may include determining the make, model, year made, and other information about the product in order to find out additional information about the product. Consistent with some embodiments, metadata associated with the product may be used to determine this information. At operation 5204, a current market value and demand of the product may then be determined by the product display modules 226. This information may be determined from databases 132, or from external sites (e.g., hosted by third-party servers 116) over communication network 104. Consistent with some embodiments, the user may decide the sources for the market value and demand information. At operation 1406, the product display application may determine a local availability of product. Consistent with some embodiments, the product display modules 226 may be in communication with a mobile location application executing on the client device 106 to determine a location of the user, and then, using databases 132 and other external sites over communication network 104, determine the product availability within a predetermined distance from a determined location of the user. At operation 5210, the product display modules 226 may retrieve and collect reviews about the product. At operation 5212, the product display modules 226 may retrieve and collect social information about the product. The social information collected may include determining if any social network connections of the user have purchased or own the product, and whether these social network connections have made any mentions of the product or commented on the product. At operation 5214, the product display modules 226 may calculate a product sentiment score of the product. As described with respect to FIG. 42, the product sentiment score may be a score calculated based on an aggregate of mentions, current market value, and market demand, to provide an overall relative value of the product. Based on this information, the product display modules 226 may create or update the information about the product on the product display based on the determined information at operation 5216. This information will be dynamically updated as the information changes whenever the user accesses the display.

Figure 53:
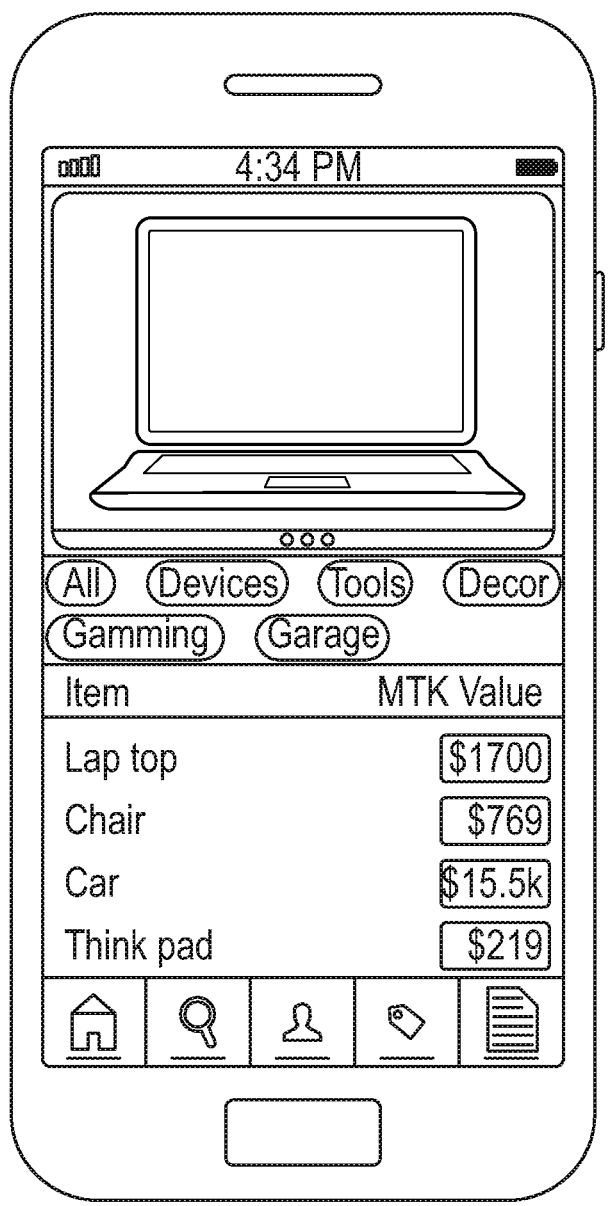
FIG. 53 is a diagram illustrating an inventory management system, consistent with some embodiments.

FIG. 53 is a diagram illustrating an inventory management system, consistent with some embodiments. As shown in FIG. 53, a mobile marketplace application 134 may provide inventory management functions on client device 106, which may be a mobile device. As also shown in FIG. 53, the mobile marketplace application 134 may provide a listing of items in an inventory of the user and a market value for each item in the inventory. Consistent with some embodiments, information displayed by the mobile marketplace application 134 may be provided by product display modules 226. In particular, product display modules 226 may store items or products that are part of the user's inventory in the user profile of the user, as well as information related to the product or item, such as the market value of the products or items. As described in FIG. 53, the mobile marketplace application 134 may be configured to create a running inventory of assets that also shows current market demand and value that is determined from databases 132 based on metadata associated with the product or item. Moreover, the listing may be sortable and the user may be able to choose the sources of market data for providing market values. Items in the inventory may be made public to be searchable, and the user may be able to set custom alerts for when an item or product in the inventory achieves a certain market value increase or decrease.

Figure 54:
FIG. 54 is a diagram illustrating information available to newly purchased products, consistent with some embodiments

FIG. 54 is a diagram illustrating information available to newly purchased products, consistent with some embodiments. Products that are purchased by the user through network-based marketplace 102 may be automatically added to the inventory of the user, so that the user is able to manage the new product with the mobile marketplace application 134. Additional information that may be available to the user for newly purchased products include tutorials, tricks, tips, warranty information, forums or communities centered around owners of the product and information about available upgrades. Moreover, past purchases may be automatically added to the inventory of the user.

Figure 55:
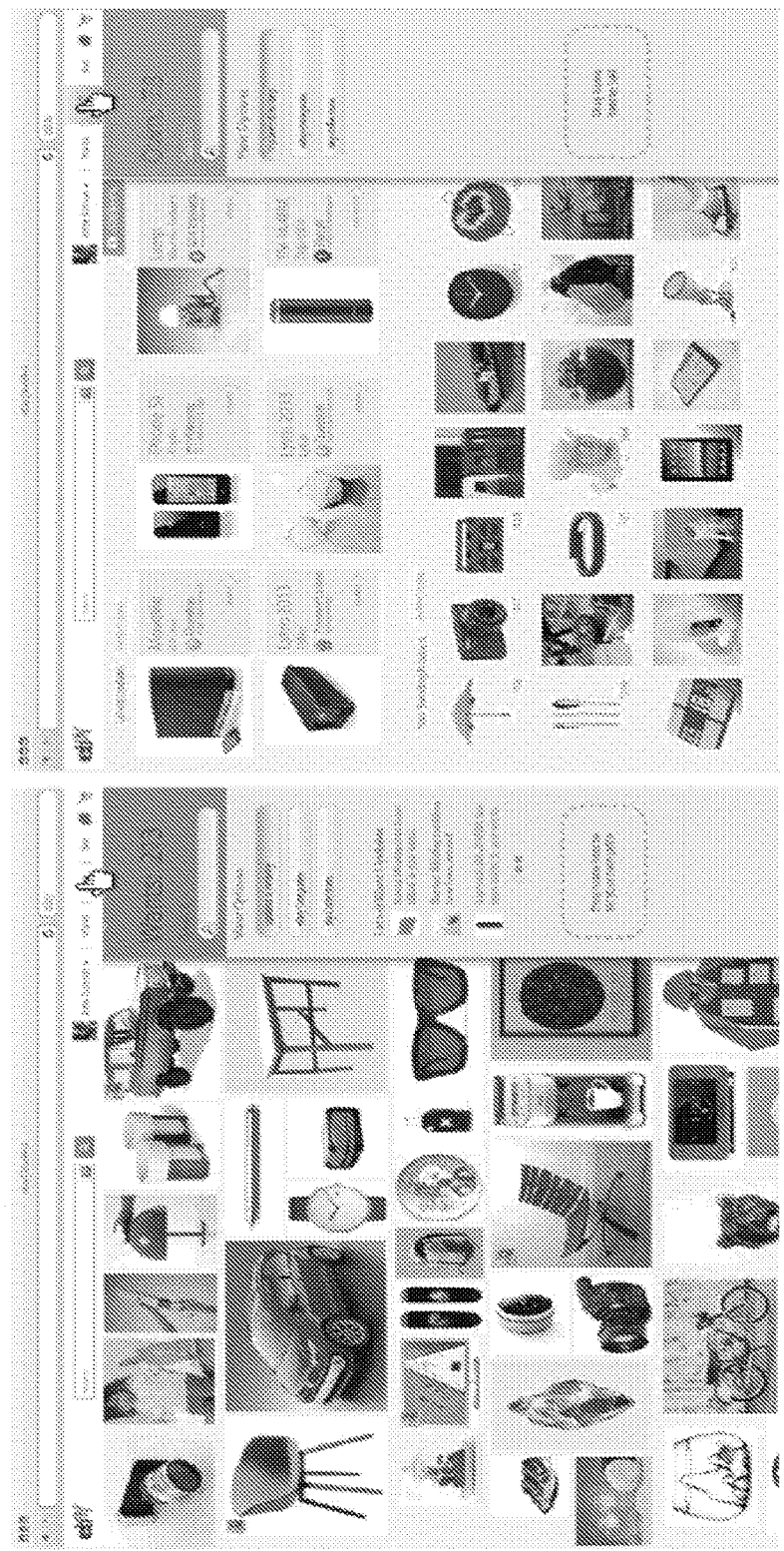
FIG. 55 is a diagram illustrating another view of an inventory, consistent with some embodiments.

FIG. 55 is a diagram illustrating another view of an inventory, consistent with some embodiments. As shown in FIG. 55, the user may pose questions about items or products that they own see recall notices, see market value increases and see which products may be trending. In some embodiments, the inventory may include information related to product upgrades, accessories, warranties, and maintenance.

Figure 56:
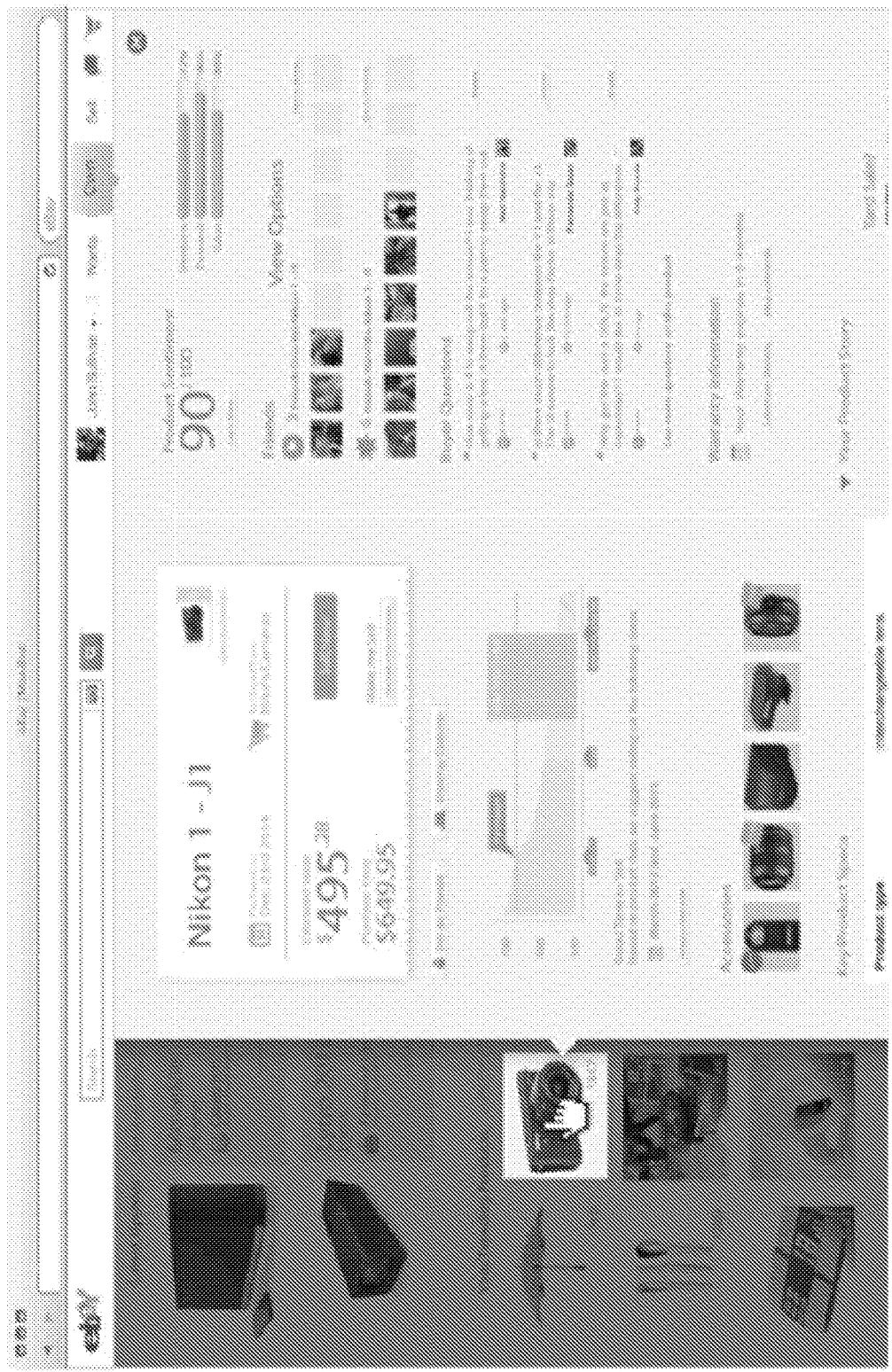
FIG. 56 is a diagram illustrating a product description page for an item in an inventory, consistent with some embodiments.

FIG. 56 is a diagram illustrating a product description page for an item in an inventory, consistent with some embodiments. As shown in FIG. 56, the product description page may be created for each item in the user's inventory based on information obtained through communication network 104 or from databases 132 based on metadata associated with the item. The product description page may show what the items are worth, who may be interested in the items, accessories available for the items, warranty information, and market trends. In addition, the product description page may provide a product sentiment, which provides a relative score of how desirable a product is based on market value, mentions, and demand.

Figure 57:
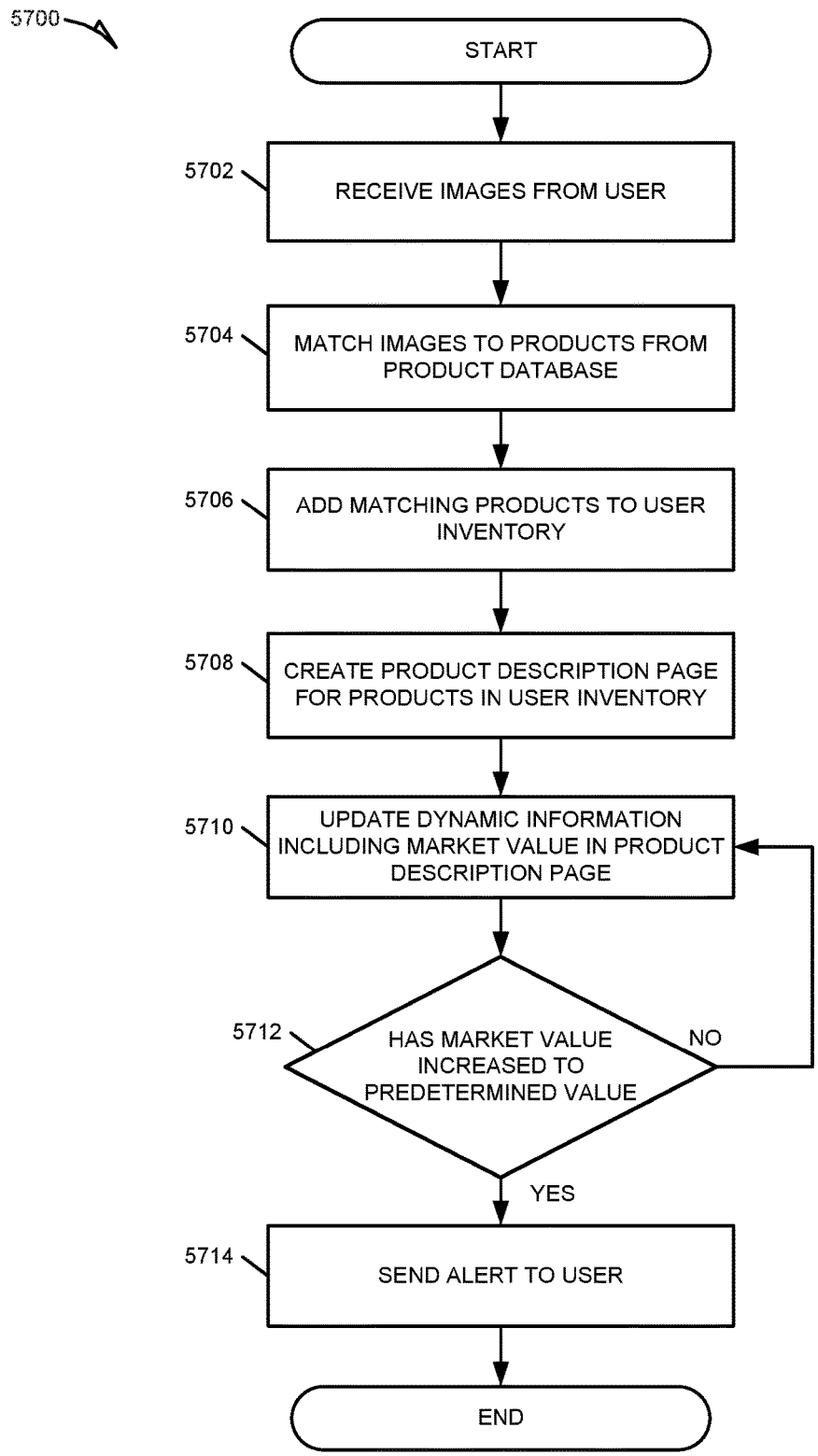
FIG. 57 is a flowchart illustrating a method of creating an inventory, consistent with some embodiments.

FIG. 57 is a flowchart illustrating a method 5700 of creating an inventory, consistent with some embodiments. For the purpose of illustration, FIG. 57 may be described with reference to FIGS. 1-2. The method 5700 may be embodied in computer-readable instructions for execution by one or more processors such that the steps of the method may be performed by client device 106 or application server 124 and, in particular, the mobile marketplace application 134 of client device 106 and the image recognition modules 222 of application marketplace applications 126. As shown in FIG. 57, at operation 5702, application server 124 may receive images from the user. Consistent with some embodiments, the user may use the mobile marketplace application 134 in combination with a mobile imaging application to capture images of products that the user wants to add to an inventory. The captured images may be transmitted from client device 106 to application server 124 over communication network 104. The images may be captured in bulk using a mobile device or using a traditional camera and uploaded using a desktop computer. At operation 5704, the image recognition modules 222 may match the received images to products in databases 132 using one or more image recognition algorithms. At operation 5706, products that match the images are added to the inventory of the user. At operation 5708, the product display modules 226 may then create a product description page for each of the items in the inventory of the user, such as shown in FIG. 56. At operation 5710, the product display modules 226 may then update the dynamic information including market value in the product description page for each item or product as the information changes.

Consistent with some embodiments, the user may set an alert to notify the user when the market value for a particular product or item has increased to a predetermined value, or has increased a predetermined percentage. In such embodiments, the marketplace applications 126 may determine if the market value associated with a product has increased to the set predetermined value at operation 5712. If it has, communication modules 232 may send an alert to the user at operation 5714. If it has not, the marketplace applications 126 may continue to update the dynamic information associated with the products in the created inventory.

Figure 58:
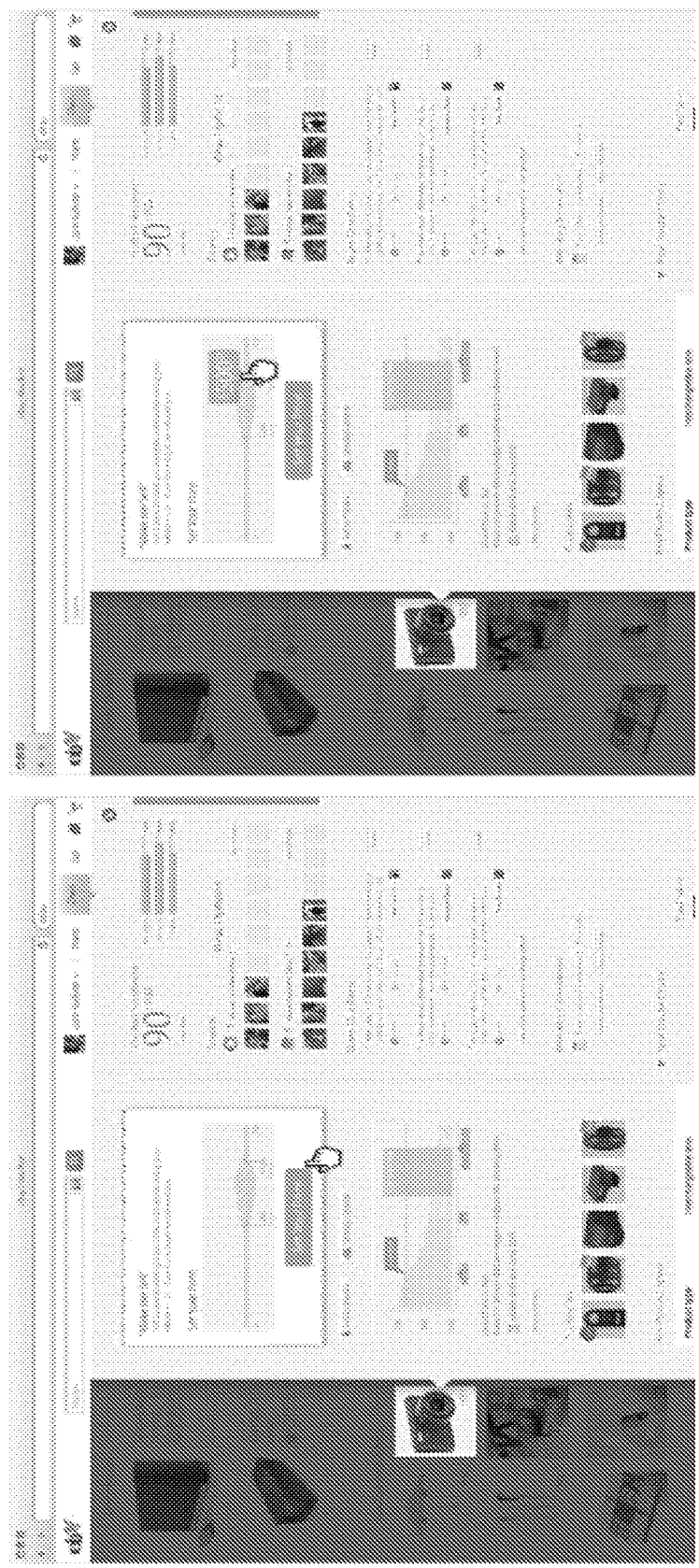
FIG. 58 is a diagram illustrating a feature allowing a user to set a selling price for an item in an inventory, consistent with some embodiments.

FIG. 58 is a diagram illustrating a feature allowing a user to set a selling price for an item in an inventory, consistent with some embodiments. As shown in FIG. 58, the user may add items to their inventory that they may not want to immediately sell, or may be unsure if they want to sell. However, the mobile marketplace application 134 may allow the user to set a price associated with a product in their inventory that, if the market value reaches that price or if the user receives an offer at that price, the user will sell at that price. Consistent with some embodiments, the item and the price may be publicly available and discoverable through a search. The selling price may be set using a slider, as shown in FIG. 58.

Figure 59:
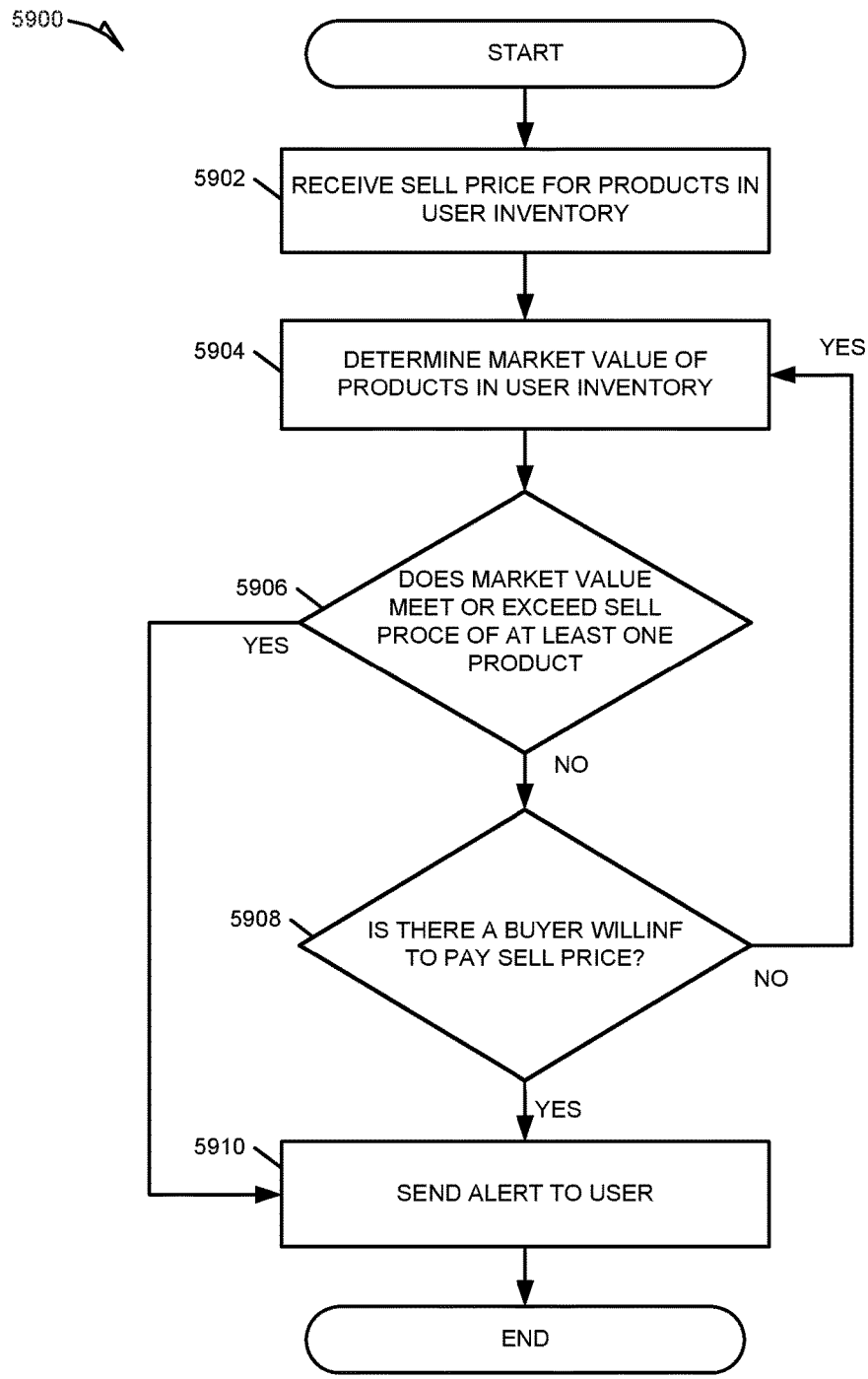
FIG. 59 is a flowchart illustrating a method of creating an inventory, consistent with some embodiments.

FIG. 59 is a flowchart illustrating a method 5900 of creating an inventory, consistent with some embodiments. For the purpose of illustration, FIG. 9 may be described with reference to FIGS. 1, 2, and 58. The method 5900 may be embodied in computer-readable instructions for execution by one or more processors such that the steps of the method 5900 may be performed by client device 106 or application server 124 and, in particular, the mobile marketplace application 134 of client device 106 and the marketplace applications 126. As shown in FIG. 9, the marketplace application 126 may receive a sell price for products in the inventory of the user at operation 5902. Consistent with some embodiments, the user may set a sell price using the mobile marketplace application 134, as shown in FIG. 58, which may then be transmitted to the application server 124 over communication network 104. The marketplace applications 126 may then determine a market value of products in the inventory of the user at operation 1904. Consistent with some embodiments, the marketplace applications 126 may automatically update the market value of products, as described above with respect to FIG. 57. At operation 5906, the marketplace applications 126 may check to determine if the market value meets or exceed the sell price of at least one of the products having an associated sell price. At operation 1910, if the market value is determined to meet or exceed the sell price of at least one of the products having an associated sell price, the communication modules 232 may transmit an alert to client device 106 to alert the user that the sell price has been met. Otherwise, the marketplace applications 126 may attempt to determine if there is a buyer that is willing to pay the sell price at operation 5908. If a buyer willing to pay the sell price is found, the communication modules 222 may transmit an alert to client device 106 to alert the user that the sell price has been met at operation 5910. Otherwise, the marketplace applications 126 may continue to determine the market value of products in the user inventory and repeat until the market value of a product has been met or exceeded, or a buyer willing to pay the sell price has been found.

Figure 60:
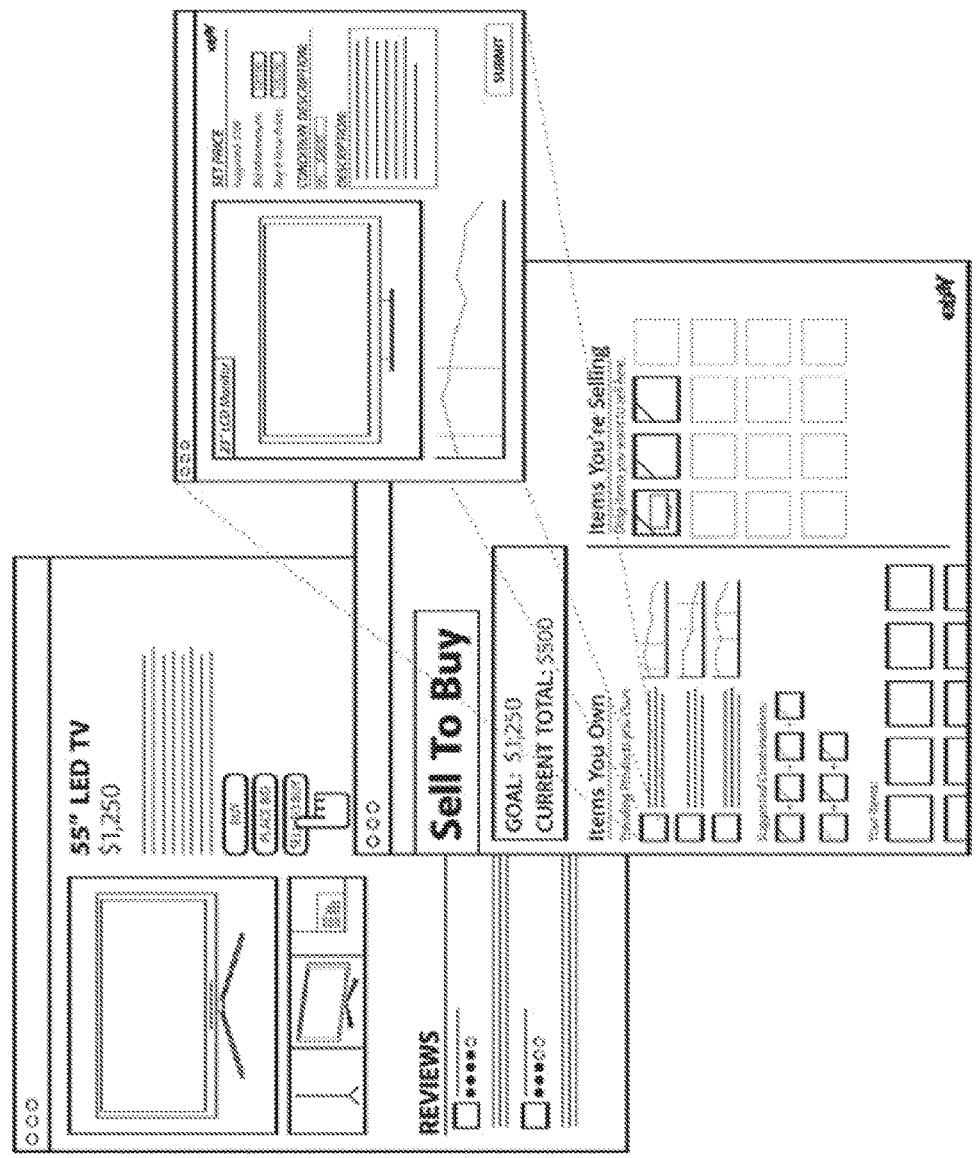
FIG. 60 is a diagram illustrating valuating items in an inventory to provide funds for purchasing new items, consistent with some embodiments.

FIG. 60 is a diagram illustrating valuating items in an inventory to provide funds for purchasing new items, consistent with some embodiments. As shown in FIG. 60, the marketplace applications 126 may provide suggestions concerning items in the inventory of the user that may be used to fund the purchase of new product. In particular, based on current market value and demand, the marketplace applications 126 may identify items that are selling well and provide suggestions to user to sell these items to create the revenue for purchasing a particular item. Consistent with some embodiments, the item that the user wants to purchase has been designated as a wanted item and stored in account information 130.

Figure 61:
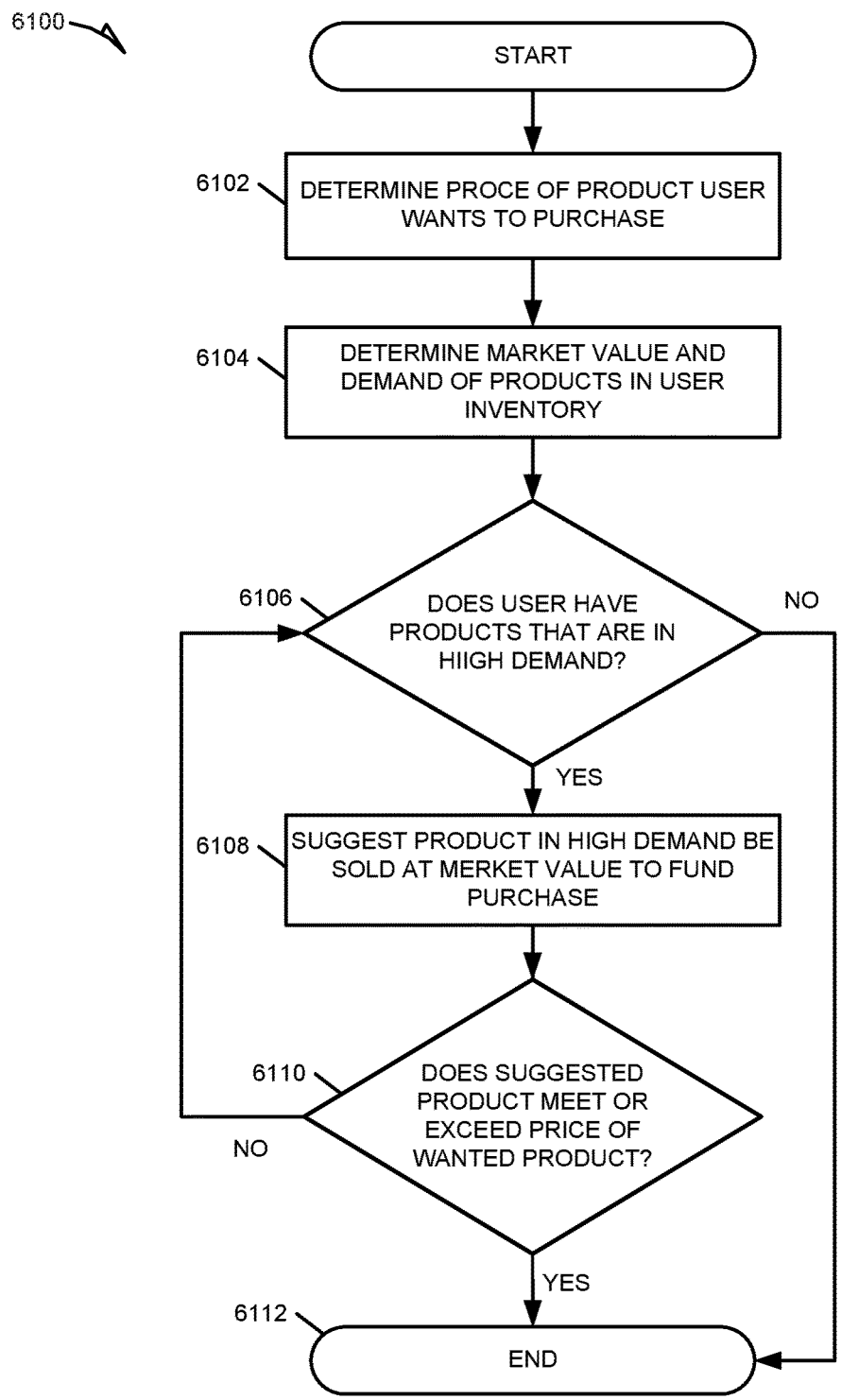
FIG. 61 is a flowchart illustrating a method of valuating items in an inventory to provide funds for purchasing new items, consistent with some embodiments.

FIG. 61 is a flowchart illustrating a method 6100 of valuating items in an inventory to provide funds for purchasing new items, consistent with some embodiments. For the purpose of illustration, FIG. 61 may be described with reference to FIGS. 1, 2, and 60. The method 6100 may be embodied in computer-readable instructions for execution by one or more processors such that the steps of the method 6100 may be performed by client device 106 or application server 124 and, in particular, the mobile marketplace application 134 of client device 106 and the marketplace applications 126 of application server 124. As shown in FIG. 61, the marketplace applications 126 may determine the price of an item that the user wants to purchase at operation 6102. The price may be determined from information in databases 132. The marketplace applications 126 may then determine the market value and demand of products in an inventory of the user at operation 6104. Consistent with some embodiments, the inventory of the user may be stored in account information 130. The marketplace applications 126 may then determine if the user has any products in the inventory that are in high demand at operation 6110. If no products are currently in high demand, the method may end at operation 6112. Consistent with some embodiments, the method 6100 may also look to other products, regardless of demand. If one or more products in the inventory of the user are determined to be in high demand, the marketplace applications 126 may suggest that the user sell the one or more products at market value to fund the purchase of a new product at operation 6108. The marketplace applications 126 may the determine if the market value of the one or more suggested products meet or exceed the price of the wanted product at operation 6110. If the market value meets or exceeds the price of the wanted product, the method 6100 will end at operation 6112, and the user can decide if they want to sell the one or more items. If the market value does not meet or exceed the price of the wanted product, The marketplace applications 126 may continue to check for additional products that may be in high demand (operation 6106) until enough products have been suggested to cover the cost of the wanted product.

Figure 62:
FIG. 62 is a diagram illustrating a digital history tag, consistent with some embodiments.

FIG. 62 is a diagram illustrating a digital history tag, consistent with some embodiments. As show in FIG. 62, the user may associate a digital product history tag with items in their inventory. The digital product history tag may tell the story of the product, and include such information as the date purchased, the seller, and product information such as manuals, reviews, warranty information, and return policies. Consistent with some embodiments, all of this information may be transmitted to a buyer of the product. Moreover, the user may print out the digital product history tag if the product is sold offline.

Figure 63:
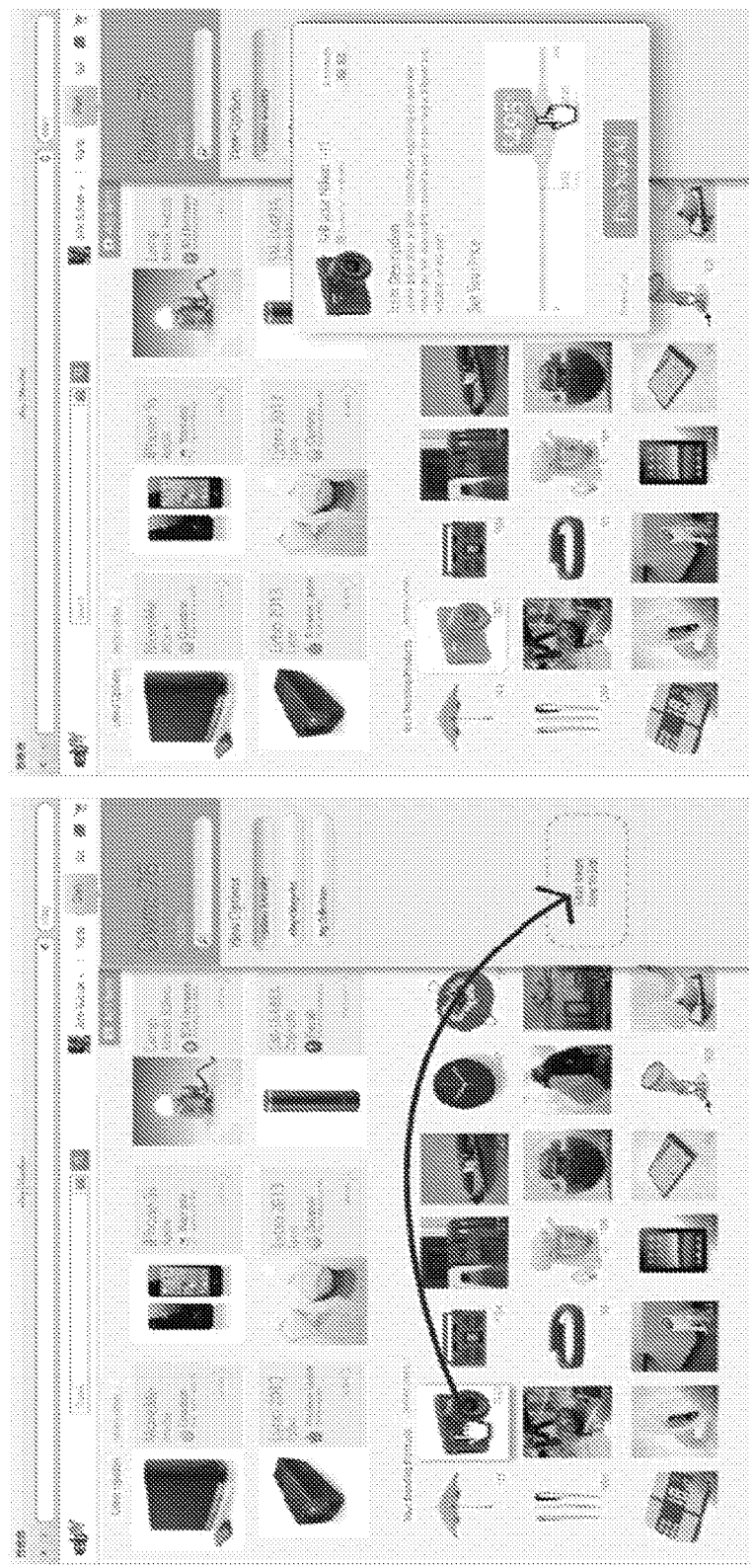
FIG. 63 is a diagram illustrating selling items in an inventory, consistent with some embodiments.

FIG. 63 is a diagram illustrating selling items in an inventory, consistent with some embodiments. As shown in FIG. 63, the user may select items in his inventory to sell through marketplace applications 126 of application server 124 using the mobile marketplace application 134. In some embodiments, the user may simply select an item and drag it to a selling box, and then set the price with a slider.

Figure 64:
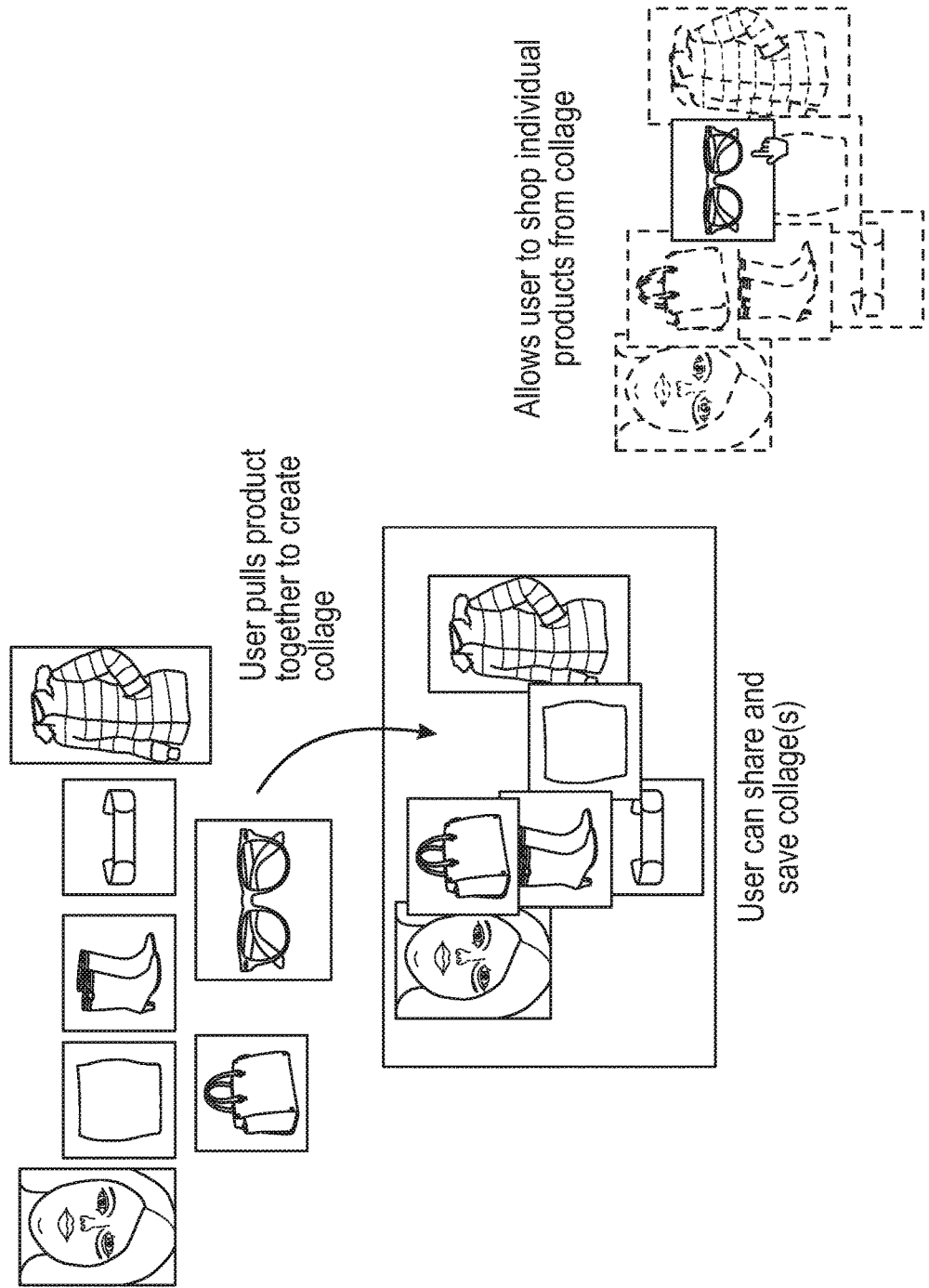
FIGS. 64 and 65 are diagrams illustrating collages and collections that can be created from items in a user inventory, consistent with some embodiments.
Figure 65:
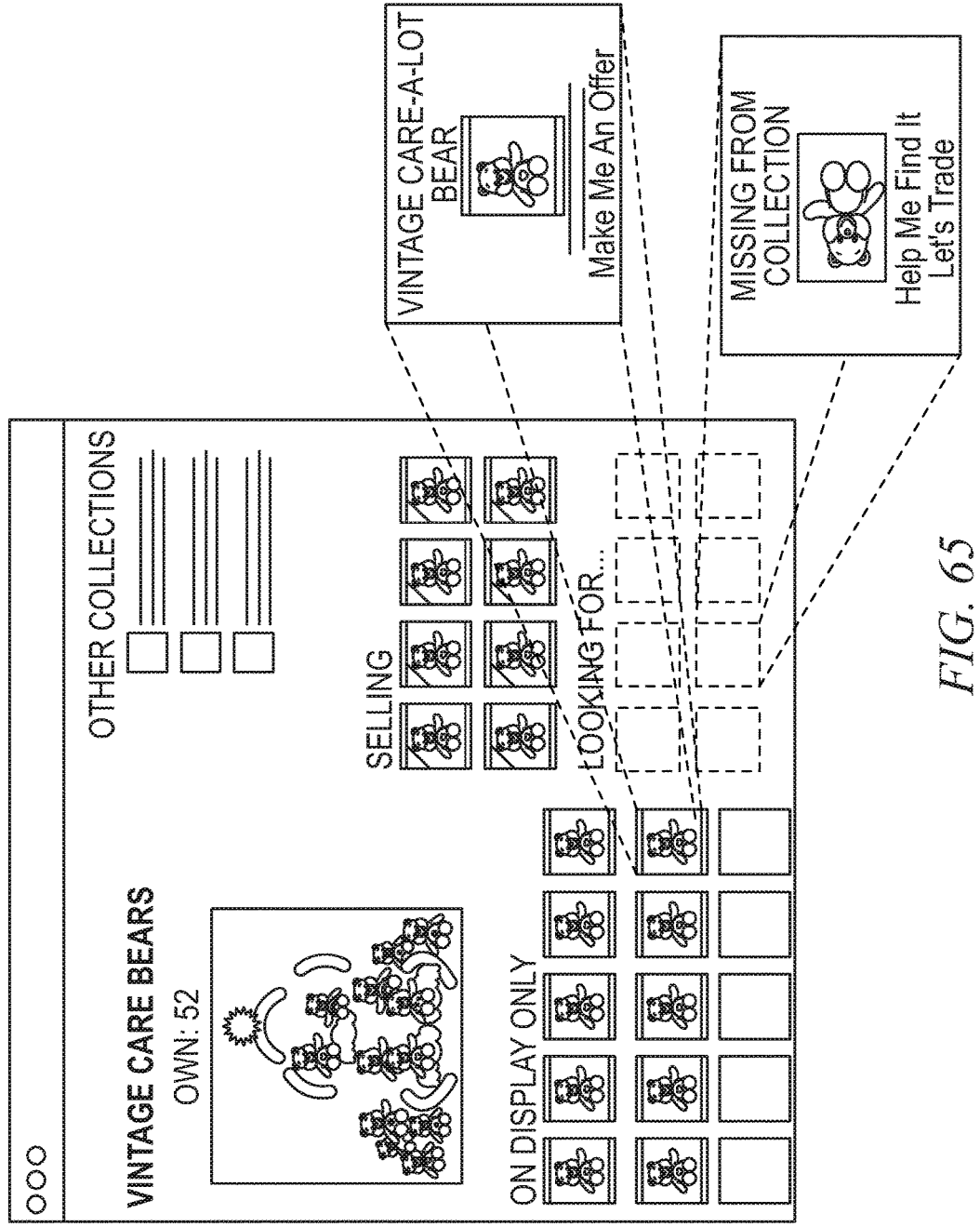

FIGS. 64 and 65 are diagrams illustrating collages and collections that can be created from items in a user inventory, consistent with some embodiments. The user, using the mobile marketplace application 134, may create collages that may include items that the user has a desire or intent to purchase. In some embodiments, the recommendation modules 214 may generate one or more recommendations for a user based on the collages that the user has created.

The user, using the mobile marketplace application 134, may create collections based on items that are in their inventory. Consistent with some embodiments, the recommendation modules 214 may generate one or more recommendations for a user based on the collections of the user.

Figure 66:
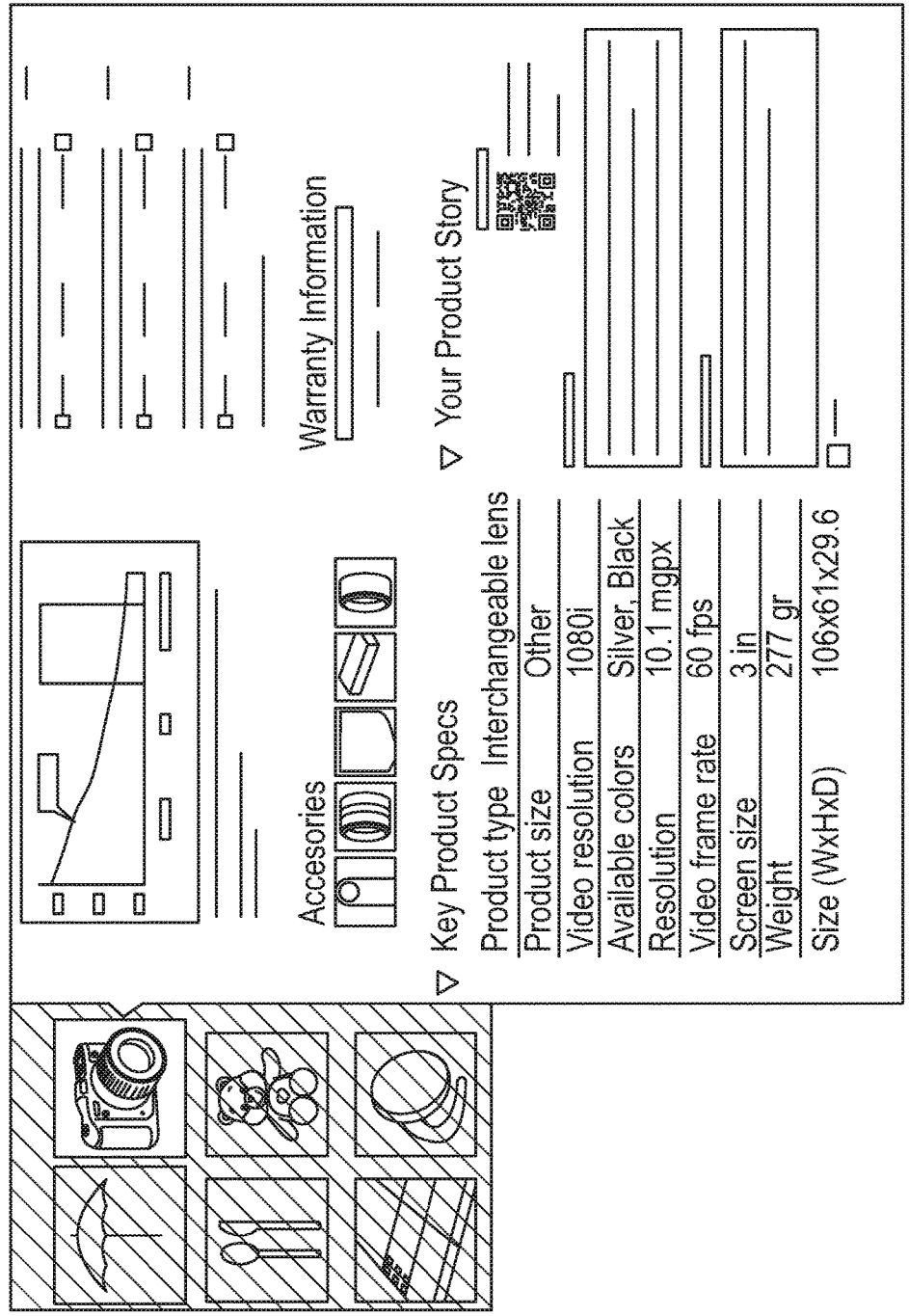
FIG. 66 is a diagram illustrating a product narrative for items in an inventory, consistent with some embodiments.

FIG. 66 is a diagram illustrating a product narrative for items in an inventory, consistent with some embodiments. The user may use the mobile marketplace application 134 to enter a product narrative that includes a story related to the product. Consistent with some embodiments, the product narrative may be included as part of the digital product history tag shown in FIG. 62.

Figure 67:
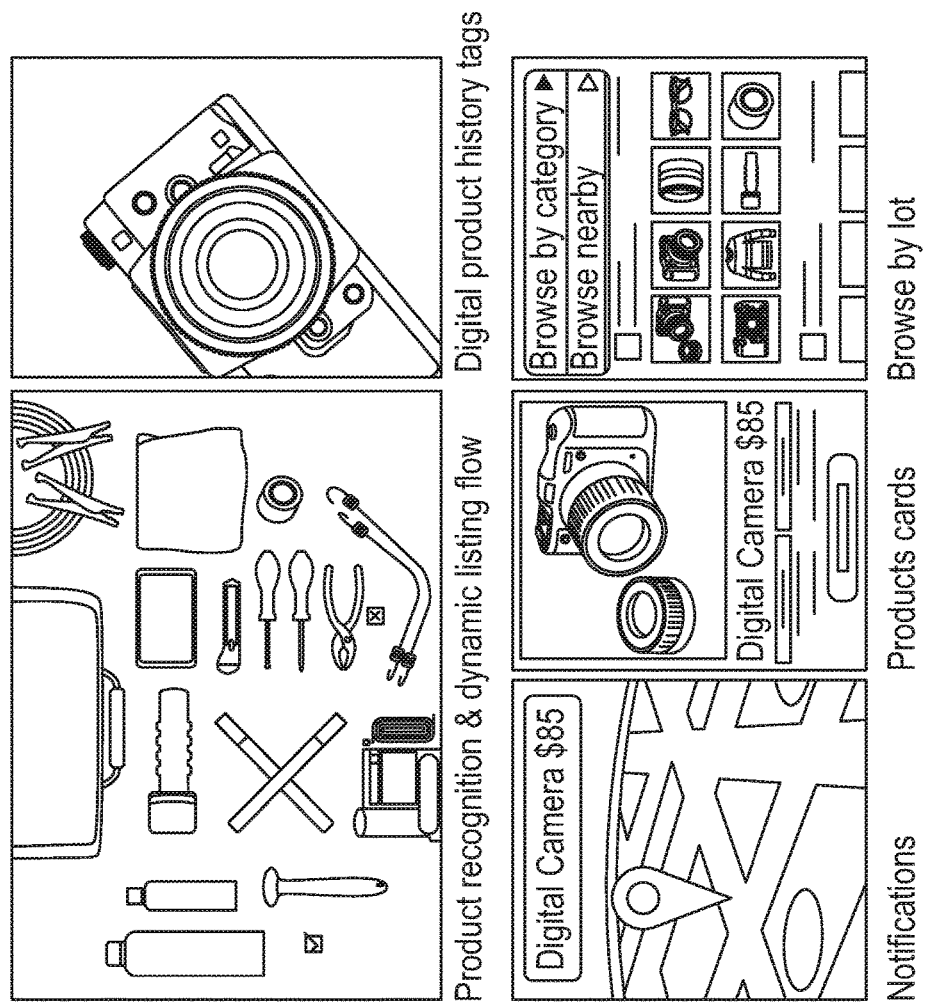
FIG. 67 is a diagram illustrating creating a virtual yard sale from items in a user inventory, consistent with some embodiments.

FIG. 67 is a diagram illustrating creating a virtual yard sale from items in a user inventory, consistent with some embodiments. The user may use the mobile marketplace application 134 to list items in their inventory in bulk to create a virtual yard sale. Alternatively, the user can upload images of products that they have lying around, as discussed above with respect to FIGS. 63-67, and associate prices to the products to create a virtual yard sale. Each item captured in the uploaded image may be identified by the image recognition applications 222. Once identified, the product display modules may retrieve the corresponding product information from database 132. In some embodiments, the user may designate certain groups of products as lots.

Figure 68:
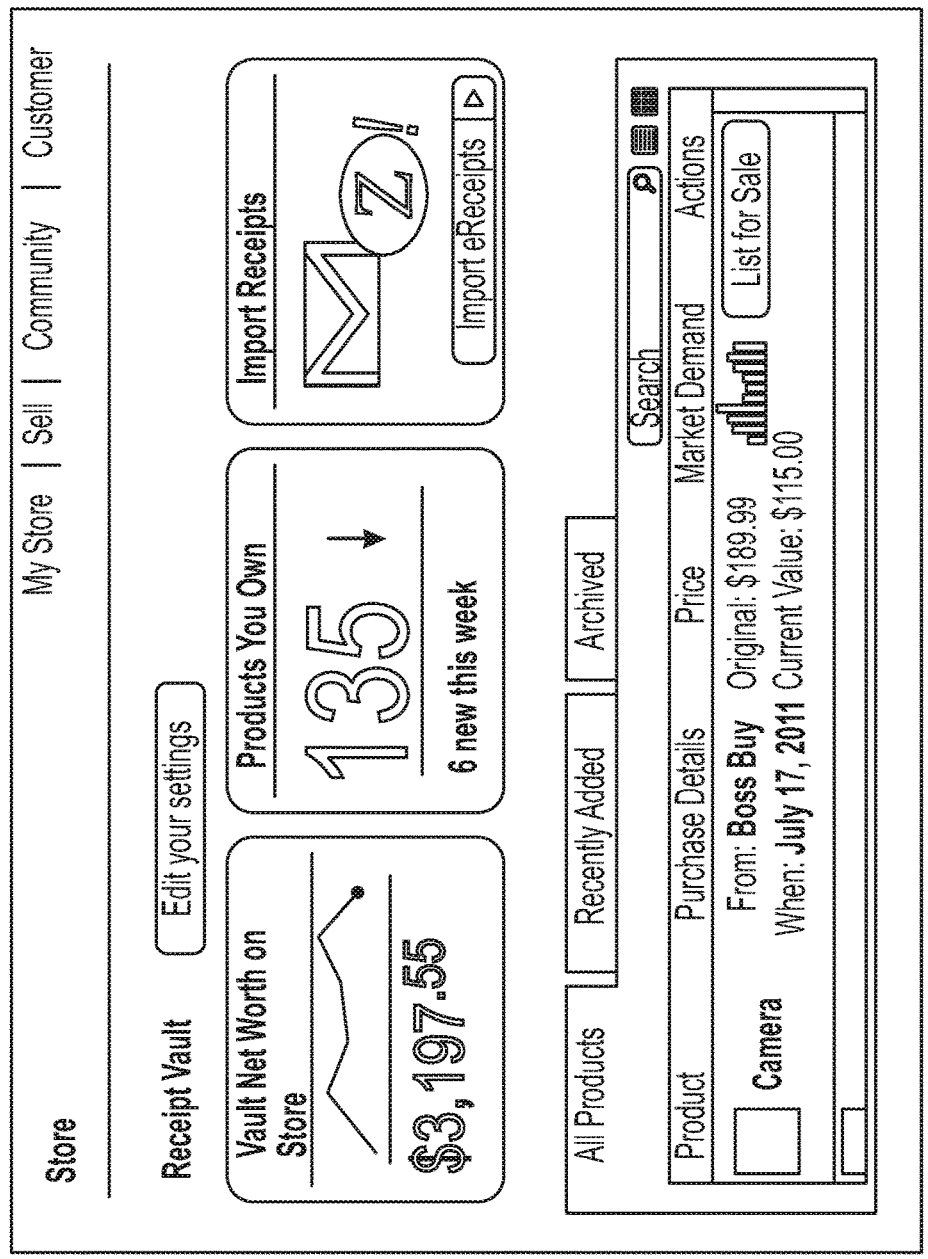
FIG. 68 is a diagram illustrating a receipt vault for items in a user inventory, consistent with some embodiments

FIG. 68 is a diagram illustrating a receipt vault for items in a user inventory, consistent with some embodiments. As shown in FIG. 68, the mobile marketplace application 134 may allow the user to view digital receipts of items that they have purchased through application server 124. The digital receipt information may be stored in the user profile of the user, and include which show the date purchased, the seller, the original image, and product information such as manuals, reviews, warranty information, return policies.

Figure 69:
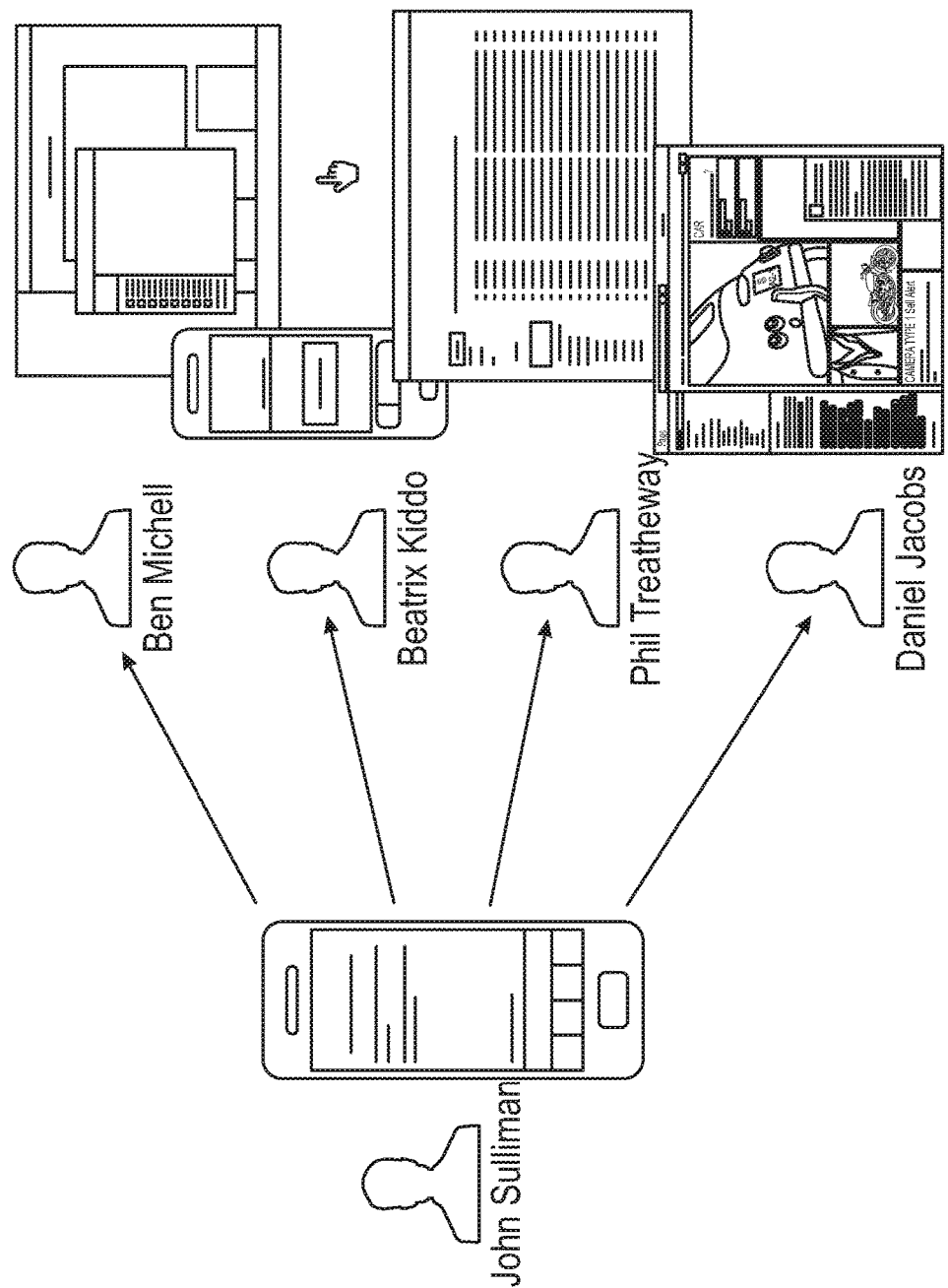
FIG. 69 is a diagram illustrating a system for providing information to a user, consistent with some embodiments.

FIG. 69 is a diagram illustrating a system for providing information to a user, consistent with some embodiments. As shown in FIG. 69, the system for providing information to the user is referred to as the "Research Assistant", and may correspond to the mobile research application executing on the client device 106 that interfaces with research modules 228 over the communication network 104. As shown in FIG. 69, the research assistant may use in user profiles to draw correlations of searches, activities, behaviors, interactions, and products that the user may be interested in to provide information tailored to the user that may be most helpful to the user. As shown in FIG. 69, the research assistant corresponds to the mobile research application executing on the client device 106. However, the research assistant may also be running on client devices of the user, such as laptops, or desktops. Research application may provide alerts to the user to keep the user up to date on the availability of products, and may connect the user to other users that may have the information to provide the user with relevant answers, based on information about the other users in account information 130.

Figure 70:
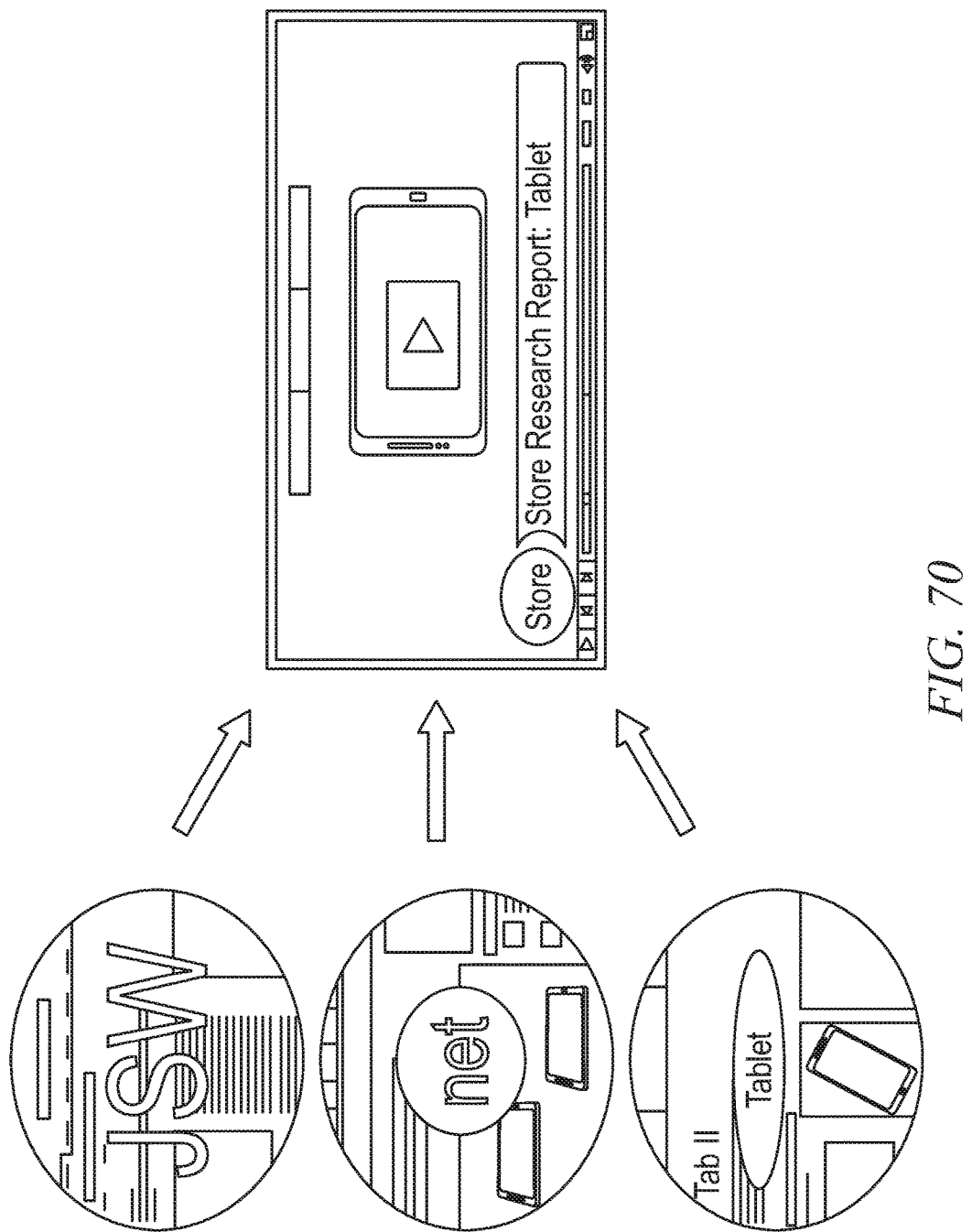
FIG. 70 is a diagram, illustrating providing review information to a user, consistent with some embodiments.

FIG. 70 is a diagram, illustrating providing review information to a user, consistent with some embodiments. As shown in FIG. 70, the research modules 228 may aggregate reviews from external websites and make them available for user to view using the mobile research application executing on the client device 106. In some embodiment, the research modules 228 may also aggregate and curate business insights, buying/selling statistics, expert reviews, and user reviews related to certain products for easy access by the user using the mobile research application executing on the client device 106.

Figure 71:
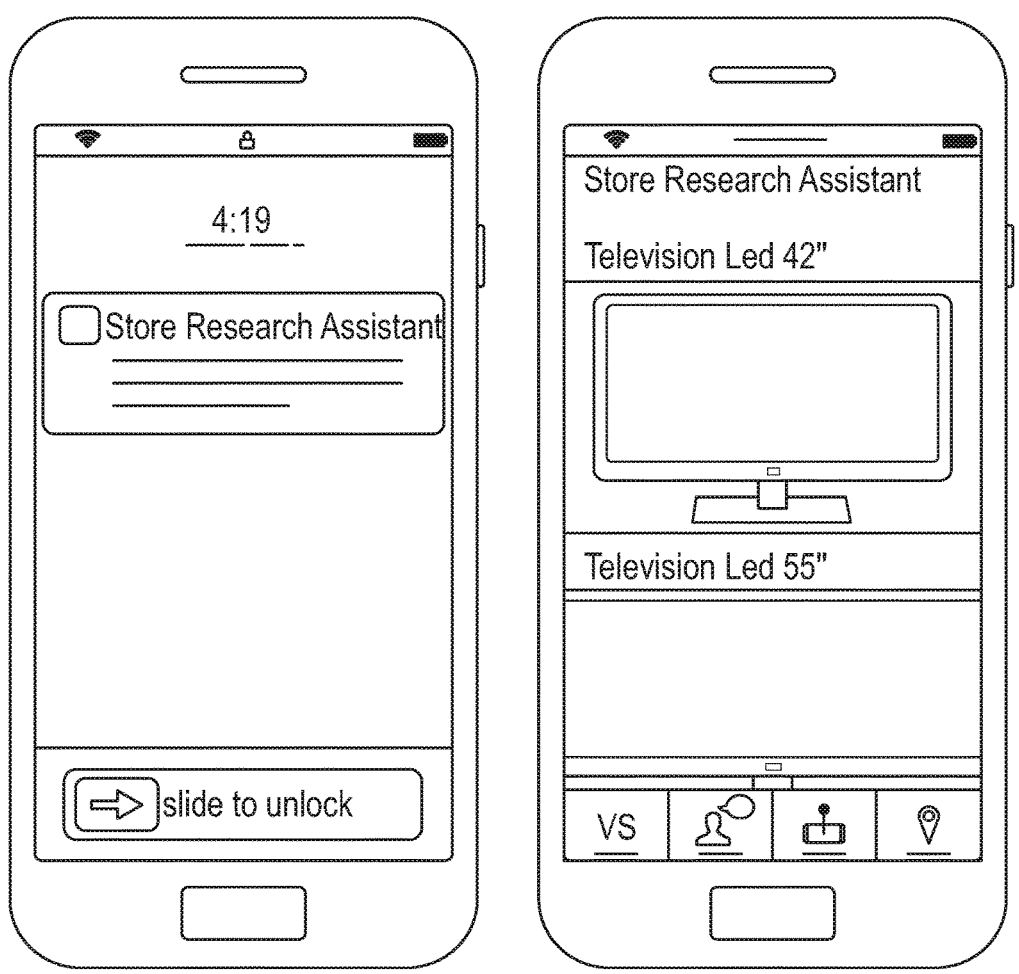
FIG. 71 is a diagram illustrating providing information to a user about a local product, consistent with some embodiments.

FIG. 71 is a diagram illustrating providing information to a user about a local product, consistent with some embodiments. As shown in FIG. 71, the mobile research application executing on the client device 106 may provide user with geo-fence alerts based on a user's location. Consistent with some embodiments, a mobile location application executing on the client device 106 may be able to determine a location of the user. The location of the user is used along with a known location of products that the user may be interested in and stored in the user profile of the user, based on product information stored in databases 132. When the location of the user is determined to be within a specified range (the geo-fence) of a product, the user may be notified by the mobile research application executing on the client device 106 that the product is near. Additional details may be shown about the product through the mobile research application executing on the client device 106.

Figure 72:
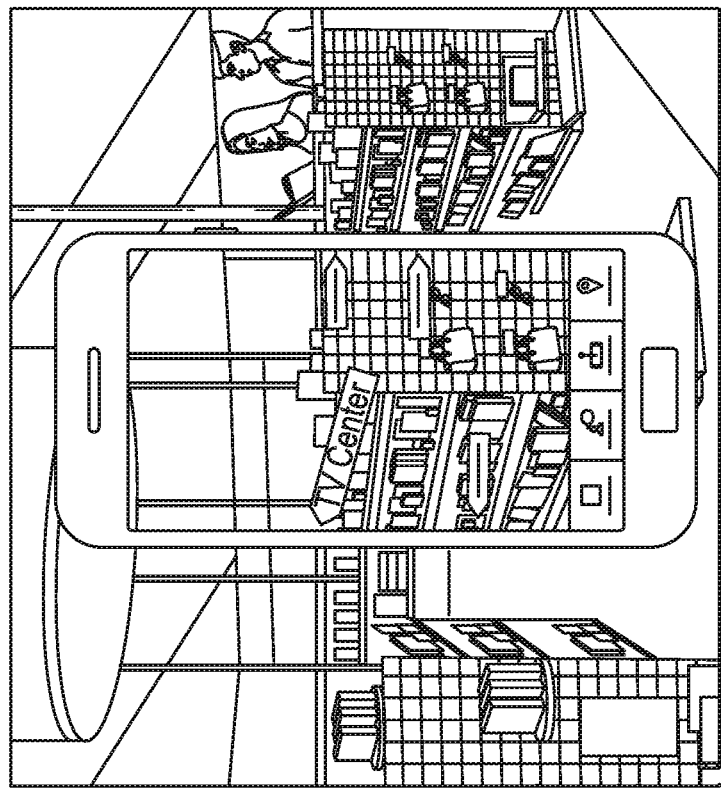
FIG. 72 is a diagram illustrating providing an exact location of a product of interest to a user using augmented reality.
Figure 72:
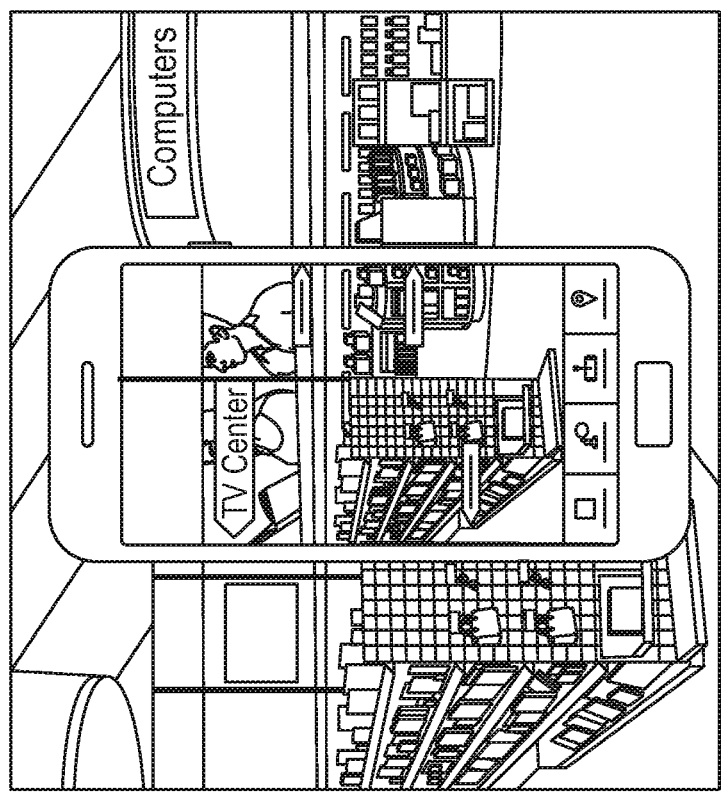

FIG. 72 is a diagram illustrating providing an exact location of a product of interest to a user using augmented reality. Consistent with some embodiments, if the user is in a store that is offering the product of interest, the mobile research application executing on the client device 106 may be able to show the user exactly where in the store the product of interest is located using augmented reality, by combining a location of the user with a known location of the product from databases 132.

Figure 73:
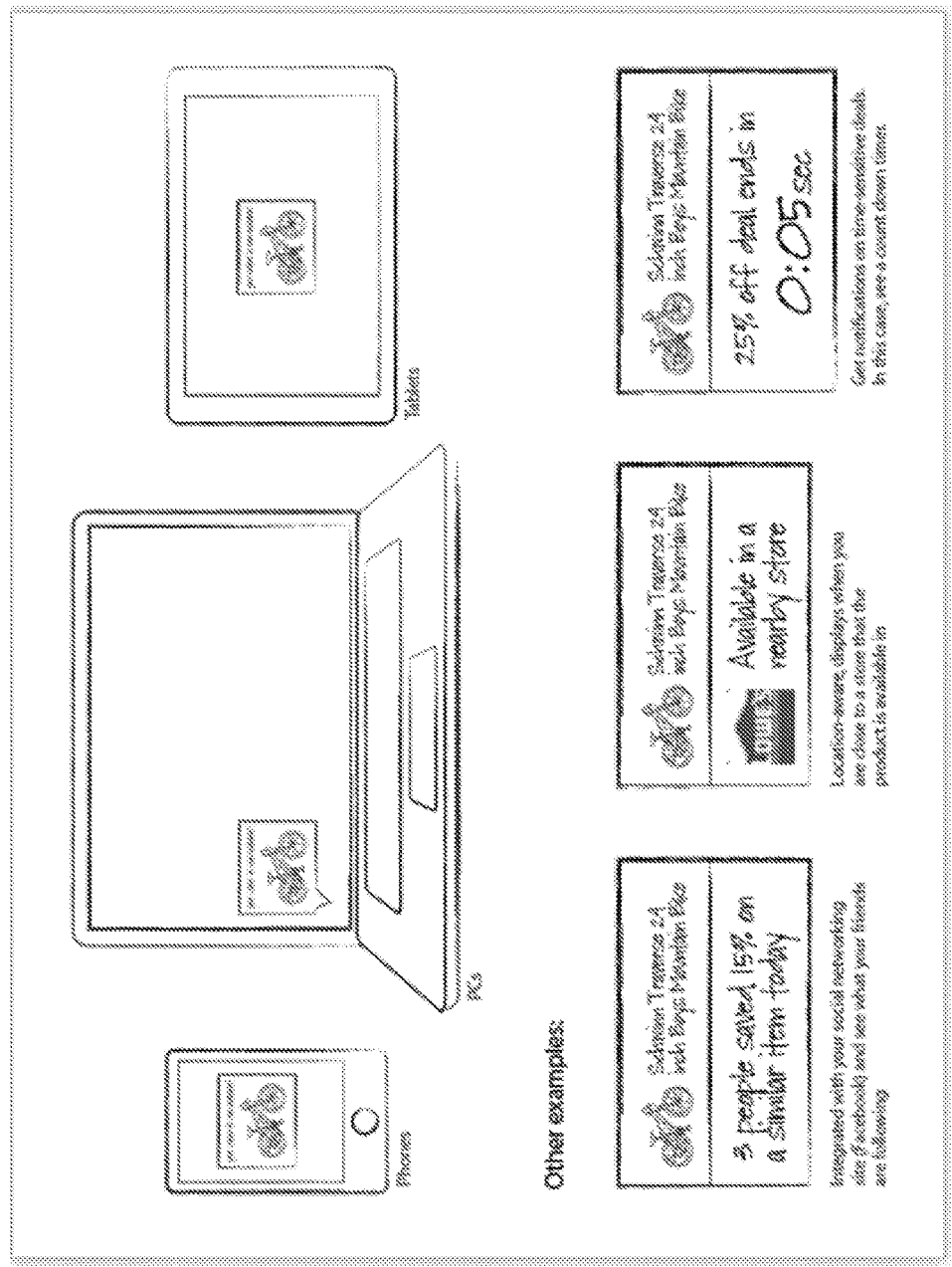
FIG. 73 is a diagram illustrating providing additional information to a user about a product, consistent with some embodiments.

FIG. 73 is a diagram illustrating providing additional information to a user about a product, consistent with some embodiments. As shown in FIG. 73, not only does the mobile research application executing on the client device 106 provide the user with notifications regarding products that may be near the user based on a location of the user and a known location of the product, but the mobile research application executing on the client device 106 may also provide notifications of deals on the product of interest or similar deals.

Figure 74:
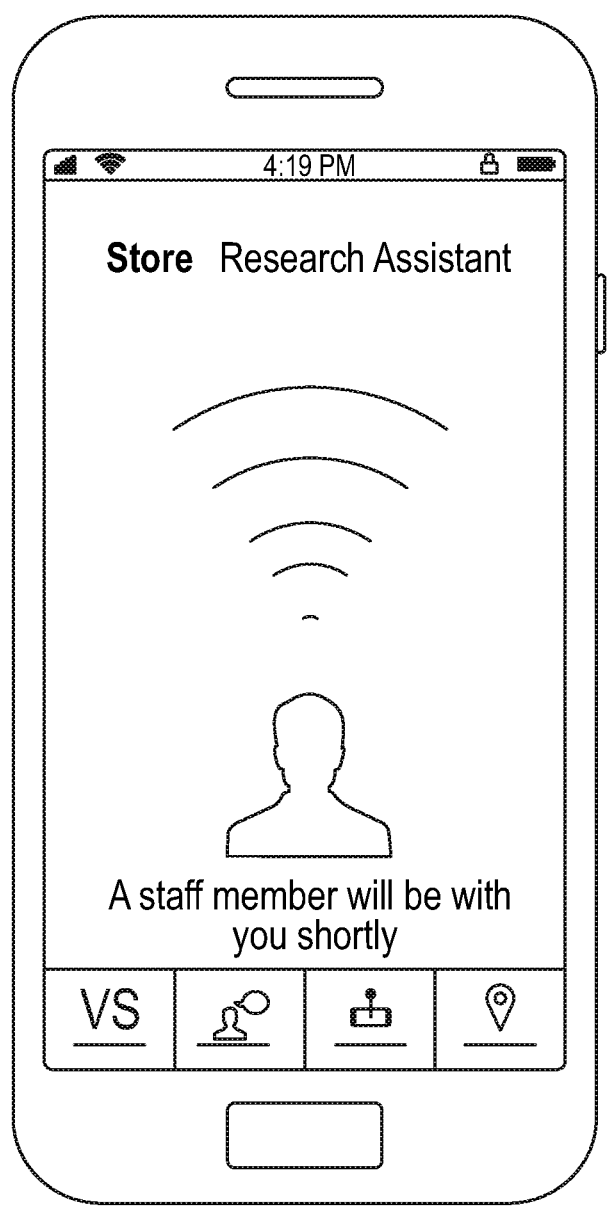
FIG. 74 is a diagram illustrating a feature allowing a user to flag an employee, consistent with some embodiments

FIG. 74 is a diagram illustrating a feature allowing a user to flag an employee using the research modules 228, consistent with some embodiments. As shown in FIG. 74, when the user has finished their research and comparisons, found the store that has the product of interest, and possibly found the product within the store using the augmented reality feature described in FIG. 72, the user may be able to user research application to flag an employee to answer questions about the product of interest or assist the user in completing a purchase for the product of interest.

Figure 75:
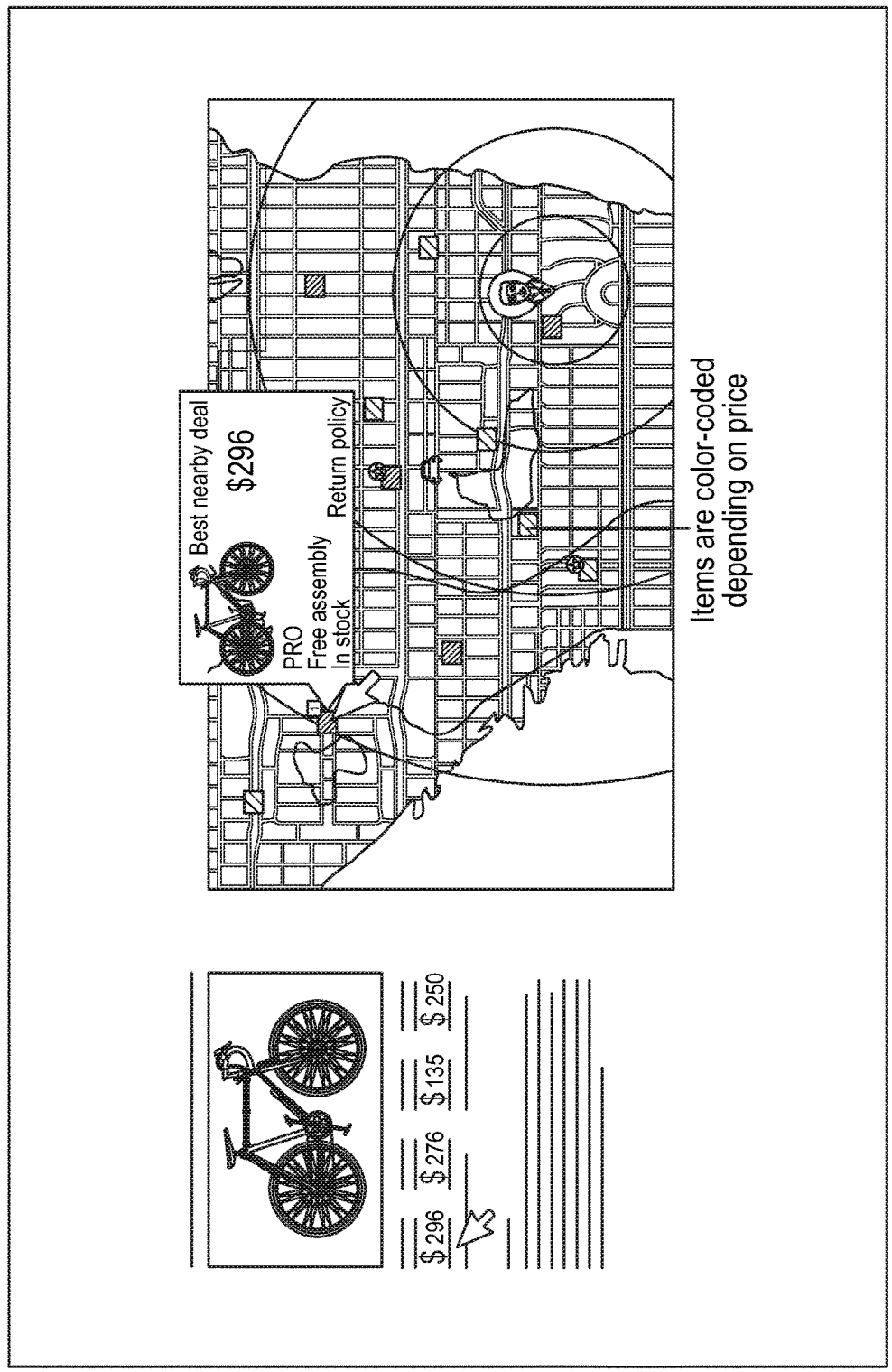
FIG. 75 is a diagram illustrating providing a map to a user showing products of interest, consistent with some embodiments.

FIG. 75 is a diagram illustrating providing a map to a user showing products of interest, consistent with some embodiments. In addition to providing alerts regarding nearby products of interest, the mobile research application executing on the client device 106 may be configured to generate a map to show the user products within a certain radius of user, as determined by a location of the user a mobile location application executing on the client device 106, and known locations of products from databases 132. Consistent with some embodiments, the map shown in FIG. 9 may color-code each of the products by price, and the user may be able to interact with the map to see prices, deals, reviews, etc.

Figure 76:
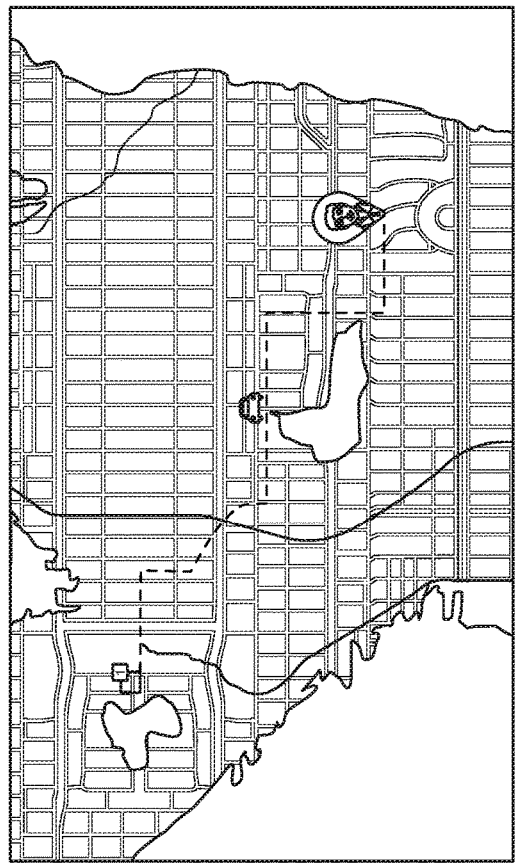
FIG. 76 is a diagram illustrating providing a map to a user showing products of interest, consistent with some embodiments.
Figure 76:
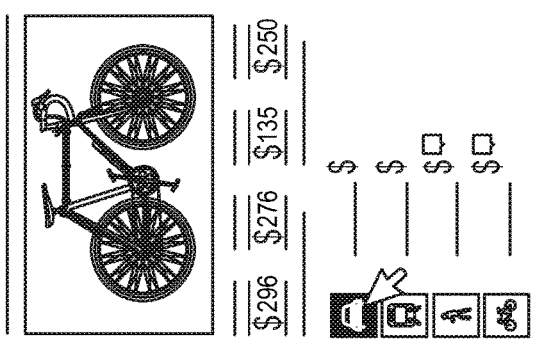

FIG. 76 is a diagram illustrating providing a map to a user showing products of interest, consistent with some embodiments. As shown in FIG. 10, the user may be able to select options within the mobile research application executing on the client device 106 that will show estimated times and prices to the locations of the products of interest based on a chosen transportation method.

Figure 77:
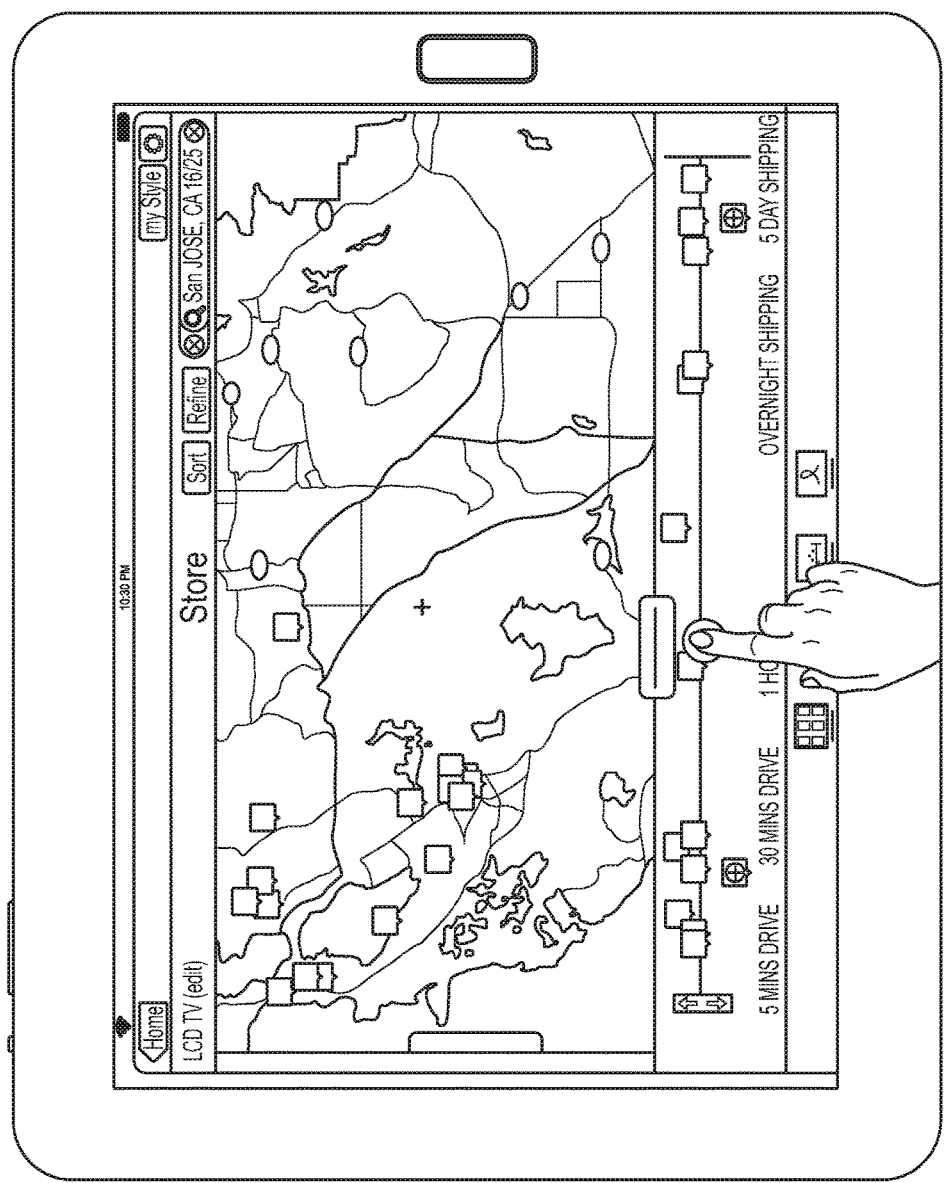
FIG. 77 is a screenshot of a map that may be scaled by the user, consistent with some embodiments.

FIG. 77 is a screenshot of a map that may be scaled by the user, consistent with some embodiments. As shown in FIG. 11, the mobile research application executing on the client device 106 may generate a map of products, wherein the user is able the map based on distance, estimated time of travel, or, in some embodiments, estimated shipping times. As shown in FIG. 11, the user may manipulate the scale of the map using a slider.

Figure 78:
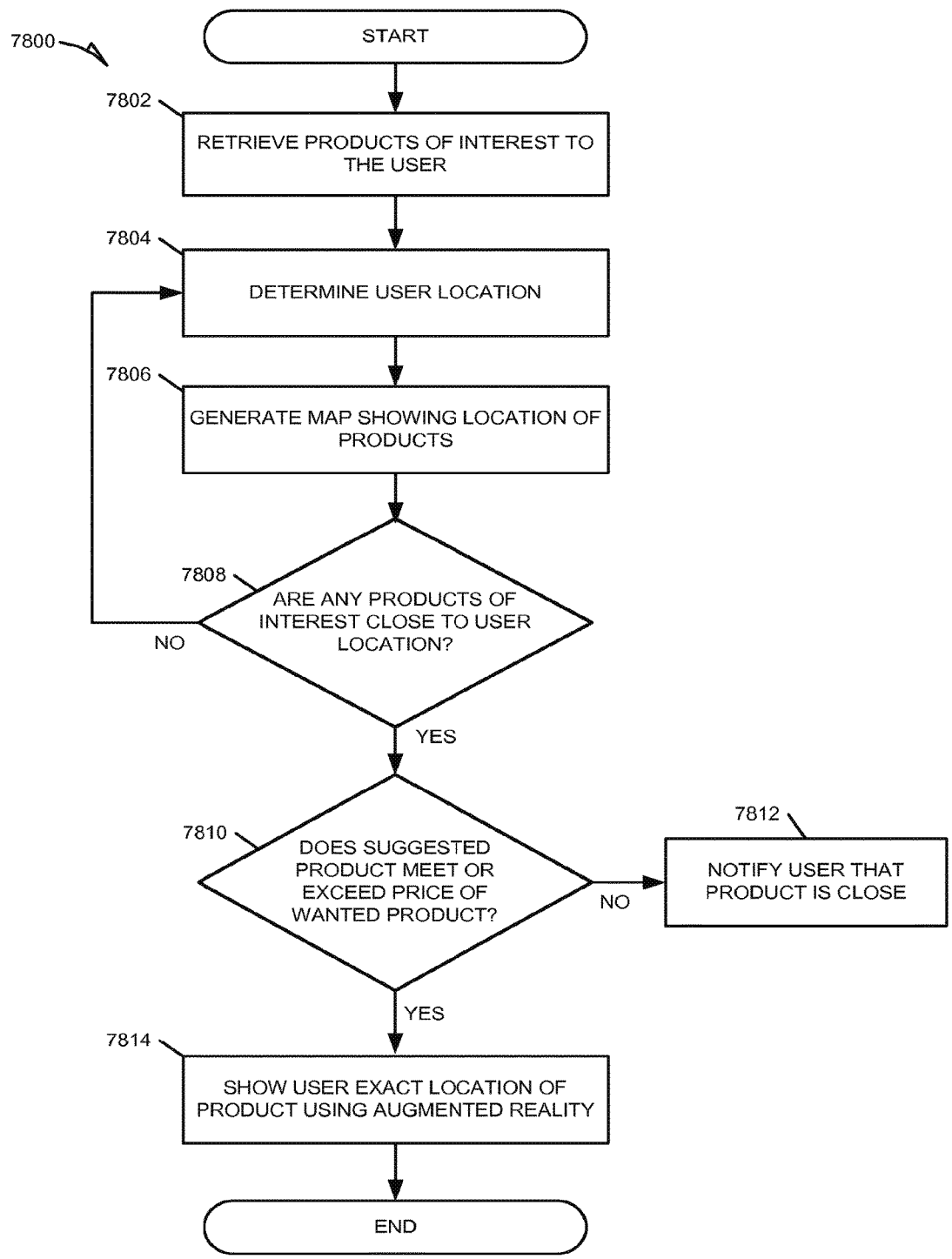
FIG. 78 is a flowchart illustrating a method for providing a user information about a location of a product, consistent with some embodiments.

FIG. 78 is a flowchart illustrating a method 7800 for providing user information about a location of a product, consistent with some embodiments. For the purpose of illustration, FIG. 72 may be described with reference to FIGS. 1, 2, and 69-78. The method 7800 may be embodied in computer-readable instructions for execution by one or more processors such that the steps of the method 7800 may be performed by client device 106 or the application server 124 and, in particular, a mobile research application executing on the client device 106 or research modules 228 of the marketplace applications 126. As shown in FIG. 78, research modules 228 may retrieve products of interest to the user from account information 130 at operation 7802. At operation 7804, the research modules 228 may then determine a location of the user. The location of the user may be determined using location with mobile location application executing on the client device 106, and may be transmitted to research modules 228 through network. At operation 7806, the research modules 228 may generate a map showing the location of products of interest, such as shown in FIGS. 75-77. At operation 7808, the research modules 228 may then determine if any of the products of interest are close to the location of the user. If not, the user will just be provided with the map. However, if the location of the user is close to a product of interest, the research modules 228 may determine if the user is in the same locations as a product of interest at operation 7810. If the user is close, but not in the same location, personalization modules 230 may send the user an alert that a product of interest is nearby, as is shown in FIGS. 71 and 73. If the user is in the same location as a product of interest, the research modules 228 may show the user the exact location of the product of interest using augmented reality at operation 7814.

FIG. 13 is a diagram illustrating providing information to a user using community discussion, consistent with some embodiments. As shown in FIG. 13, when researching products of interest the mobile research application executing on the client device 106 may allow a user to ask questions to other users using research applications on their user device, in conjunction with research modules 228 on application server 124. Asked questions may be transmitted to the other users instantly using instant messaging (IM) applications, short messaging service (SMS), e-mail, or through information accessible by users when accessing application server 124.

Figure 79:
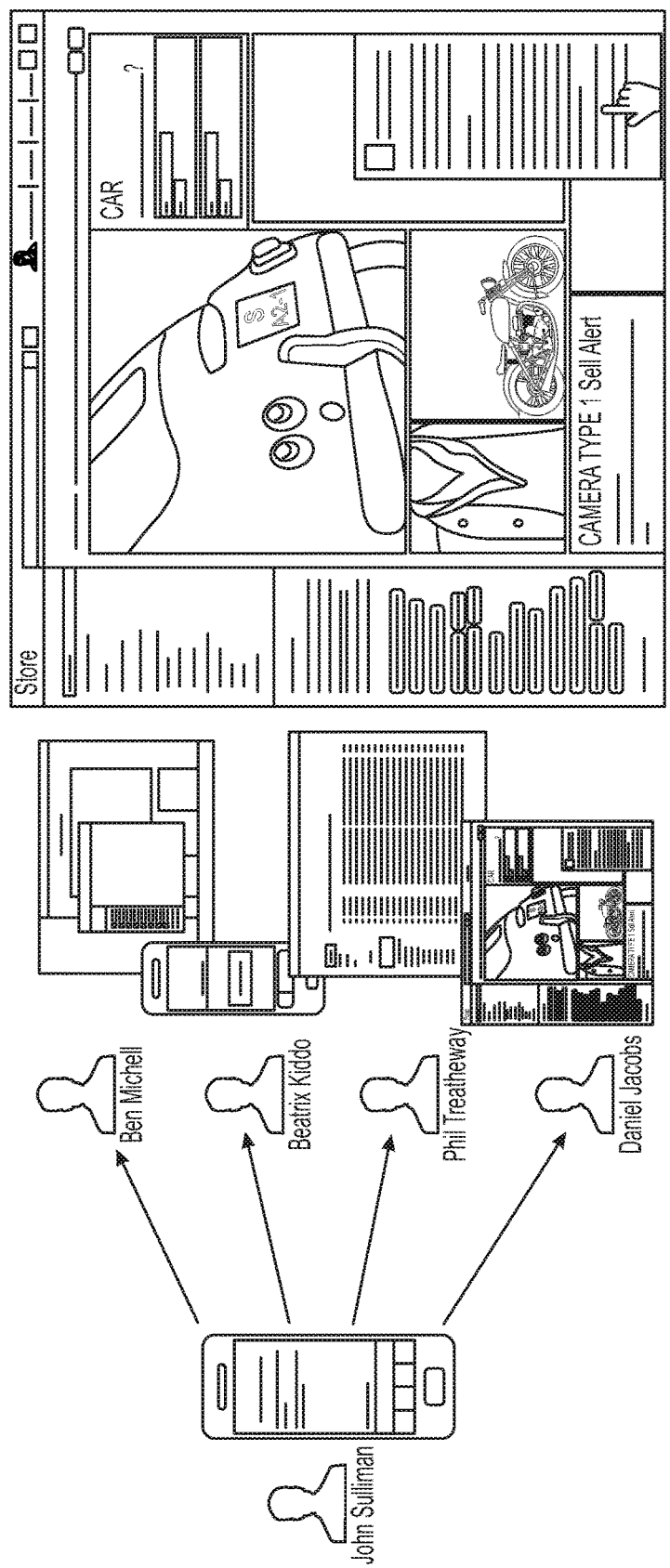
FIG. 79 is a diagram illustrating providing information to a user based on other user's expertise.

FIG. 79 is a diagram illustrating providing information to a user based on other user's expertise. As shown in FIG. 79, questions asked by the user using the mobile research application executing on the client device 106 may be provided to other users of the mobile research application executing on the client device 106 based on information known about the other users, which may be stored in a user profile. Information such as the other user's affinity groups, interests, past purchases, past searches, and community activity may all be used to determine if the other user is the right person to route the user's questions to.

Figure 80:
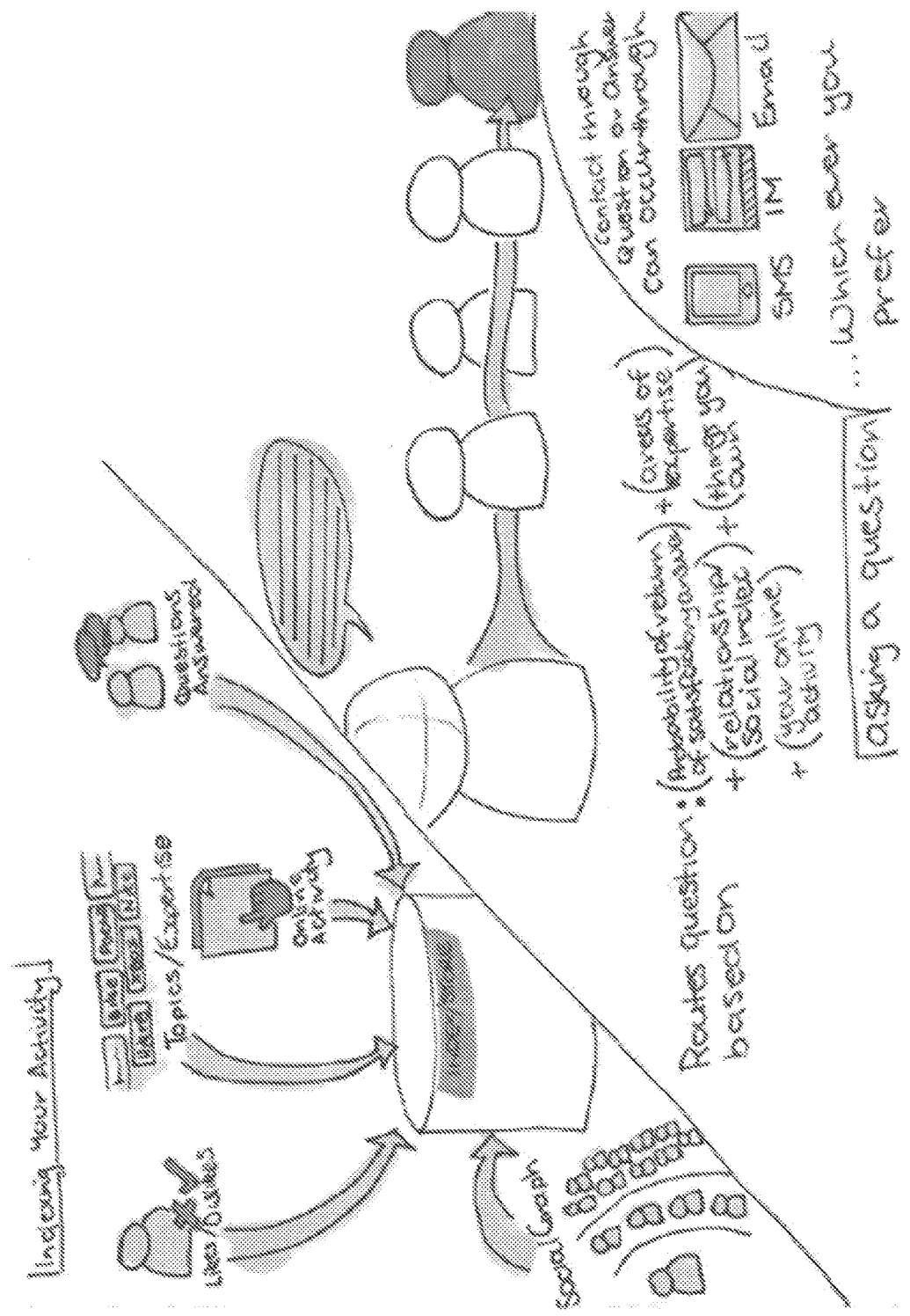
FIG. 80 is a diagram illustrating providing immediate information to a user, consistent with some embodiments
Figure 81:
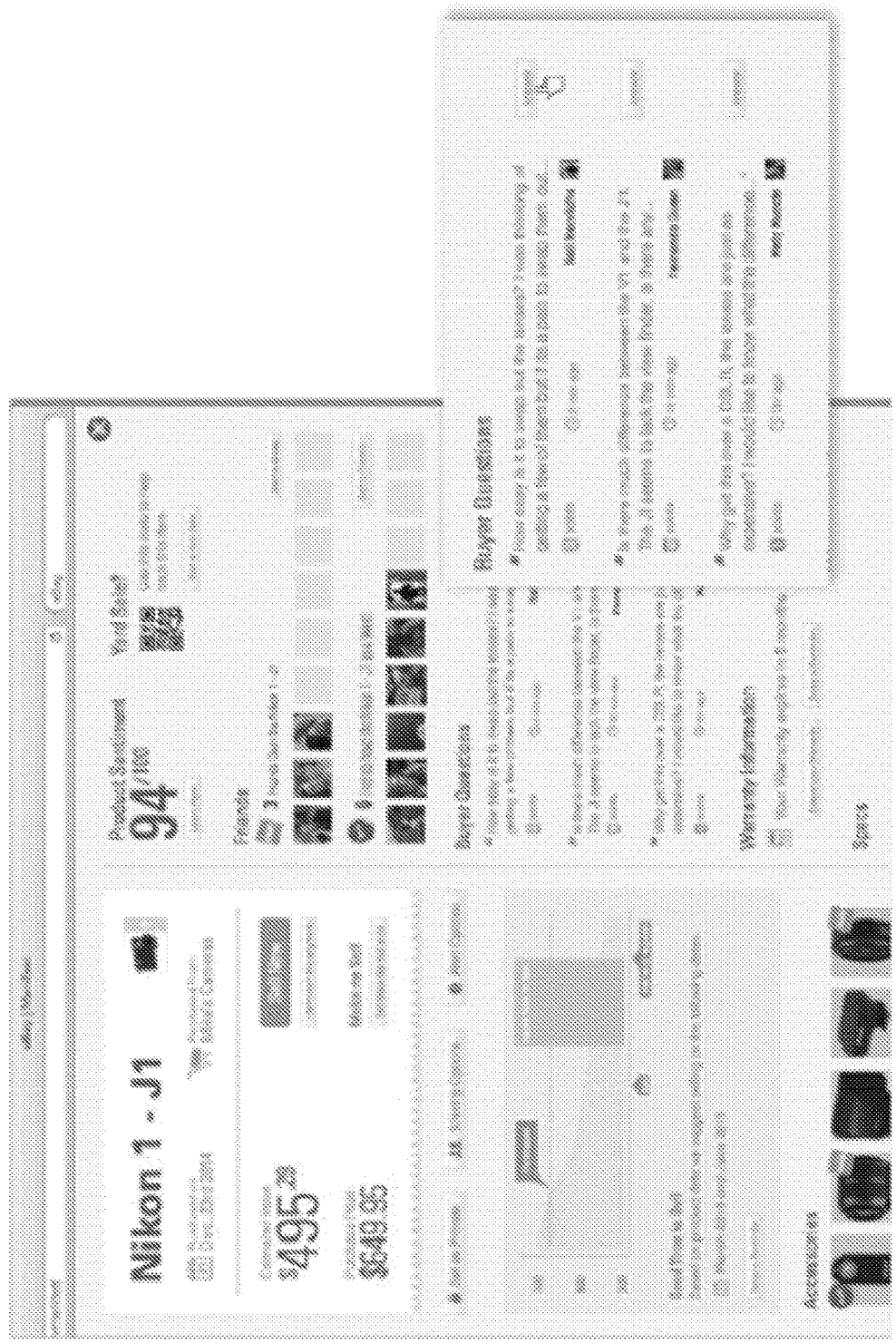
Figure 82:
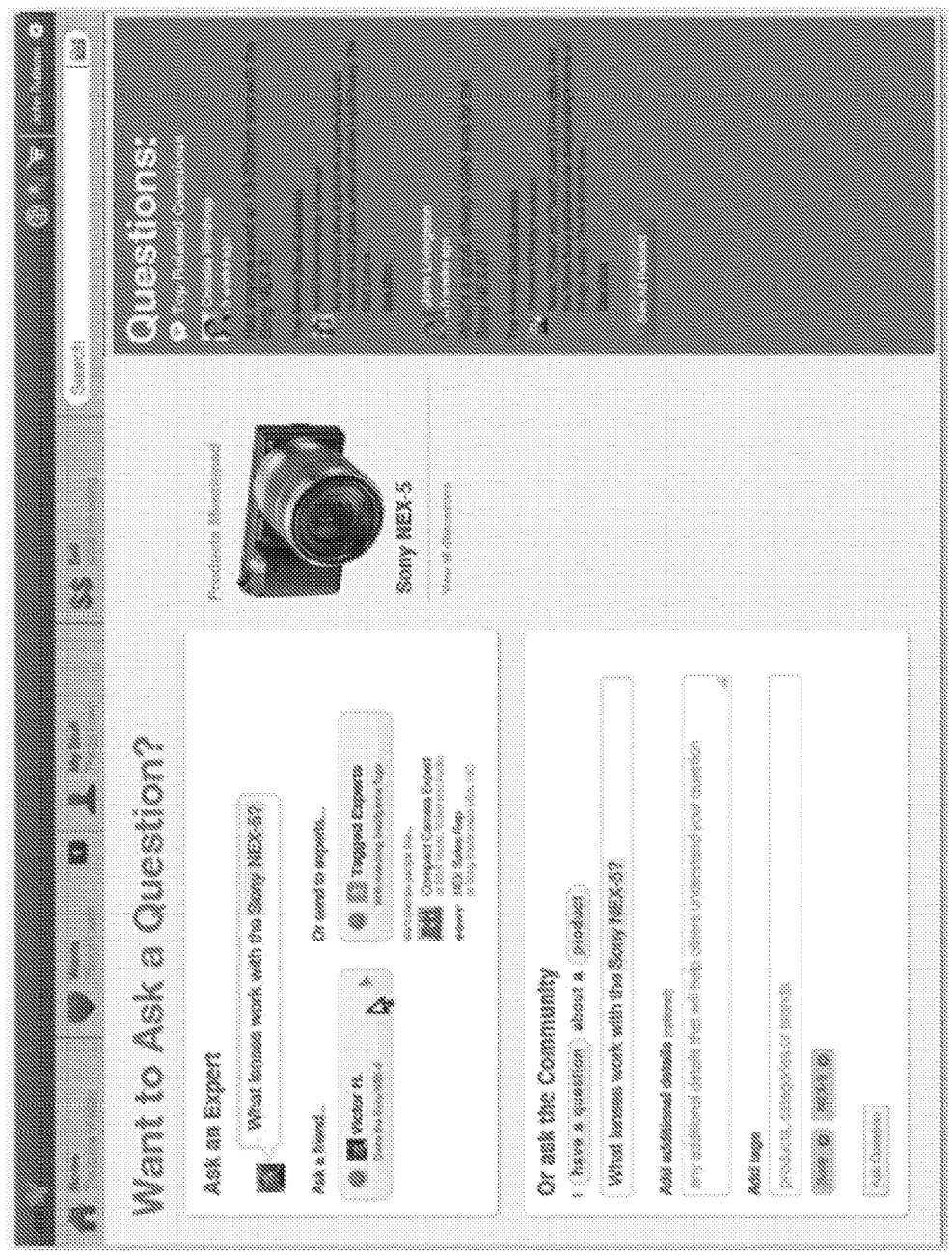
Figure 83:
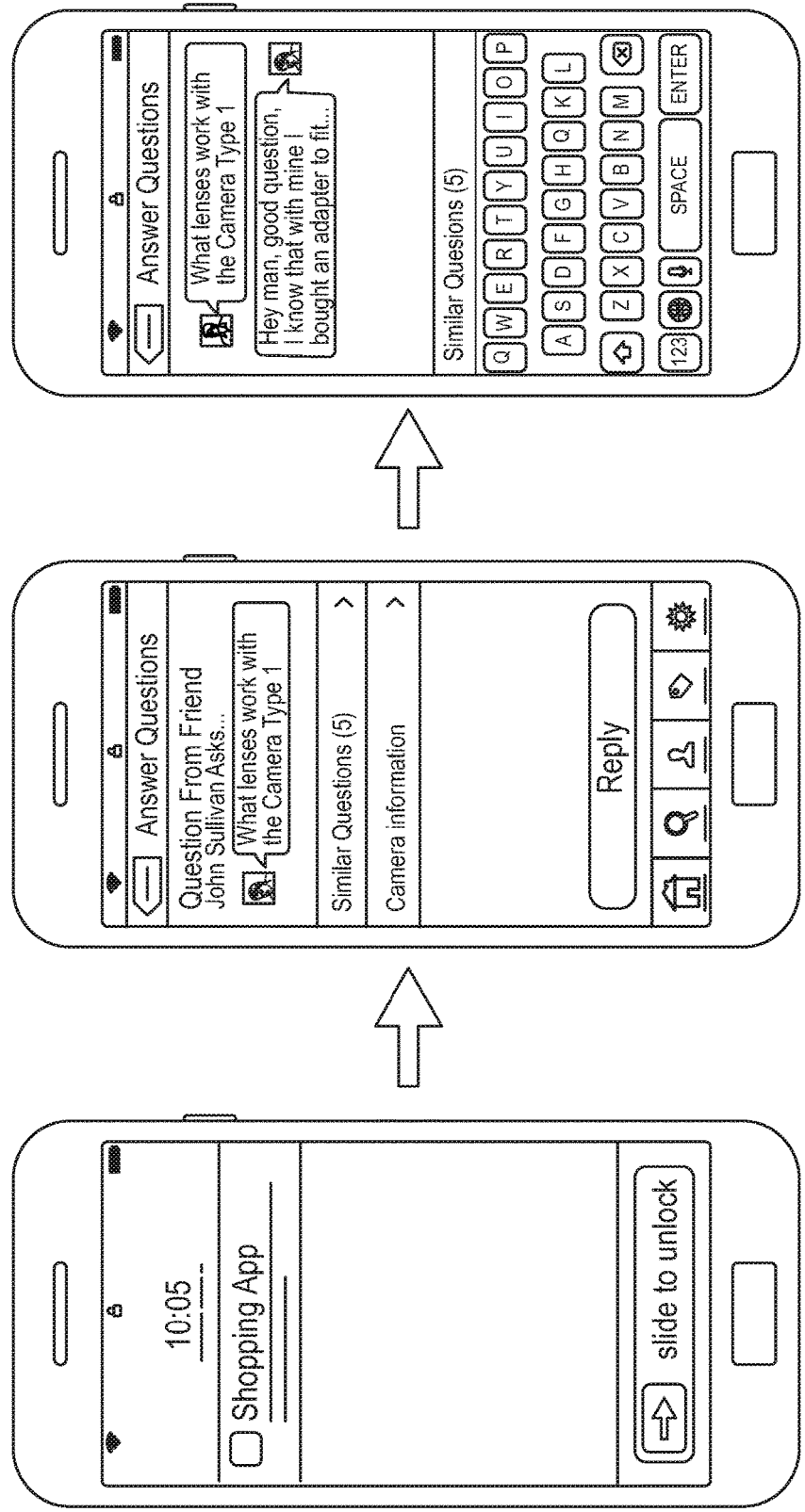
Figure 84:
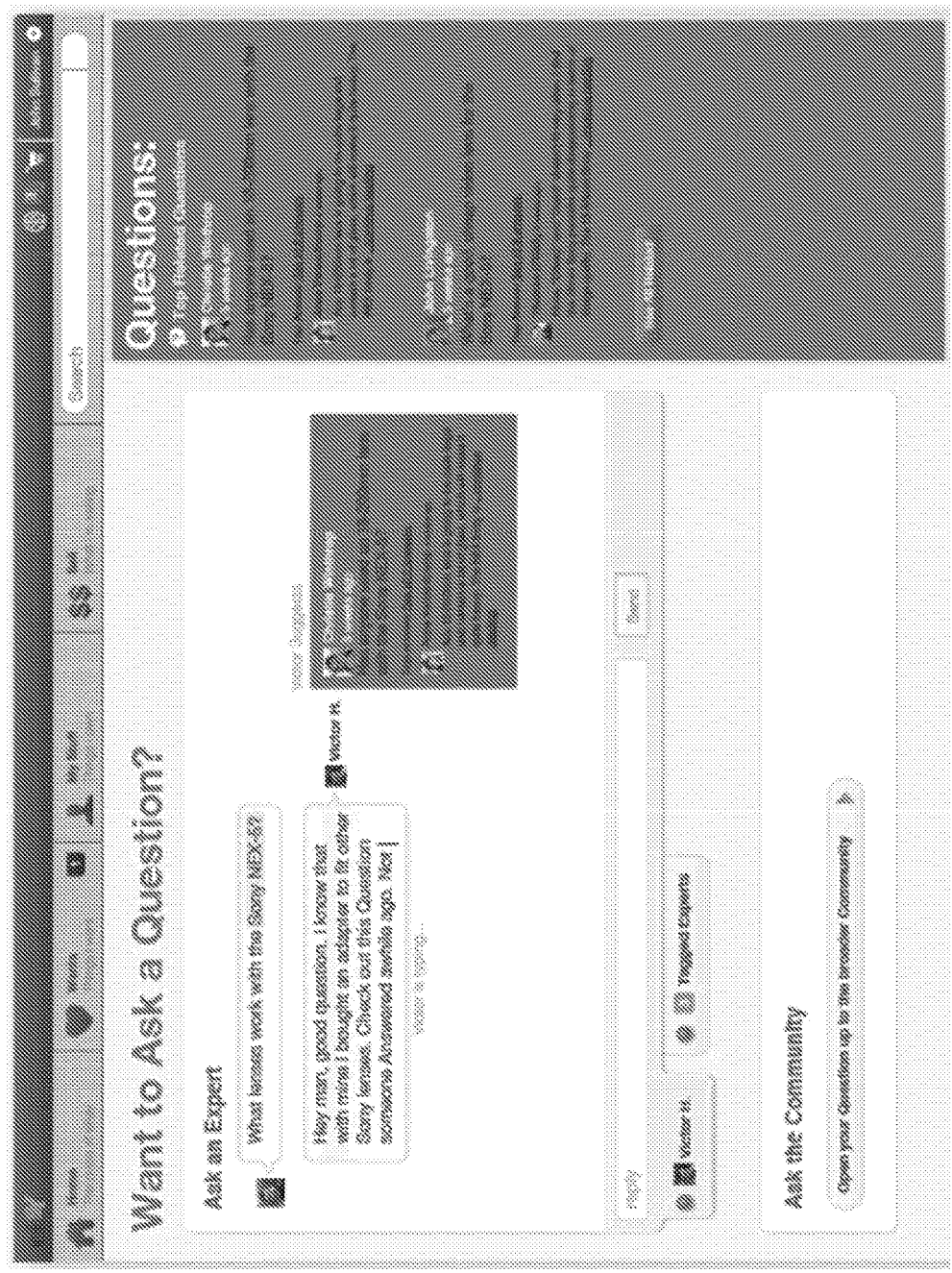
Figure 86:
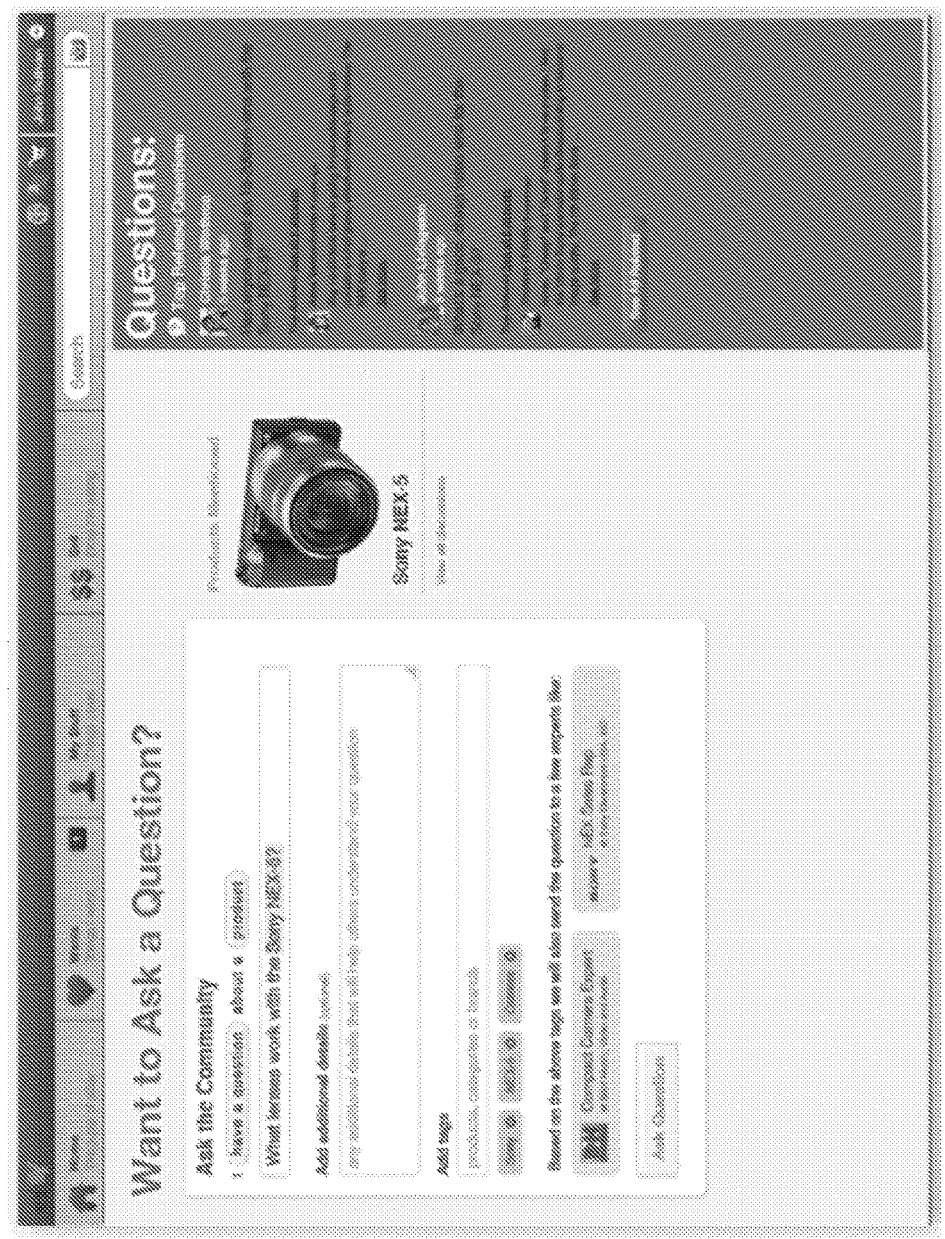

FIG. 80 is a diagram illustrating providing immediate information to a user, consistent with some embodiments. As shown in FIG. 80, the user may be about to purchase a product, but requires some last minute information in order to be able to go ahead with the purchase. In such situations, the user may need immediate information. Using the mobile research application executing on the client device 106, the user may be able to ask a questions, which may be routed to appropriate other users by the communication modules 232 via e-mail, SMS, IM, or phone call, in order for them to provide the last minute advice that the user requires.

FIGS. 81-86 are screenshots illustrating additional examples of providing information to a user by asking questions of the community, consistent with some embodiments.

Figure 87:
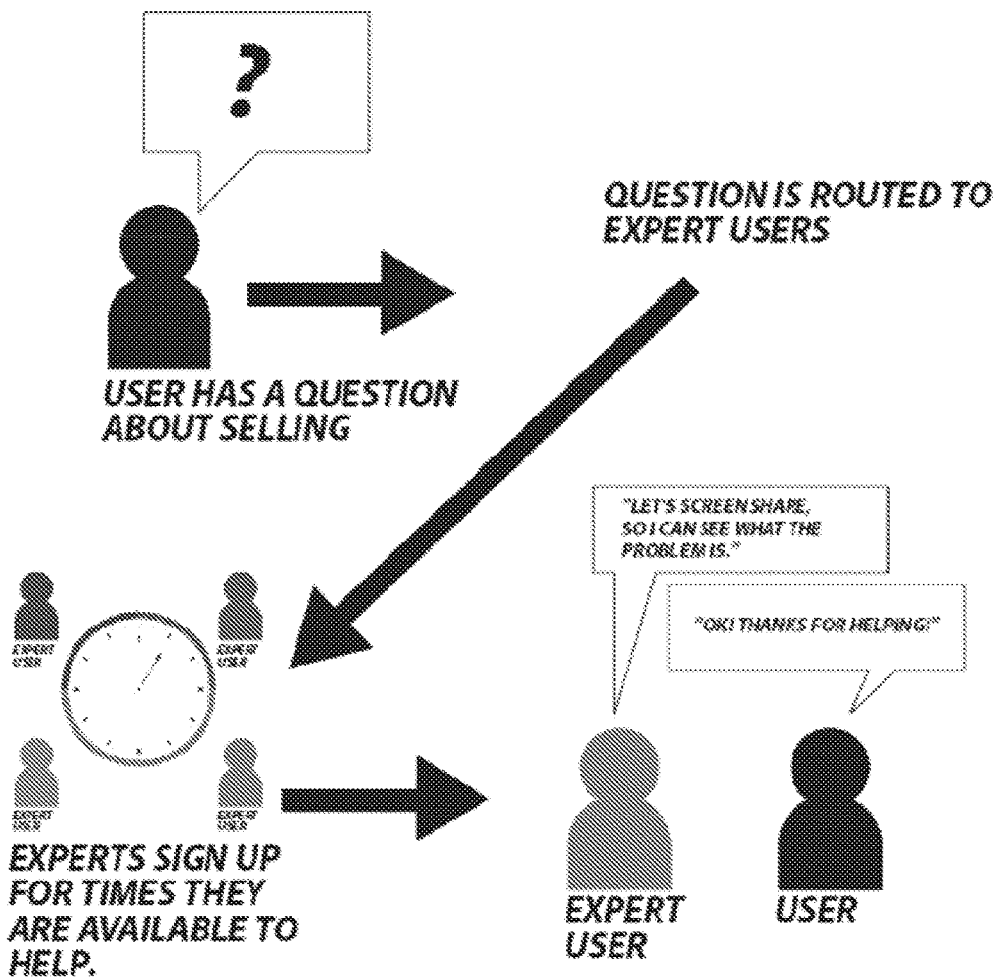
FIG. 87 is a diagram illustrating connecting users to experts to answer questions, consistent with some embodiments.

FIG. 87 is a diagram illustrating connecting users to experts to answer questions, consistent with some embodiments.

Figure 88:
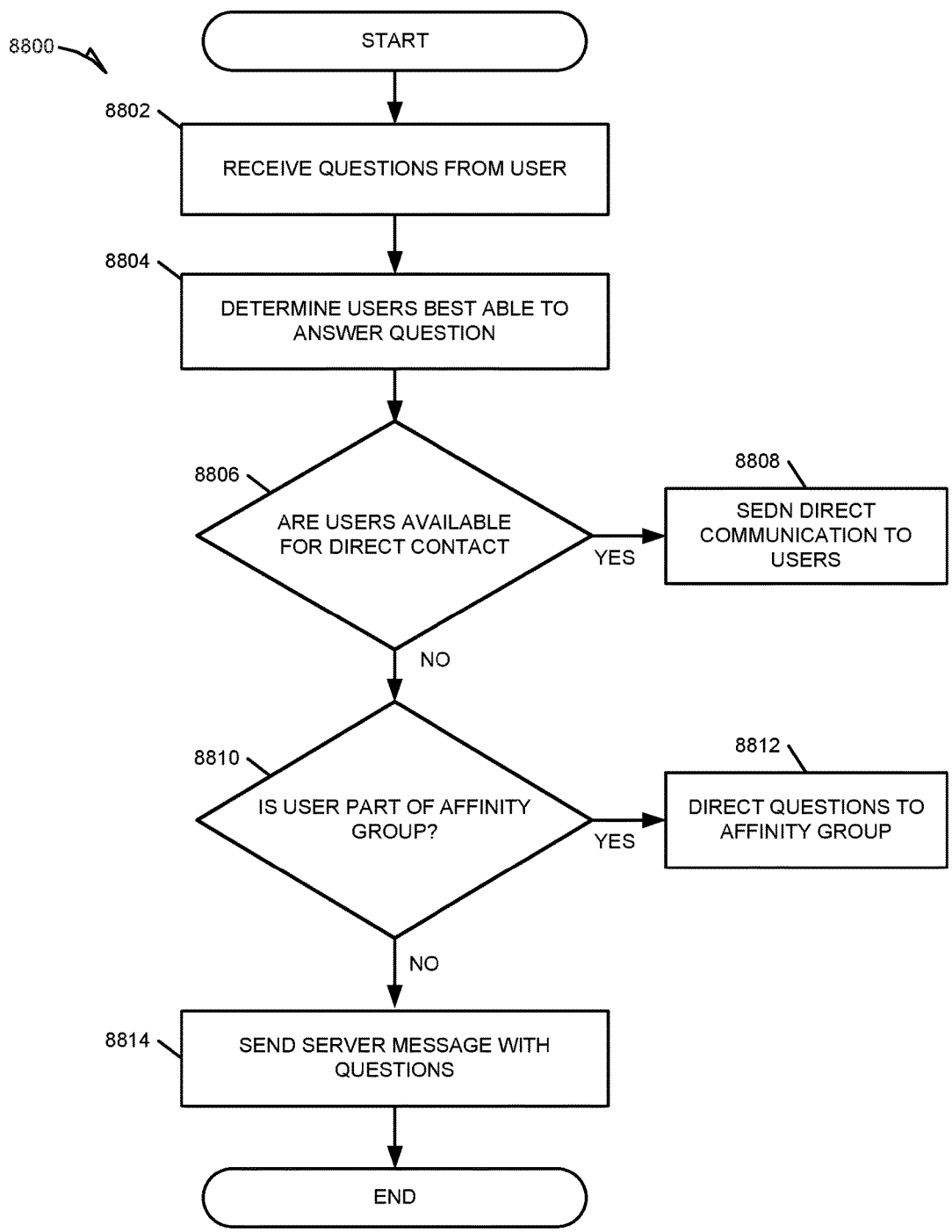
FIG. 88 is a flowchart illustrating a method for providing a user with information, consistent with some embodiments.

FIG. 88 is a flowchart illustrating a method for providing a user with information, consistent with some embodiments. For the purpose of illustration, FIG. 88 may be described with reference to FIGS. 79-87. The method shown in FIG. 88 may be embodied in computer-readable instructions for execution by one or more processors such that the steps of the method may be performed by client device 106 or the application server 124 and, in particular, a mobile research application executing on the client device 106 or research modules 228 of the marketplace applications 126. As shown in FIG. 88, research modules 228 may receive questions from the user at operation 8802. Consistent with some embodiments, the questions may be transmitted from client device 106 by the mobile research application. At operation 8804, the research modules 228 may then determine other users that may best be able to answer the questions from the user. As shown in FIG. 88, the users determined to be best able to answer a question may be based on information known about the other users, which may be stored in a user profile. Information such as the other user's affinity groups, interests, past purchases, past searches, and community activity may all be used to determine if the other user is the best person able to answer the question. The research modules 228 may then determine if the determined user or users are available for direct contact at operation 8806. That is, the research modules 228 may determine if the determined users have indicated that they are able to receive questions by IM, SMS, e-mail, or phone call. If they have indicated that they are available, the communication modules 232 may send a direct communication to the determined users, such as an IM, SMS, e-mail, or phone call. If the determined users are not available for direct contact, research application may determine if the determined users are part of an affinity group at operation 8810. If the determined users are part of an affinity group, research application may post the question of the user to the affinity group at operation 8812. If the determined users are not part of an affinity group, the communication modules 232 may post the question using a server message at operation 8814. That is, the communication modules 232 may post the question so that the determined users are able to view and respond to the question the next time that the determined users access application server 124.

Figure 89:
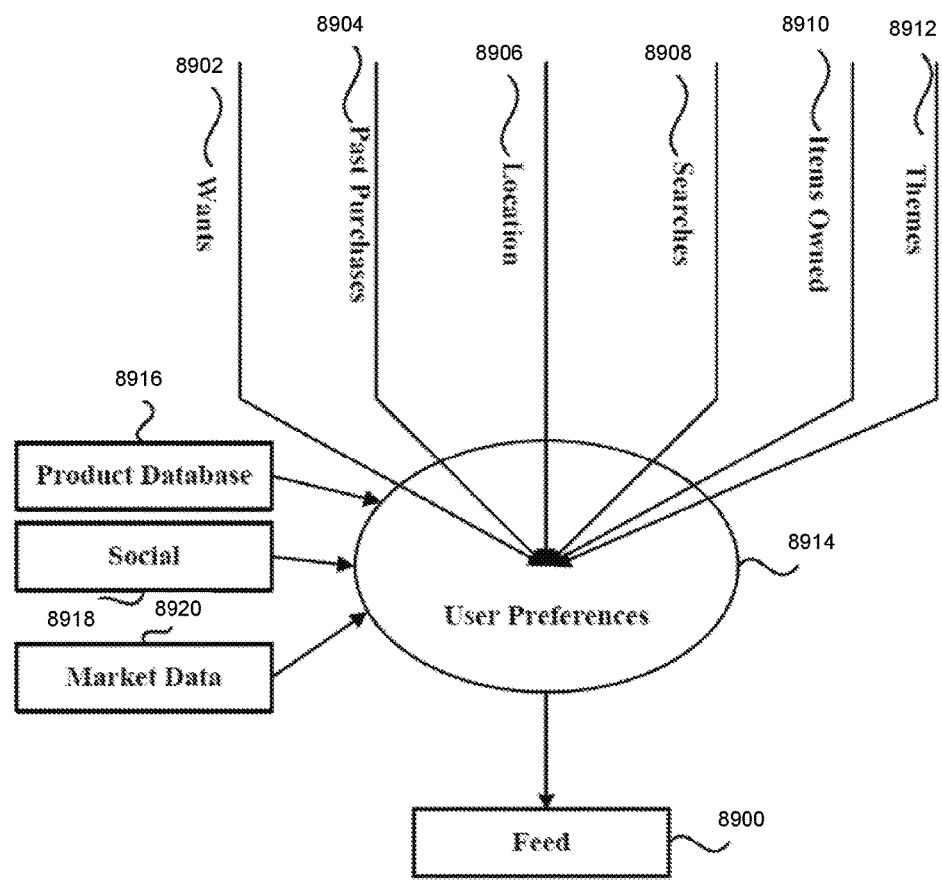
FIG. 89 is a diagram illustrating generating a personalized interface, consistent with some embodiments.

FIG. 89 is a diagram illustrating generating a personalized interface, consistent with some embodiments. As shown in FIG. 89, a number of inputs from a user and other sources are used to create a personalized interface for the user, which may be referred to as the "feed" 8900. Feed 8900 may be created using personalization modules 230, using a machine language-based learning algorithm that allows network-based marketplace 102 to understand and profile the user by analyzing activities within the context of transactions and interactions with network-based marketplace 102 to build suggestions and content pertinent to the user that is displayed to the user in feed 8900. For example, a user may designate certain items as being "Wants" 8902, which are items that the user wants and places in a want list or wish list. Wants may be indicated by selecting items that the user finds when accessing, for example, the network-based marketplace 102. If the user finds an item that they are interested in, the user may click on an image representing the item to indicate that they want the item. Wants may be indicated by selecting items that the user finds when accessing a third-party server 114 using an external toolbar application that persists in the context of the network-based marketplace 102. For example, a third-party application 116 hosted on the third-party server 114 may display an image using of an item stored in database associated with the third-party. The user may interface with the third-party application 116 using a mobile browser application running on the client device 106 and the user may be able to view the image. Using the external toolbar application, the user may be able to cut and past the displayed image of the product, or drag and drop the displayed image of the product onto the external toolbar which may send the image to application server 124. An image recognition module 222 executing on the application server 124 may then, using an image recognition algorithm, match the received image to items in databases 132, and store matching items as a want in the user profile of the user. Consistent with some embodiments, the network-based marketplace 102 may also store near-matches or items that are similar to the received image in appearance, price, etc., as want information in the user profile.

The feed 8900 may also be created using past purchases 8904. Consistent with some embodiments, past purchases 8904 may correspond to purchases made through the network-based marketplace 102 or a marketplace hosted by the third-party server 114. Details of past purchases 8904 are stored in the user profile. The details may include sizes of clothing articles purchased by the user, wherein the sizes may be automatically entered into drop down boxes and other size selection interfaces for items viewed using a mobile browser application running on the client device 106 through marketplace applications 126. Moreover, the sizes may be automatically entered into drop down boxes and other size selection interfaces for items viewed using the mobile browser application. The details of past purchases may also include payment information, such as banking account information, credit card information, or payment service provider information, such as may be provided by PayPal of San Jose, Calif. Similar to the sizes, the stored payment information may automatically be entered into payment information form fields or drop down boxes or by an external toolbar.

A location 8906 of the user may also be used to generate feed 8900. As discussed previously, location 8906 may be determined using the GPS functionality of the client device 106. Location 8906 of the user may be used to sort items in feed 8900 by their distance to the user. Alternatively, the user may be able to define location 110 as being a local corridor, such as a commuting corridor or usual travel corridor, wherein items in feed 8900 may be sorted based on their distance to the local corridor. Past searches 8908 of user may also be used to generate feed. Searches made when the user interfaces with application server 124 using the client device 106 may be saved in the user's user profile (e.g., maintained by user profile modules 212), and may provide insight into general interests and wants of the user. Searches made when the user interfaces with application server 124 using the client device 106 may be transmitted to the user profile by an external toolbar application (e.g., external toolbar application 1800), which may be in communication with application server 124. Items that the user owns 8910 may also be used in generating feed 8900. The user may be able to upload images to application server 124 of items that the user owns, wherein application server 124 will match the uploaded images to items stored in databases 132 using an image matching algorithm. The matching items will be stored in account information as items owned 8910. Items that the user has sold may also be included in generating feed 8900. Themes 8912 selected by the user may also be used to generate feed 8900. Themes 8912 may be images, collections of images, music, television shows, movies, or other media that define a theme that the user is interested in. The user may specify a theme by uploading or providing links to websites, blogs, media, and the related images will be recognized using the image recognition algorithm to provide matches that will be stored in account information 130.

The user may also specify certain preferences 8914 with respect to the inputs used to generate feed 8900. For example, the user may specify that the user does not wish location 8906, past searches 8908, or items owned 8910 used in generating feed 8900. In this example, these inputs would be ignored by personalization modules 230 in generating feed. User preferences 8914 may include other information, such as items or information that the user may always want to be used in generating feed. Personalization modules 230 takes inputs 8902-8912 and finds matches from product database 8916, social databases 8918, and market data 8920, each of which may be stored in one or more databases 132 to generate feed 8900. Social databases 8918 may include affinity groups and communities associated with application server 124 that the user may be interested in participating in due to their inputs. Consistent with some embodiments, social databases 8918 may also correspond to information taken from social groups of the user. For example, if the user has social network connections that have indicated that a matching or near-matching product from product database 8916 has been good or bad, feed 8900 may include or not include that product. Moreover, if a social network connection of the user has reviewed a particular product, that review may be presented in feed 8900 and highlighted for the user to see. Furthermore, the user may permit personalization modules 230 access to external social networks of the user, such as Facebook, Twitter, Google+, etc., possibly through an external toolbar application, such that the social information may be used as a further input to generate feed. Market data 8920 corresponds to current trends in prices, availability, and demand of items, and market data 8920 may be presented to the user in feed 8900. Consistent with some embodiments, the user may indicate preferred sources of market data.

Feed 8900 may include product tiles of matching or near-matching products from product database 8916. The product tiles may show products that the user may be interested in as determined by the personalization modules 230. The products shown may include wants 8902 and similar products based on image recognition, price, brand and style. Consistent with some embodiments, users may be able to interact with product tiles by selecting, clicking on, or hovering over product tiles, which may bring up additional personalization options for the user to personalize or accessorize the selected product. Further consistent with some embodiments, any personalization or accessorizing of the selected product may be shown within the displayed product tile, within feed 8900, without navigating away from feed 8900. The product tiles may also display a product description page (PDP) that shows all information that the user may be interested in with respect to the product. Product tiles may also include market data 8920 related to the product, which may include prices, changes in prices, and market forecasts.

Feed 8900 may also include communities, forums, affinity groups, and links to other similar social sites. Communities and affinity groups may allow connections between the user and other users having similar interests determined by personalization modules 230. Content from social network connections (e.g., "friends") of the user may also be displayed in feed 8900. Such content may include items or products wanted or owned by the social network connections, polls, requests for information or advice, reviews, etc. Feed 8900 may also include profile card of the user. The profile card of the user may provide additional information and details about the user including links to additional information about the user such as statistics and items purchased and sold by user, interests of the user, and a location 8906 of the user. The user may also be able to organize items that they own 310 into collections or collages, which may be linked on the profile card. Location 8906 of the user may be used to sort items in feed 8900 by their distance to the user. Alternatively, the user may be able to define location 8906 as being a local corridor, such as a commuting corridor or usual travel corridor, wherein items in feed 8900 may be sorted based on their distance to the local corridor. Feed 8900 may also include market data related to products displayed in feed 8900. The market data includes trends, prices, demand, etc. of products in feed 8900 and products owned 8910 to assist the user in deciding when to sell or buy. Just as user preferences 8914 may be used by the user to limit the inputs 8902-8912 used to generate feed 8900, user preferences 8914 may also limit the amount of information that is displayed in feed 8900. For example, the user may not want to see affinity groups or communities in feed 8900, and may indicate this preference in user preferences 8914.

Figure 90:
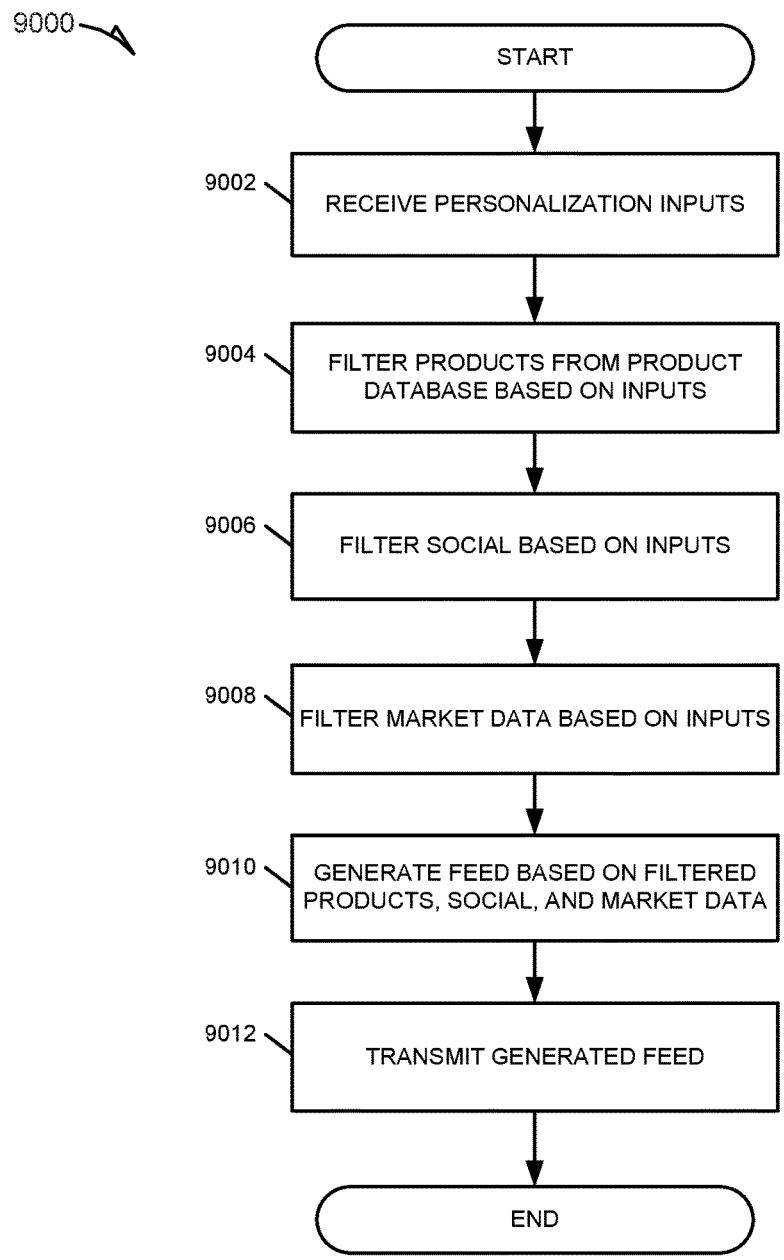
FIG. 90 is a flowchart illustrating a method for generating a personalized feed, consistent with some embodiments.

FIG. 90 is a flowchart illustrating a method 9000 for generating a personalized feed, consistent with some embodiments. For the purpose of illustration, FIG. 90 will be described with reference to FIGS. 1, 2, and 89. The method 9000 may be embodied in computer-readable instructions for execution by one or more processors such that the steps of the method 9000 may be performed by application server 124 and, in particular, the personalization modules 230 of application server 124. As shown in FIG. 90, the personalization modules 230 may receive personalization inputs 8902-8912 from the user at operation 9002. Based on personalization inputs 8902-8912 and user preferences 8914, personalization modules 230 may filter products from product database 8916 based on inputs 302-312 at operation 9004. Personalization modules 230 may further filter social information 8918 based on inputs 8902-8912 and user preferences 8914 at operation 9006. Personalization modules 230 may then filter market data 8920 based on inputs 8902-8912 and user preferences 8914 at operation 9008. From the filtered products 8916, social 8918, and market data 8920, personalization modules 230 may generated feed 8900 (at operation 9010) and transmit the generated feed 8900 (at operation 9012) to the client device 106 for display.

Figure 91:
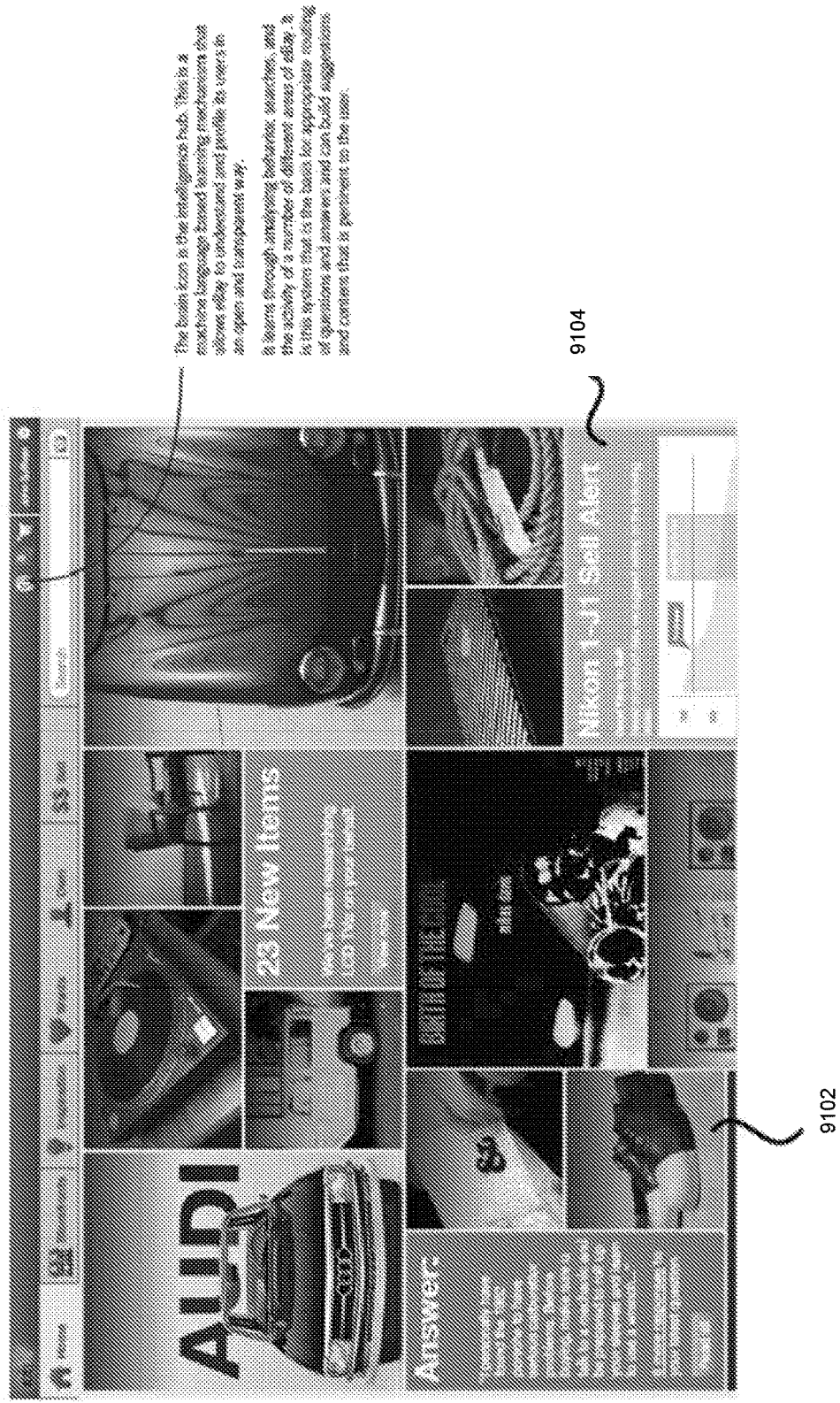
FIG. 91 is a screenshot of the generated feed along illustrating the personalization, consistent with some embodiments.

FIG. 91 is a screenshot of the generated feed along illustrating the personalization, consistent with some embodiments. As shown in FIG. 91, the feed 8900 includes product tiles 9102 and market data 8920. Moreover, FIG. 91 further shows and describes the personalization of feed by using a machine language based learning mechanism that analyses behavior, searches, and other information.

Figure 92:
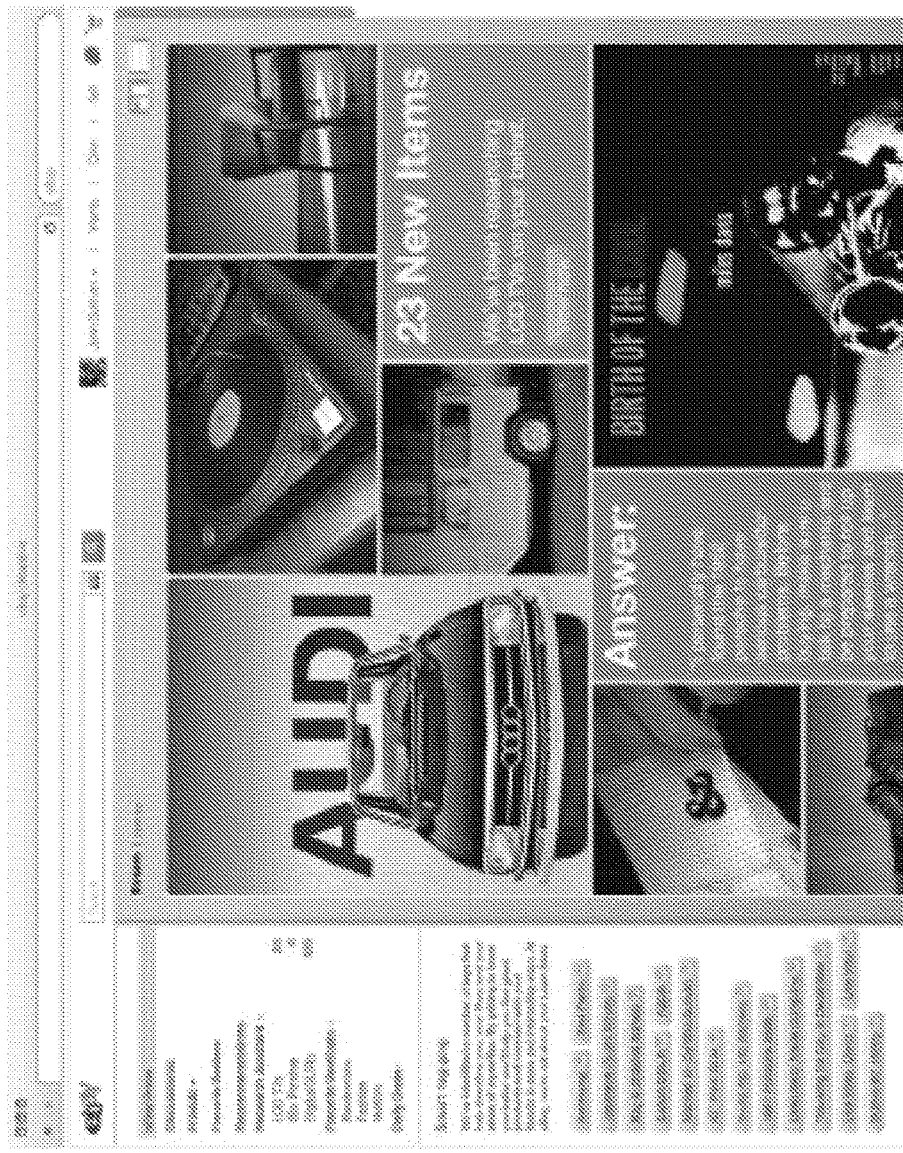
FIG. 92 shows screenshots demonstrating when the machine language based learning mechanism of personalization modules is active, inactive, or disabled, consistent with some embodiments.

FIG. 92 shows screenshots demonstrating when the machine language based learning mechanism of the personalization modules 230 is active, inactive, or disabled, consistent with some embodiments.

Figure 93:
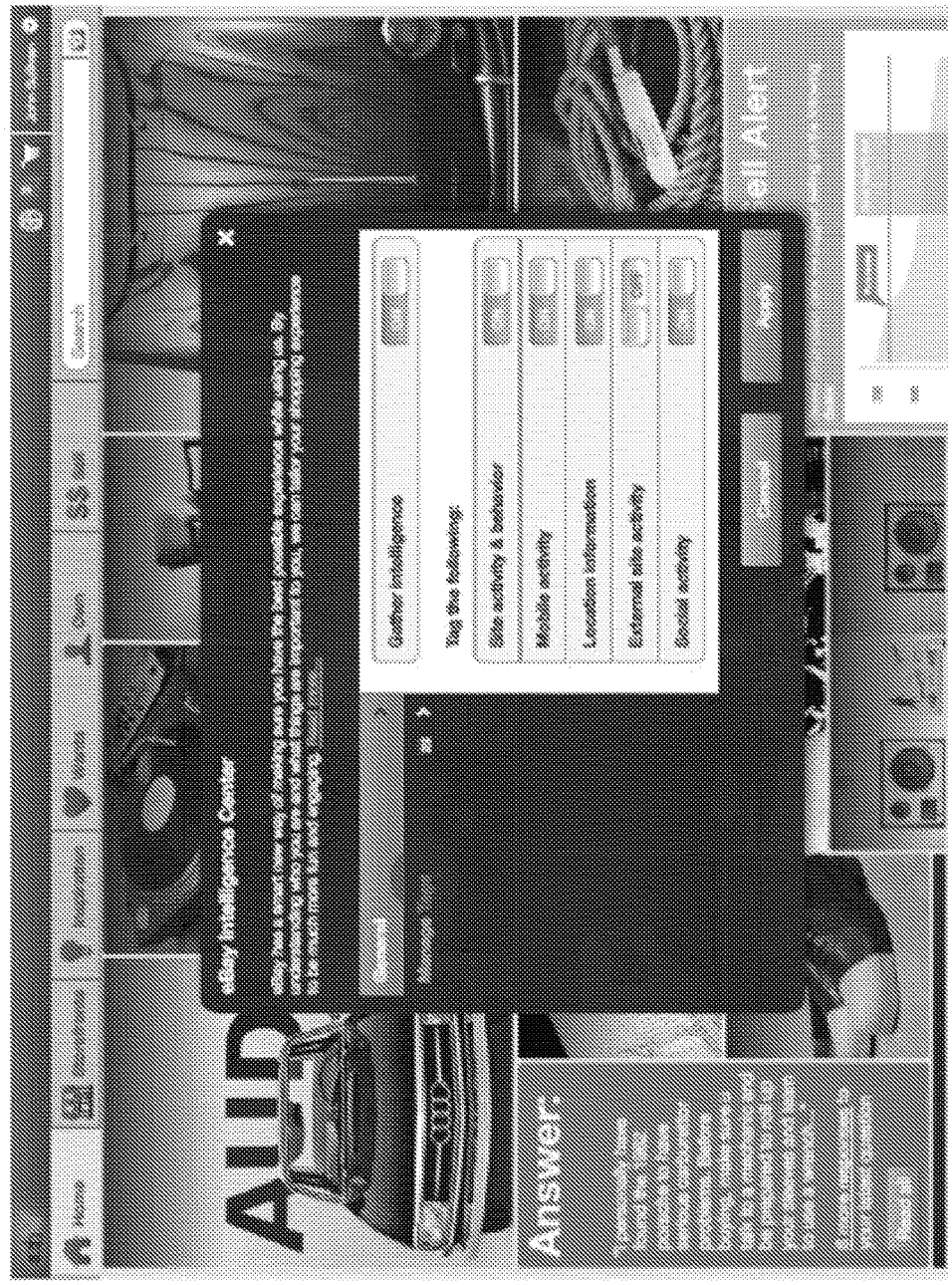
FIGS. 93-94 are screenshots illustrating user preferences, consistent with some embodiments.
Figure 94:
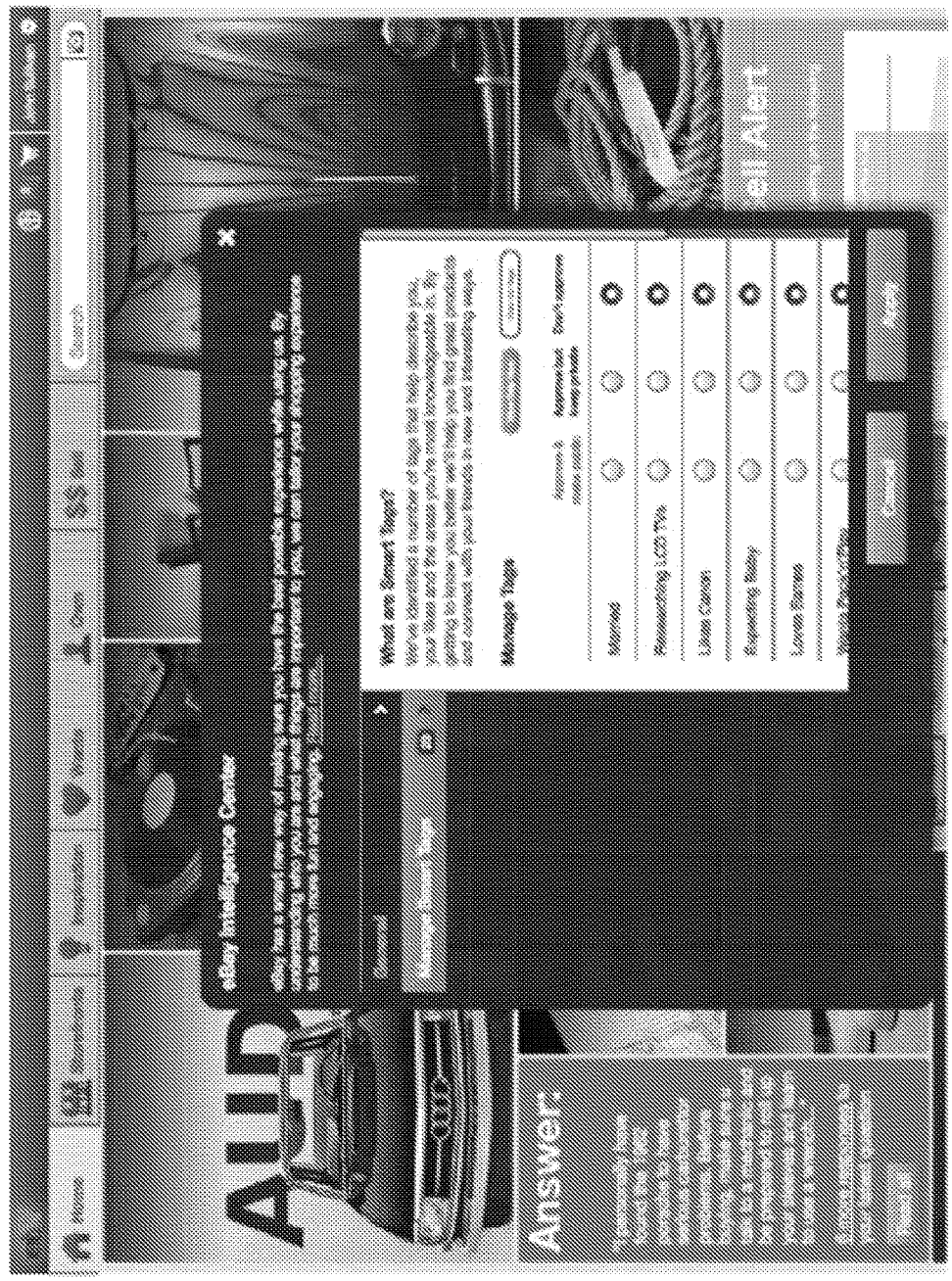

FIGS. 93-94 are screenshots illustrating user preferences 8914, consistent with some embodiments. As shown in FIG. 93, the user may enable or disable certain information or inputs 8902-8912 from being used by the personalization modules 230 by selecting the appropriate user preference 8914.

Figure 95:
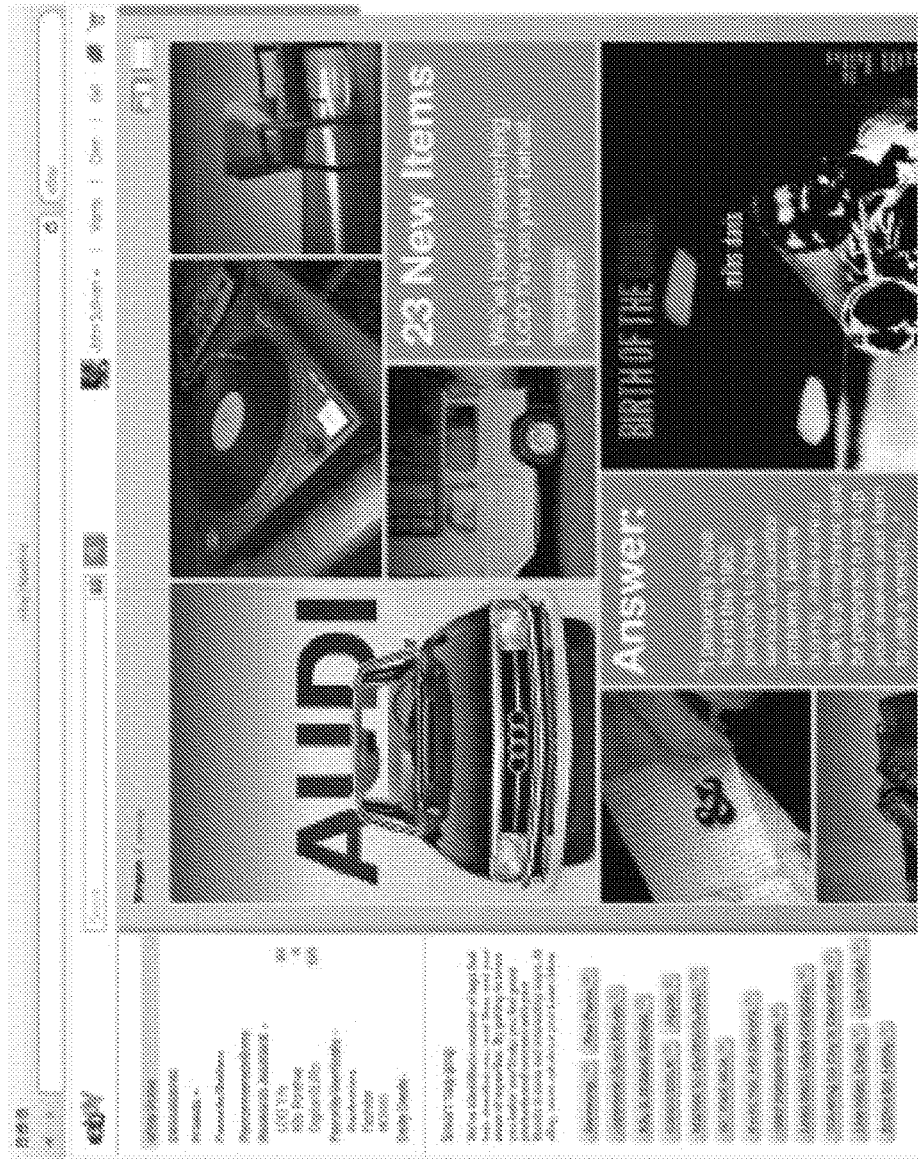
FIGS. 95-96 are screenshots showing an example of feed with product tiles.
Figure 96:
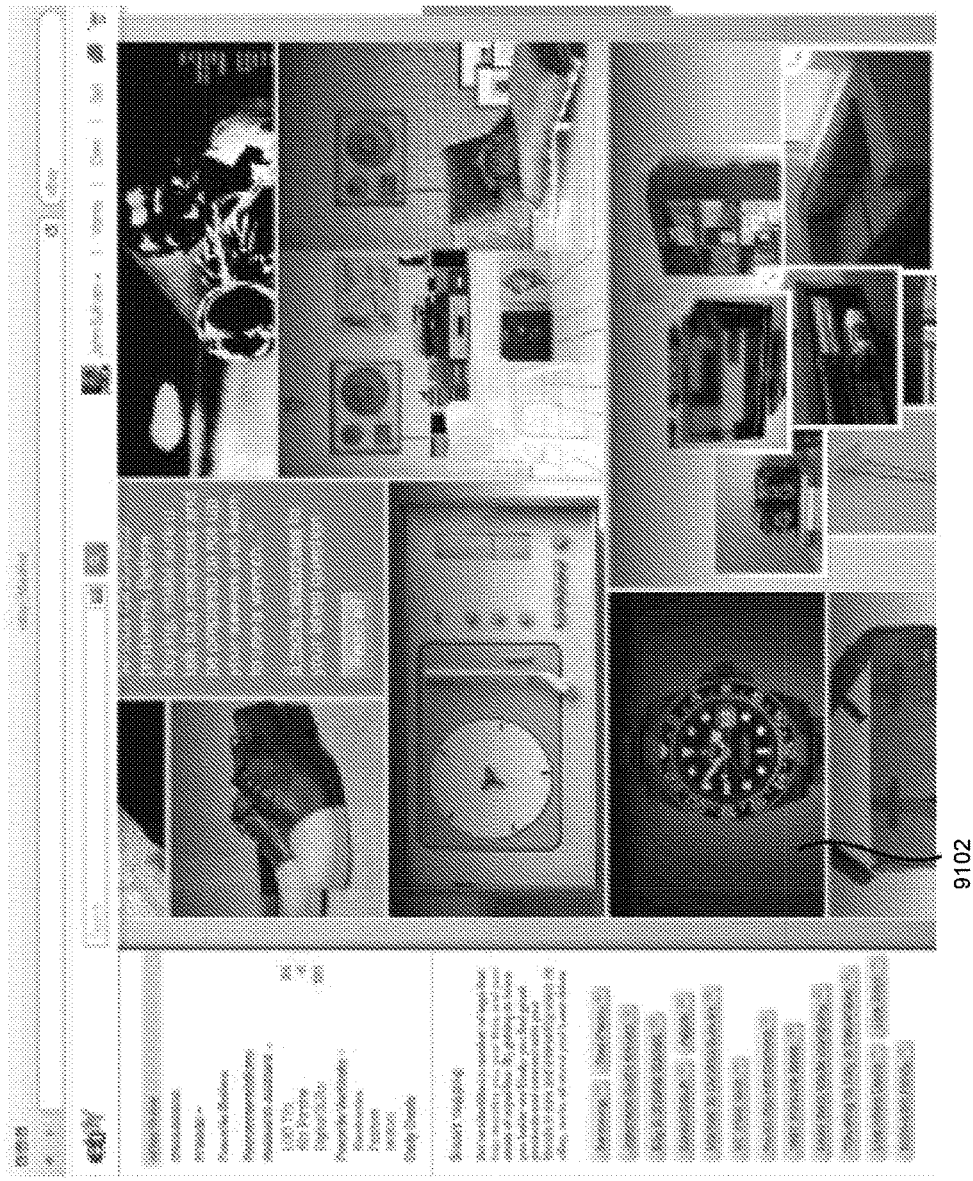

FIGS. 95-96 are screenshots showing an example of feed 8900 with product tiles 9102.

Figure 97:
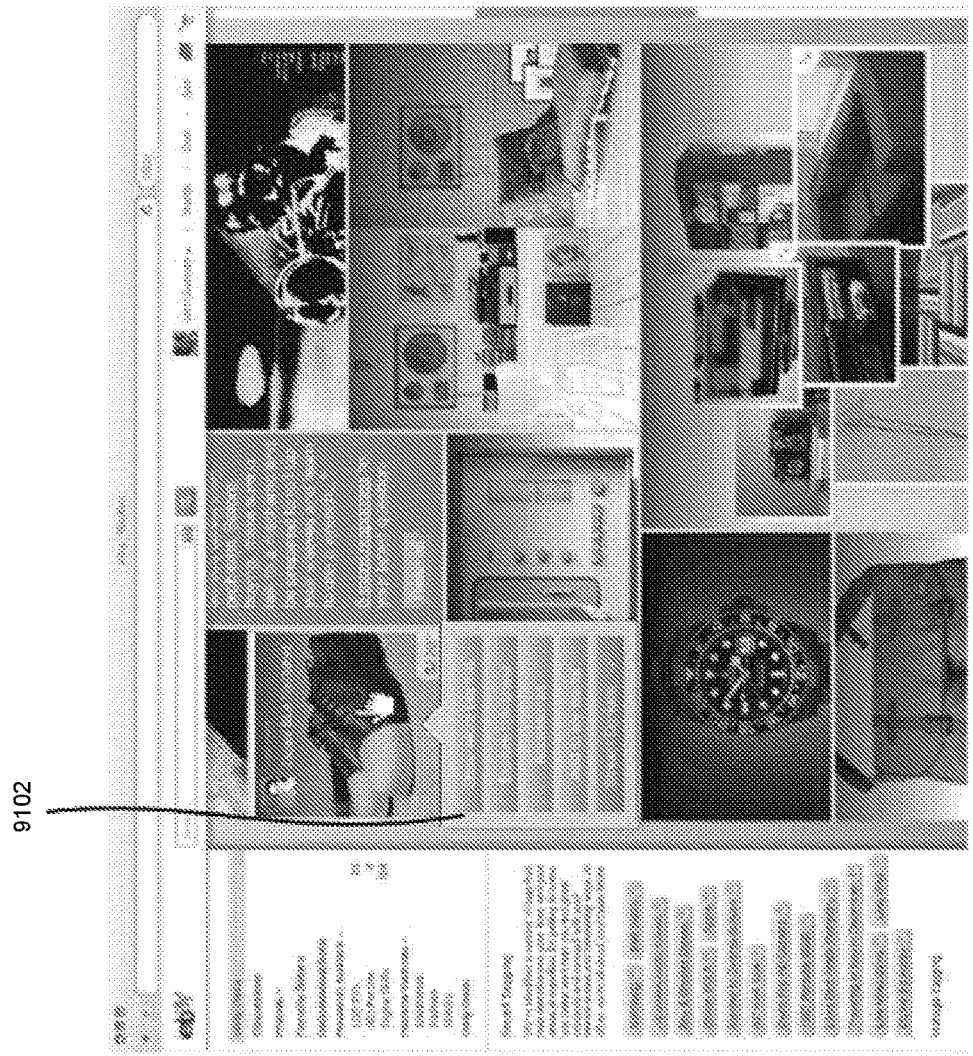
FIGS. 97-98 are screenshots showing an example of feed interacting with product tiles to accessorize and/or personalize the products.
Figure 98:
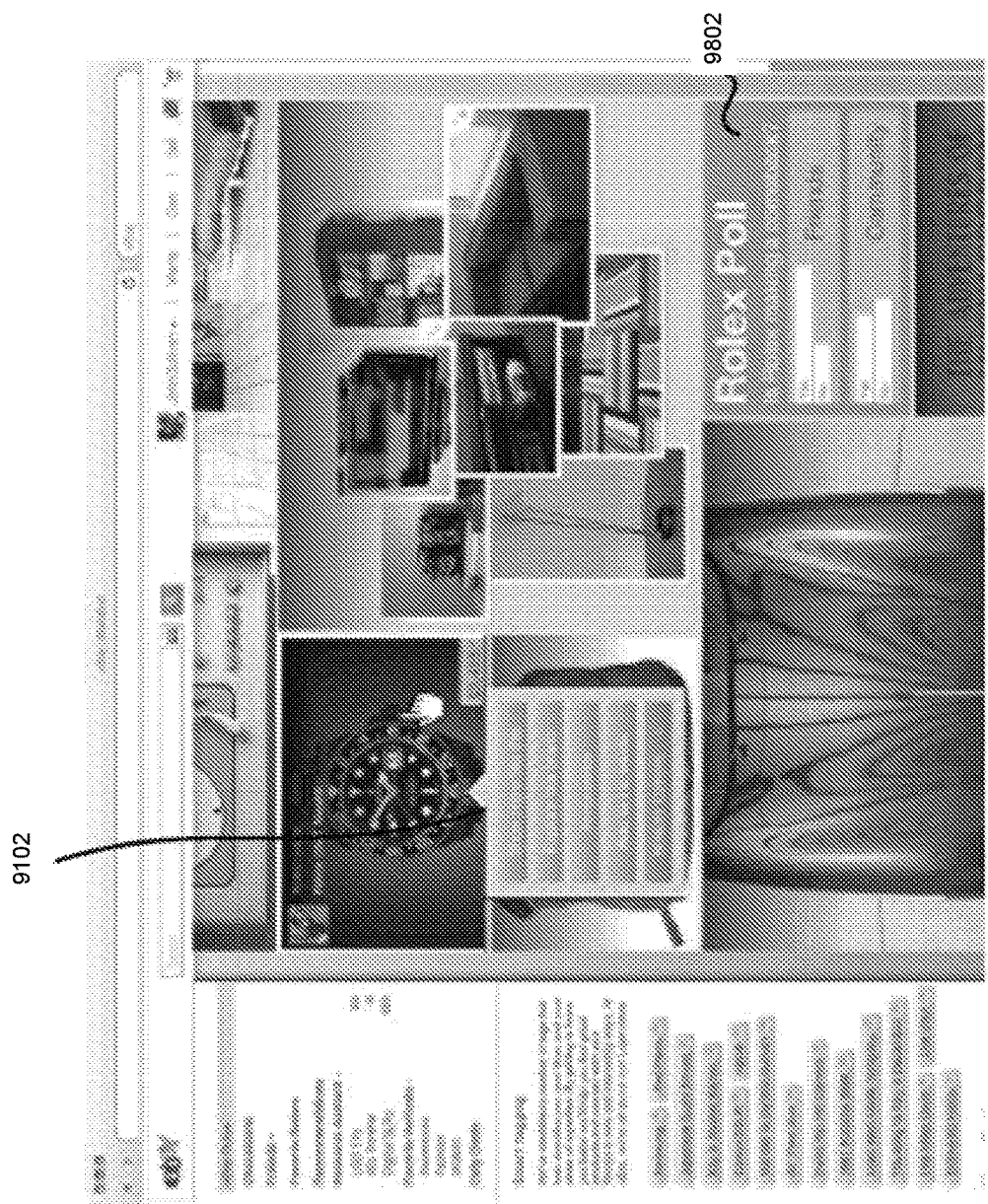

FIGS. 97-98 are screenshots showing an example of feed 8900 interacting with product tiles 9102 to accessorize and/or personalize the products. FIG. 98 also shows social content 9802, such as a poll.

Figure 99:
FIG. 99 is a screenshot showing similar items to a wanted item, consistent with some embodiments.

FIG. 99 is a screenshot showing similar items to a wanted item, consistent with some embodiments.

Figure 100:
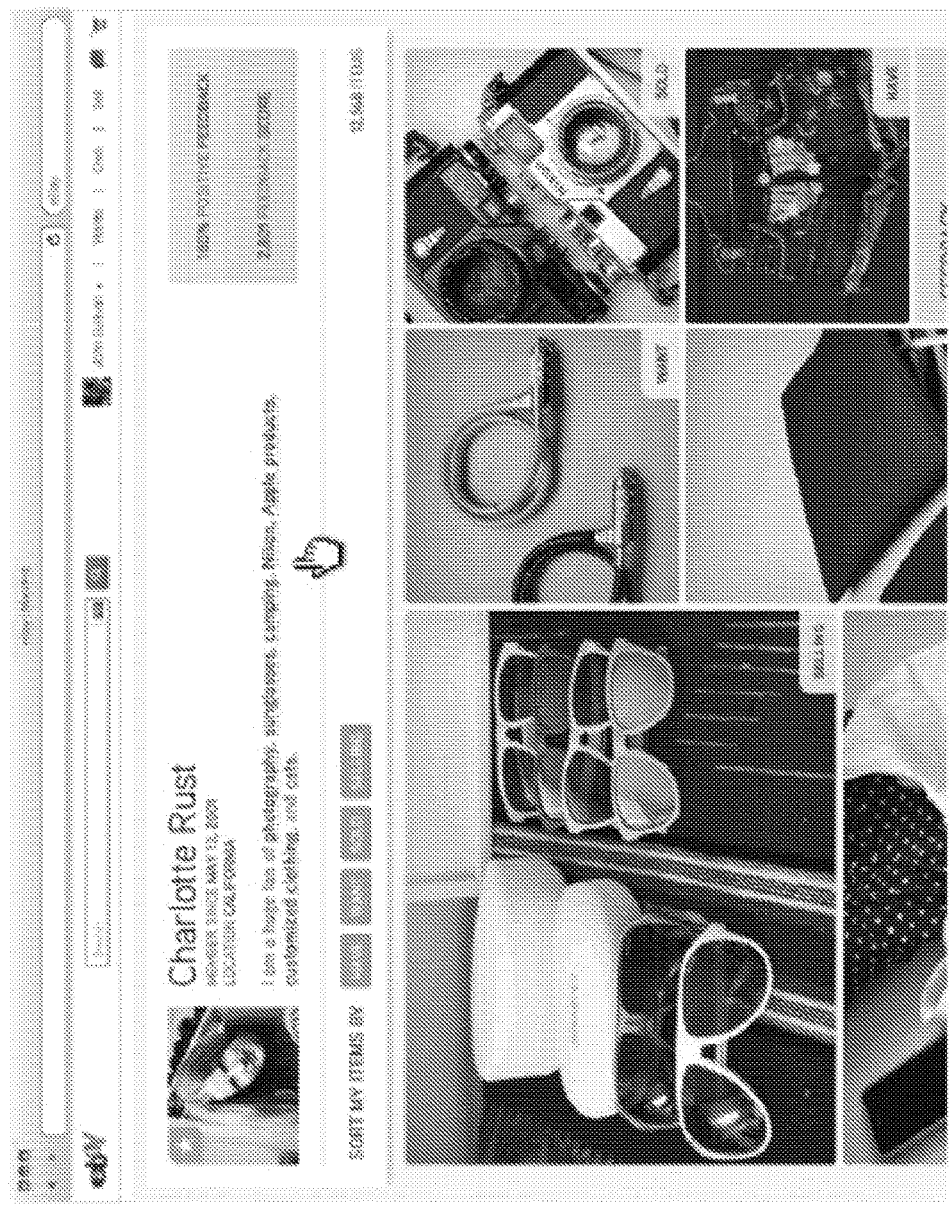
FIG. 100 is a screenshot showing a user profile card profiling the user, consistent with some embodiments.

FIG. 100 is a screenshot showing a user profile card profiling the user, consistent with some embodiments. As shown in FIG. 100, the user profile card includes information about the user along with items that the user has sold, is selling, has, and wants. The user profile card also includes statistics related to the transactions of the user.

Figure 101:
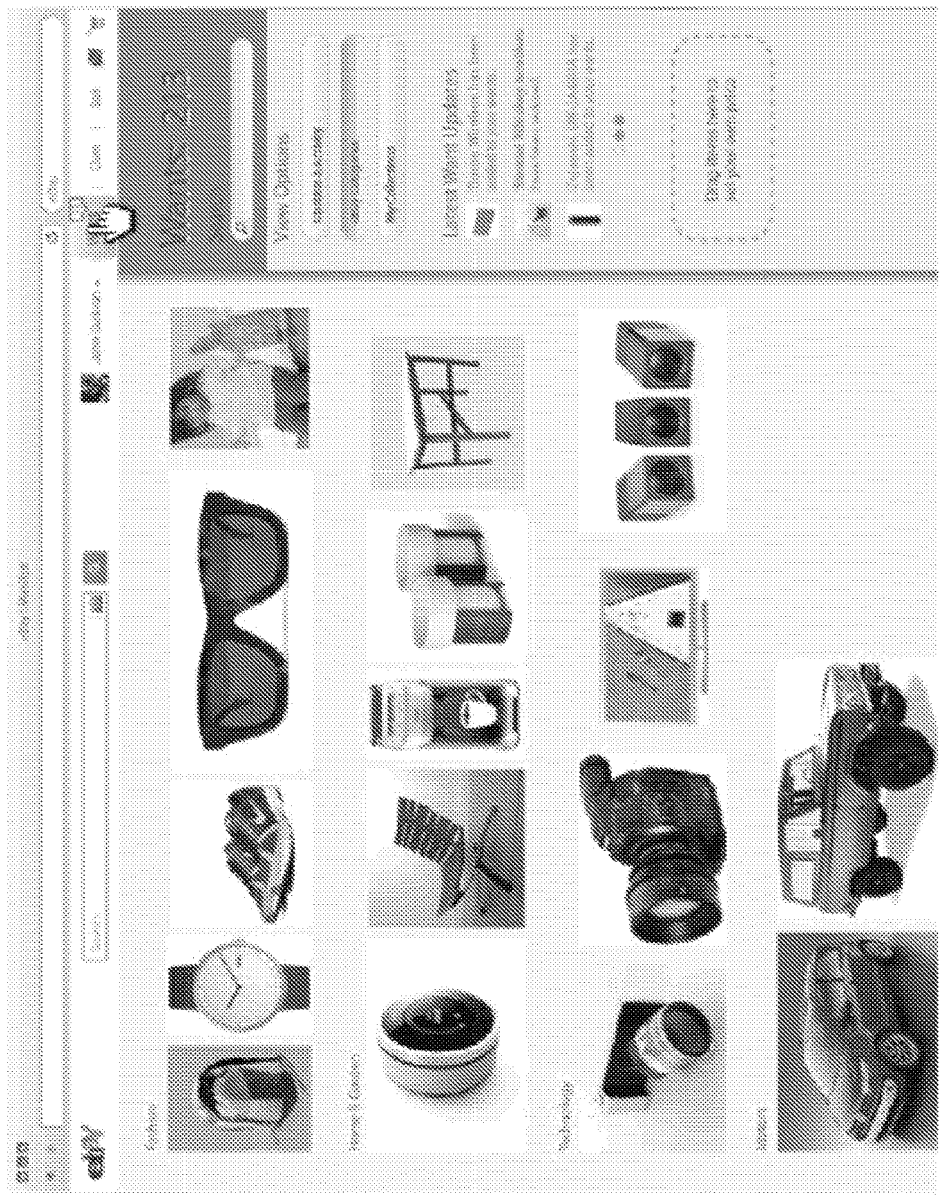
FIG. 101 is a screenshot of items that the user has designated as wants, consistent with some embodiments.

FIG. 101 is a screenshot of items that the user has designated as wants, consistent with some embodiments. Consistent with some embodiments, the user may be able to designate a price associated with a wanted item, wherein application server 124 may match the wanted item to items owned by other users using information in the user profile to alert the other user that the user is interested in the item.

Figure 102:
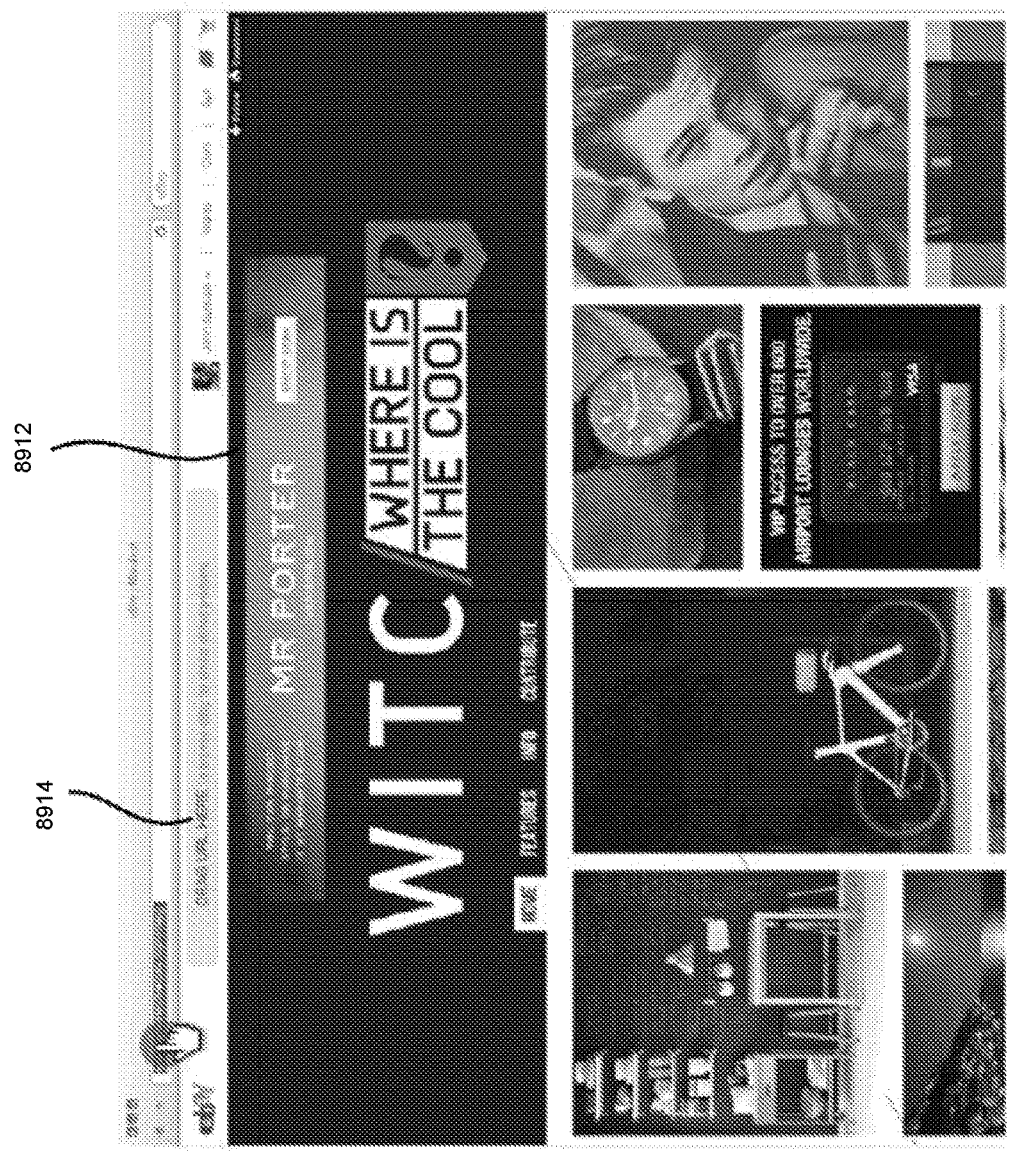
FIG. 102 is a screenshot demonstrating theme as an input, consistent with some embodiments.

FIG. 102 is a screenshot demonstrating theme 8912 as an input, consistent with some embodiments. As shown in FIG. 102, the user may drag the uniform resource locator (URL) of the website to an external toolbar application (e.g., external toolbar application 1800), which will copy the images in the website to application server 124. Application server 124 may then match the images to products in product database 8914 using an image matching algorithm.

Figure 103:
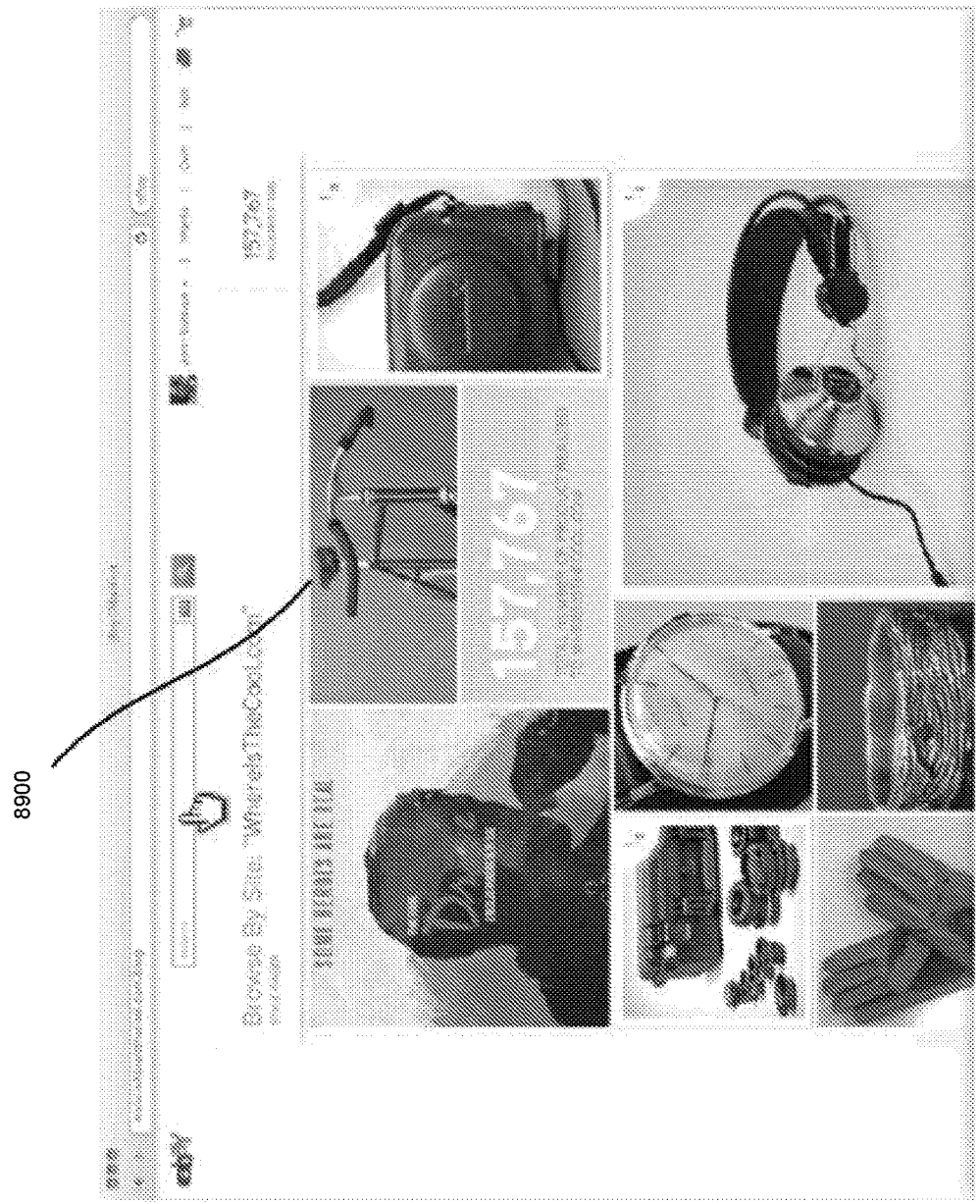
FIG. 103 is a screenshot illustrating a feed based on a theme.

FIG. 103 is a screenshot illustrating feed 8900 based on the theme 8912 from FIG. 102.

Figure 104:
FIG. 104 is a screenshot demonstrating adding images of items to the user wants using an external toolbar application.

FIG. 104 is a screenshot demonstrating adding images of items to the user wants using an external toolbar application (e.g., external toolbar application 1800).

Figure 105:
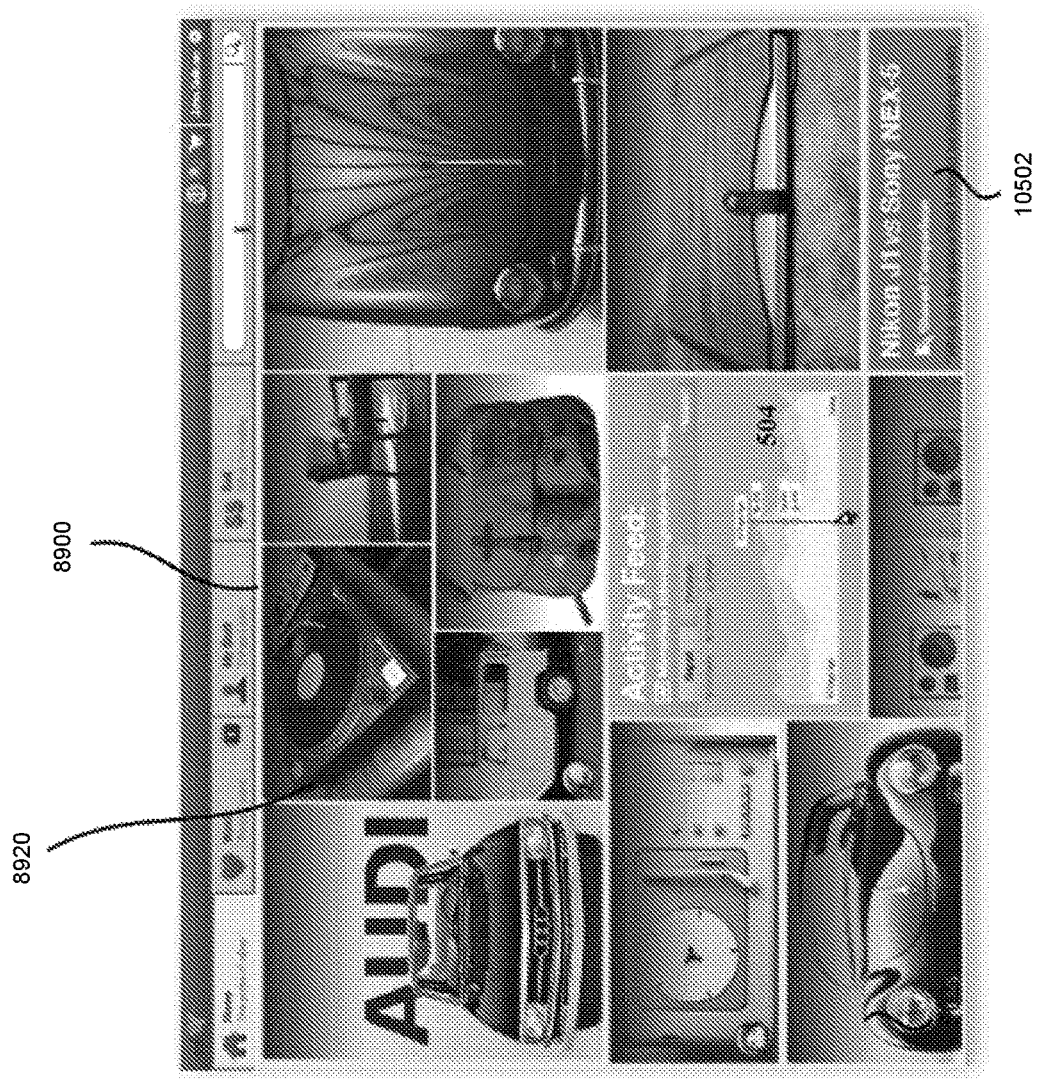
FIG. 105 is a screenshot illustrating feed showing product tiles, market data, and social information such as a shared product comparison.

FIG. 105 is a screenshot illustrating feed 8900 showing product tiles 9102, market data 8920, and social information such as a shared product comparison 10502.

Figure 106:
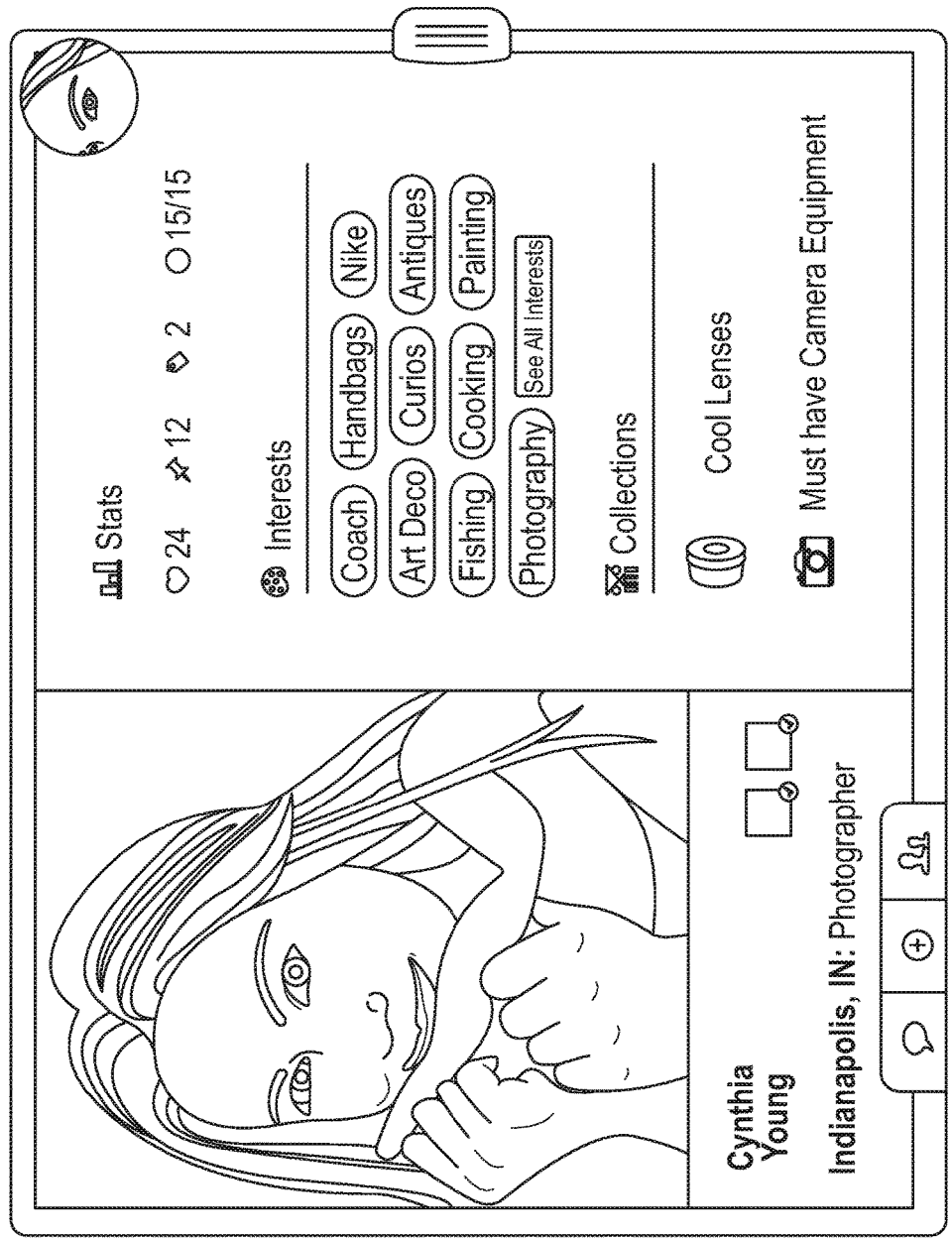
FIG. 106 is a screenshot showing another view of the user profile card, consistent with some embodiments.

FIG. 106 is a screenshot showing another view of the user profile card, consistent with some embodiments.

Figure 107:
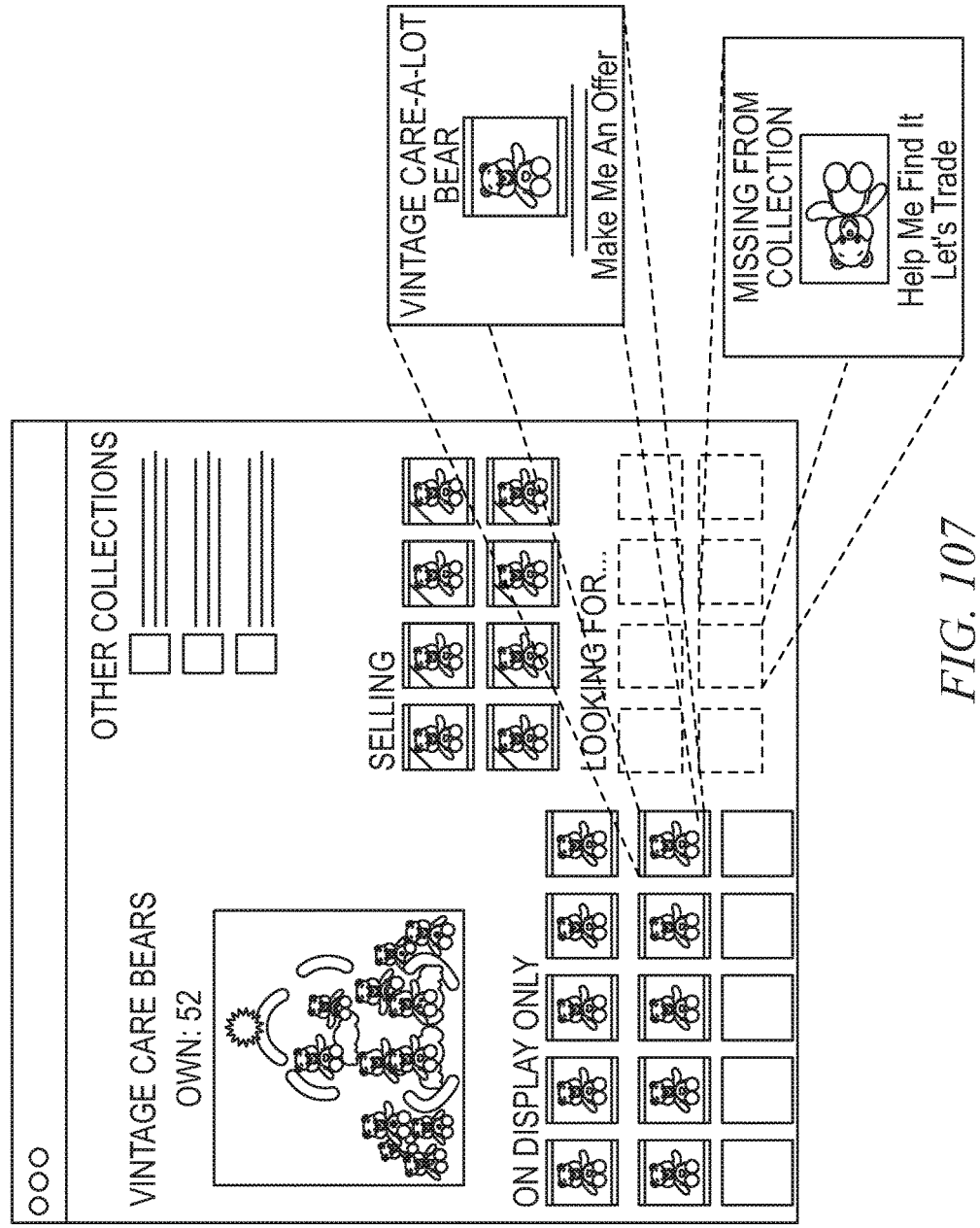
FIG. 107 is a diagram showing a collection page, consistent with some embodiments.

FIG. 107 is a diagram showing a collection page, consistent with some embodiments. As shown in FIG. 107, the user may create collections of items that they own including designating items as being on display, for sale, and showing items that they need to complete their collections. The items shown in the collection, both owned and needed, may be used by personalization modules 230 to generate feed 8900.

Figure 108:
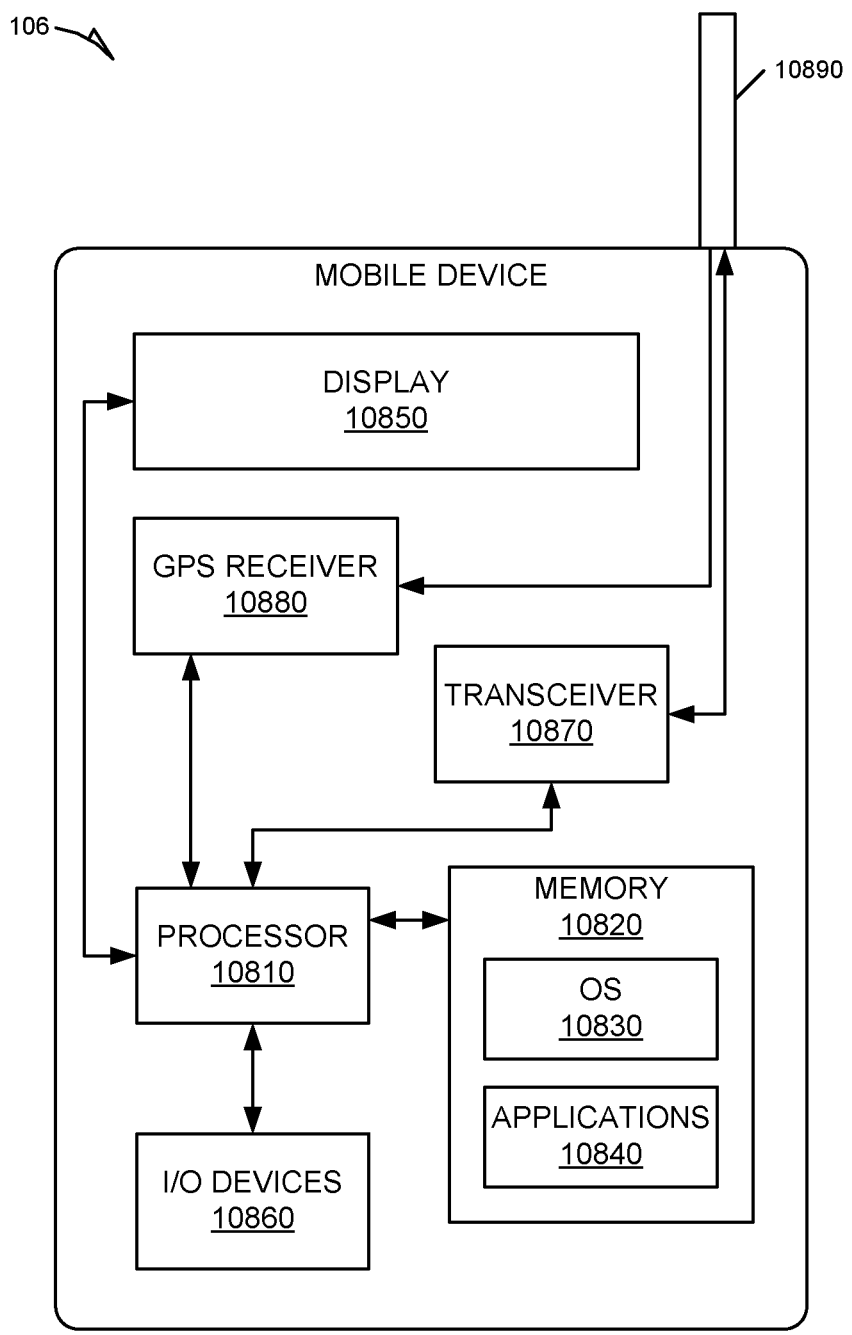
FIG. 108 is a block diagram illustrating a computing device, consistent with some embodiments.

FIG. 108 is a block diagram illustrating a computing device 10800, which may correspond to client device 106, or client device 108, consistent with some embodiments. The mobile device 10800 may, for example, be a smartphone such as an iPhone™ or other mobile device running the iOS™ operating system, the Android™ operating system, a BlackBerry™ operating system, the Microsoft® Windows® Phone operating system, Symbian™ OS, or webOS™, as would be consistent with client device 106 or client device 108. Computing device 10800 may also be a tablet computer such as the iPad™ or other similar device running the aforementioned operating systems. Computing device 10800 may also be personal computer, laptop computer, netbook, or tablet computer as also would be consistent with client device 106 or client device 108. The computing device 10800 may include a processor 10810. The processor 10810 may be any of a variety of different types of commercially available processors suitable for mobile devices (e.g., an XScale architecture microprocessor, a Microprocessor without Interlocked Pipeline Stages (MIPS) architecture processor, or another type of processor). A memory 10820, such as a random access memory (RAM), a Flash memory, or other type of memory, is typically accessible to the processor 10810. The memory 10820 may be adapted to store an operating system (OS) 10830, as well as application programs 10840, such as a mobile location enabled application that may provide location based services (e.g., physical location check-in) to a user. The processor 10810 may be coupled, either directly or via appropriate intermediary hardware, to a display 10850 and to one or more input/output (I/O) devices 10860, such as a keypad, a touch panel sensor, a microphone, and the like.

Similarly, in some embodiments, the processor 10810 may be coupled to a transceiver 10870 that interfaces with an antenna 10890. The transceiver 10870 may be configured to both transmit and receive cellular network signals, wireless data signals, or other types of signals via the antenna 10890, depending on the nature of the computing device 10800. In this manner, the connection 118 with the network 104 may be established. Further, in some configurations, a GPS receiver 10890 may also make use of the antenna 10890 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 109:
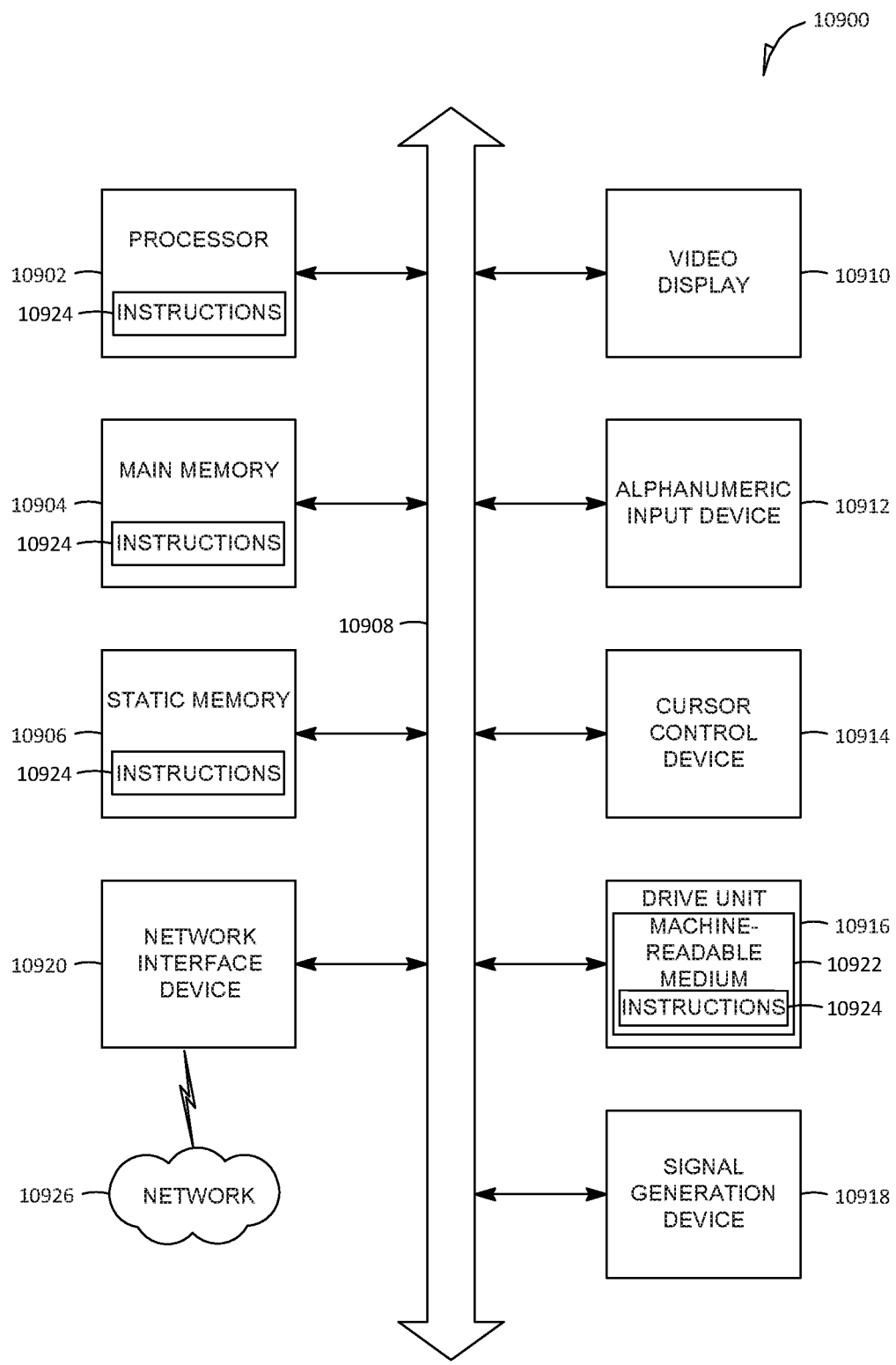
FIG. 109 is a diagrammatic representation of a machine in the example form of a computer system within which a set of instructions for causing the machine to perform any one or more of the methodologies discussed herein may be executed.

FIG. 109 is a block diagram of machine in the example form of a computer system 10900 within which instructions 10924 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 10900 includes a processor 10902 (e.g., a central processing unit (CPU), a graphics processing unit (GPU) or both), a main memory 10904 and a static memory 10906, which communicate with each other via a bus 10908. The computer system 10900 may further include a video display unit 10910 (e.g., a liquid crystal display (LCD) or a cathode ray tube (CRT)). The computer system 10900 also includes an alphanumeric input device 10912 (e.g., a keyboard), a UI cursor control device 10914 (e.g., a mouse), a disk drive unit 10916, a signal generation device 10918 (e.g., a speaker), and a network interface device 10920.

Machine-Readable Medium

The disk drive unit 10916 includes a machine-readable medium 10922 on which is stored one or more sets of data structures and instructions 10924 (e.g., software) embodying or used by any one or more of the methodologies or functions described herein. The instructions 10924 may also reside, completely or at least partially, within the main memory 10904, static memory 10906, and/or within the processor 10902 during execution thereof by the computer system 10900, with the main memory 10904 and the processor 10902 also constituting machine-readable media.

While the machine-readable medium 10922 is shown in an example embodiment to be a single medium, the term "machine-readable medium" may include a single medium or multiple media (e.g., a centralized or distributed database, and/or associated caches and servers) that store the one or more data structures or instructions 10924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Transmission Medium

The instructions 10924 may further be transmitted or received over a communications network 10926 using a transmission medium. The instructions 10924 may be transmitted using the network interface device 10920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 10924 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed:

1. A method for providing a shipping update for a package being shipped, the method comprising:
   receiving, at a server machine, a location update for the package from a location component associated with the package;
   determining information about the location of the package from the location update;
   determining, by one or more processors of the server machine, compatibility of an item included in the package with one or more items owned by a recipient of the package;
   in response to the one or more processors of the server machine determining the item included in the package is incompatible with the one or more items owned by the recipient, generating a recommendation for an additional item that is compatible with the item included in the package;
   creating the shipping update using the information about the location and the recommendation for the additional item, the shipping update comprising a personalized message for the recipient and an option to purchase the additional item; and
   transmitting, from the server machine, the shipping update to a device of the recipient of the package.

2. The method according to claim 1, wherein the personalized message includes at least one of: the location of the package, weather at the location of the package, a time of day at the location, or a status of the package.

3. The method according to claim 1, wherein transmitting the shipping update comprises transmitting the shipping update over at least one of short messaging service (SMS), e-mail, or a social network.

4. The method of claim 1, wherein the determining of the compatibility of an item included in the package with the one or more items owned by a recipient of the package is based on compatibility information of the item included in the location update.

5. The method of claim 1, further comprising accessing inventory information maintained as part of a user profile of the user, the inventory information specifying the one or more items owned by the user.

6. The method of claim 1, wherein the determining information related to the location of the package from the location update comprises:
   identifying, based on the location of the package, a merchant able to timely ship the additional item such that the additional item may be received by the recipient concurrently with the package;
   wherein the shipping update provides the recipient an ability to purchase the item from the merchant.

7. The method of claim 1, further comprising:
   retrieving a location of a merchant offering the additional item for sale; and
   generating a map showing the retrieved location of the merchant offering the additional item for sale.

8. A system comprising:
   one or more processors of a machine;
   a computer readable medium storing instructions that, when executed by the one or more processors, cause the machine to perform operations comprising:
   receiving, from a location component, a location update for the package;
   determining information about the location of the package from the location update;
   determining compatibility of an item included in the package with one or more items owned by a recipient of the package;
   in response to determining the item included in the package is incompatible with the one or more items owned by the recipient, generating a recommendation for an additional item that is compatible with the item included in the package;
   creating the shipping update using the information about the location and the recommendation for the additional item, the shipping update comprising a personalized message for the recipient and an option to purchase the additional item; and
   transmitting the shipping update to a device of the recipient of the package.

9. A machine-readable storage device embodying instructions that, when executed by a machine, cause the machine to perform operations comprising:
   receiving, from a location component, a location update for the package;
   determining information about the location of the package from the location update;
   determining compatibility of an item included in the package with one or more items owned by a recipient of the package;
   in response to determining the item included in the package is incompatible with the one or more items owned by the recipient, generating a recommendation for an additional item that is compatible with the item included in the package;
   creating the shipping update using the information about the location and the recommendation for the additional item, the shipping update comprising a personalized message for the recipient and an option to purchase the additional item; and transmitting the shipping update to a device of the recipient of the package.

\* \* \* \* \*